US011003338B2

(12) United States Patent
Dunn et al.

(10) Patent No.: US 11,003,338 B2
(45) **Date of Patent: *May 11, 2021**

(54) DEVICE, METHOD, AND GRAPHICAL USER INTERFACE FOR WINDOW MANIPULATION AND MANAGEMENT

(71) Applicant: Apple Inc., Cupertino, CA (US)

(72) Inventors: Corbin Robert Dunn, Los Gatos, CA (US); John O. Louch, Santa Barbara, CA (US); Kevin James Van Vechten, Orinda, CA (US); Patrick Lee Coffman, San Francisco, CA (US); Troy N. Stephens, Franklin Lakes, NJ (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/357,300

(22) Filed: Mar. 18, 2019

(65) Prior Publication Data

US 2019/0272084 A1 Sep. 5, 2019

Related U.S. Application Data

(63) Continuation of application No. 15/609,695, filed on May 31, 2017, now Pat. No. 10,289,292.

(Continued)

(51) Int. Cl.
*G06F 3/0488* (2013.01)
*G06F 3/0481* (2013.01)
(Continued)

(52) U.S. Cl.
CPC ........ *G06F 3/04845* (2013.01); *G06F 3/0481* (2013.01); *G06F 9/451* (2018.02); *G06F 3/0488* (2013.01)

(58) Field of Classification Search
CPC ............................ G06F 1/3234; G06F 3/0481
See application file for complete search history.

(56) References Cited

U.S. PATENT DOCUMENTS 6,075,531 A * 6/2000 DeStefano .......... G06F 3/04812 715/788
2003/0189597 A1* 10/2003 Anderson ............ G06F 3/0481 715/778

(Continued)

OTHER PUBLICATIONS

International Preliminary Report on Patentability and Written Opinion for PCT/US2017/035376 dated Dec. 27, 2018.

(Continued)

*Primary Examiner* — Rayeez R Chowdhury
(74) *Attorney, Agent, or Firm* — Fernando & Partners, LLP

(57) ABSTRACT

An electronic device: displays a first window in a display area; and detects a first user input associated with one or more edges of the first window. In response to detecting the first user input, and in accordance with a determination that the first user input corresponds to a first input type, the device resizes one or more dimensions of the first window that correspond to the one or more edges of the first window based on a movement vector associated with the first user input. In response to detecting the first user input, and in accordance with a determination that the first user input corresponds to a second input type, the device moves the one or more edges of the first window to one or more corresponding edges of the display area while maintaining respective one or more opposite edges of the first window.

19 Claims, 129 Drawing Sheets

Related U.S. Application Data

(60) Provisional application No. 62/348,984, filed on Jun. 12, 2016.

(51) Int. Cl.
*G06F 3/0484* (2013.01)
*G06F 9/451* (2018.01)

(56) References Cited

U.S. PATENT DOCUMENTS

| | | | | |
|---|---|---|---|---|
| 2005/0125742 | A1* | 6/2005 | Grotjohn ............... | G06F 3/0481 715/799 |
| 2008/0005693 | A1* | 1/2008 | Oliver ................. | G06F 3/04845 715/781 |
| 2009/0144653 | A1* | 6/2009 | Ubillos ............... | G06F 3/04845 715/800 |
| 2011/0175930 | A1* | 7/2011 | Hwang ................. | G06F 3/0488 345/629 |
| 2013/0212522 | A1* | 8/2013 | Fleizach ............... | G06F 3/0488 715/784 |
| 2015/0378518 | A1 | 12/2015 | Heydlauf | |
| 2016/0034155 | A1* | 2/2016 | Vranjes ............... | G06F 3/04842 715/803 |
| 2016/0034156 | A1 | 2/2016 | Vranjes et al. | |

OTHER PUBLICATIONS

“Digitisation of a Moving Assembly Operation Using Multiple Imaging Sensor”, Vinayak Prabhu, Oct. 9, 2015.
“Working Mac”, JR Brookwalter, Jan. 2019.

* cited by examiner

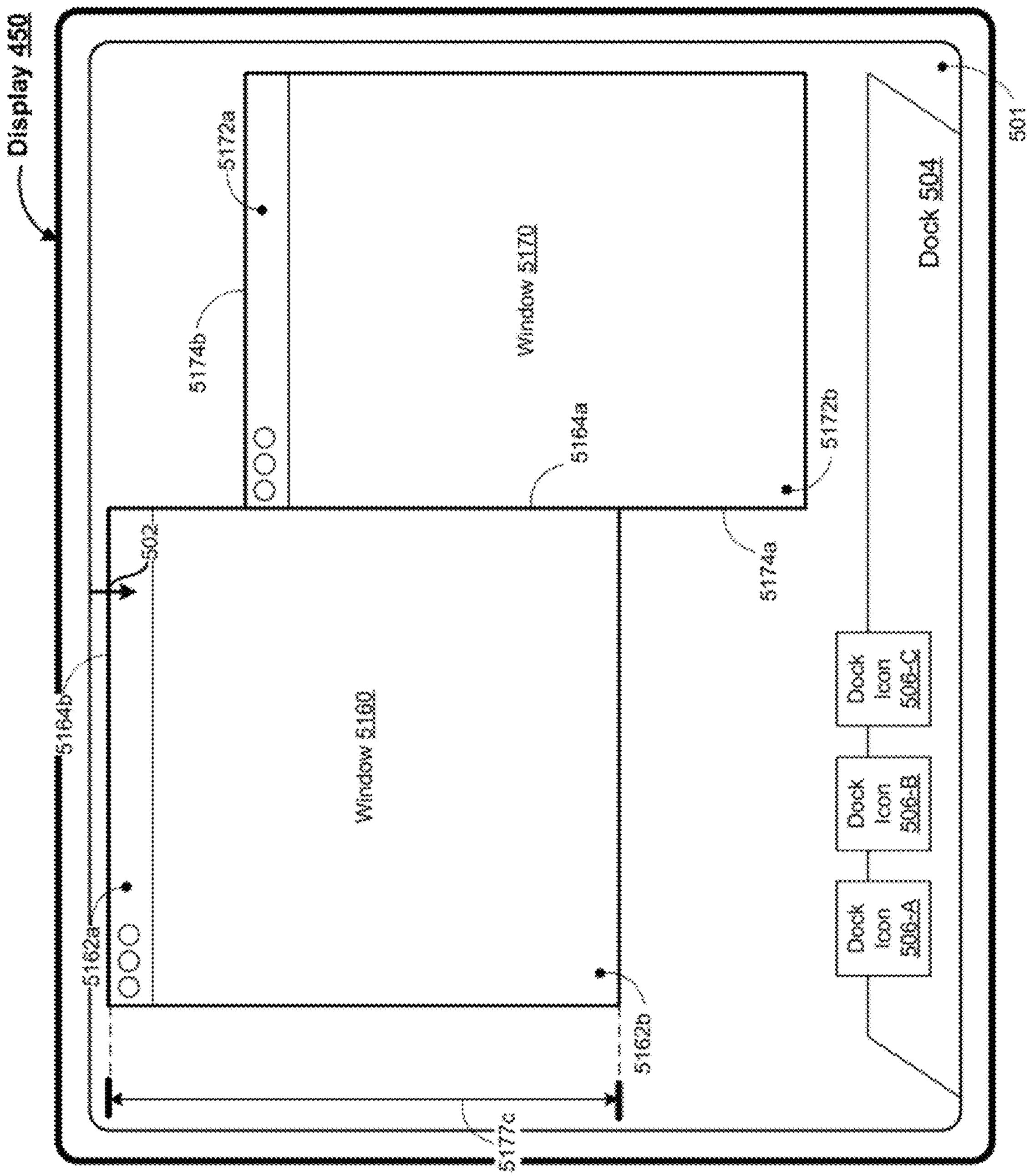
Figure 5AAA

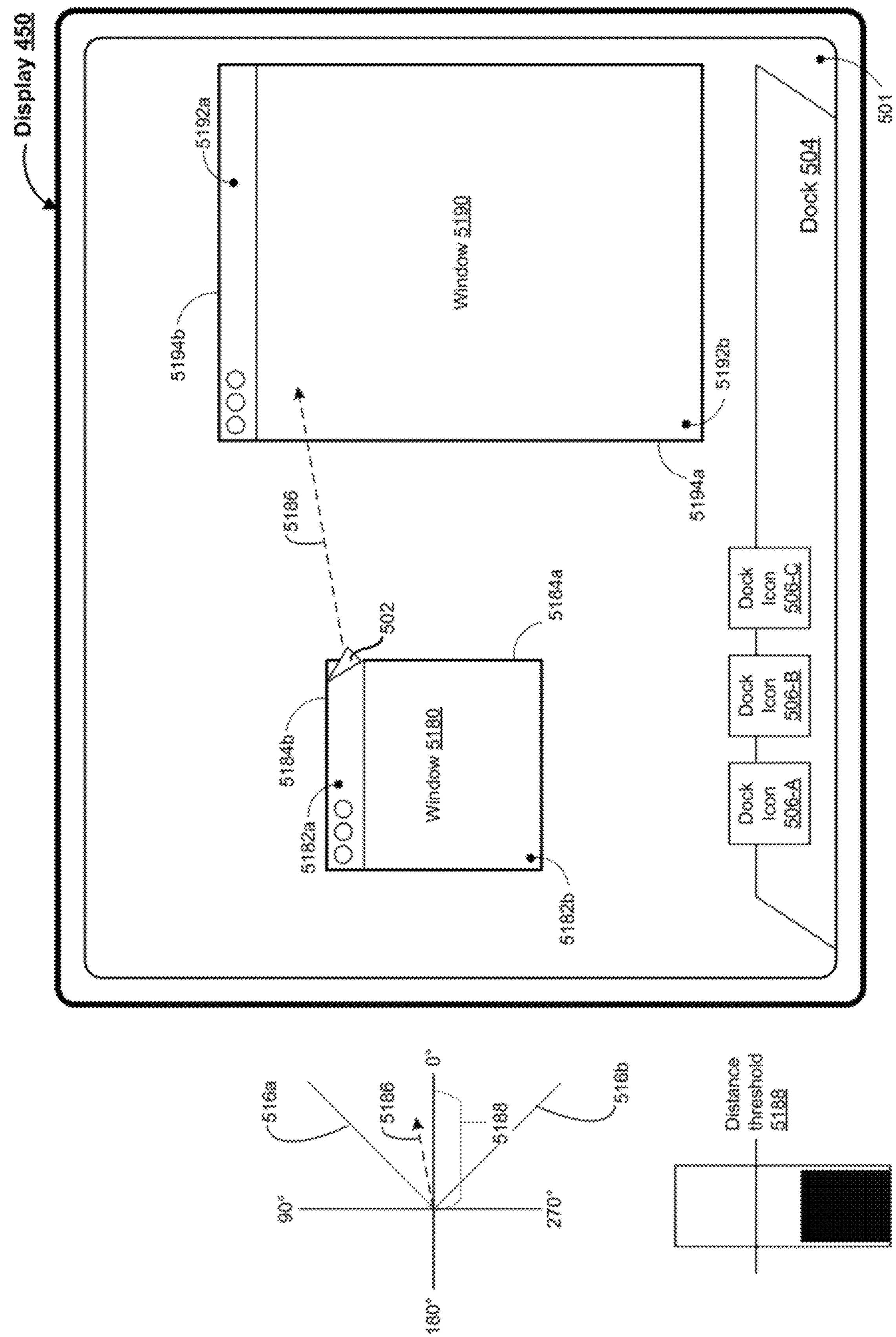
Figure 5BBB

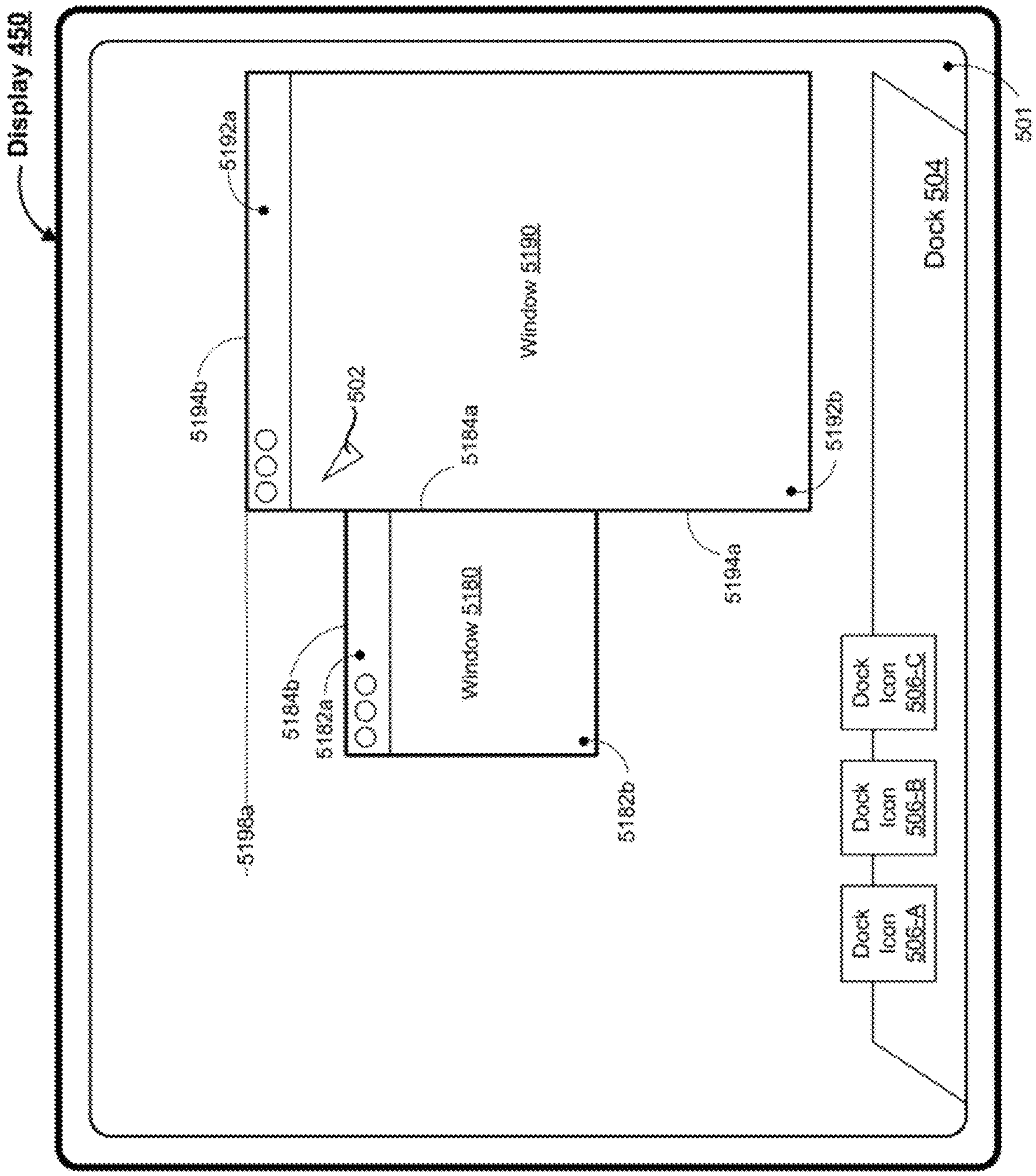
Figure 5CCC

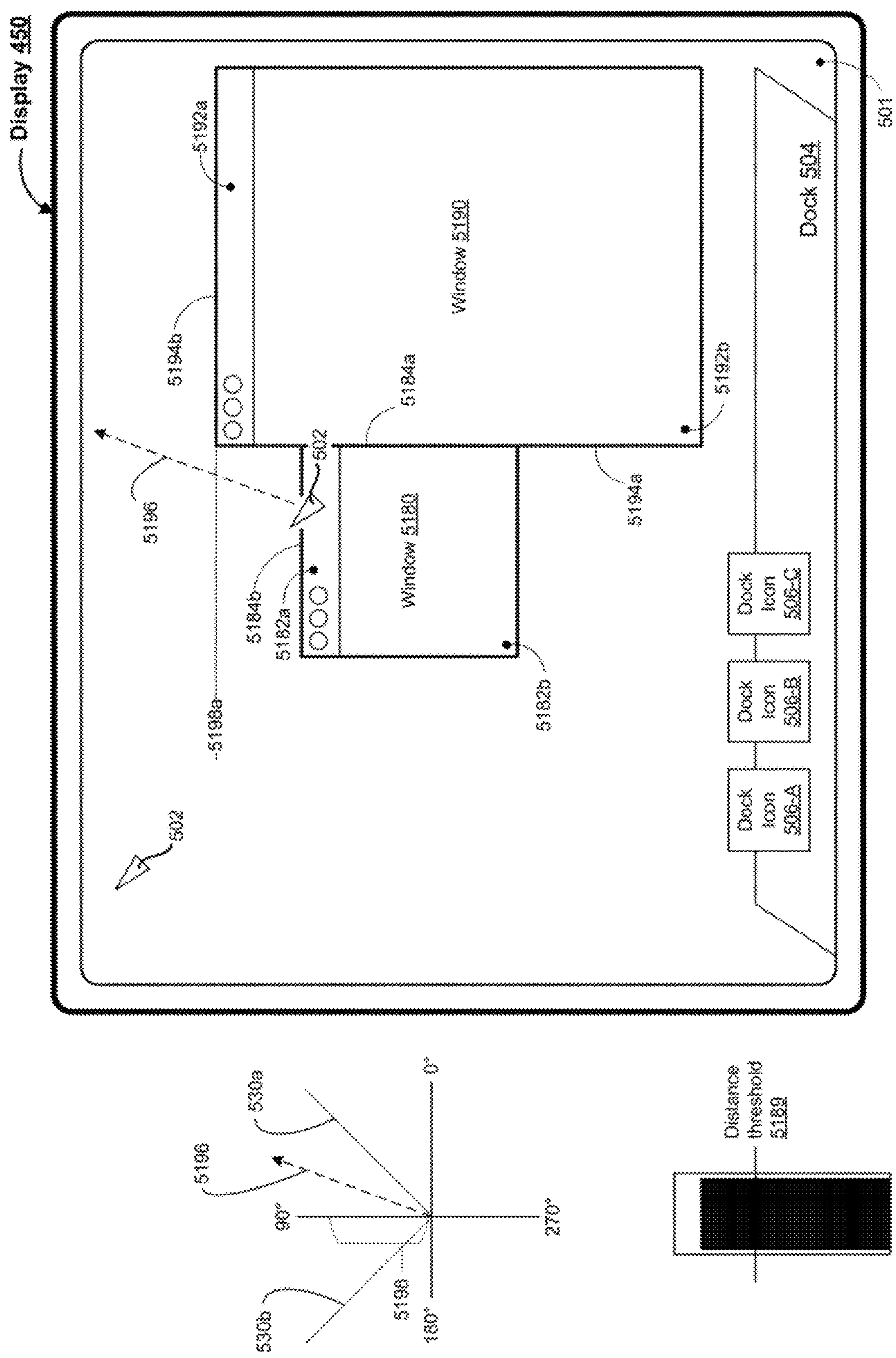
Figure 5DDD

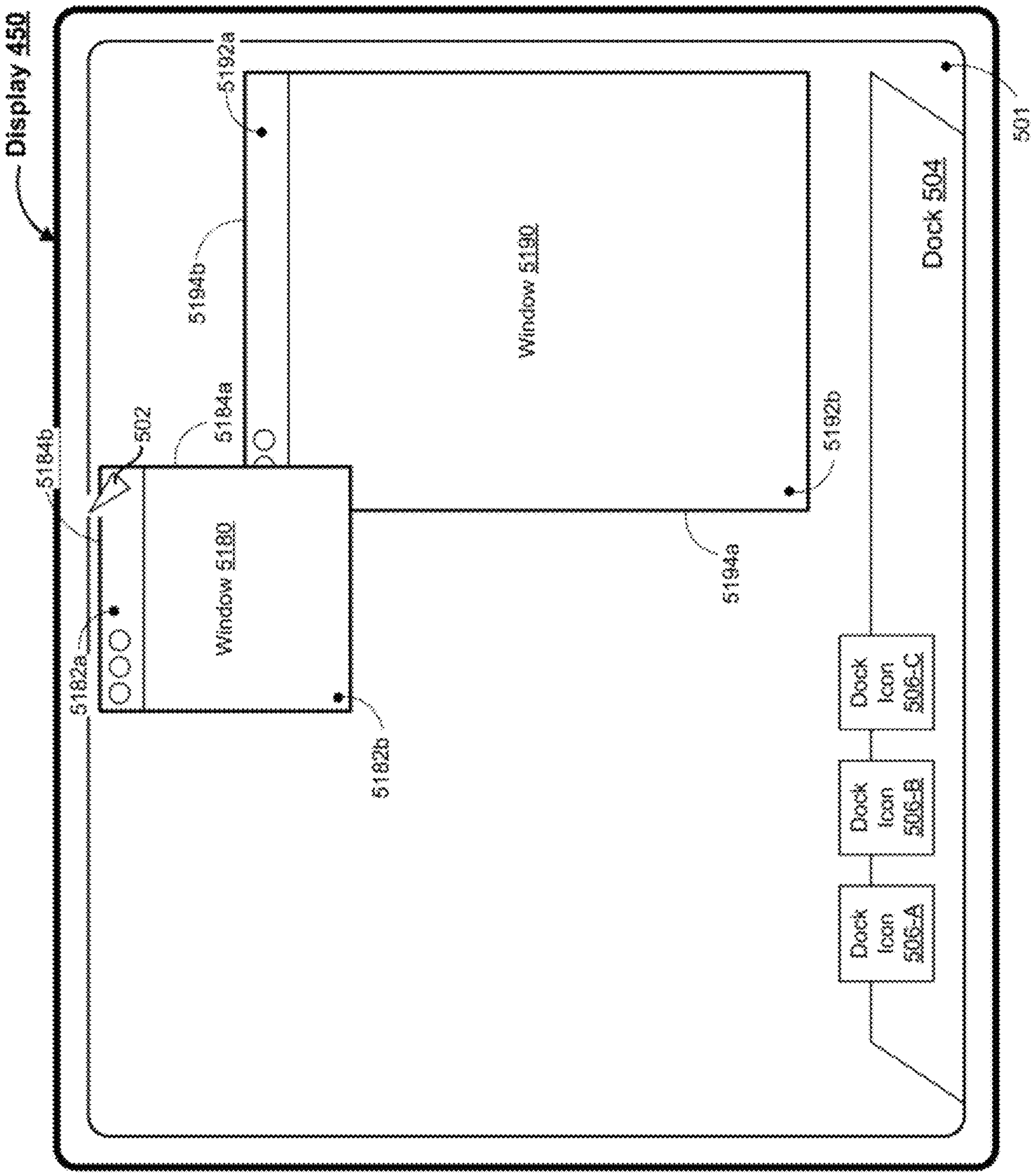
Figure 5EEE

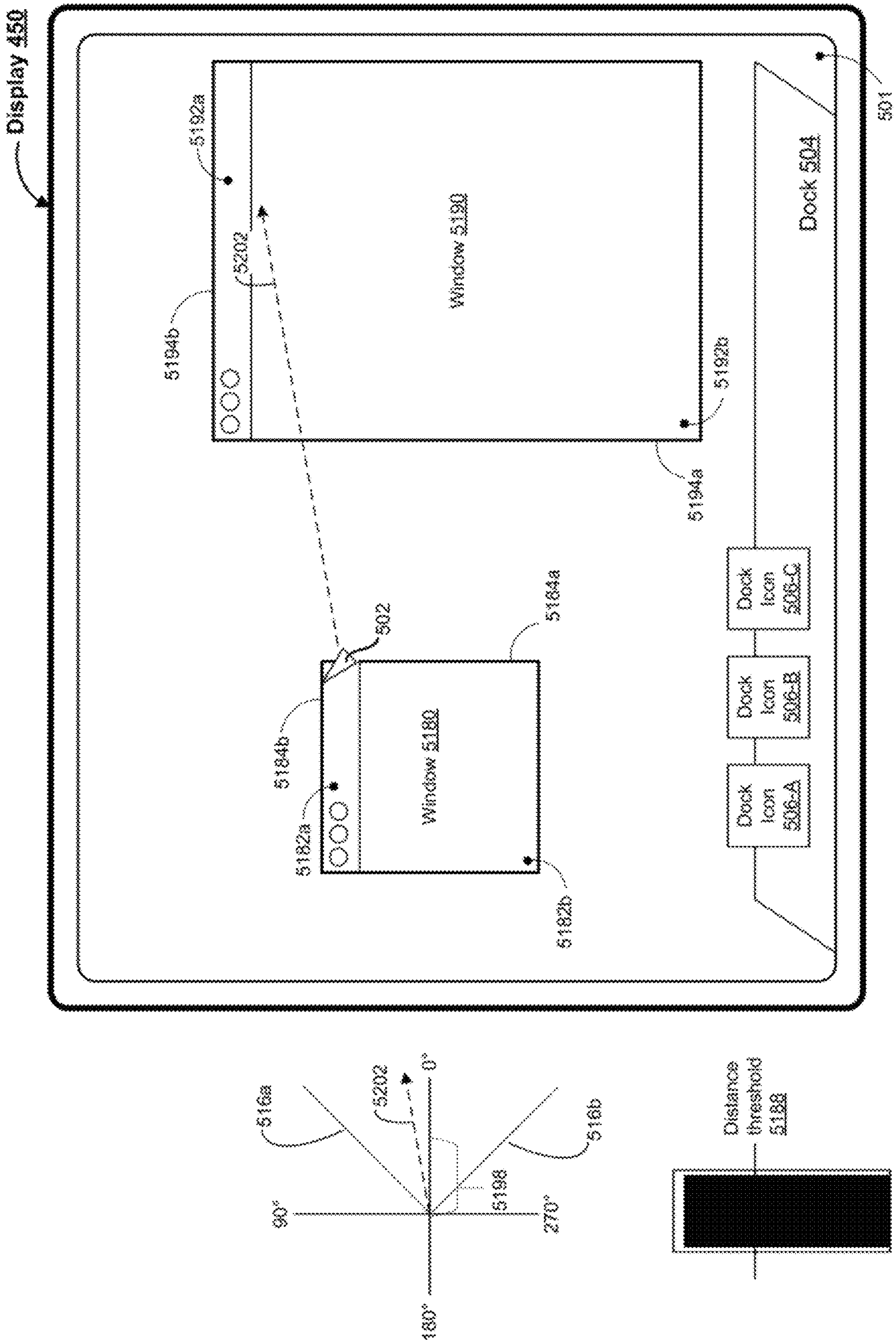
Figure 5FFF

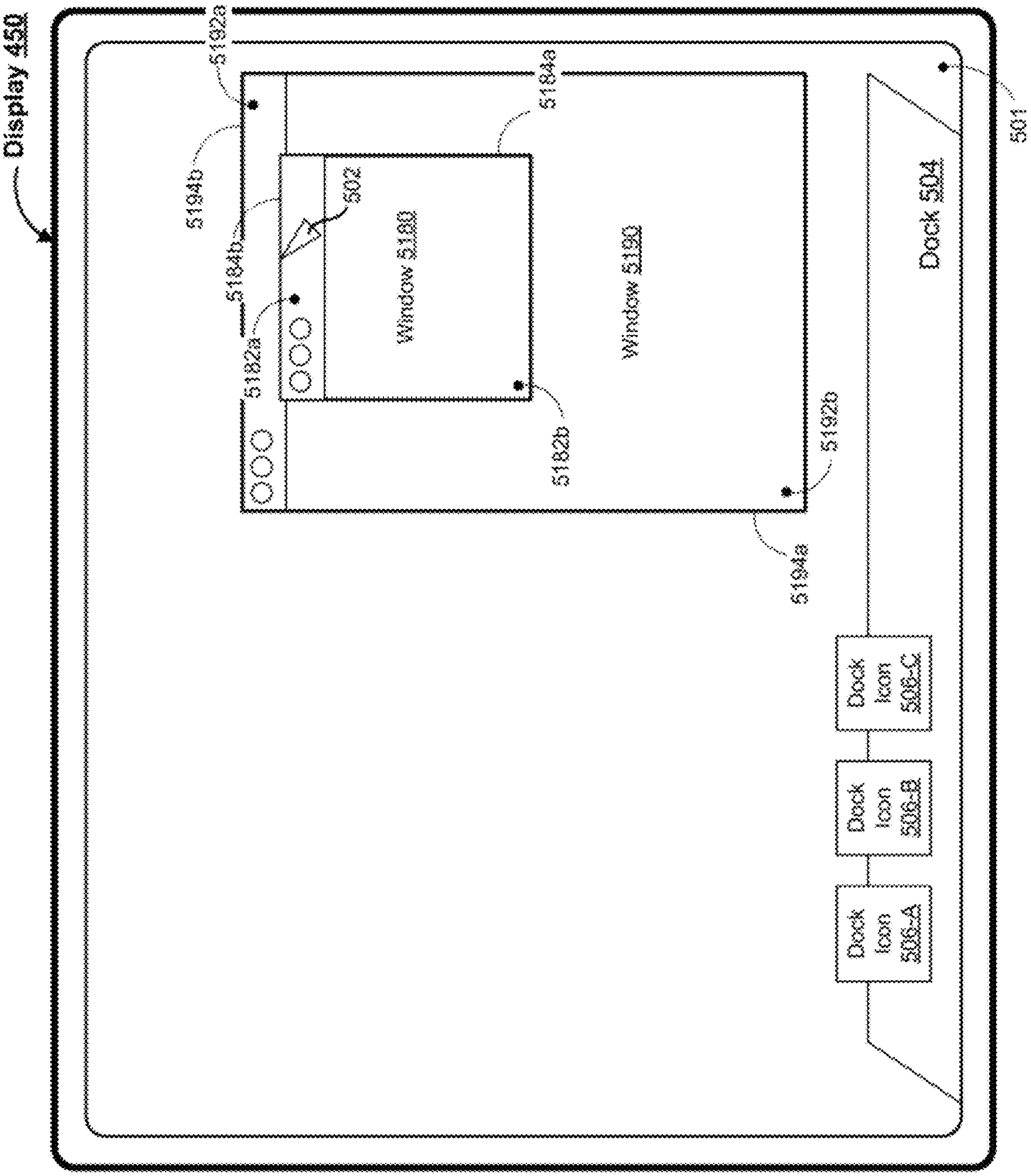
Figure 5GGG

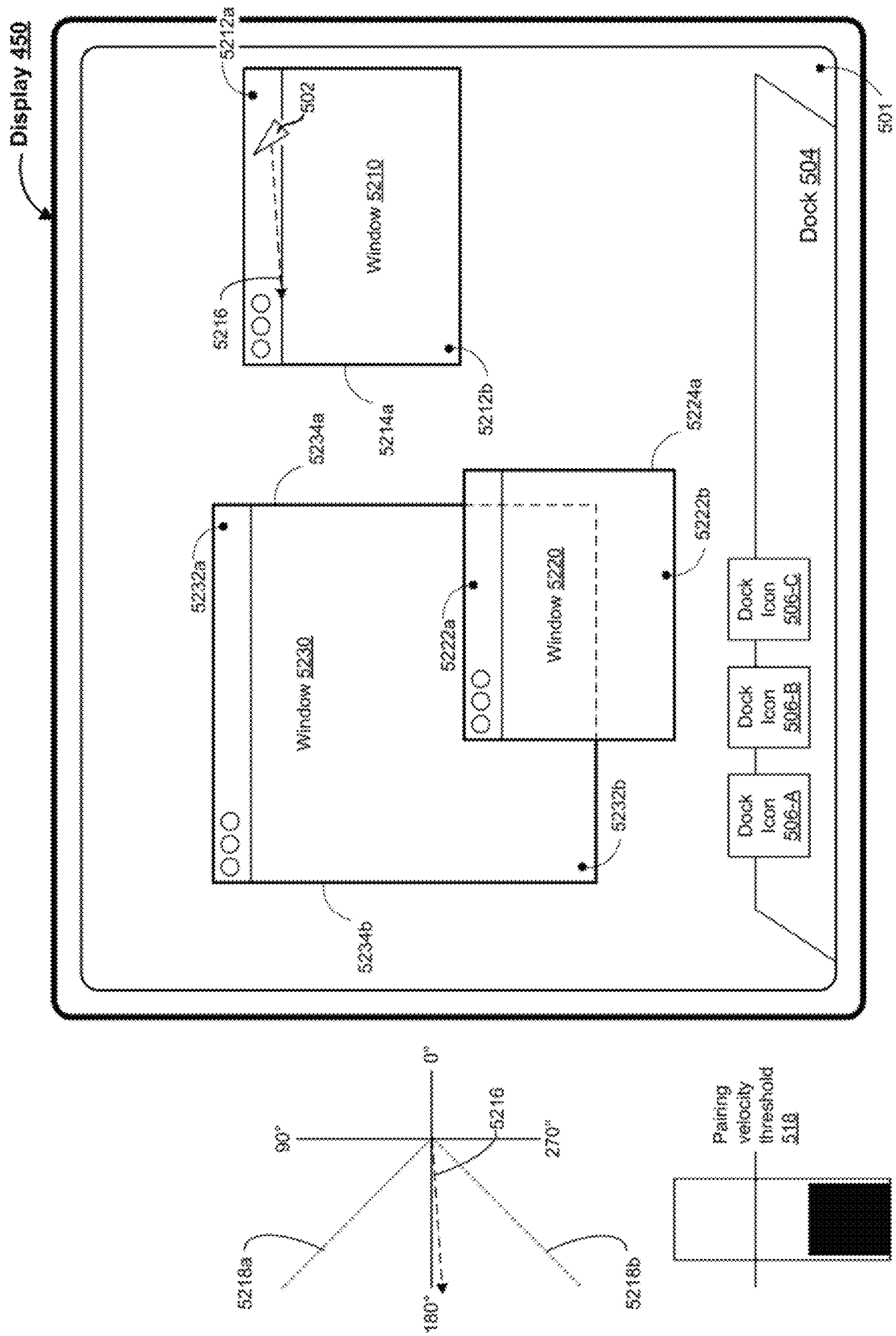
Figure 5HHH

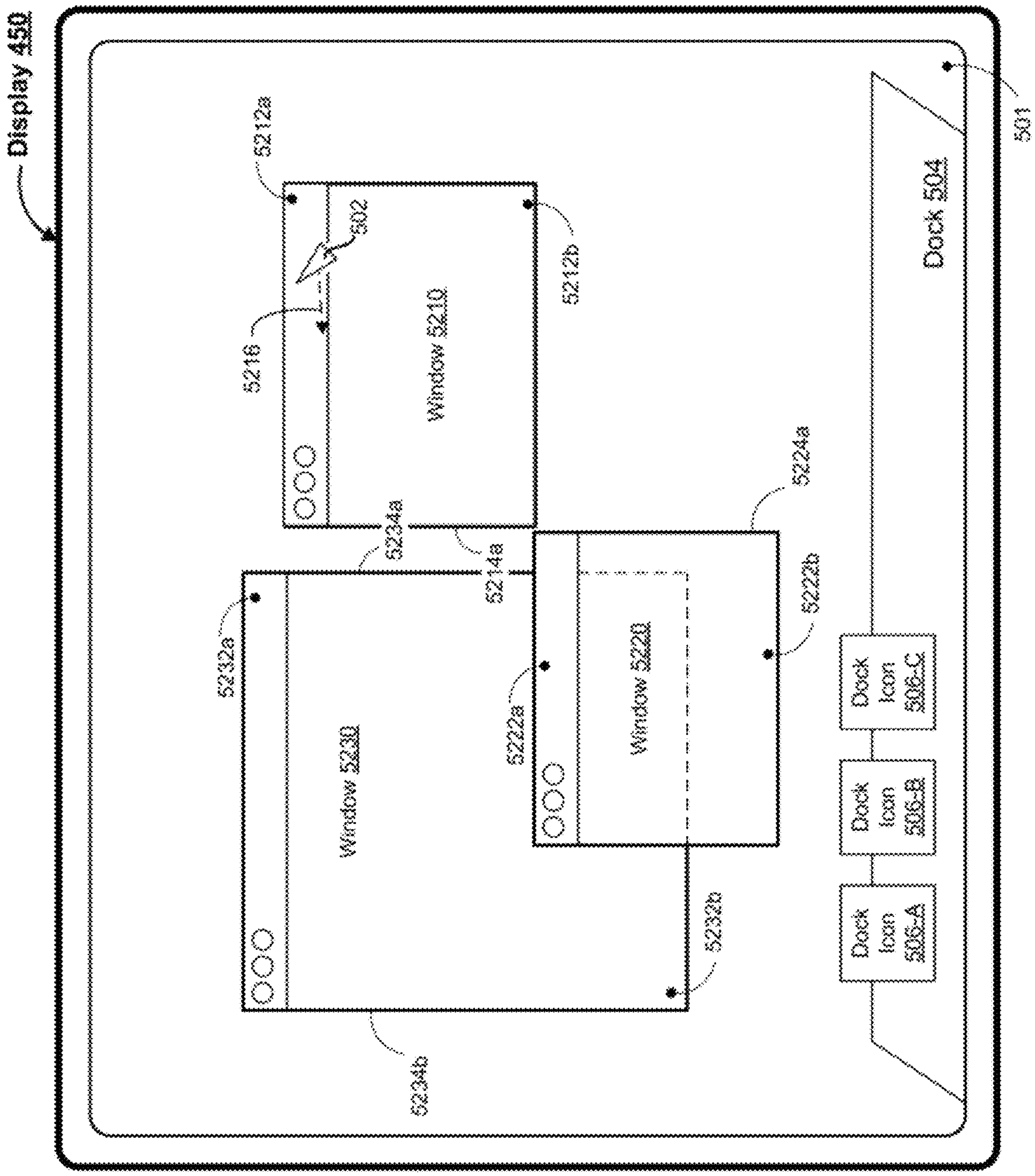
Figure 5III

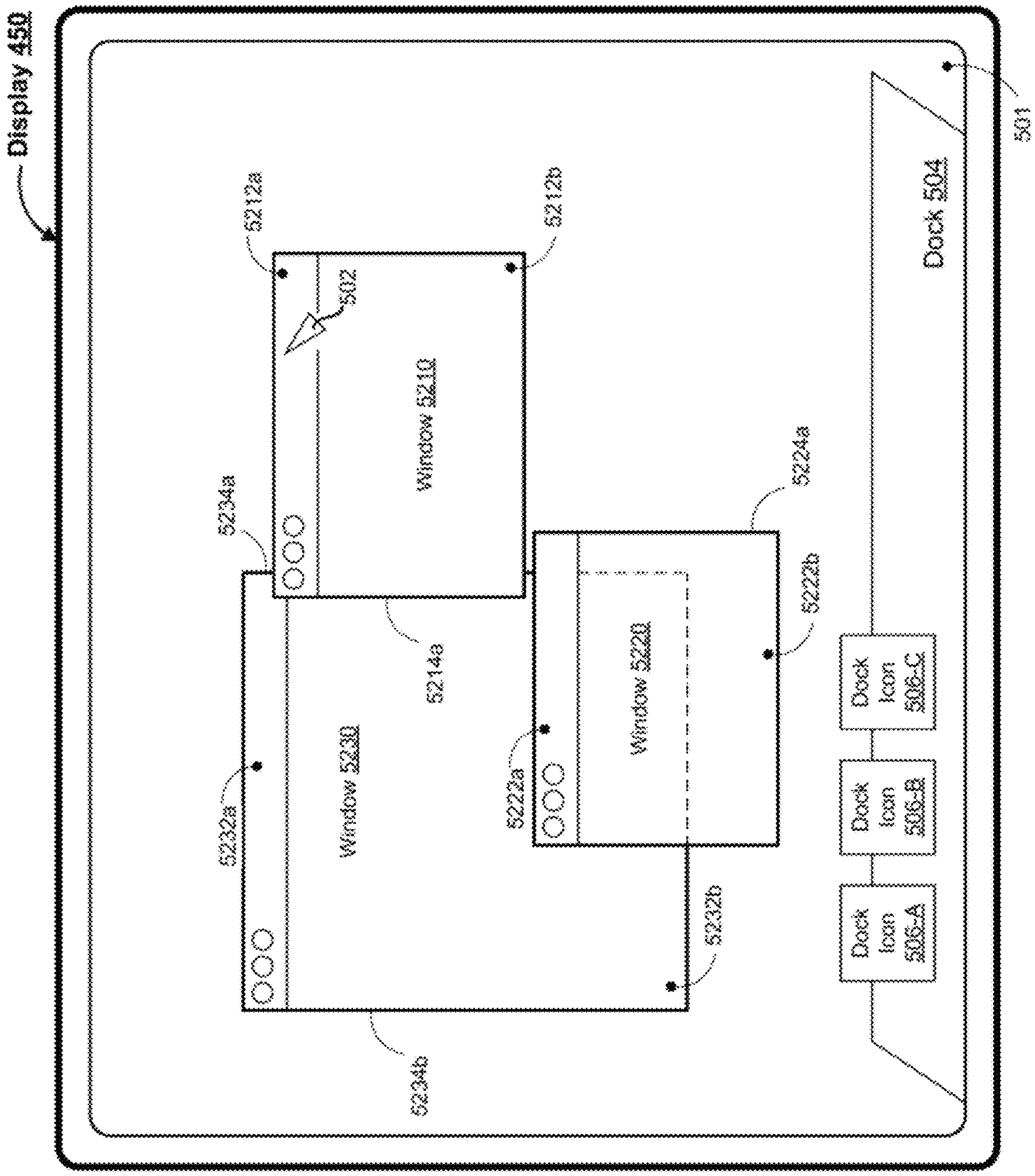
Figure 5JJJ

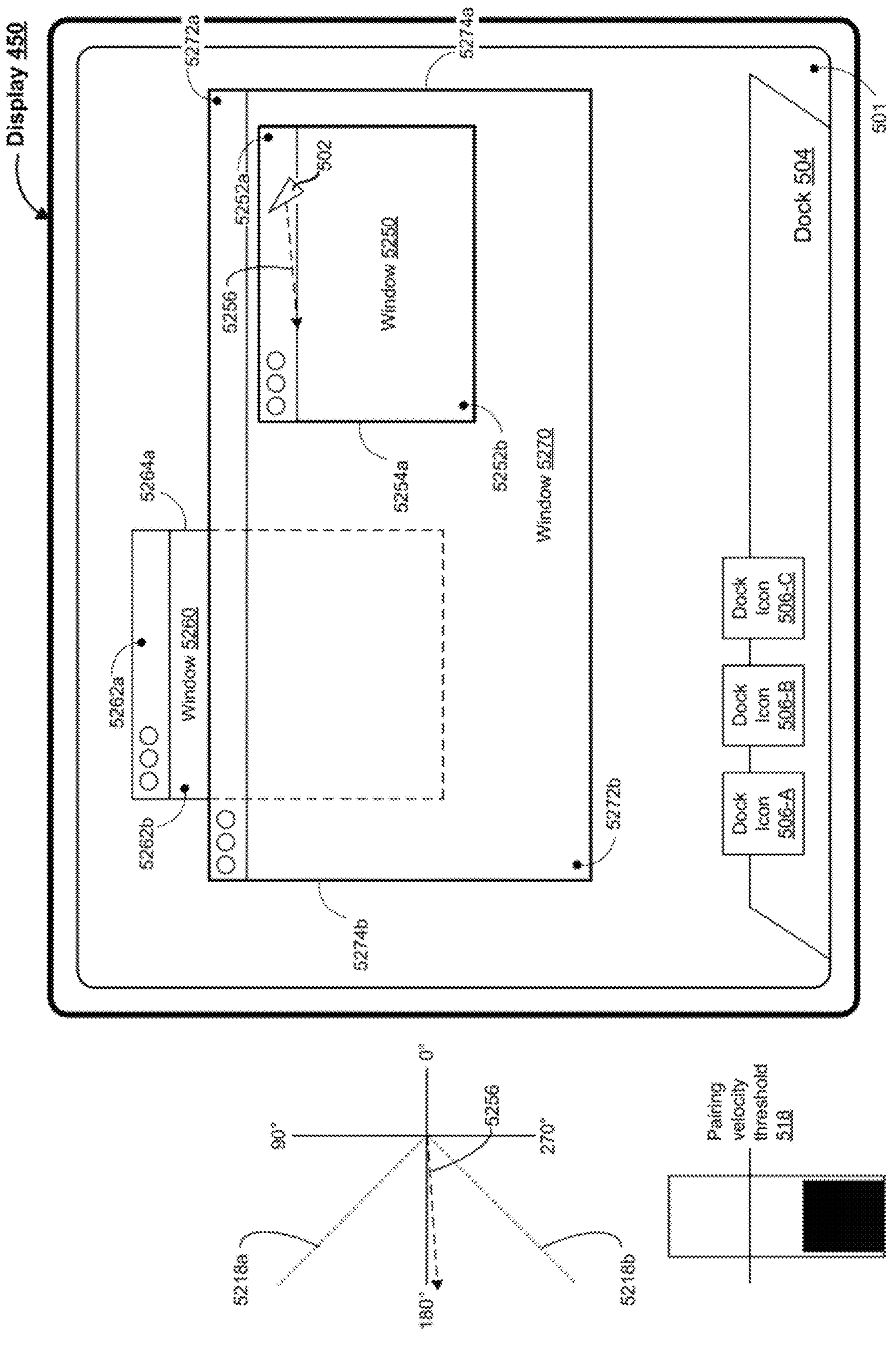
Figure 5KKK

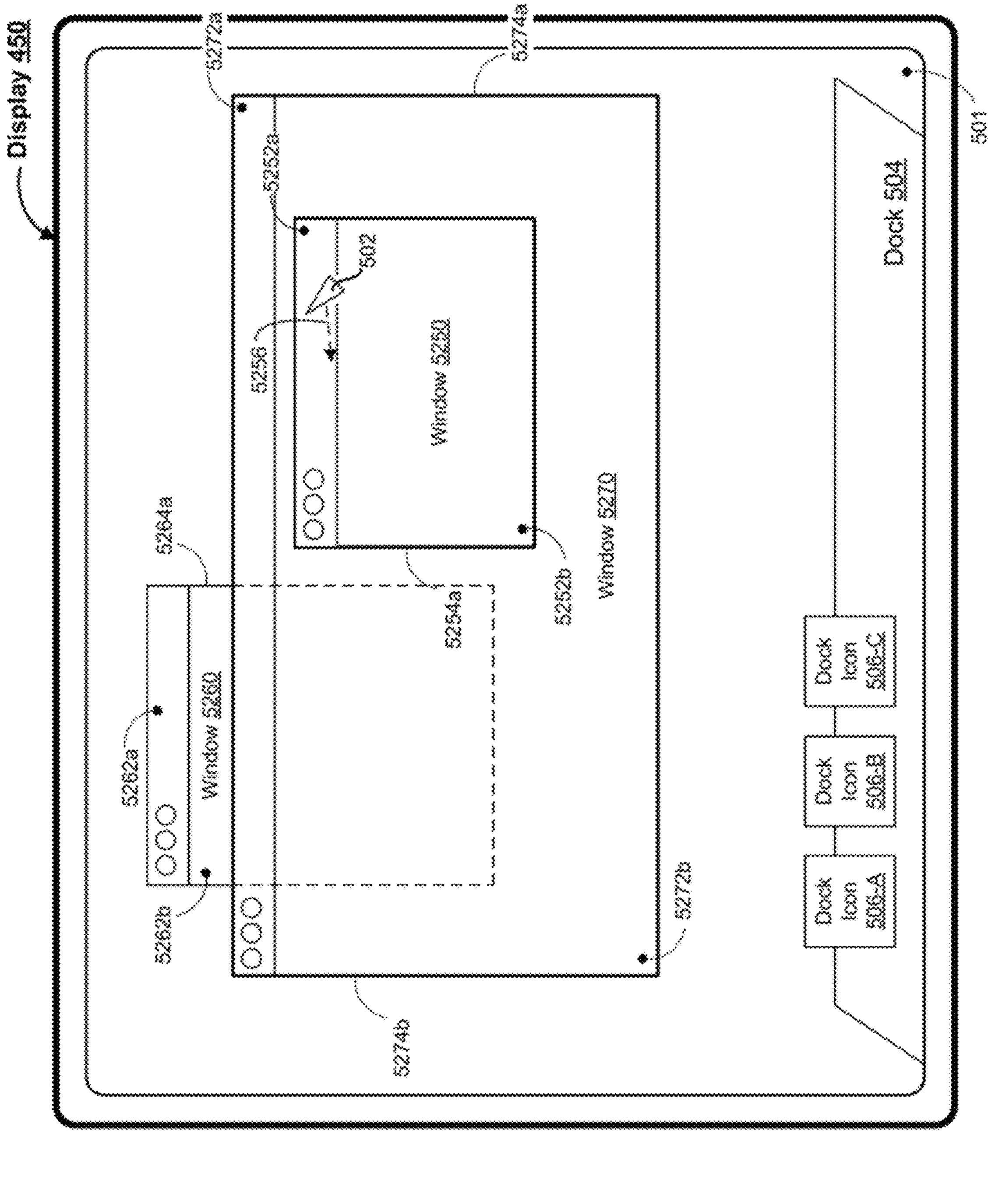
Figure 5LLL

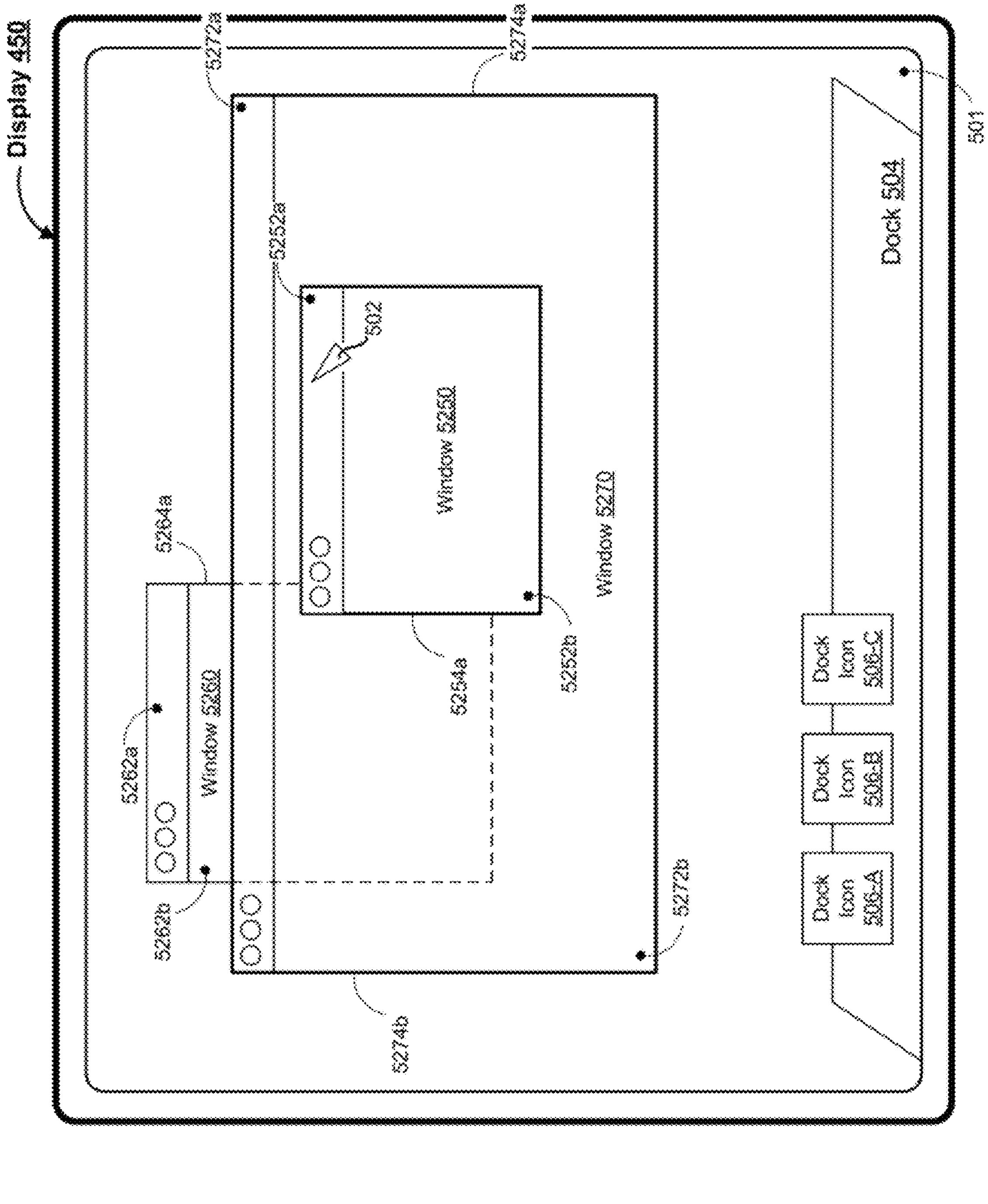
Figure 5MMM

Figure 8B:
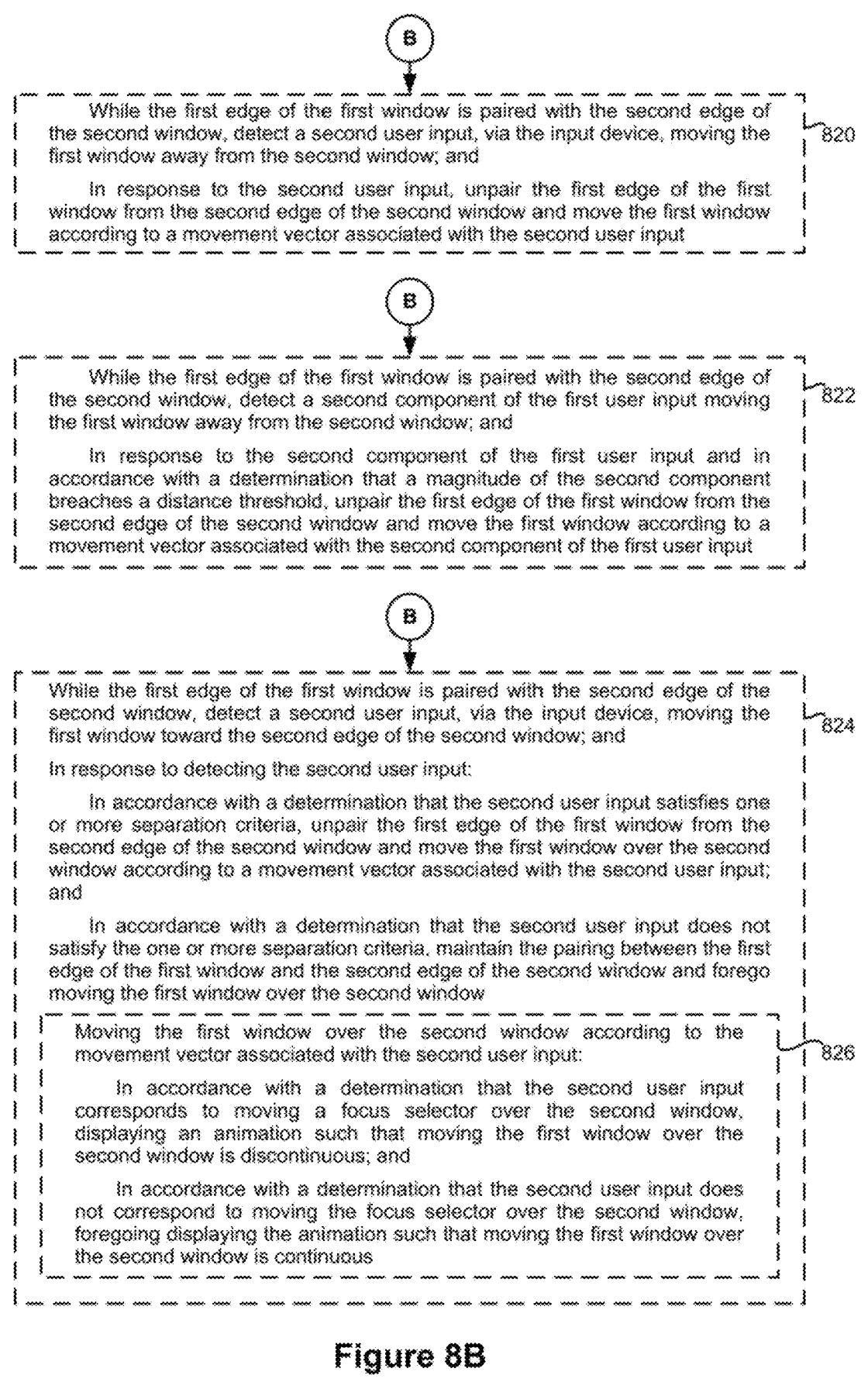

B

While the first edge of the first window is paired with the second edge of the second window, detect a second user input, via the input device, moving the first window away from the second window; and In response to the second user input, unpair the first edge of the first window from the second edge of the second window and move the first window according to a movement vector associated with the second user input

820

B

While the first edge of the first window is paired with the second edge of the second window, detect a second component of the first user input moving the first window away from the second window; and In response to the second component of the first user input and in accordance with a determination that a magnitude of the second component breaches a distance threshold, unpair the first edge of the first window from the second edge of the second window and move the first window according to a movement vector associated with the second component of the first user input

822

B

While the first edge of the first window is paired with the second edge of the second window, detect a second user input, via the input device, moving the first window toward the second edge of the second window; and In response to detecting the second user input:

In accordance with a determination that the second user input satisfies one or more separation criteria, unpair the first edge of the first window from the second edge of the second window and move the first window over the second window according to a movement vector associated with the second user input; and In accordance with a determination that the second user input does not satisfy the one or more separation criteria, maintain the pairing between the first edge of the first window and the second edge of the second window and forego moving the first window over the second window

824

Moving the first window over the second window according to the movement vector associated with the second user input:

In accordance with a determination that the second user input corresponds to moving a focus selector over the second window, displaying an animation such that moving the first window over the second window is discontinuous; and In accordance with a determination that the second user input does not correspond to moving the focus selector over the second window, foregoing displaying the animation such that moving the first window over the second window is continuous

Figure 8C:
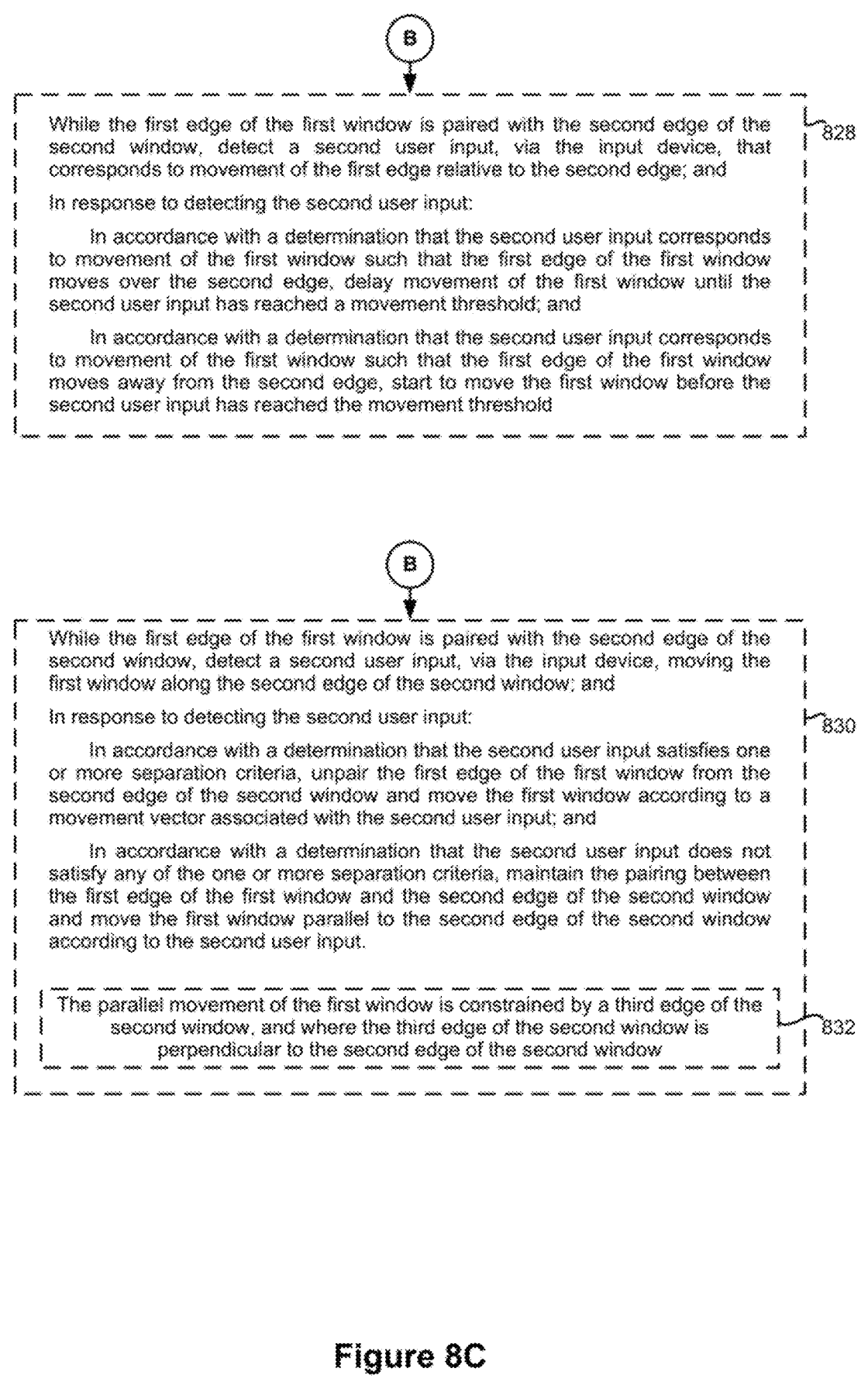

While the first edge of the first window is paired with the second edge of the second window, detect a second user input, via the input device, that corresponds to movement of the first edge relative to the second edge; and In response to detecting the second user input:

In accordance with a determination that the second user input corresponds to movement of the first window such that the first edge of the first window moves over the second edge, delay movement of the first window until the second user input has reached a movement threshold; and In accordance with a determination that the second user input corresponds to movement of the first window such that the first edge of the first window moves away from the second edge, start to move the first window before the second user input has reached the movement threshold (B)

830

While the first edge of the first window is paired with the second edge of the second window, detect a second user input, via the input device, moving the first window along the second edge of the second window; and In response to detecting the second user input:

In accordance with a determination that the second user input satisfies one or more separation criteria, unpair the first edge of the first window from the second edge of the second window and move the first window according to a movement vector associated with the second user input; and In accordance with a determination that the second user input does not satisfy any of the one or more separation criteria, maintain the pairing between the first edge of the first window and the second edge of the second window and move the first window parallel to the second edge of the second window according to the second user input.

832

The parallel movement of the first window is constrained by a third edge of the second window, and where the third edge of the second window is perpendicular to the second edge of the second window

Figure 8D:
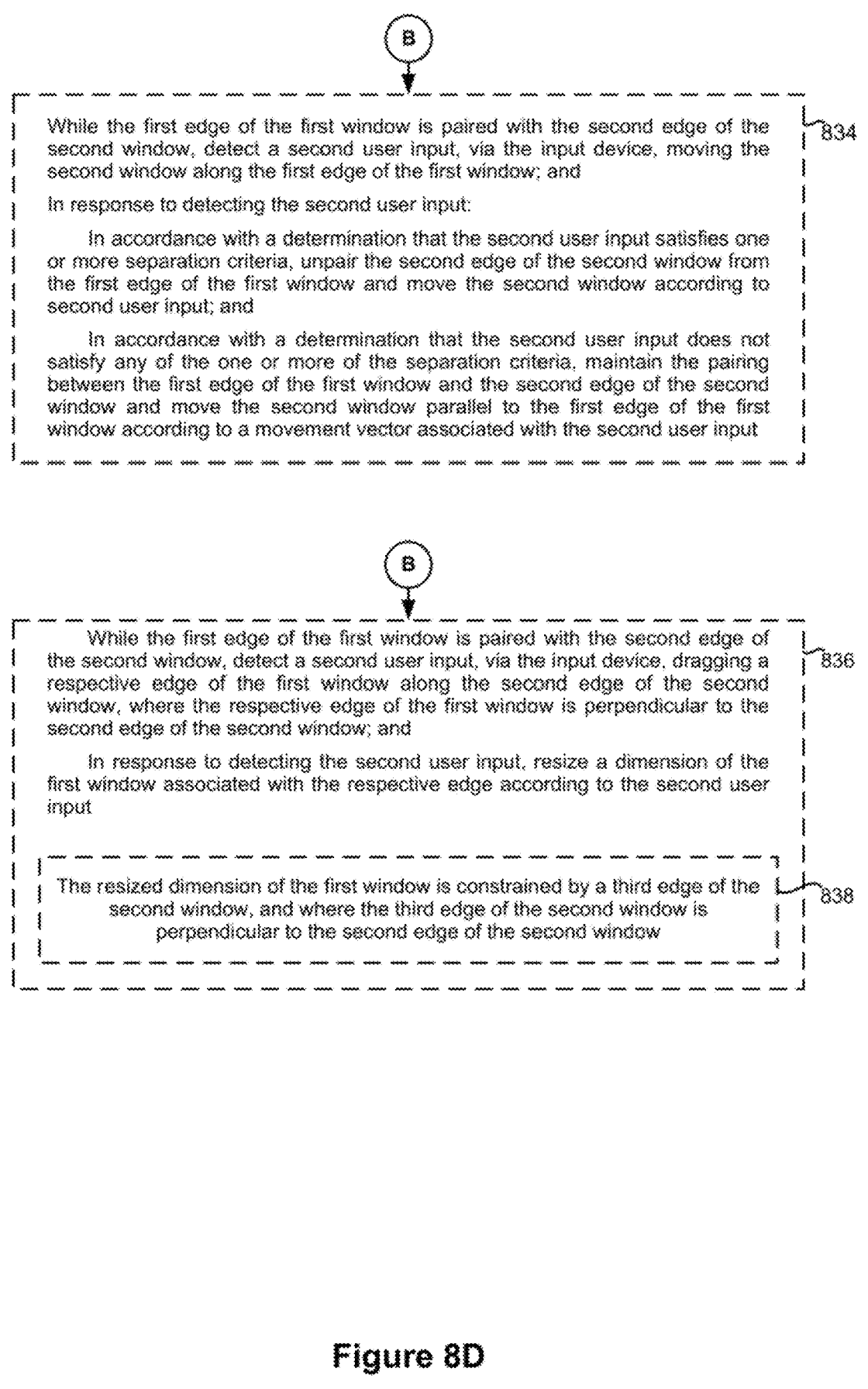

While the first edge of the first window is paired with the second edge of the second window, detect a second user input, via the input device, moving the second window along the first edge of the first window; and In response to detecting the second user input:

In accordance with a determination that the second user input satisfies one or more separation criteria, unpair the second edge of the second window from the first edge of the first window and move the second window according to second user input; and In accordance with a determination that the second user input does not satisfy any of the one or more of the separation criteria, maintain the pairing between the first edge of the first window and the second edge of the second window and move the second window parallel to the first edge of the first window according to a movement vector associated with the second user input (B)

836

While the first edge of the first window is paired with the second edge of the second window, detect a second user input, via the input device, dragging a respective edge of the first window along the second edge of the second window, where the respective edge of the first window is perpendicular to the second edge of the second window; and In response to detecting the second user input, resize a dimension of the first window associated with the respective edge according to the second user input

838

The resized dimension of the first window is constrained by a third edge of the second window, and where the third edge of the second window is perpendicular to the second edge of the second window

Figure 9B:
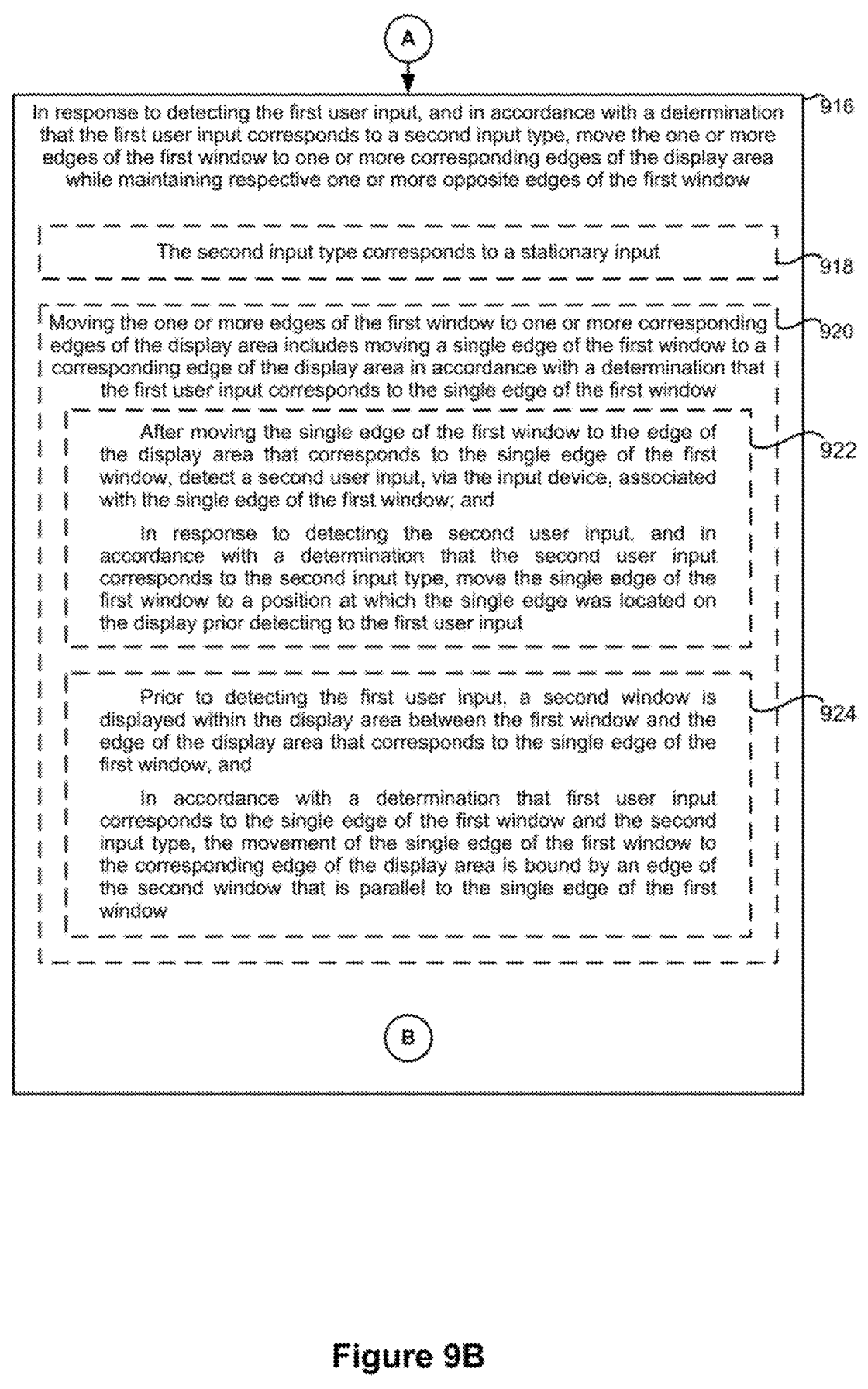

In response to detecting the first user input, and in accordance with a determination that the first user input corresponds to a second input type, move the one or more edges of the first window to one or more corresponding edges of the display area while maintaining respective one or more opposite edges of the first window 916

The second input type corresponds to a stationary input 918

Moving the one or more edges of the first window to one or more corresponding edges of the display area includes moving a single edge of the first window to a corresponding edge of the display area in accordance with a determination that the first user input corresponds to the single edge of the first window 920

After moving the single edge of the first window to the edge of the display area that corresponds to the single edge of the first window, detect a second user input, via the input device, associated with the single edge of the first window; and In response to detecting the second user input, and in accordance with a determination that the second user input corresponds to the second input type, move the single edge of the first window to a position at which the single edge was located on the display prior detecting to the first user input 922

Prior to detecting the first user input, a second window is displayed within the display area between the first window and the edge of the display area that corresponds to the single edge of the first window, and In accordance with a determination that first user input corresponds to the single edge of the first window and the second input type, the movement of the single edge of the first window to the corresponding edge of the display area is bound by an edge of the second window that is parallel to the single edge of the first window 924

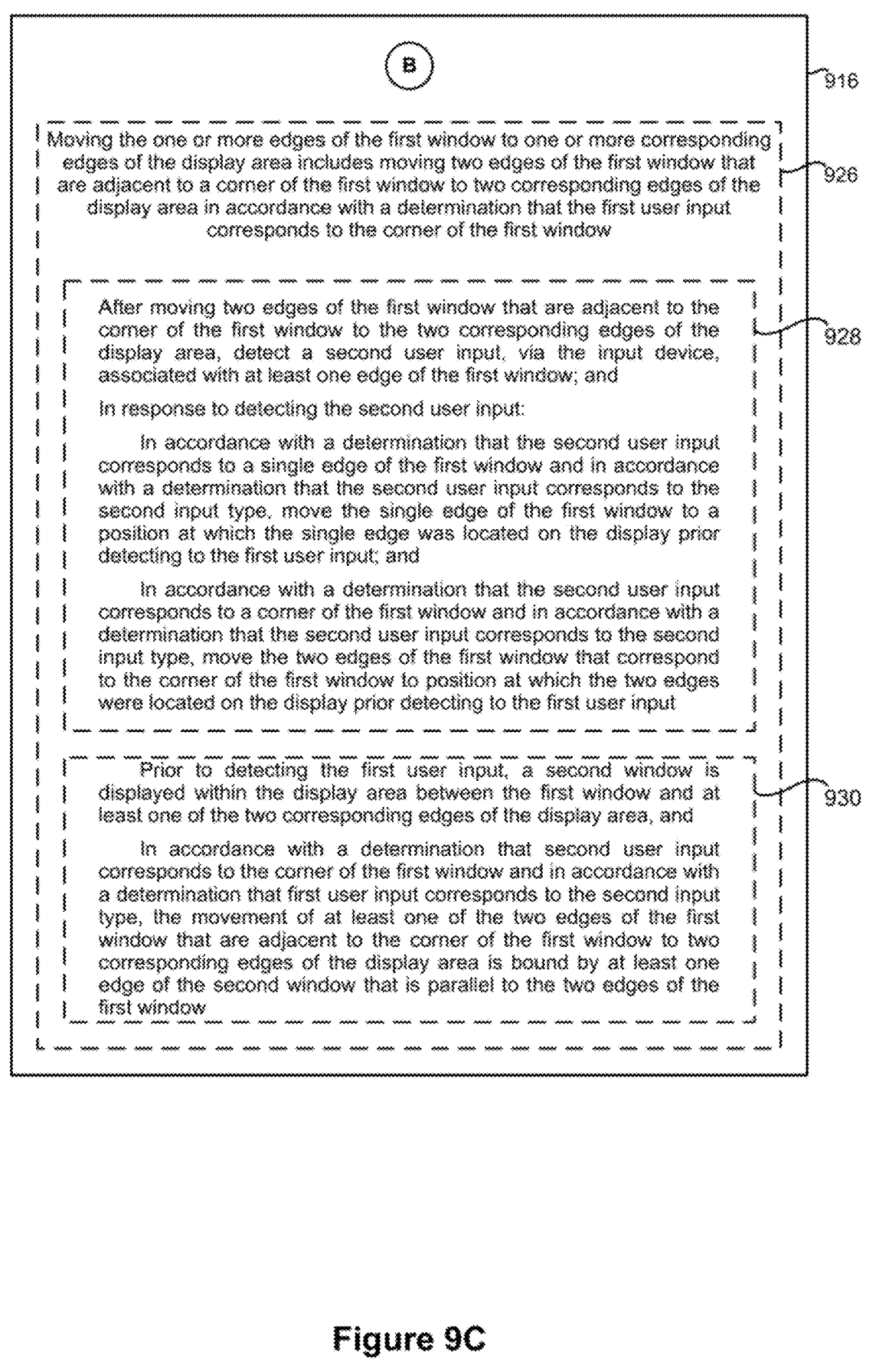

Moving the one or more edges of the first window to one or more corresponding edges of the display area includes moving two edges of the first window that are adjacent to a corner of the first window to two corresponding edges of the display area in accordance with a determination that the first user input corresponds to the corner of the first window

928

After moving two edges of the first window that are adjacent to the corner of the first window to the two corresponding edges of the display area, detect a second user input, via the input device, associated with at least one edge of the first window; and In response to detecting the second user input:

In accordance with a determination that the second user input corresponds to a single edge of the first window and in accordance with a determination that the second user input corresponds to the second input type, move the single edge of the first window to a position at which the single edge was located on the display prior detecting to the first user input; and In accordance with a determination that the second user input corresponds to a corner of the first window and in accordance with a determination that the second user input corresponds to the second input type, move the two edges of the first window that correspond to the corner of the first window to position at which the two edges were located on the display prior detecting to the first user input

930

Prior to detecting the first user input, a second window is displayed within the display area between the first window and at least one of the two corresponding edges of the display area, and In accordance with a determination that second user input corresponds to the corner of the first window and in accordance with a determination that first user input corresponds to the second input type, the movement of at least one of the two edges of the first window that are adjacent to the corner of the first window to two corresponding edges of the display area is bound by at least one edge of the second window that is parallel to the two edges of the first window

Figure 9C

DEVICE, METHOD, AND GRAPHICAL USER INTERFACE FOR WINDOW MANIPULATION AND MANAGEMENT

CROSS-REFERENCE TO RELATED-APPLICATIONS

This application is a continuation of U.S. patent application Ser. No. 15/609,695, filed on May 31, 2017, which claims priority to U.S. Provisional Patent App. No. 62/348,984, filed on Jun. 12, 2016, which are both hereby incorporated by reference in their entirety.

TECHNICAL FIELD

This relates generally to electronic devices with displays and input devices, including but not limited to electronic devices with displays that enable window manipulation and management using input devices.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interface objects on a display.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But methods for performing these manipulations are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for window manipulation and management. Such methods and interfaces optionally complement or replace conventional methods for window manipulation and management. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device with one or more processors, non-transitory memory, a display, and an input device. The method includes: displaying, on the display, a first window and a second window within a display area, the first window having a first edge parallel to a second edge of the second window; and detecting a first user input, via the input device, moving the first edge of the first window toward the second edge of the second window. In response to detecting the first user input, and in accordance with a determination that the first user input satisfies one or more pairing criteria, the method includes pairing the first edge of the first window to the second edge of the second window such that the first window stops moving in response to the first user input before it overlaps the second window, where the one or more pairing criteria include a first pairing criterion that is met when the first input corresponds to movement of the first edge toward the second edge that deviates from a predefined axis by less than an angular threshold value. In response to detecting the first user input, and in accordance with a determination that the first user input does not satisfy the one or more pairing criteria, the method further includes continuing the movement of the first window based on the first user input so that the first window at least partially overlaps the second window.

In accordance with some embodiments, a method is performed at a device with one or more processors, non-transitory memory, a display, and an input device. The method includes: displaying, on the display, a first window in a display area; and detecting a first user input, via the input device, associated with one or more edges of the first window. In response to detecting the first user input, and in accordance with a determination that the first user input corresponds to a first input type, the method also includes resizing one or more dimensions of the first window that correspond to the one or more edges of the first window based on a movement vector associated with the first user input. In response to detecting the first user input, and in accordance with a determination that the first user input corresponds to a second input type, the method further includes moving the one or more edges of the first window to one or more corresponding edges of the display area while maintaining respective one or more opposite edges of the first window.

In accordance with some embodiments, a method is performed at a device with one or more processors, non-transitory memory, a display, and an input device. The method includes: displaying, on the display, a first window associated with a first application within a display area; and detecting a first user input, via the input device, that corresponds to a request to add a second window associated with the first application. In response to detecting the first user input, and in accordance with a determination that the first window is displayed within the display area in full screen mode, the method also includes adding the second window as a new tab within a tab bar associated with the first window. In response to detecting the first user input, and in accordance with a determination that the first window is displayed within the display area in windowed mode, the method further includes displaying the second window separate from the first window within the display area.

In accordance with some embodiments, an electronic device includes a display unit configured to display a user interface, one or more input units configured to receive user inputs, and a processing unit coupled with the display unit and the one or more input units. The processing unit is configured: enable display of, on the display unit, a first window and a second window within a display area, the first window having a first edge parallel to a second edge of the second window; and detect a first user input, via the one or more input units, moving the first edge of the first window toward the second edge of the second window. In response to detecting the first user input, and in accordance with a determination that the first user input satisfies one or more pairing criteria, the method processing unit is further configured to pair the first edge of the first window to the second edge of the second window such that the first window stops moving in response to the first user input before it overlaps the second window, where the one or more pairing criteria include a first pairing criterion that is met when the first input corresponds to movement of the first edge toward the second edge that deviates from a predefined axis by less than an angular threshold value. In response to detecting the first user input, and in accordance with a determination that the first user input does not satisfy the one or more pairing criteria, the method processing unit is further configured to continue the movement of the first window based on the first user input so that the first window at least partially overlaps the second window.

In accordance with some embodiments, an electronic device includes a display unit configured to display a user interface, one or more input units configured to receive user inputs, and a processing unit coupled with the display unit and the one or more input units. The processing unit is configured to: enable display of, on the display unit, a first window in a display area; and detect a first user input, via the one or more input units, associated with one or more edges of the first window. In response to detecting the first user input, and in accordance with a determination that the first user input corresponds to a first input type, the method processing unit is further configured to resize one or more dimensions of the first window that correspond to the one or more edges of the first window based on a movement vector associated with the first user input. In response to detecting the first user input, and in accordance with a determination that the first user input corresponds to a second input type, the method processing unit is further configured to move the one or more edges of the first window to one or more corresponding edges of the display area while maintaining respective one or more opposite edges of the first window.

In accordance with some embodiments, an electronic device includes a display unit configured to display a user interface, one or more input units configured to receive user inputs, and a processing unit coupled with the display unit and the one or more input units. The processing unit is configured: enable display of, on the display unit, a first window associated with a first application within a display area; and detect a first user input, via the one or more input units, that corresponds to a request to add a second window associated with the first application. In response to detecting the first user input, and in accordance with a determination that the first window is displayed within the display area in full screen mode, the method processing unit is further configured to add the second window as a new tab within a tab bar associated with the first window. In response to detecting the first user input, and in accordance with a determination that the first window is displayed within the display area in windowed mode, the method processing unit is further configured to enable display of the second window separate from the first window within the display area.

In accordance with some embodiments, an electronic device includes a display, an input device, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device with a display and an input device, cause the device to perform or cause performance of the operations of any of the methods described herein. In accordance with some embodiments, a graphical user interface on an electronic device with a display, an input device, a memory, and one or more processors to execute one or more programs stored in the non-transitory memory includes one or more of the elements displayed in any of the methods described above, which are updated in response to inputs, as described in any of the methods described herein. In accordance with some embodiments, an electronic device includes: a display, an input device; and means for performing or causing performance of the operations of any of the methods described herein. In accordance with some embodiments, an information processing apparatus, for use in an electronic device with a display and an input device, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for window manipulation and management, thereby increasing the effectiveness, efficiency, and user satisfaction with such devices. Such methods and interfaces may complement or replace conventional methods for window manipulation and management.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8E illustrate a flow diagram of a method of pairing edges of windows in accordance with some embodiments.

FIGS. 9A-9D illustrate a flow diagram of a method of resizing windows in accordance with some embodiments.

DESCRIPTION OF EMBODIMENTS

The use of electronic devices with touch-based user interfaces (e.g., devices such as the iPhone®, iPod Touch®, iPad®, MacBook®, and iMac® devices from Apple Inc. of Cupertino, Calif.) has increased significantly in recent years. These devices use touch-sensitive surfaces, such as a touch screen display or a touch pad, as the main input for manipulating user interface objects on a display and/or controlling the device. These devices may also have contact intensity sensor for determining a force or pressure of contacts with the touch-sensitive surfaces.

Described below are devices and methods that enable edges of windows to be paired. In some embodiments, when movement of a first edge of a first window toward a second edge of a second window satisfies pairing criteria the first and second edges are paired such that the windows do not overlap. In some embodiments, after the edges are paired, the windows exhibit a “sticky” behavior. As such, according to some embodiments, the user is able to slide windows parallel to one another while the edges maintaining the pairing of the edges.

Described below are devices and methods that enable resizing of windows. In some embodiments, a stationary input (e.g., a double click) on an edge of the window causes the edge of the window to move to a corresponding edge of the display area. As such, a dimension of the window expands in one direction while other edges of the window maintain their positions. In some embodiments, a stationary input (e.g., a double click) on a corner of the window causes the edges that intersect the window to move to a corresponding edges of the display area. As such, a first dimension of the window expands in a first direction and a second dimension of the window expands in a second direction while other edges of the window maintain their positions.

Described below are devices and methods that provide tabbed window functionality. In some embodiments, the operating system provides tabbed window functionality for applications without native tab functionality. In some embodiments, while the tabbed functionality is active, open windows are resized to a same size and stacked on top of one another such that the foreground window is displayed on the top of the stack. According to some embodiments, tabs corresponding to each of the windows in the stack are displayed within a virtual tab bar superimposed on the top window of the stack by the operating system. For example, if another tab is selected within the tab bar, a window associated with selected tab is moved to the top of the stack of windows. In some embodiments, the application is not aware of the fact that its windows are being displayed in a single tabbed window. According to some embodiments, the application is able to perform operations with respect to the windows as it normally would, treating them as though they were just stacked on top of each other.

Figure 10A:
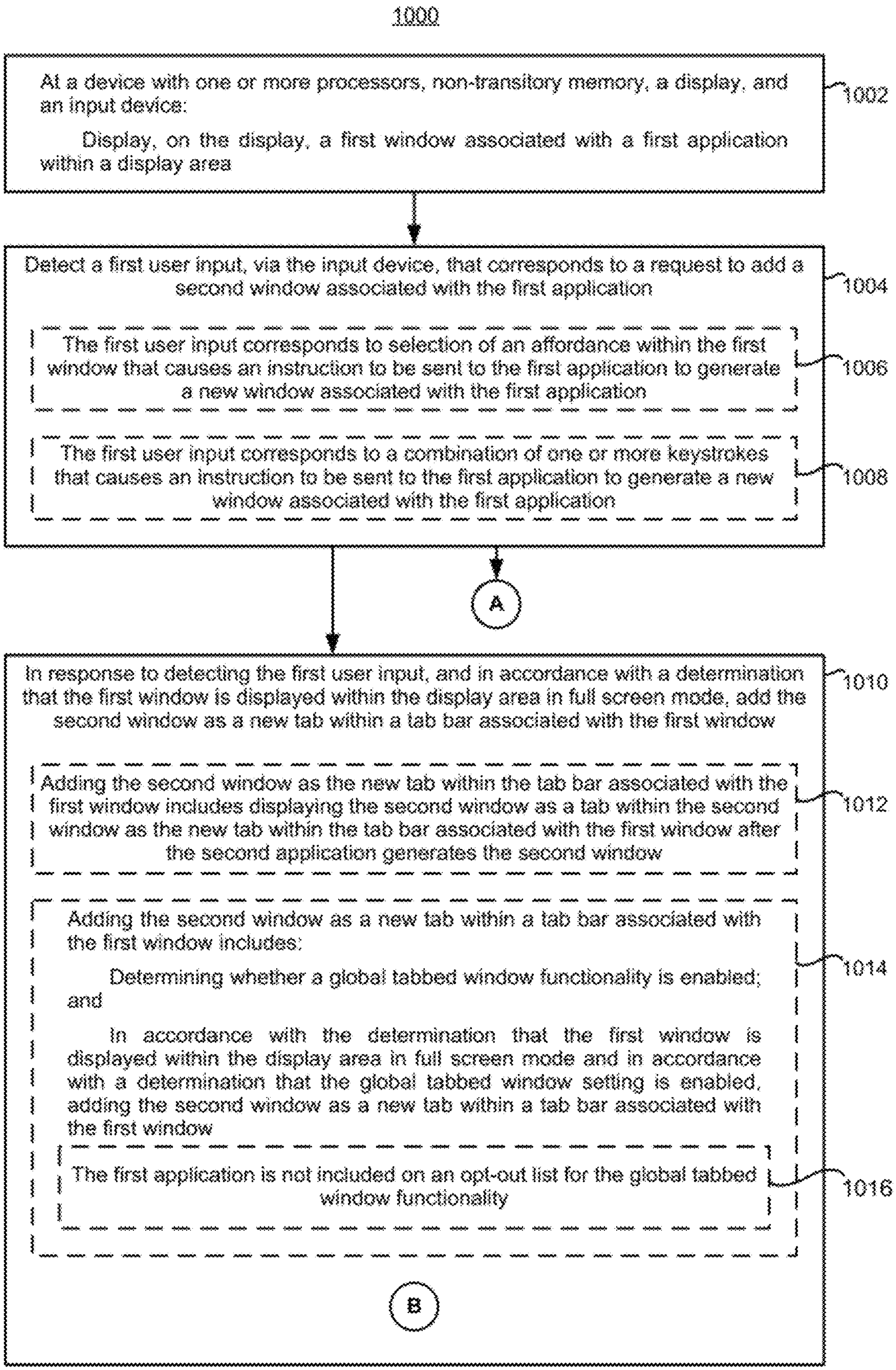
FIGS. 10A-10C illustrate a flow diagram of a method of providing tabbed window functionality in accordance with some embodiments.
Figure 10B:
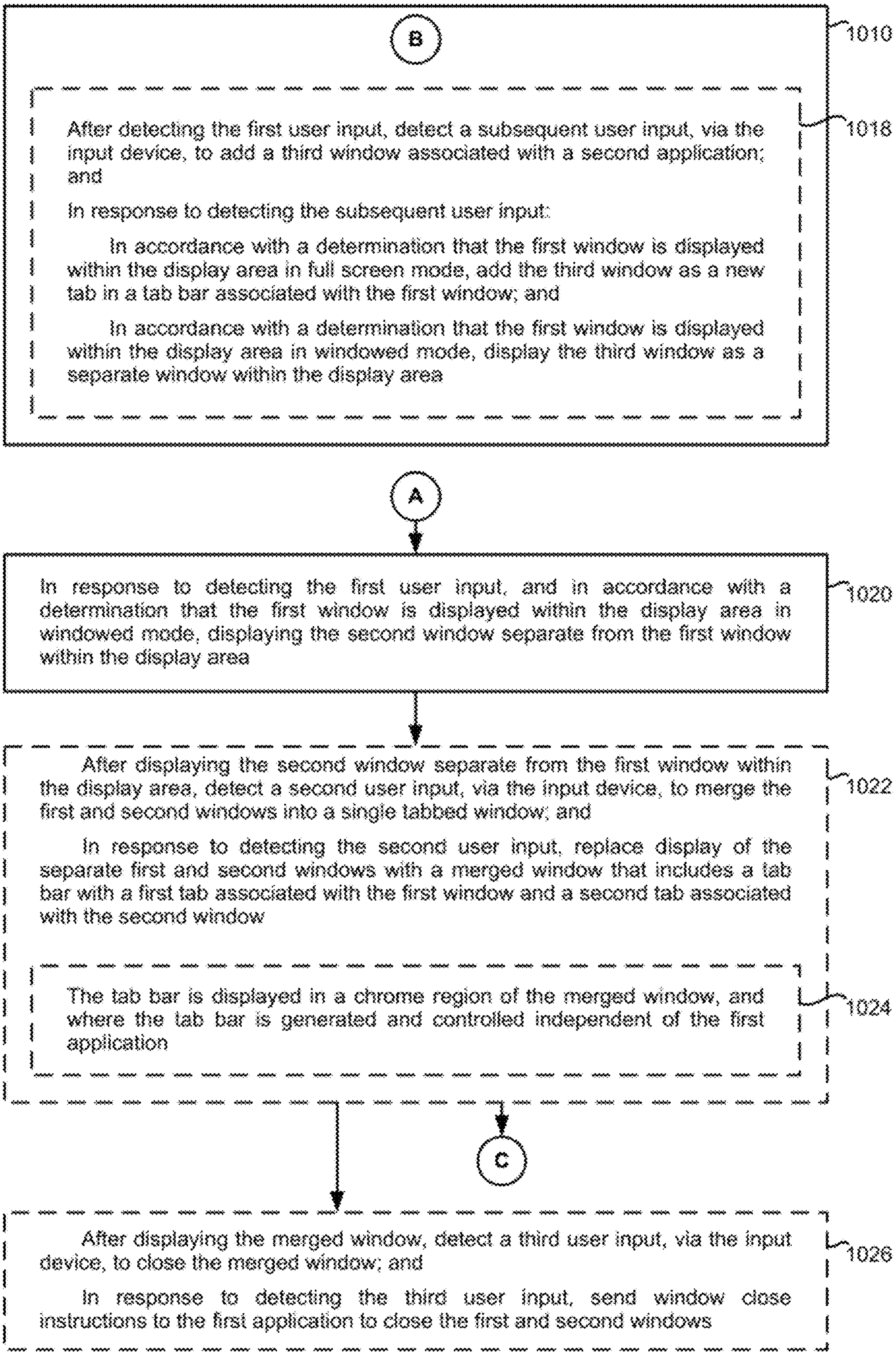
Figure 10C:
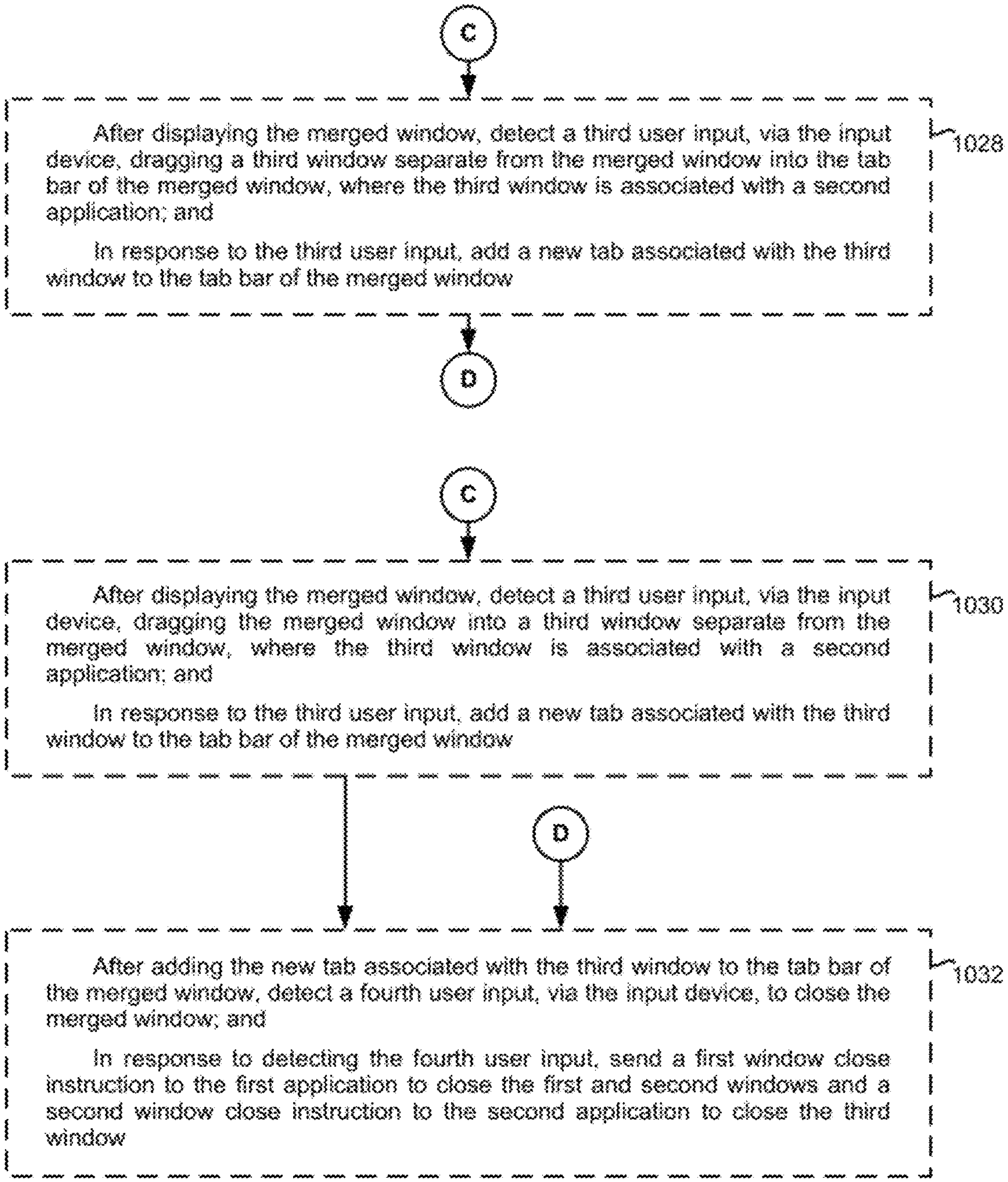

Below, FIGS. 1A-1B, 2-3, and 4A-4B provide a description of example devices. FIGS. 5A-5MMM, 6A-6Y, and 7A-7R illustrate example user interfaces for window manipulation and management. FIGS. 8A-8E illustrate a flow diagram of a method of pairing edges of windows. FIGS. 9A-9D illustrate a flow diagram of a method of resizing windows. FIGS. 10A-10C illustrate a flow diagram of a method of providing tabbed window functionality. The user interfaces in FIGS. 5A-5MMM, 6A-6Y, and 7A-7R are used to illustrate the processes in FIGS. 8A-8E, 9A-9D, and 10A-10C.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
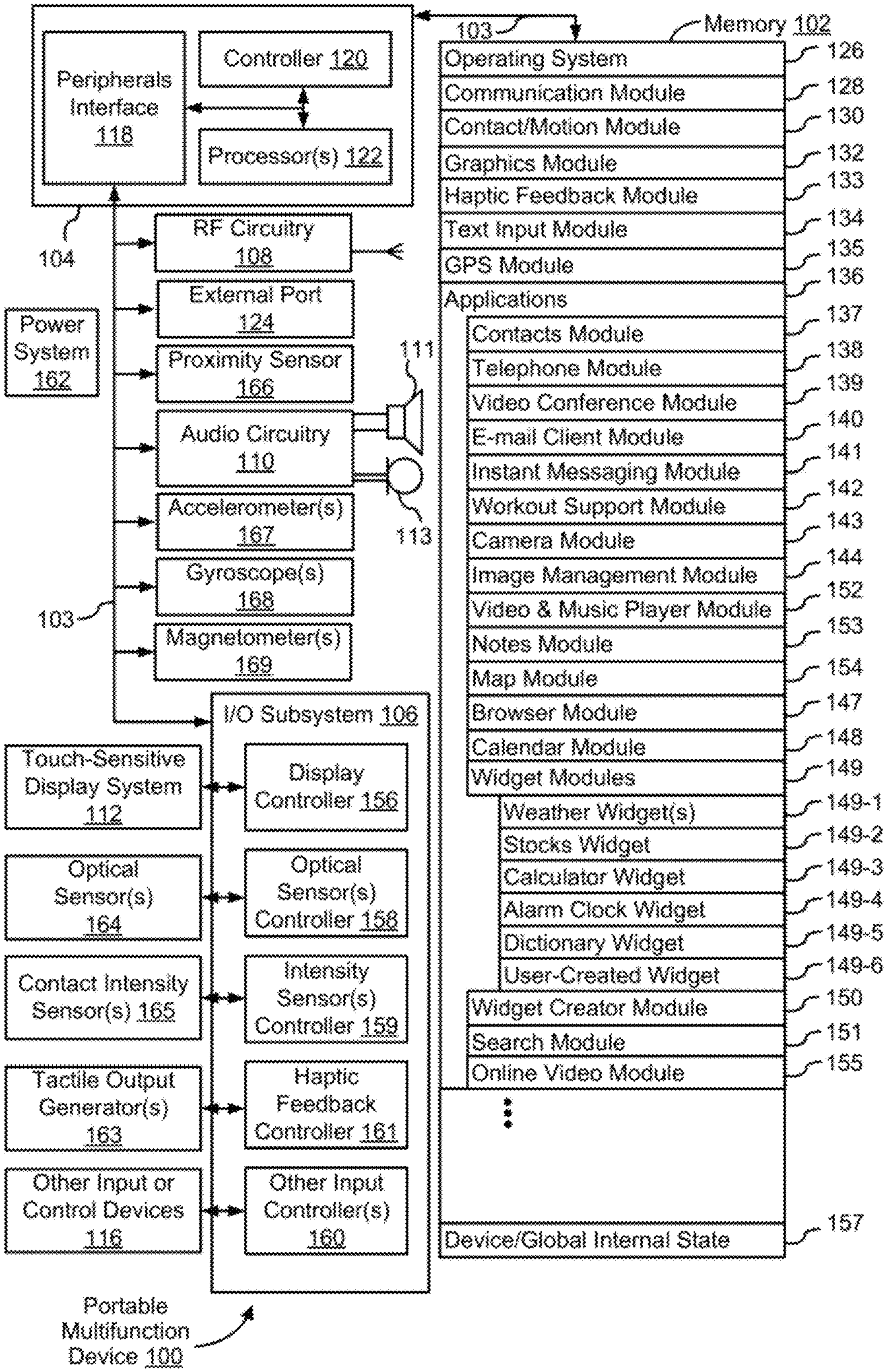
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed “graphics”). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

Figure 3:
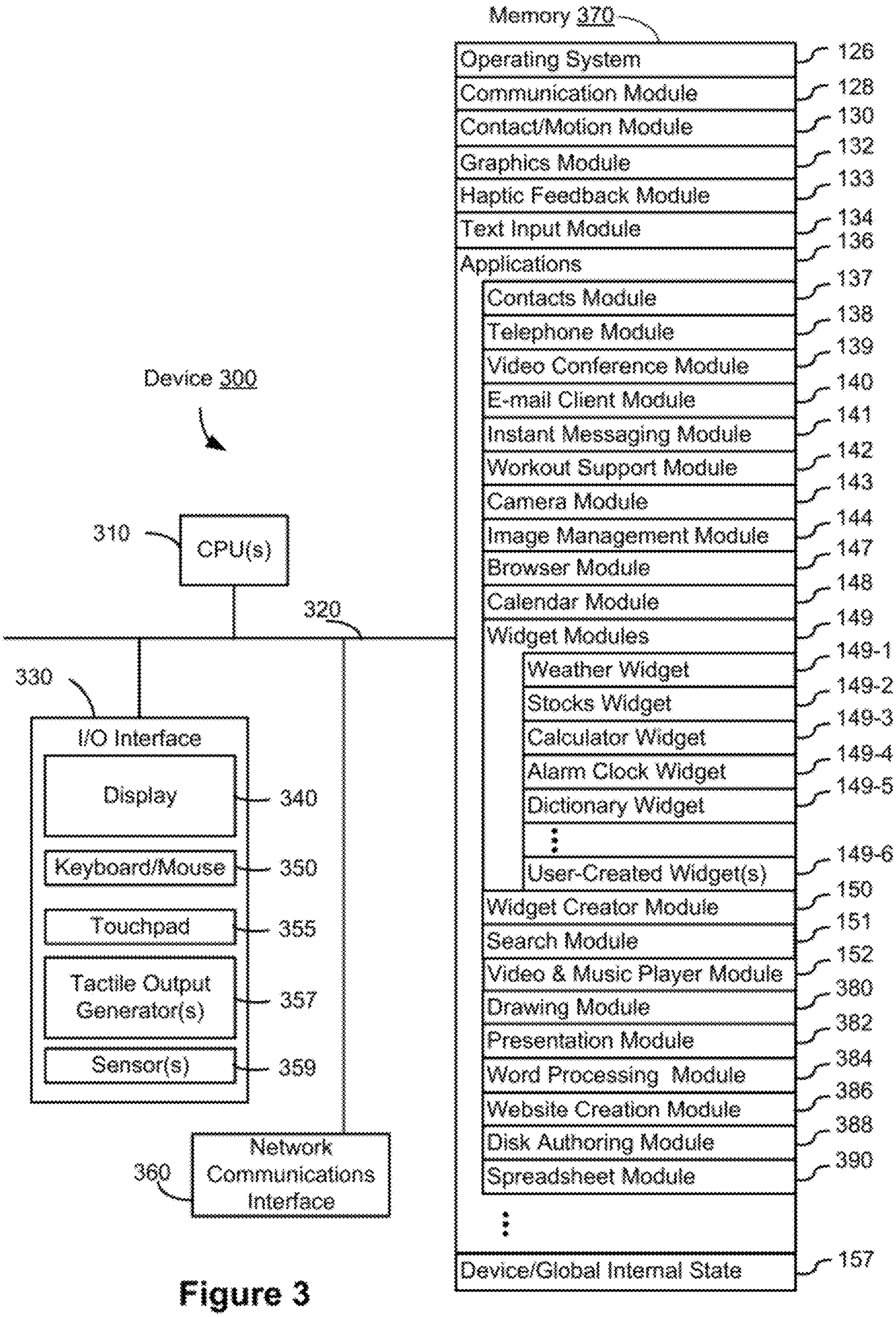
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
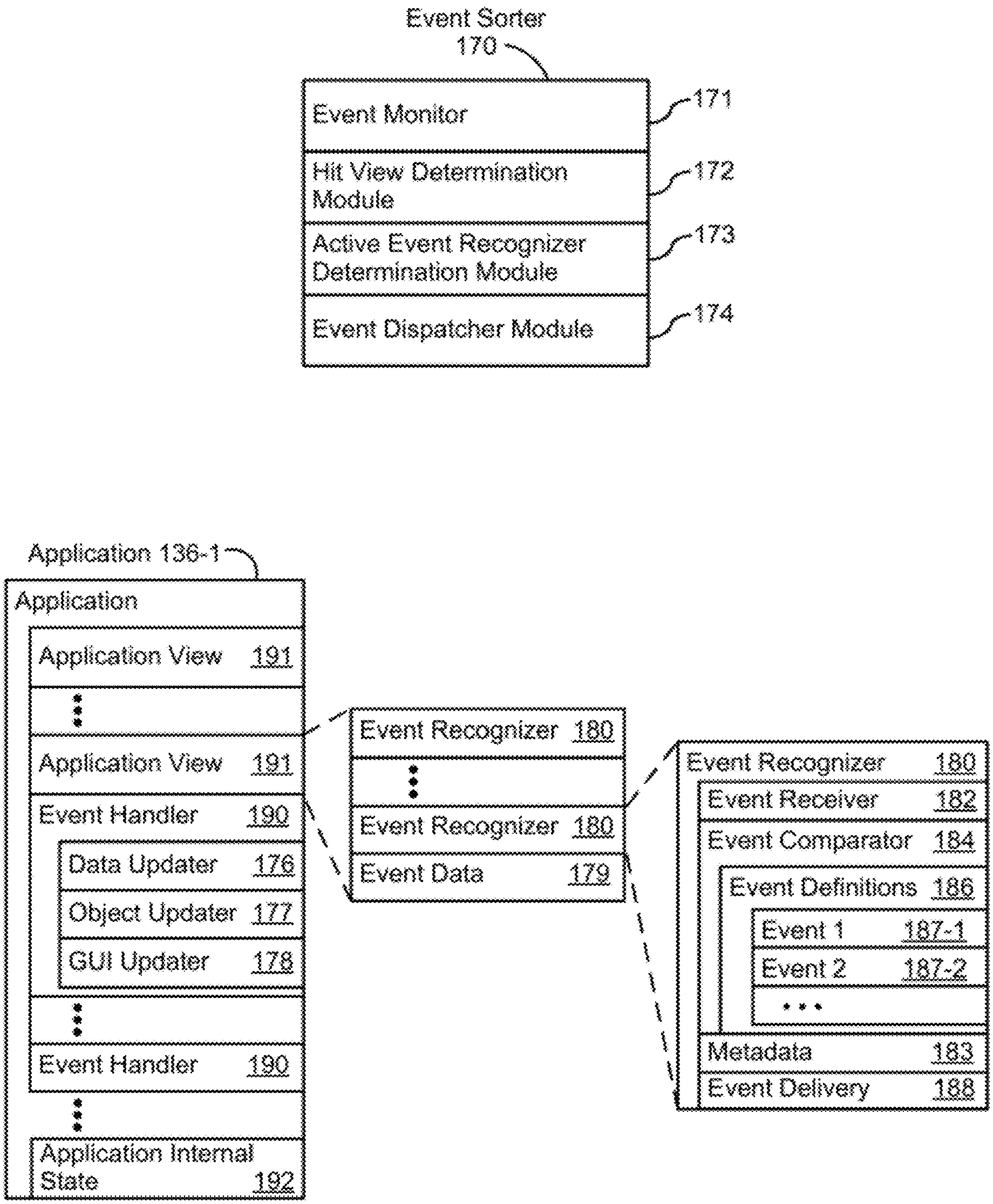
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
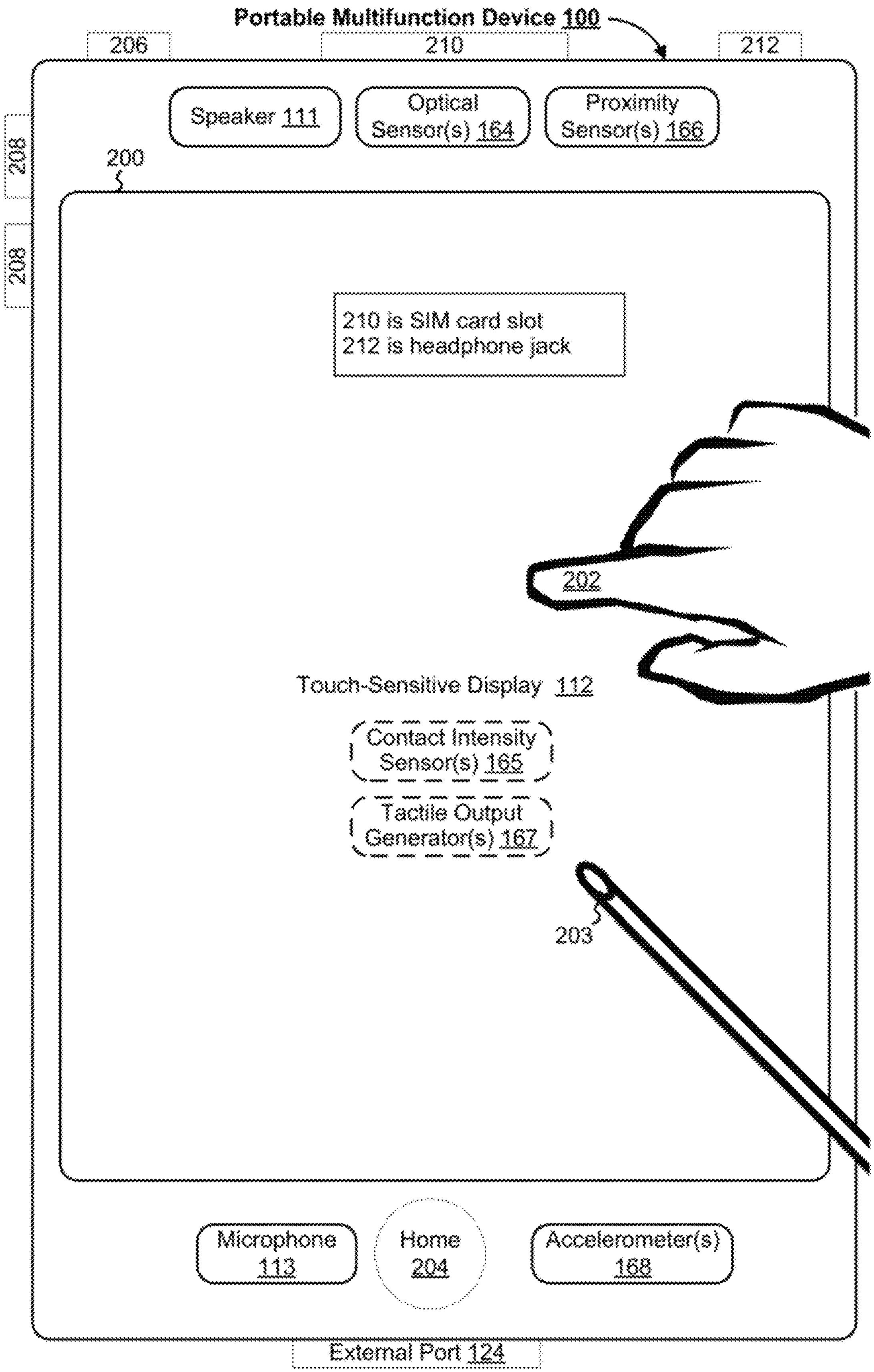
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
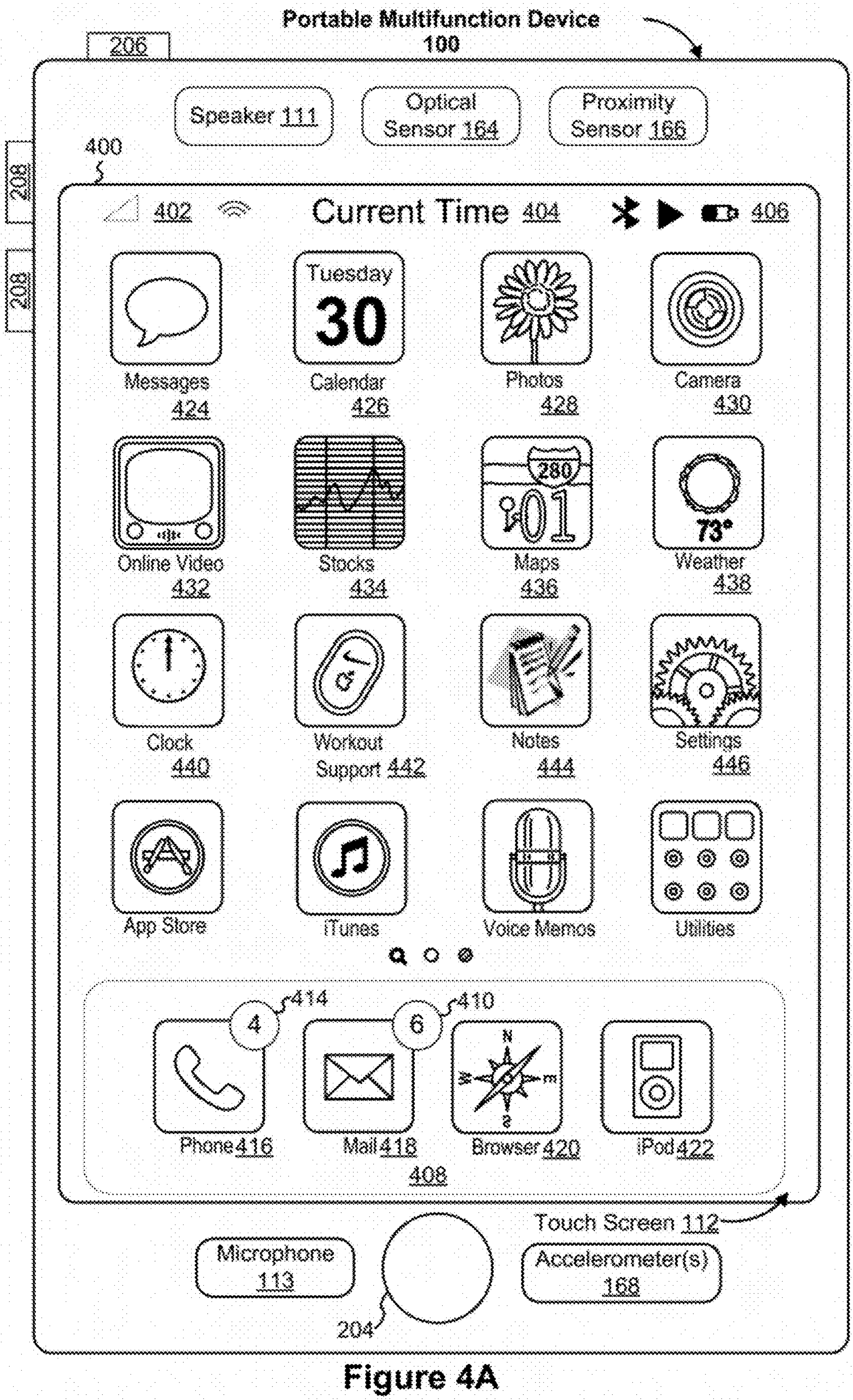
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser"; and
  - Icon 422 for video and music player module 152, also referred to as iPod (trademark of Apple Inc.) module 152, labeled "iPod"; and
- Icons for other applications, such as:
  - Icon 424 for IM module 141, labeled "Text";
  - Icon 426 for calendar module 148, labeled "Calendar";
  - Icon 428 for image management module 144, labeled "Photos";
  - Icon 430 for camera module 143, labeled "Camera";
  - Icon 432 for online video module 155, labeled "Online Video";
  - Icon 434 for stocks widget 149-2, labeled "Stocks";
  - Icon 436 for map module 154, labeled "Map";
  - Icon 438 for weather widget 149-1, labeled "Weather";
  - Icon 440 for alarm clock widget 169-6, labeled "Clock";
  - Icon 442 for workout support module 142, labeled "Workout Support";
  - Icon 444 for notes module 153, labeled "Notes"; and
  - Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
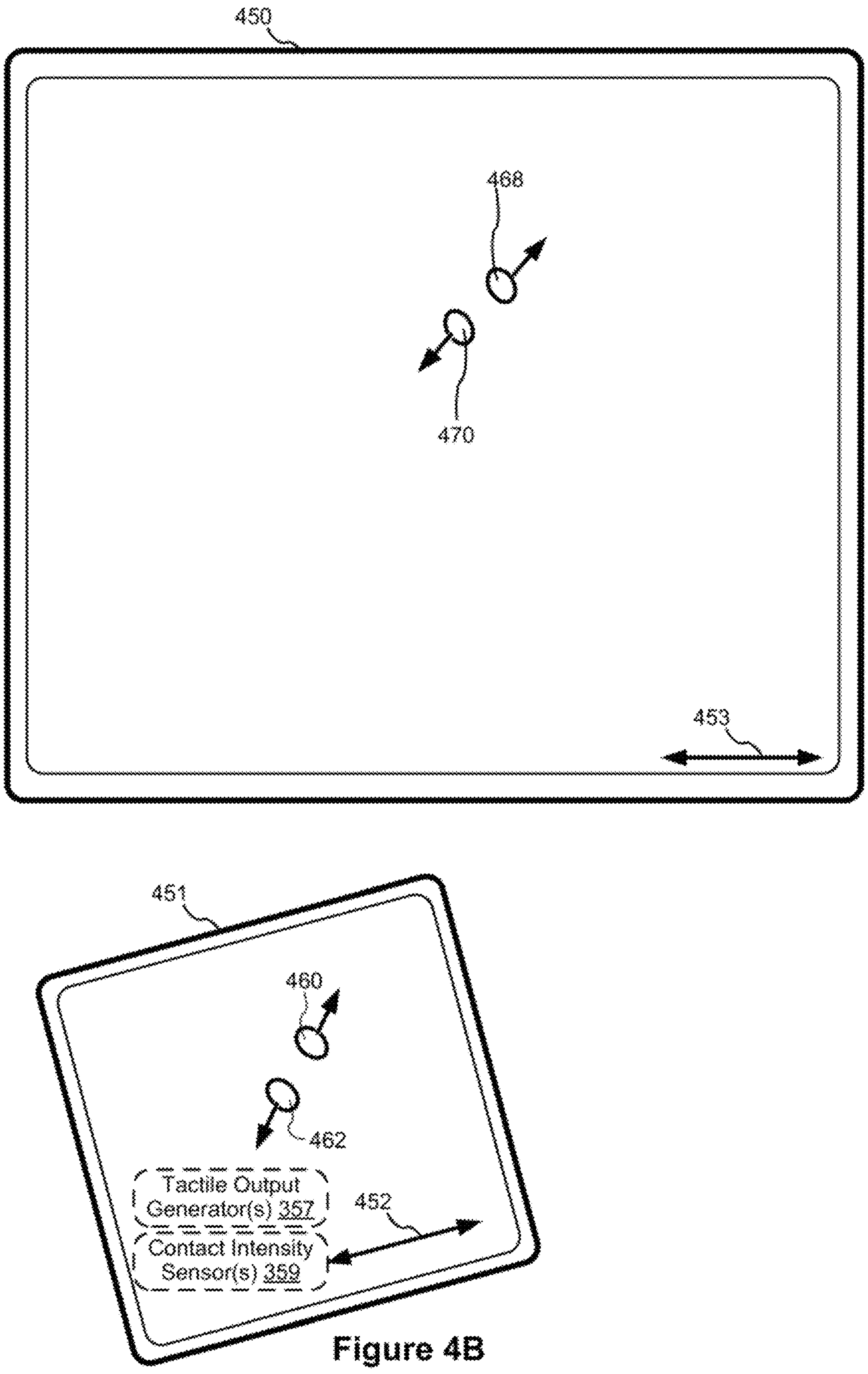
FIG. 4B illustrates an example user interface for a multifunction device with a touch-sensitive surface that is separate from the display in accordance with some embodiments.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Many of the examples that follow will be given with reference to a device that detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed towards embodiments of user interfaces ("UI") and associated processes that may be implemented on an electronic device, such as a portable multifunction device 100 with a display, a touch-sensitive surface, and optionally one or more sensors to detect intensity of contacts with the touch-sensitive surface, or a device 300 with a one or more processors, non-transitory memory, a display, and an input device.

FIGS. 5A-5MMM illustrate example user interfaces for pairing edges of windows in accordance with some embodiments. The user interfaces in these figures are used to illustrate the processes described below, including the processes in FIGS. 8A-8E. Although some of the examples which follow will be given with reference to inputs on a touch-sensitive surface 451 that is separate from the display 450, in some embodiments, the device detects inputs on a touch-screen display (where the touch-sensitive surface and the display are combined), as shown in FIG. 4A.

Figure 5A:
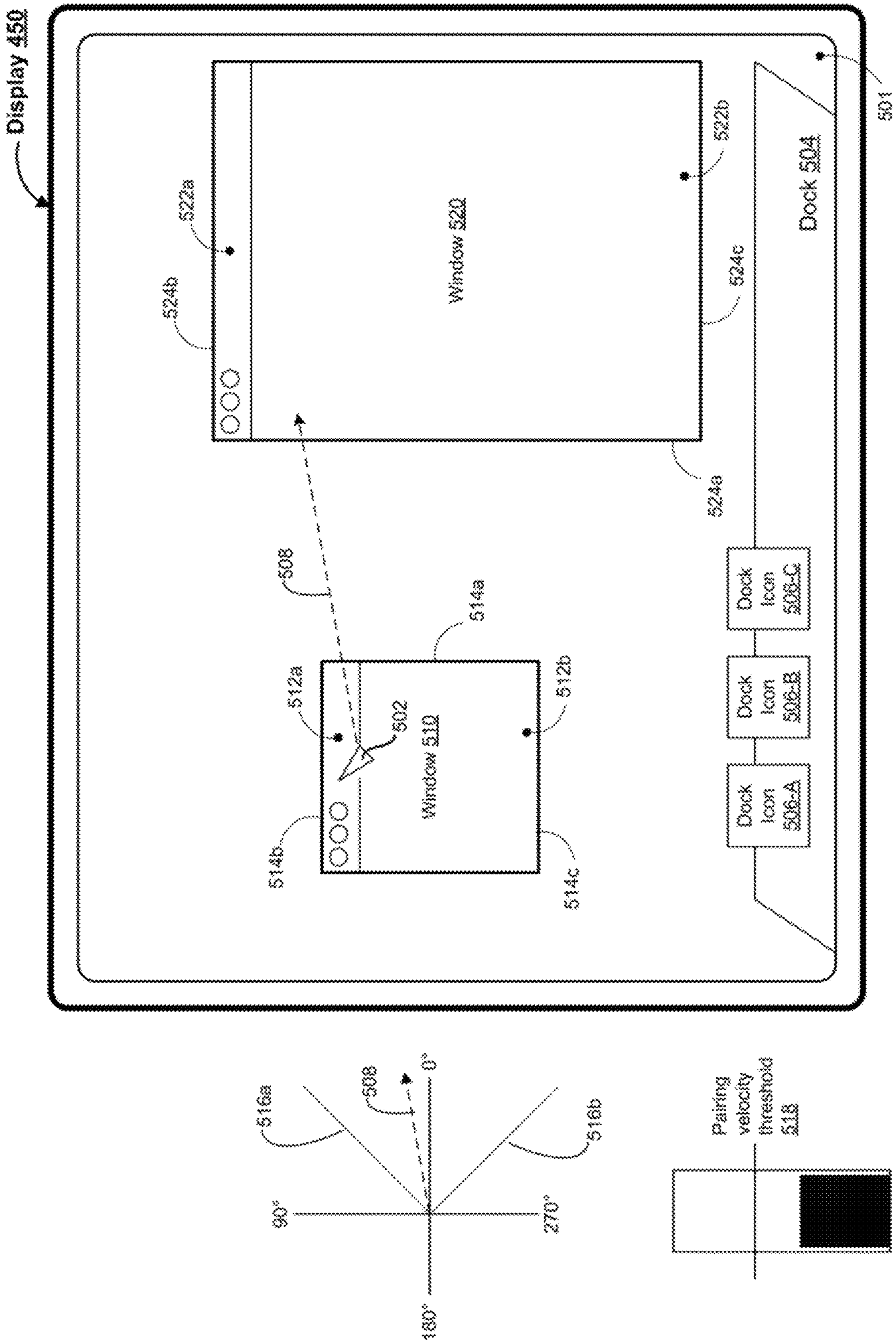
FIGS. 5A-5MMM illustrate example user interfaces for pairing edges of windows in accordance with some embodiments.
Figure 5B:
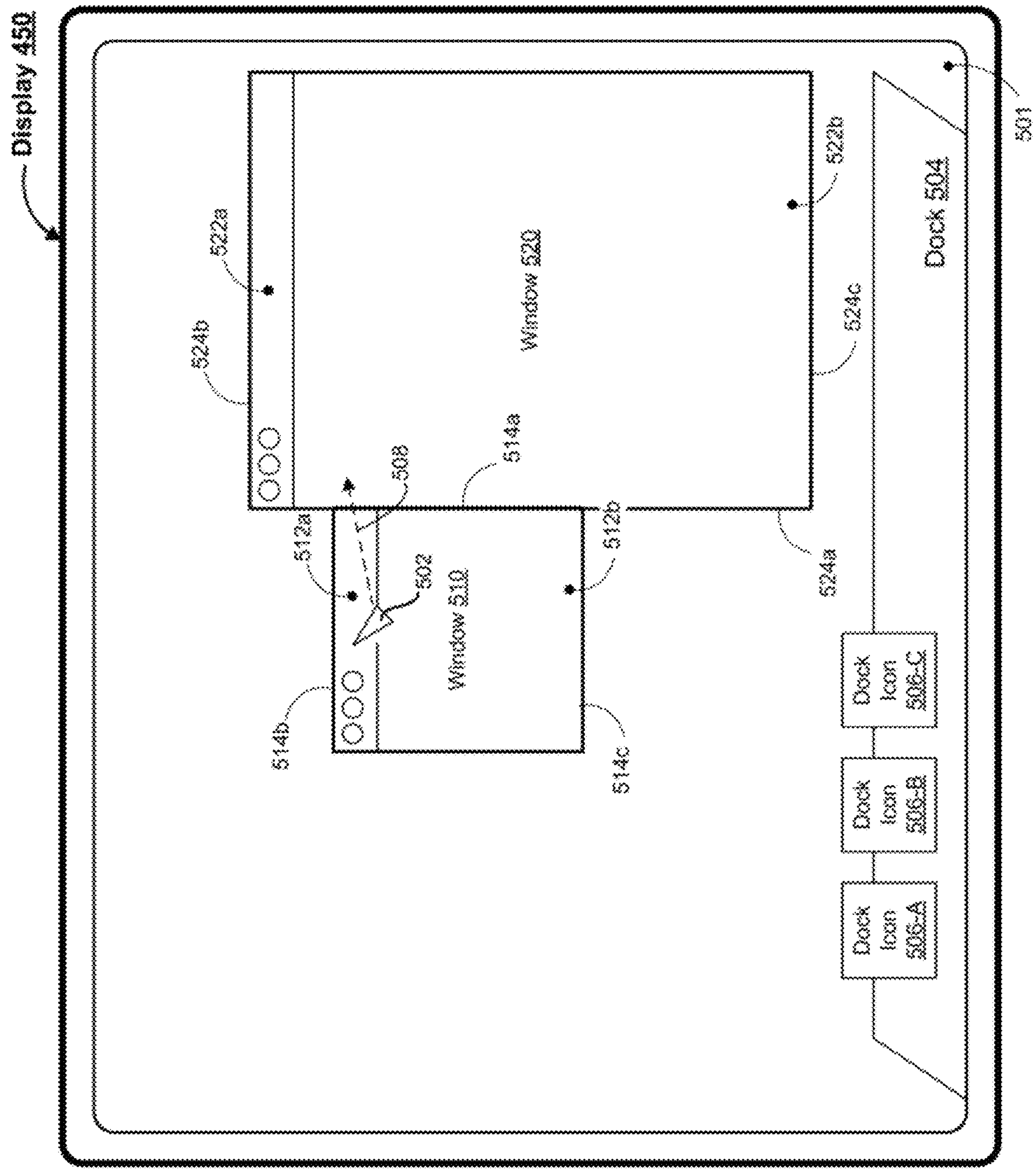
Figure 5C:
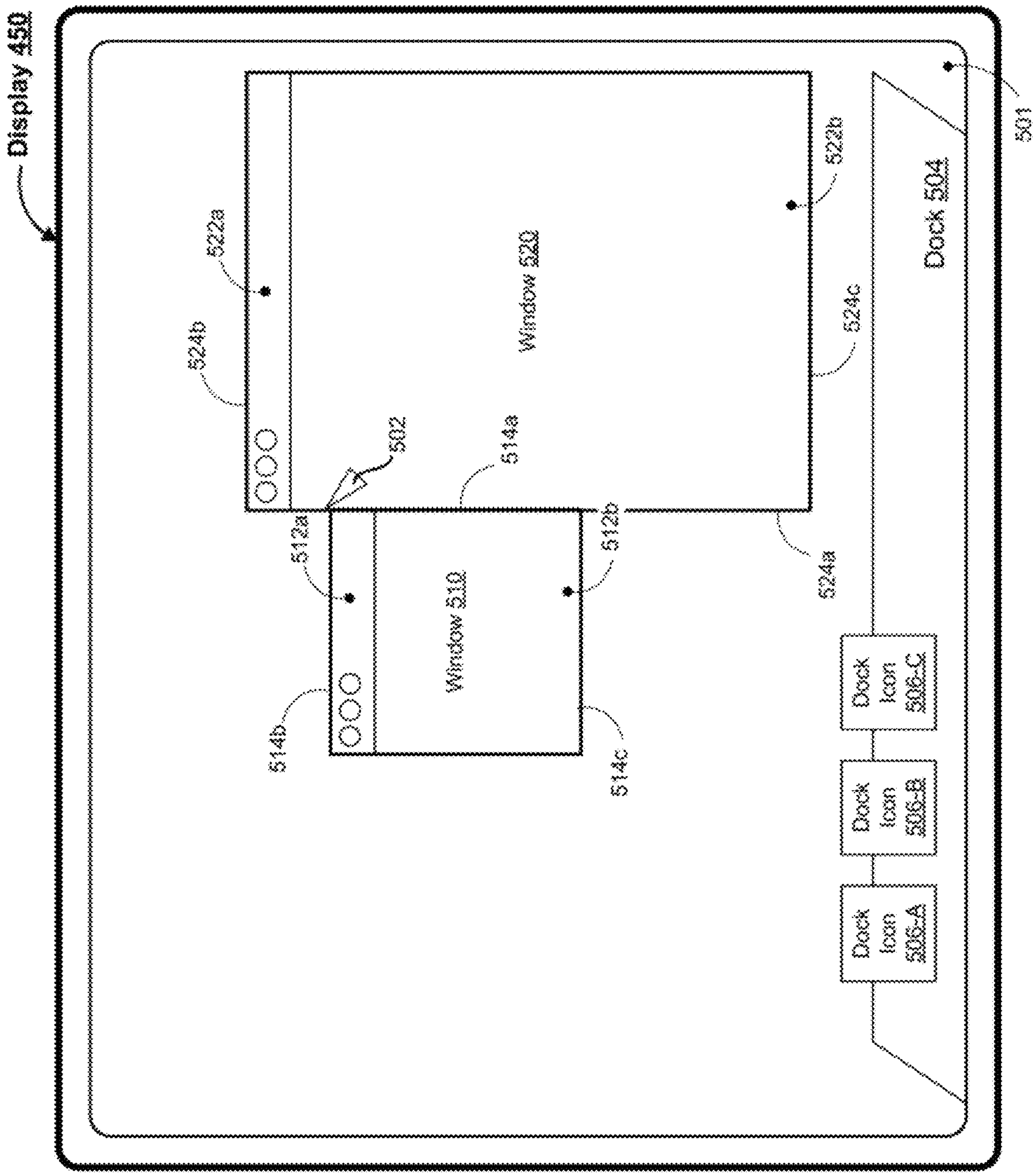
Figure 5D:
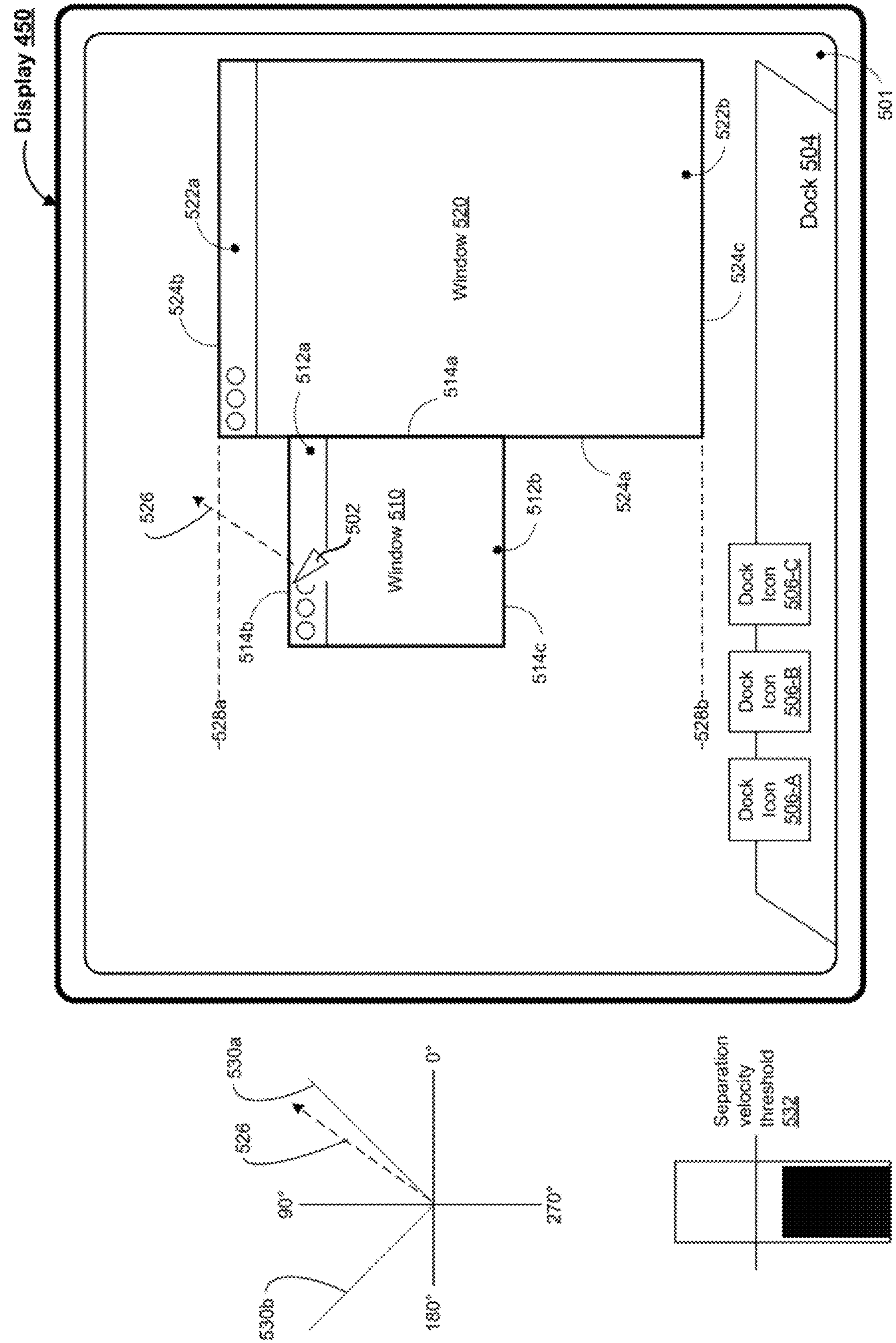
Figure 5E:
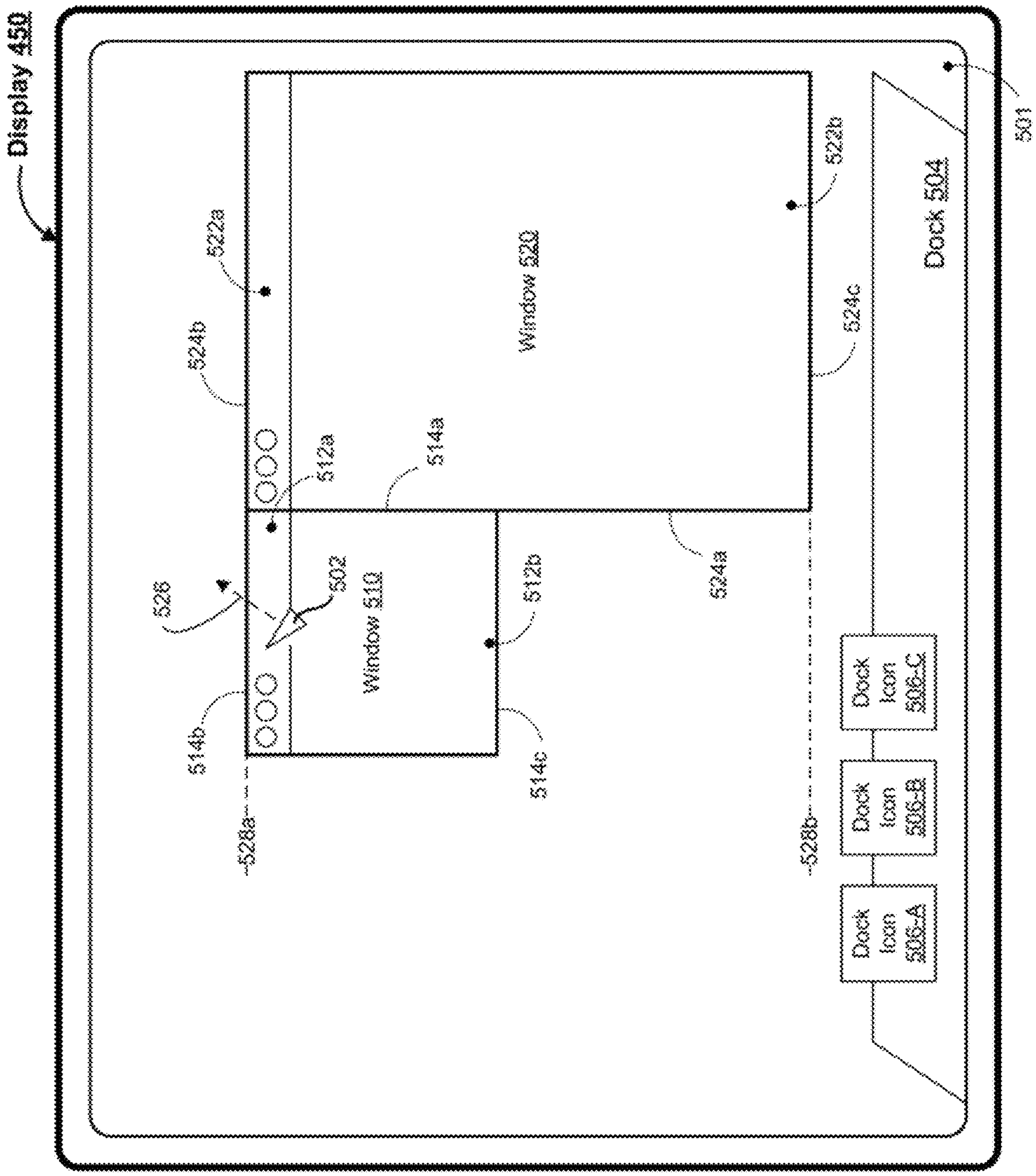
Figure 5F:
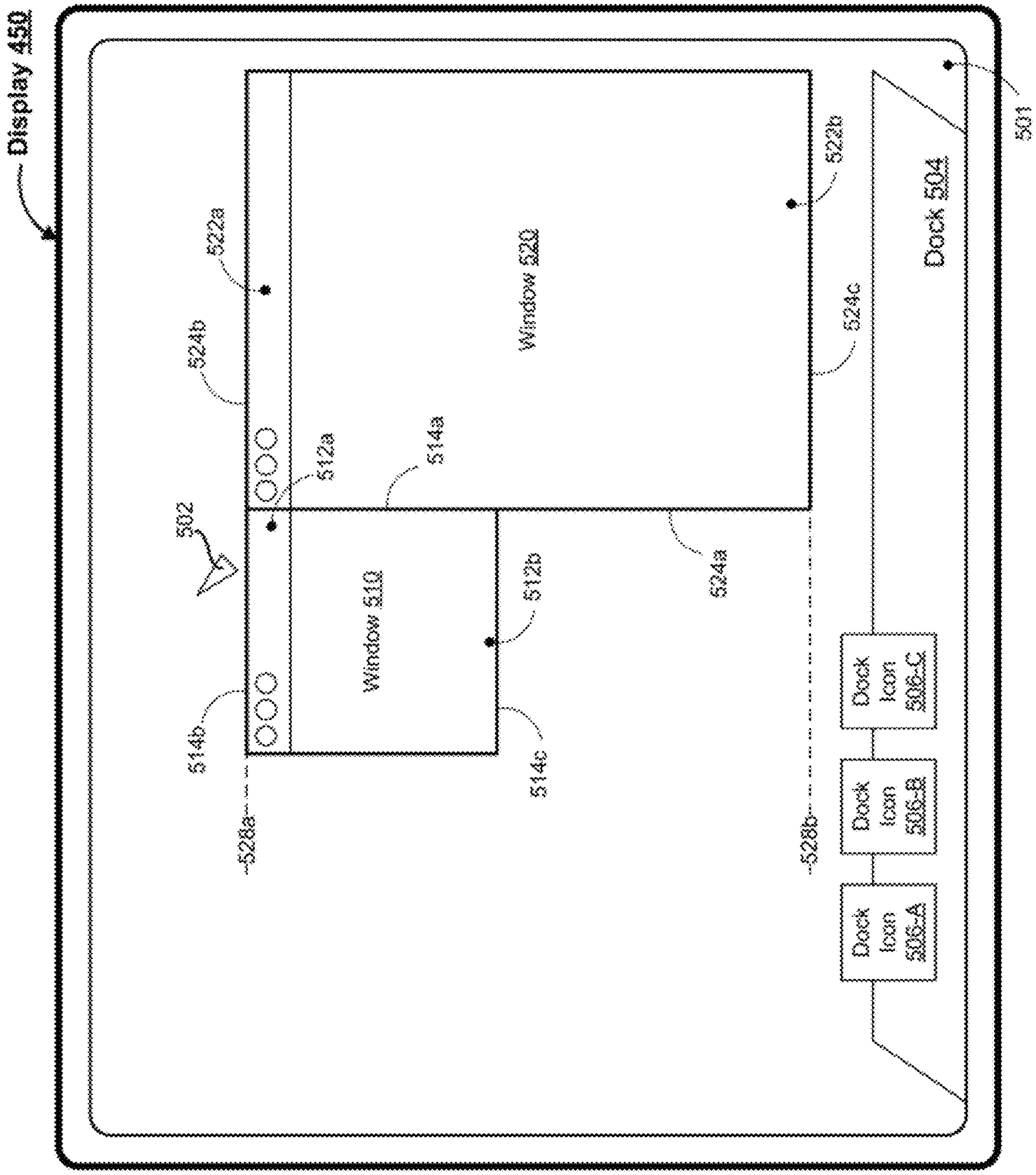
Figure 5G:
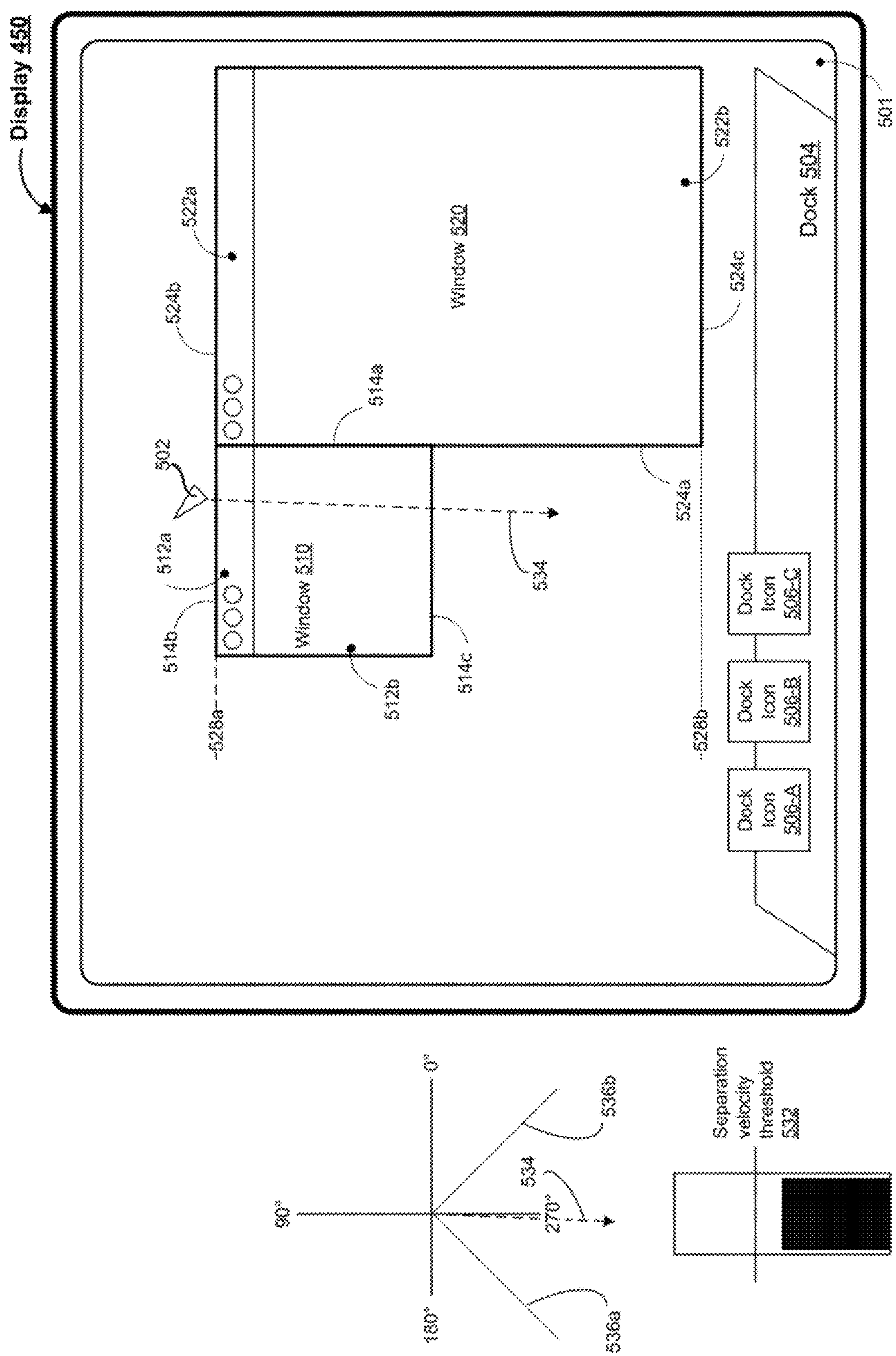
Figure 5H:
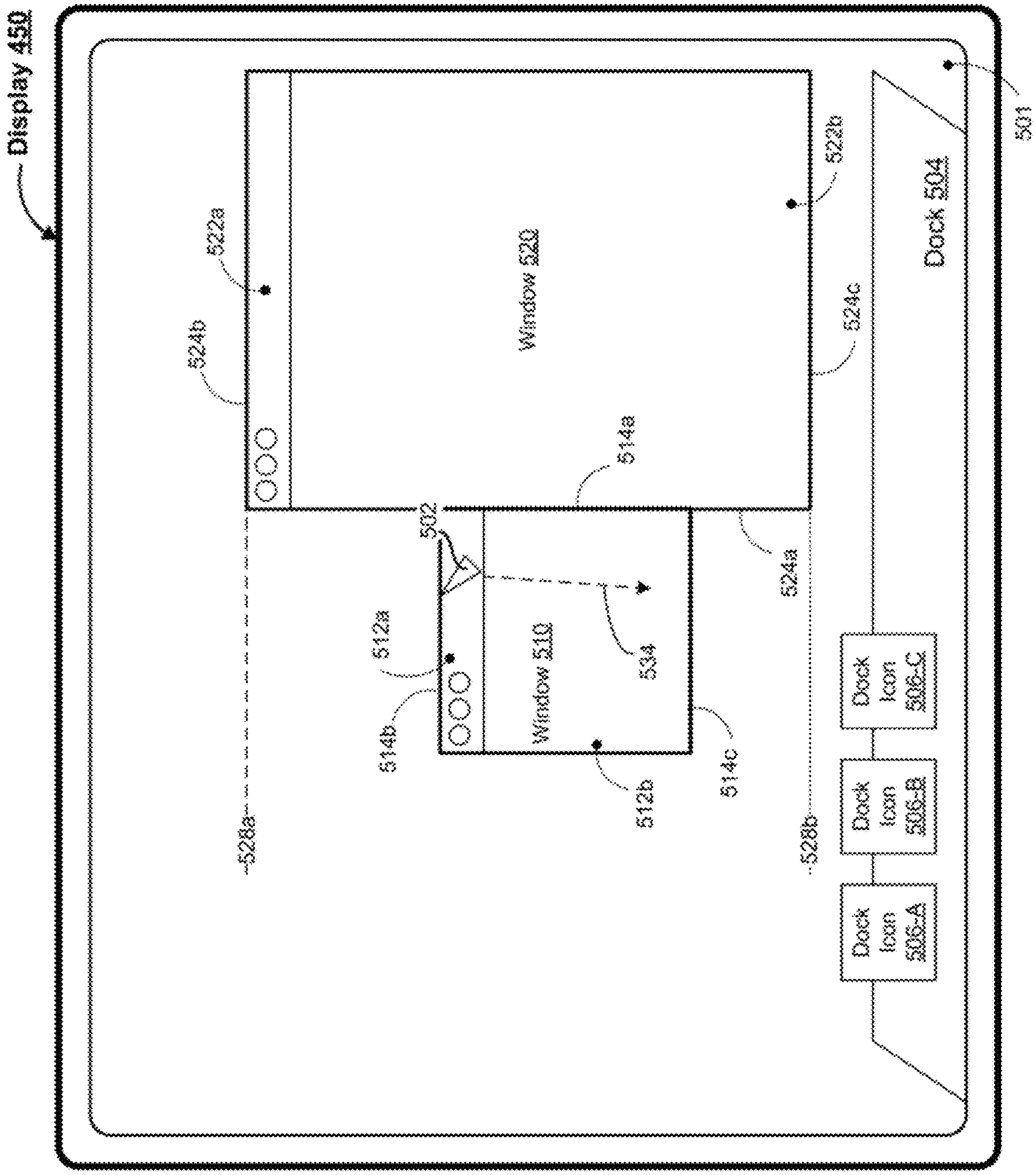
Figure 5I:
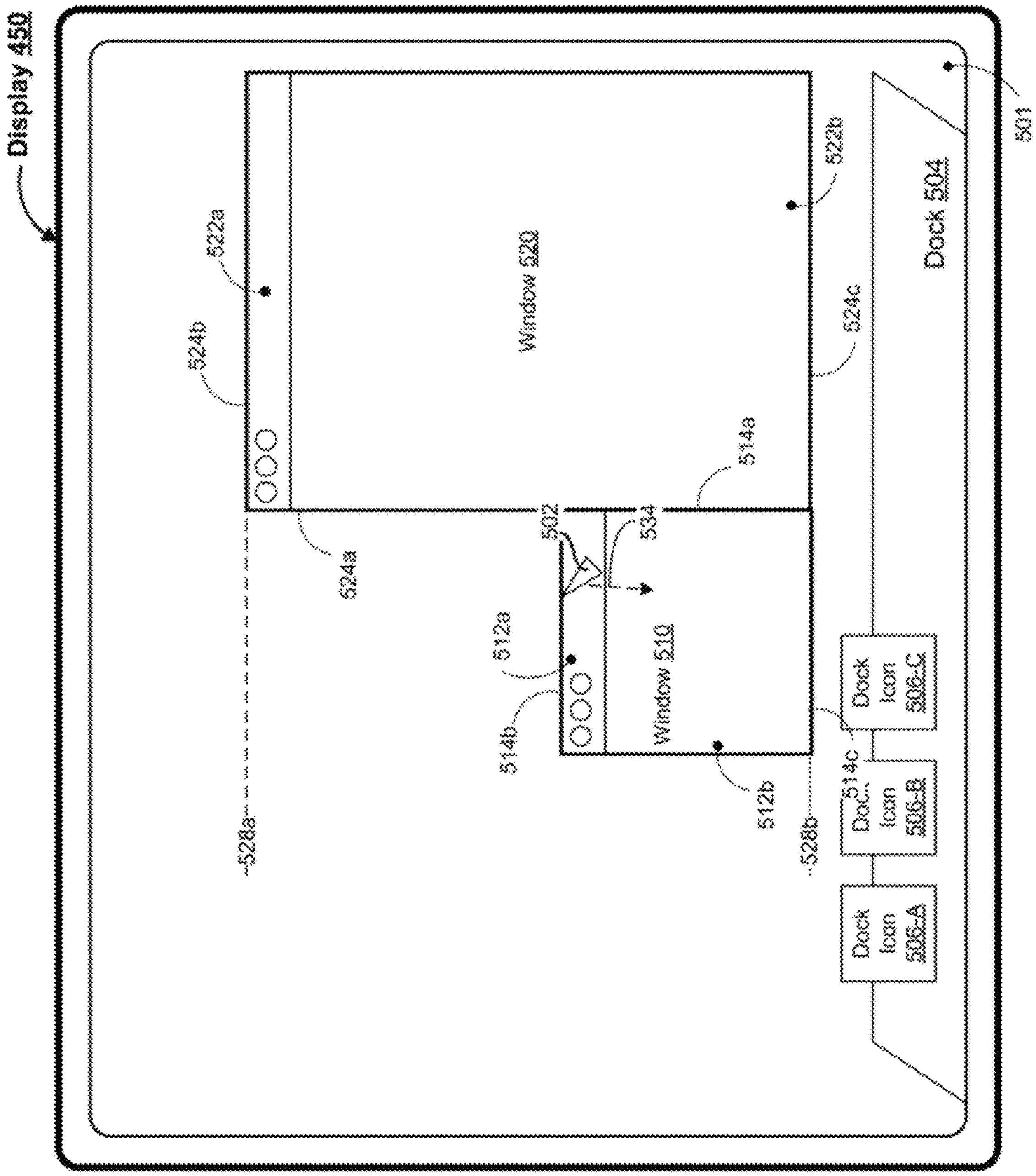
Figure 5J:
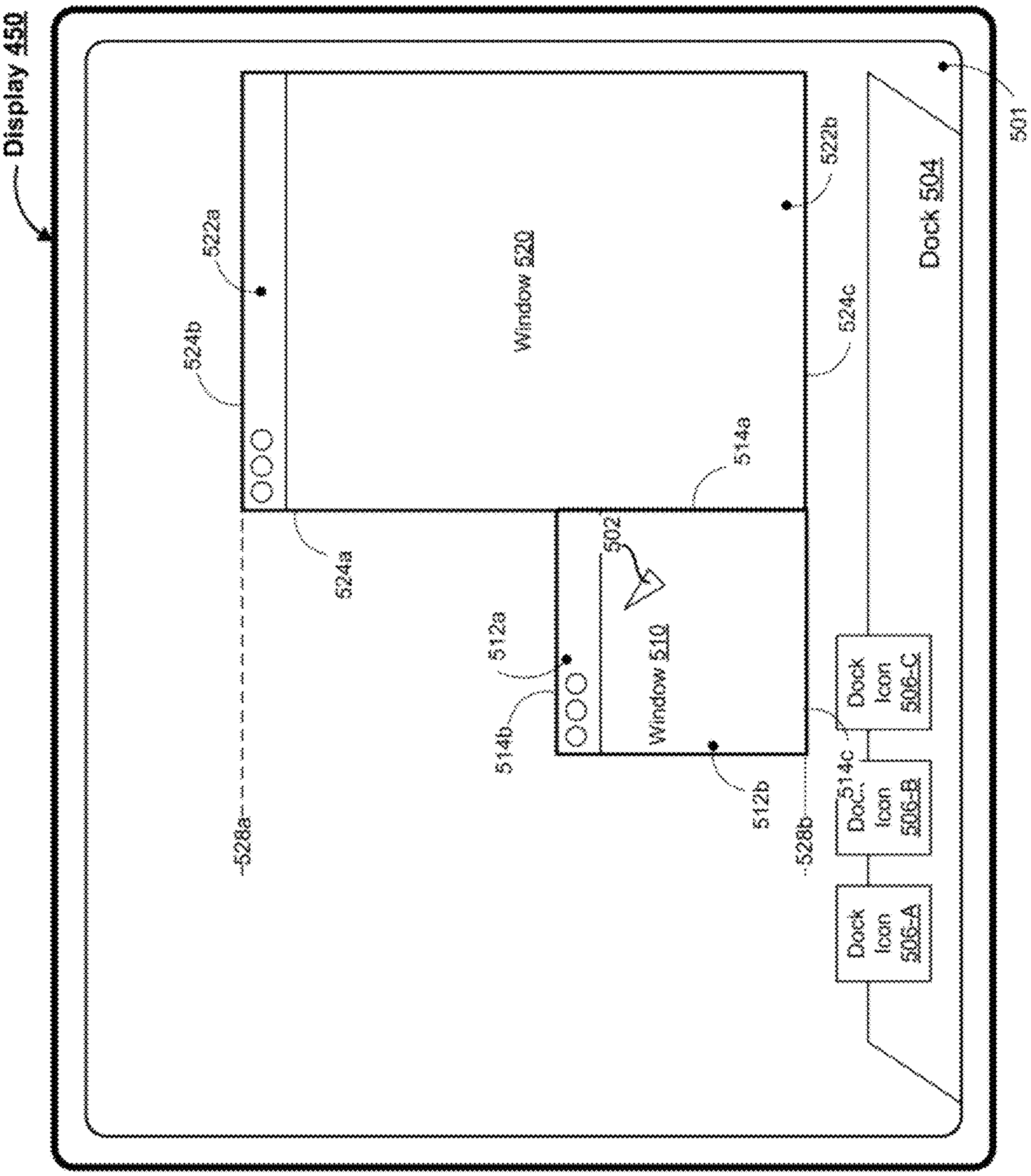
Figure 5K:
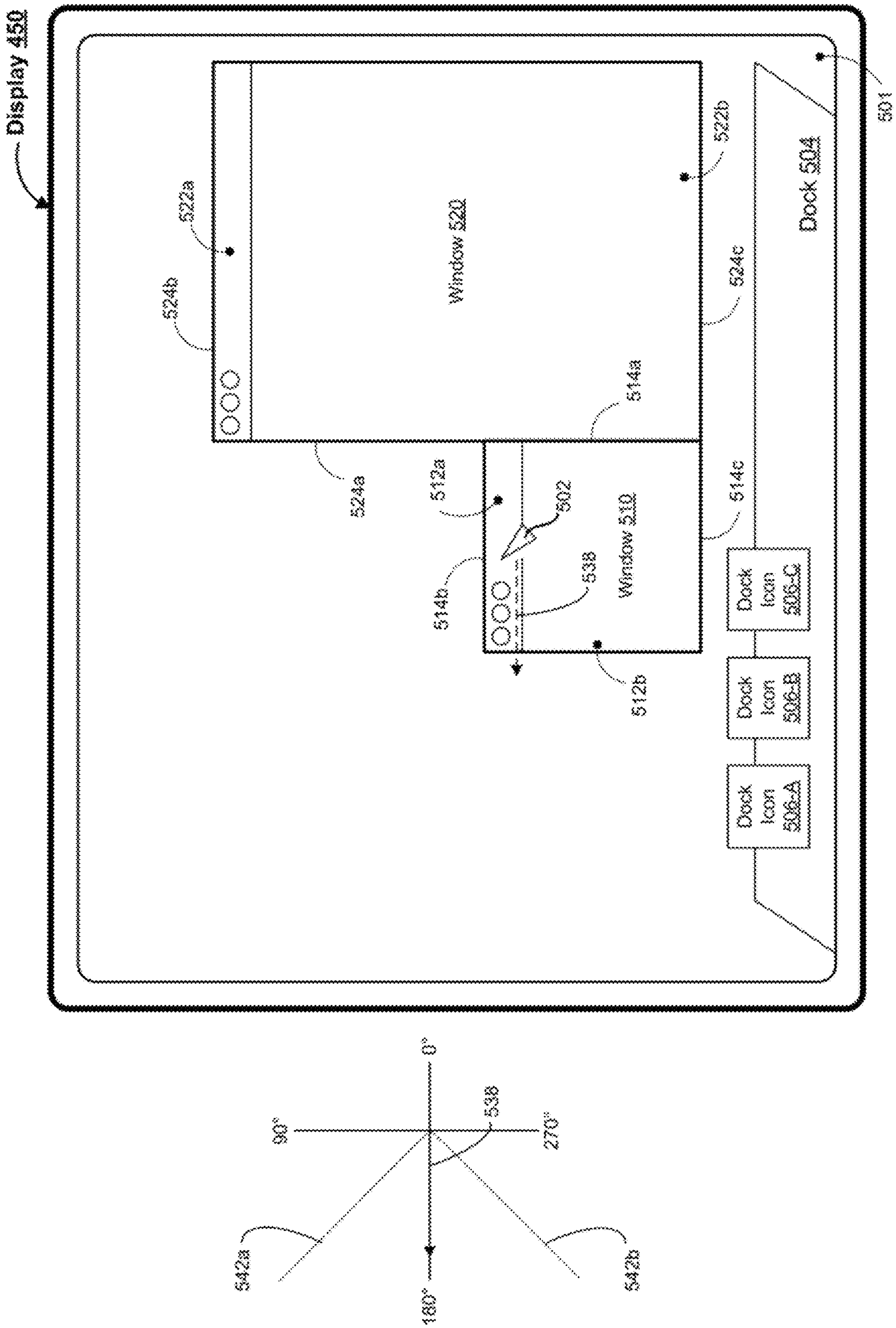
Figure 5L:
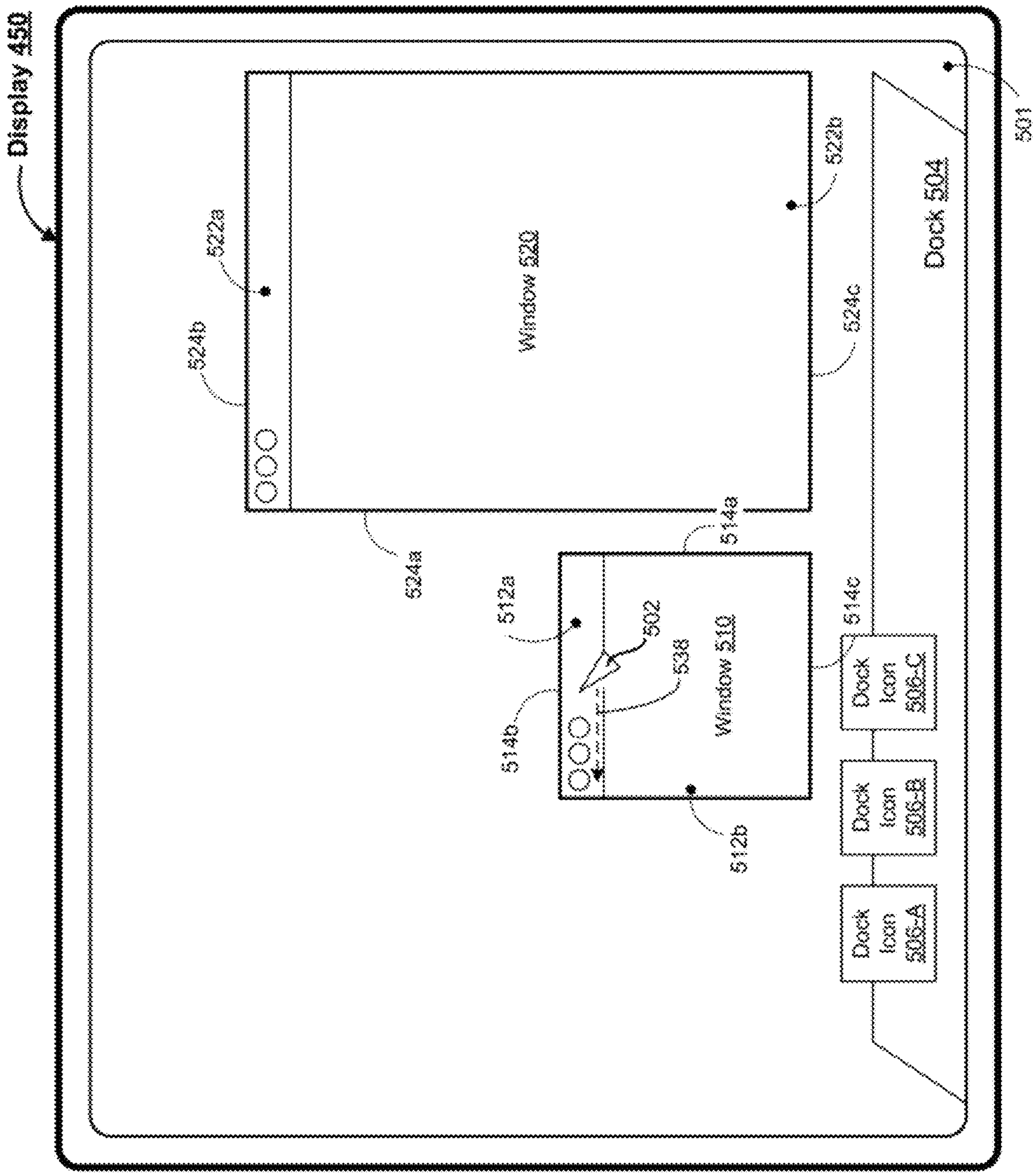
Figure 5M:
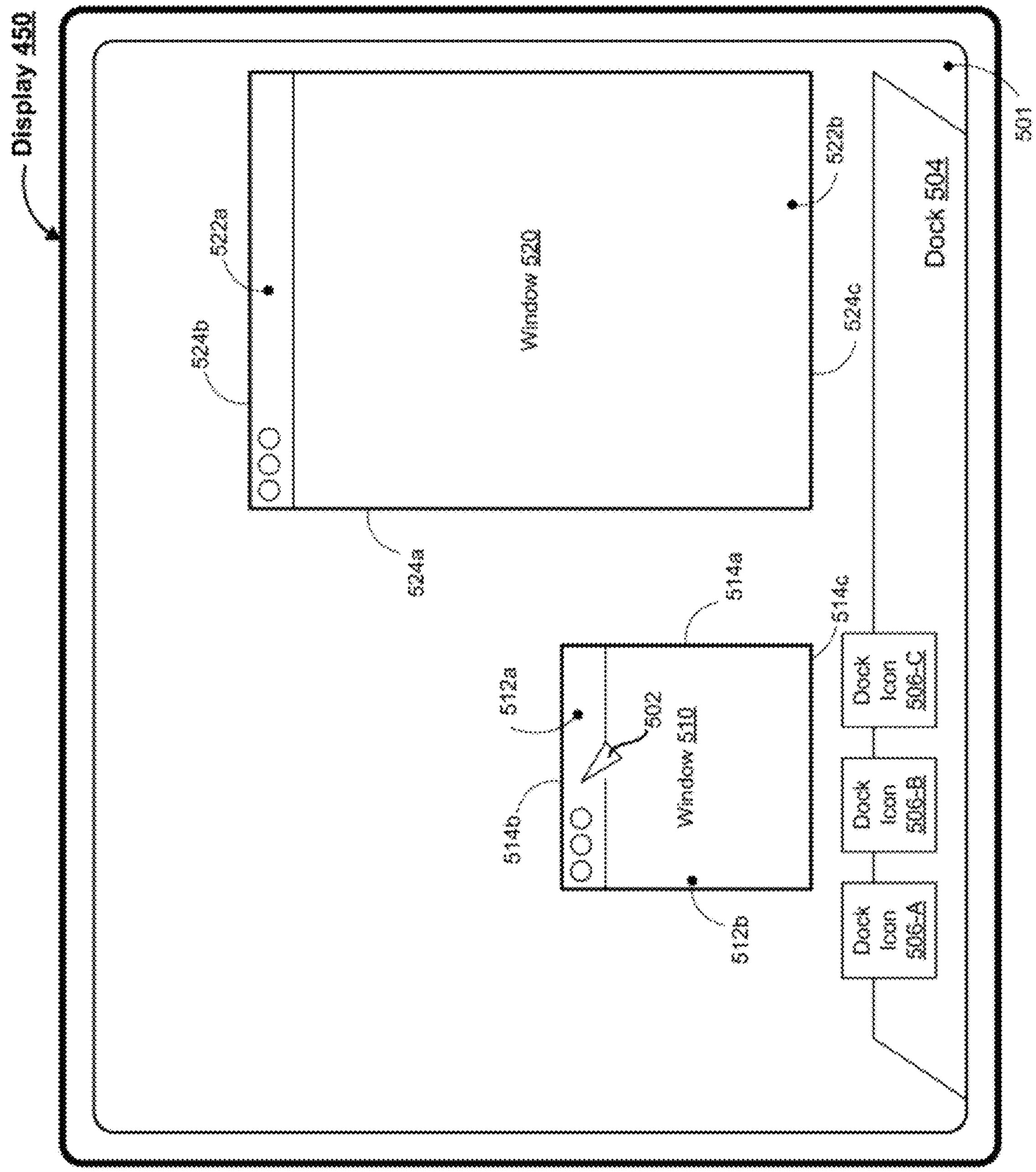
Figure 5N:
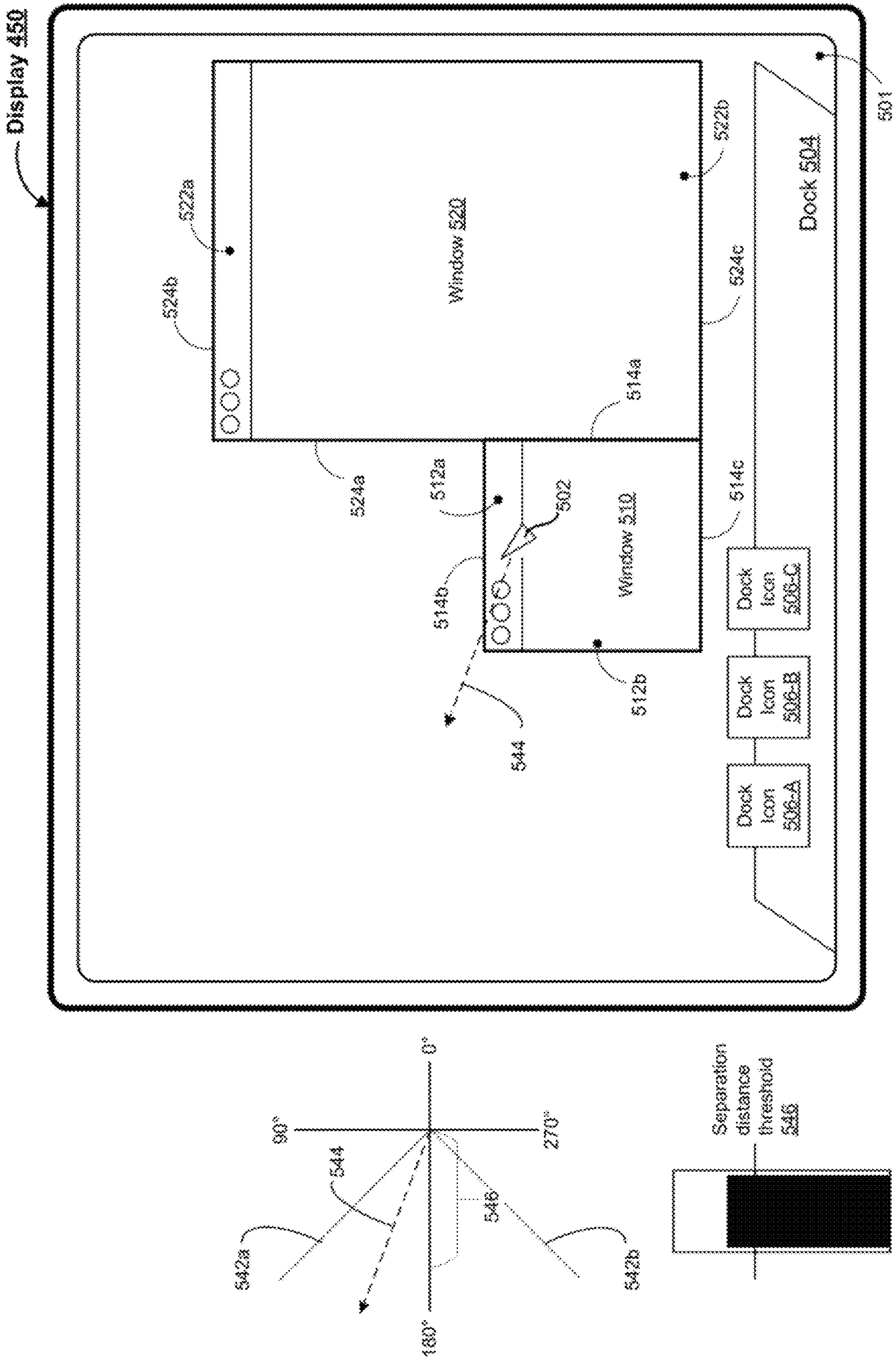
Figure 5O:
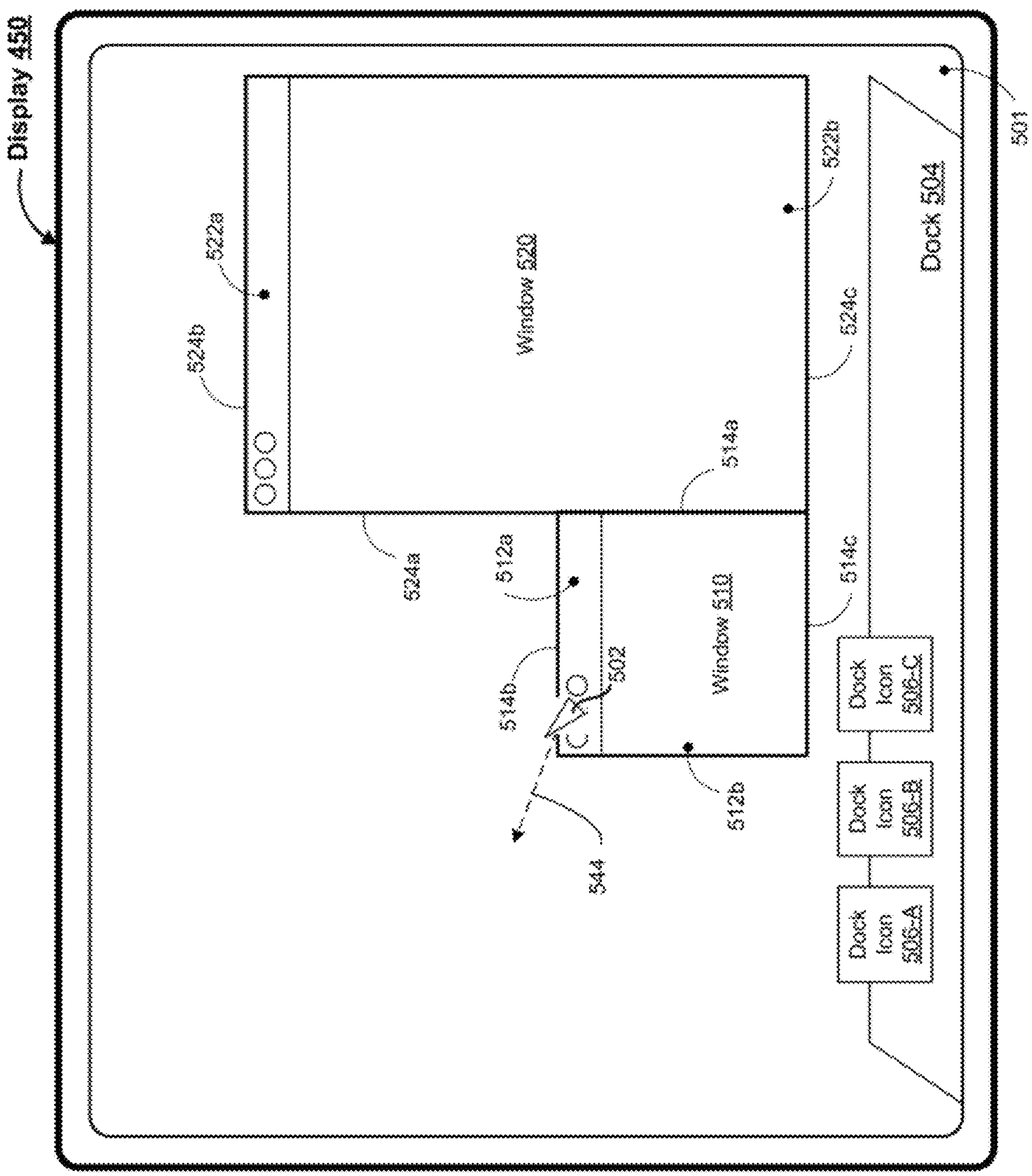
Figure 5P:
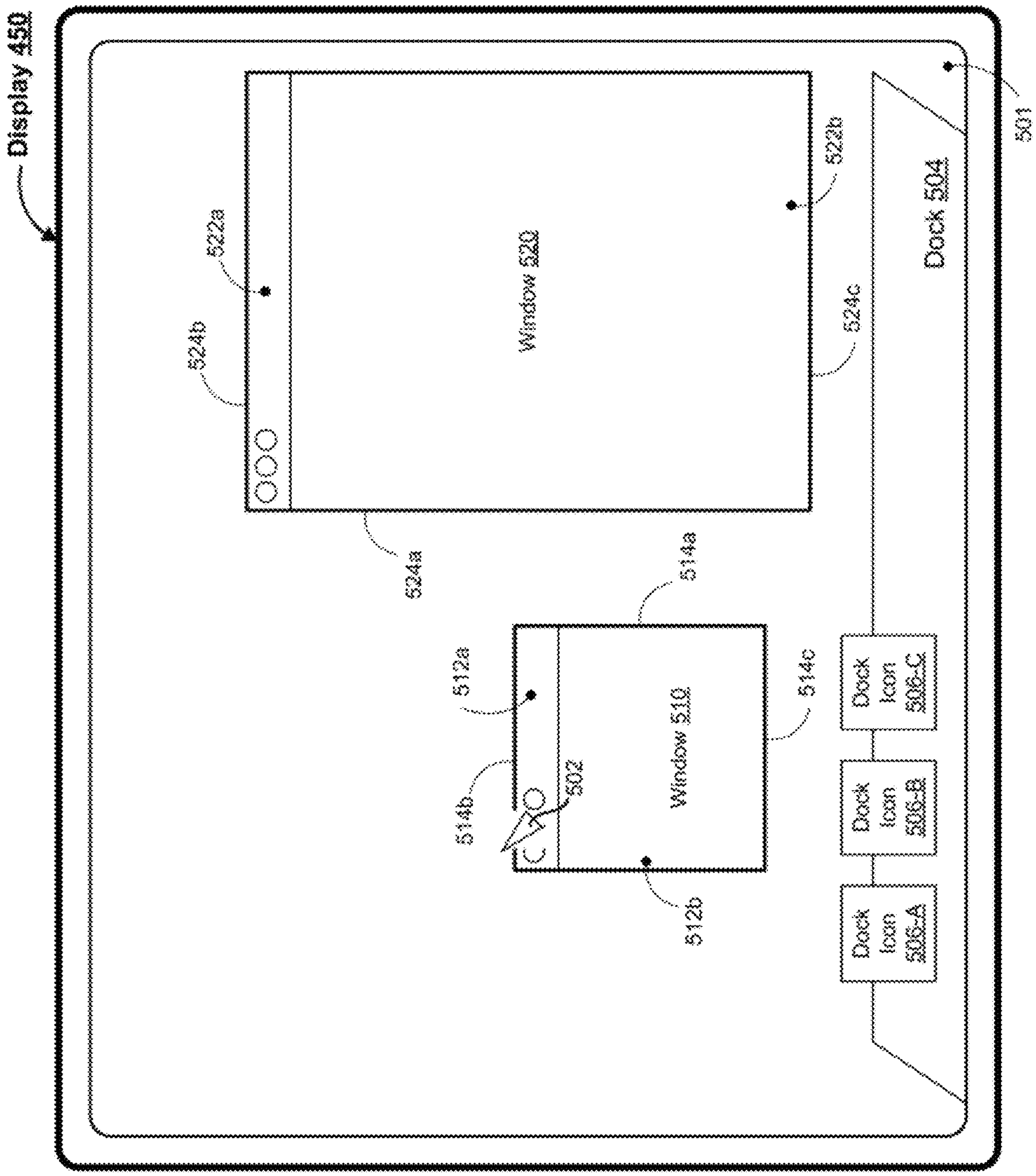
Figure 5Q:
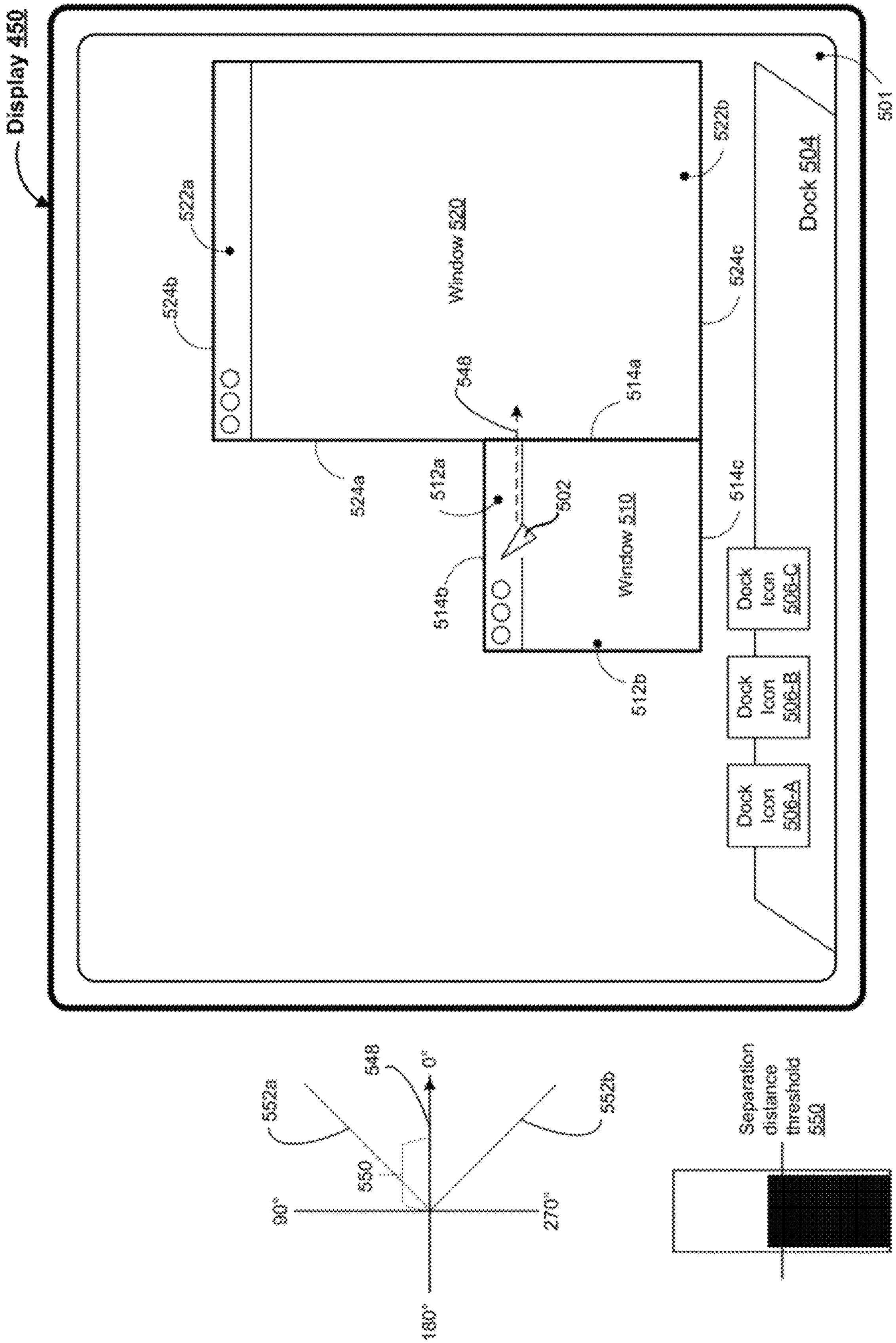
Figure 5R:
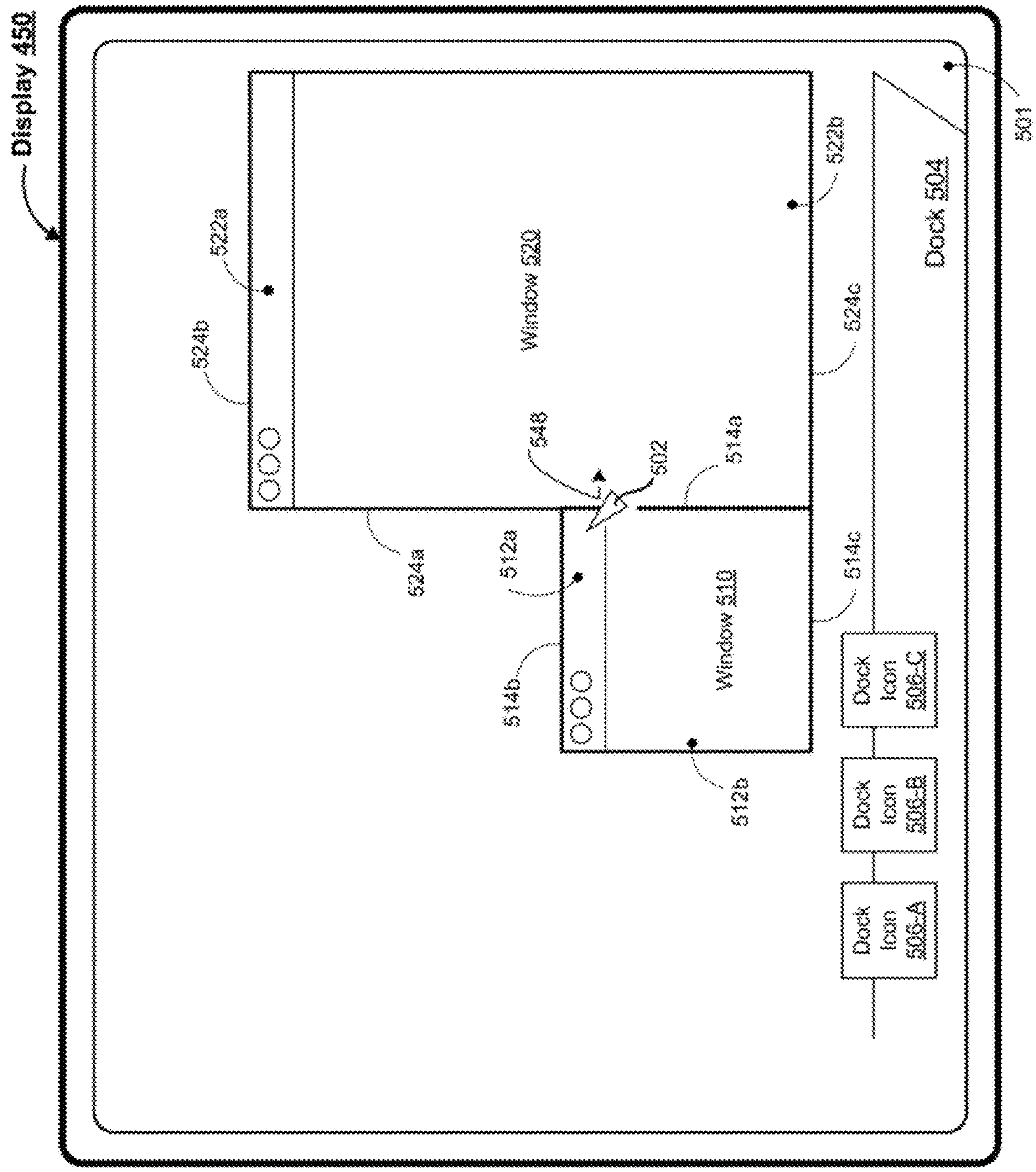
Figure 5S:
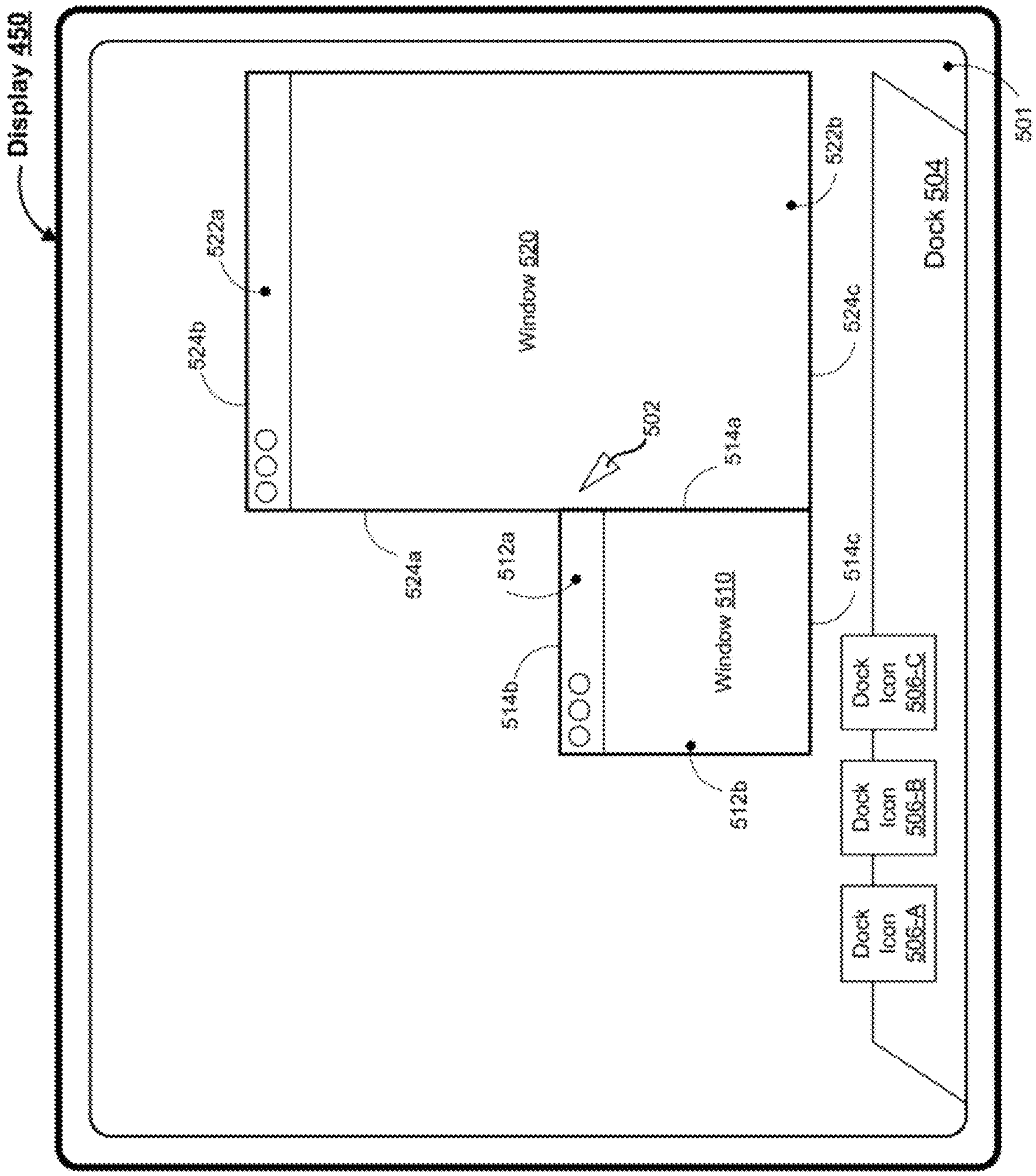
Figure 5T:
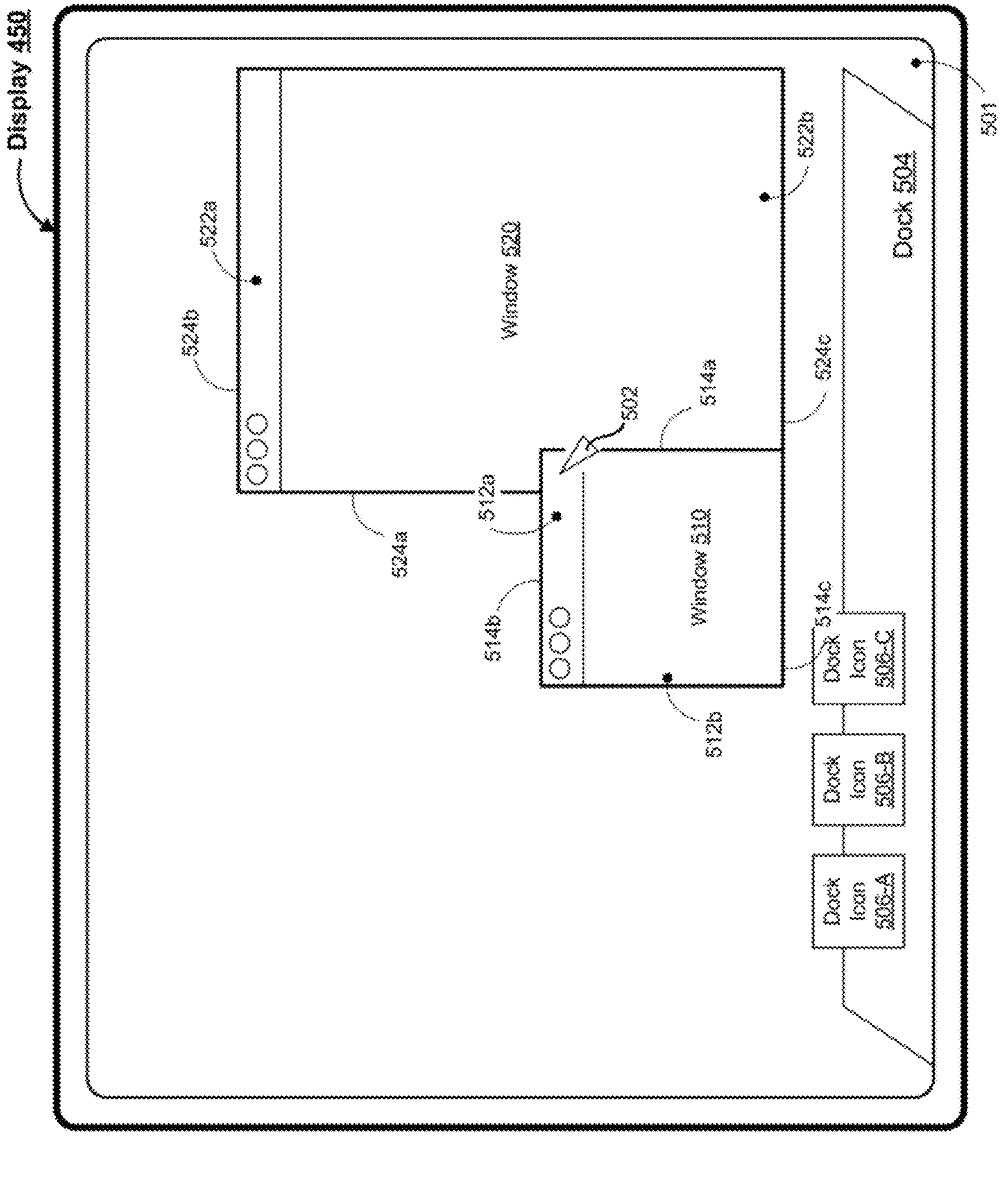

FIGS. 5A-5T show a window 510 and a window 520 displayed within a display area 501 of the display 450. For example, the window 510 corresponds to a first application, and the window 520 corresponds to a second application different from the first application. For example, the window 510 and the window 520 correspond to a same application. FIGS. 5A-5MMM show a dock 504 within the display area 501 with a plurality of dock icons 506-A, 506-B, and 506-C corresponding to different applications.

As shown in FIGS. 5A-5T, the window 510 includes a chrome region 512*a* and a content region 512*b*. The window 510 has a right edge 514*a*, a top edge 514*b*, and a bottom edge 514*c*. Similarly, the window 520 includes a chrome region 522*a* and a content region 522*b*. The window 520 has a left edge 524*a*, a top edge 524*b*, and a bottom edge 524*c*.

FIGS. 5A-5B illustrate a sequence in which the right edge 514*a* of the window 510 is moved toward the left edge 524*a* of the window 520 and the right edge 514*a* of the window 510 is paired with the left edge 524*a* of the window 520 according to a determination that the movement of the window 510 satisfies one or more pairing criteria. In this example, the one or more pairing criteria are satisfied when both an angle criterion and a velocity criterion are satisfied. For example, the angle criterion is satisfied when the angle of the movement deviates from a predefined axis (e.g., an axis normal or perpendicular to the edge being approached) by less than an angular threshold value (e.g., +/−45° from the predefined axis). As such, according to some embodiments, the angle criterion is satisfied when the angle of approach is between pairing values 516*a* (e.g., 45°) and 516*b* (e.g., 315°). For example, the velocity criterion is satisfied when the velocity of the movement is less than a pairing velocity threshold 518.

In FIG. 5A, the window 510 is dragged with the focus selector 502 by the chrome region 512*a* according to the movement vector 508. For example, the right edge 514*a* of the window 510 is moved toward the left edge 524*a* of the window 520 according to the movement vector 508. As shown in FIG. 5A, the angle of the movement vector 508 (e.g., 15°) relative to a normal associated with the left edge 524*a* of the window 520 is between the pairing values 516*a* and 516*b*. Furthermore, in FIG. 5A, the velocity associated with the movement vector 508 is less than the pairing velocity threshold 518.

As such, as shown in FIGS. 5B-5C, the right edge 514*a* of the window 510 is paired with the left edge 524*a* of the window 520. For example, the movement of the window 510 is stopped when the right edge 514*a* of the window 510 touches the left edge 524*a* of the window 520 due to satisfaction of the angle criterion and the velocity criterion. However, in FIG. 5C, the focus selector 502 moves past the left edge 524*a* of the window 520 according to the movement vector 508. In some embodiments, when the window is moved (or resized) based on an input from a device with a tactile output generator (e.g., a trackpad with a tactile output generator), a tactile output is generated when the edge of a window (e.g., window 510) is paired with the edge of another window (e.g., window 520). In contrast, in some embodiments, if the edge of the window is moved over the edge of the other window without being paired, then no tactile output is generated to indicate that the edge of the window has passed over the edge of the other window.

FIGS. 5D-5F illustrate a sequence in which the window 510 is moved substantially parallel to the left edge 524*a* of the window 520 and the right edge 514*a* of the window 510 remains paired with the left edge 524*a* of the window 520 according to a determination that the movement of the window 510 does not satisfy one or more separation criteria. In this example, the one or more separation criteria are satisfied when either an angle criterion or a velocity criterion are satisfied. For example, the angle criterion is satisfied when the angle of the movement deviates from a predefined axis (e.g., an axis normal or perpendicular to the paired edges) by more than an angular threshold value (e.g., +/−45° from the predefined axis). As such, according to some embodiments, the angle criterion is satisfied when the angle of the movement is not between separation values 530*a* (e.g., 45°) and 530*b* (e.g., 135'). For example, the velocity criterion is satisfied when the velocity of the movement is greater than a separation velocity threshold 532.

In FIG. 5D, the window 510 is dragged with the focus selector 502 by the chrome region 512*a* according to the movement vector 526. For example, the right edge 514*a* of a window 510 is moved substantially parallel to the left edge 524*a* of the window 520 according to the movement vector 526. As shown in FIG. 5D, the angle of the movement vector 526 (e.g., 75°) relative to a normal associated with the left edge 524*a* of the window 520 is between the separation values 530*a* and 530*b*. Furthermore, in FIG. 5D, the velocity associated with the movement vector 526 is less than the separation velocity threshold 532.

As such, as shown in FIGS. 5E-5F, the right edge 514*a* of the window 510 remains paired with the left edge 524*a* of the window 520. For example, the window 510 slides parallel to the window 520, but the window 510 remains paired to the window 520 because neither the angle criterion nor the velocity criterion associated with the one or more separation criteria are satisfied. As shown in FIGS. 5E-5F, the parallel movement of the window 510 is constrained by a line 528*a* associated with the top edge 524*b* of the window 520. However, in FIG. 5F, the focus selector 502 moves past the line 528*a* according to the movement vector 526. In some embodiments, when the window is moved (or resized) based on an input from a device with a tactile output generator (e.g., a trackpad or touch-sensitive surface with a tactile output generator), a tactile output is generated when the edge of window 510 reaches a constraint associated with another edge of the window with which it is paired (e.g., the top edge 524*b* of window 520 in FIG. 5E) if the separation criteria is not satisfied. In contrast, in some embodiments, if the separation criteria are satisfied, then no tactile output is generated when the edge of the window reaches the constraint associated with the edge of the other window.

FIGS. 5G-5J illustrate another sequence in which the window 510 is moved substantially parallel to the left edge 524*a* of the window 520 and the right edge 514*a* of the window 510 remains paired with the left edge 524*a* of the window 520 according to a determination that the movement of the window 510 does not satisfy one or more separation criteria. In this example, the one or more separation criteria are satisfied when either an angle criterion or a velocity criterion are satisfied. For example, the angle criterion is satisfied when the angle of the movement deviates from a predefined axis (e.g., an axis normal or perpendicular to the paired edges) by more than an angular threshold value (e.g., +/−45° from the predefined axis). As such, according to some embodiments, the angle criterion is satisfied when the angle of the movement is not between separation values 536*a* (e.g., 225°) and 536*b* (e.g., 315°). For example, the velocity criterion is satisfied when the velocity of the movement is greater than a separation velocity threshold 532.

In FIG. 5G, the window 510 is dragged with the focus selector 502 by the chrome region 512*a* according to the movement vector 534. For example, the movement vector 534 is a continuation of the movement in FIGS. 5D-5F (e.g., click and drag according to movement vector 526, then hold and drag according to movement vector 534). For example, the right edge 514*a* of a window 510 is moved substantially parallel to the left edge 524*a* of the window 520 according to the movement vector 534. As shown in FIG. 5G, the angle of the movement vector 534 (e.g., 285°) relative to a normal associated with the left edge 524*a* of the window 520 is between the separation values 536*a* and 536*b*. Furthermore, in FIG. 5G, the velocity associated with the movement vector 534 is less than the separation velocity threshold 532.

As such, as shown in FIGS. 5H-5J, the right edge 514*a* of the window 510 remains paired with the left edge 524*a* of the window 520. For example, the window 510 slides parallel to the window 520, but the window 510 remains paired to the window 520 because neither the angle criterion nor the velocity criterion associated with the one or more separation criteria are satisfied. As shown in FIGS. 5I-5J, the parallel movement of the window 510 is constrained by a line 528*b* associated with the bottom edge 524*c* of the window 520.

FIGS. 5K-5M illustrate a sequence in which the window 510 is moved substantially perpendicular to the left edge 524*a* of the window 520 and the right edge 514*a* of the window 510 is unpaired from the left edge 524*a* of the window 520 according to a determination that the movement of the window 510 satisfies one or more separation criteria. In this example, the one or more separation criteria are satisfied when an angle criterion is satisfied. For example, the angle criterion is satisfied when the angle of the movement deviates from a predefined axis (e.g., an axis normal or perpendicular to the paired edges) by less than an angular threshold value (e.g., +/−45° from the predefined axis). As such, according to some embodiments, the angle criterion is satisfied when the angle of the movement is between separation values 542*a* (e.g., 135°) and 542*b* (e.g., 225°).

In some embodiments, if a first window is moved away from a paired, second window in a substantially perpendicular direction, the first window is unpaired from the second window when the angle criterion is satisfied (e.g., no distance criterion in FIGS. 5K-5M). In some embodiments, if a first window is moved toward a paired, second window in a substantially perpendicular direction, the first window is unpaired from the second window when an angle criterion and a distance criterion is satisfied (e.g., FIGS. 5Q-5T).

In FIG. 5K, the window 510 is dragged with the focus selector 502 by the chrome region 512*a* according to the movement vector 538. For example, the right edge 514*a* of a window 510 is moved away from the left edge 524*a* of the window 520 in a substantially perpendicular direction according to the movement vector 538. As shown in FIG. 5K, the angle of the movement vector 538 (e.g., 180°) relative to a normal associated with the left edge 524*a* of the window 520 is between the separation values 542*a* and 542*b*.

As such, as shown in FIGS. 5L-5M, the right edge 514*a* of the window 510 is separated from and no longer paired with the left edge 524*a* of the window 520. For example, the window 510 separates from the window 520 and moves according to the movement vector 538 because the angle criterion and the distance criterion associated with the one or more separation criteria are satisfied.

FIGS. 5N-5P illustrate another sequence in which the window 510 is moved substantially perpendicular to the left edge 524*a* of the window 520 and the right edge 514*a* of the window 510 is unpaired from the left edge 524*a* of the window 520 according to a determination that the movement of the window 510 satisfies one or more separation criteria.

In this example, the one or more separation criteria are satisfied when an angle criterion and a distance criterion are satisfied. For example, the angle criterion is satisfied when the angle of the movement deviates from a predefined axis (e.g., an axis normal or perpendicular to the paired edges) by less than an angular threshold value (e.g., +/−45° from the predefined axis). As such, according to some embodiments, the angle criterion is satisfied when the angle of the movement is between separation values 542*a* (e.g., 135°) and 542*b* (e.g., 225°). For example, the distance criterion is satisfied when the magnitude of the movement is greater than a separation distance threshold 546.

In FIG. 5N, the window 510 is dragged with the focus selector 502 by the chrome region 512*a* according to the movement vector 544. For example, the right edge 514*a* of a window 510 is moved away from the left edge 524*a* of the window 520 in a substantially perpendicular direction according to the movement vector 544. As shown in FIG. 5N, the angle of the movement vector 544 (e.g., 160°) relative to a normal associated with the left edge 524*a* of the window 520 is between the separation values 542*a* and 542*b*. Furthermore, in FIG. 5N, the magnitude associated with the movement vector 544 is greater than the separation distance threshold 546.

As such, as shown in FIGS. 5O-5P, the right edge 514*a* of the window 510 is separated from and no longer paired with the left edge 524*a* of the window 520. For example, the window 510 separates from the window 520 and moves according to the movement vector 544 because the angle criterion and the distance criterion associated with the one or more separation criteria are satisfied. In some embodiments, when the window is moved (or resized) based on an input from a device with a tactile output generator (e.g., a trackpad or touch-sensitive surface with a tactile output generator), a tactile output is generated when the edge of a window (e.g., window 510) is separated (e.g., unpaired) from the edge of another window (e.g., window 520). In some embodiments, when the window is moved (or resized) based on an input from a device with a tactile output generator (e.g., a trackpad or touch-sensitive surface with a tactile output generator), a tactile output is not generated when the edge of a window (e.g., window 510) is separated (e.g., unpaired) from the edge of another window (e.g., window 520) even when the tactile output was generated when the edge of the window (e.g., window 510) was paired with the edge of the other window (e.g., window 520).

FIGS. 5Q-5T illustrate yet another sequence in which the window 510 is moved substantially perpendicular to the left edge 524*a* of the window 520 and the right edge 514*a* of the window 510 is unpaired from the left edge 524*a* of the window 520 according to a determination that the movement of the window 510 satisfies one or more separation criteria. In this example, the one or more separation criteria are satisfied when an angle criterion and a distance criterion are satisfied. For example, the angle criterion is satisfied when the angle of the movement deviates from a predefined axis (e.g., an axis normal or perpendicular to the paired edges) by less than an angular threshold value (e.g., +/−45° from the predefined axis). As such, according to some embodiments, the angle criterion is satisfied when the angle of the movement is between separation values 552*a* (e.g., 45°) and 552*b* (e.g., 315°). For example, the distance criterion is satisfied when the magnitude of the movement is greater than a separation distance threshold 550.

In some embodiments, the value associated with the distance criterion scales based on the angle of the substantially perpendicular movement. For example, the separation distance threshold 550 in FIG. 5Q associated with movement of the window 510 at a 0° angle is less than separation distance threshold 546 in FIG. 5N associated with movement of the window 510 at a 160° angle.

In FIG. 5Q, the window 510 is dragged with the focus selector 502 by the chrome region 512*a* according to the movement vector 548. For example, the right edge 514*a* of a window 510 is moved toward the left edge 524*a* of the window 520 in a substantially perpendicular direction according to the movement vector 548. As shown in FIG. 5Q, the angle of the movement vector 548 (e.g., 0°) relative to a normal associated with the left edge 524*a* of the window 520 is between the separation values 552*a* and 552*b*. Furthermore, in FIG. 5Q, the magnitude associated with the movement vector 548 is greater than the separation distance threshold 550.

As shown in FIG. 5R-5S, the focus selector 502 moves according to the movement vector 528 and the right edge 514*a* of the window 510 remains paired with the left edge 524*a* of the window 520 until the separation distance threshold 550 is satisfied. When the separation distance threshold 550 is satisfied, the window 510 "jumps" between FIGS. 5S-5T so as to be displayed under the focus selector 502. As such, as shown in FIG. 5T, the right edge 514*a* of the window 510 is separated from and no longer paired with the left edge 524*a* of the window 520. For example, the window 510 separates from the window 520 and moves according to the movement vector 548 because the angle criterion and the distance criterion associated with the one or more separation criteria are satisfied.

Figure 5U:
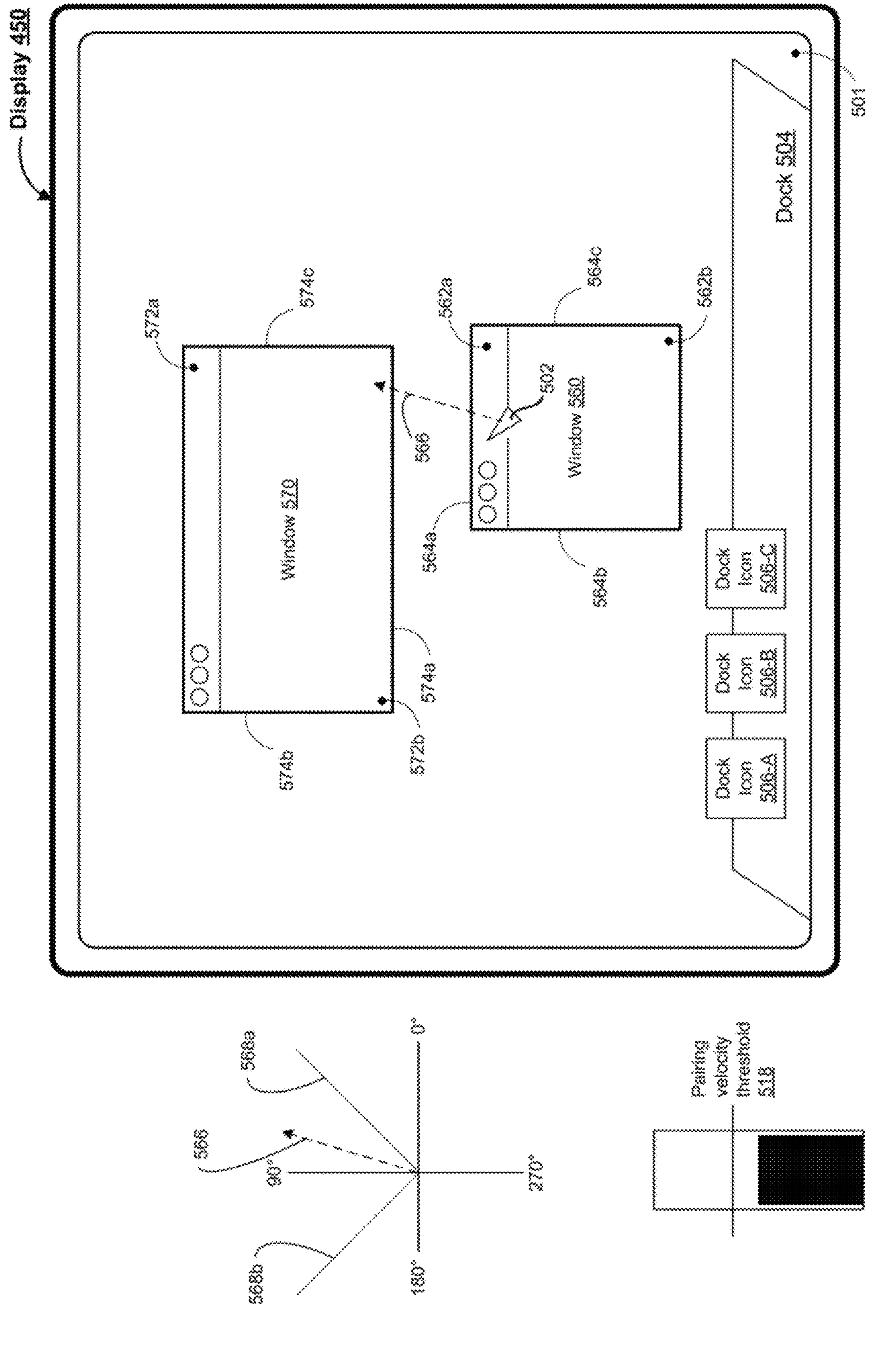

FIGS. 5U-5JJ show a window 560 and a window 570 displayed within a display area 501 of the display 450. For example, the window 560 corresponds to a first application, and the window 570 corresponds to a second application different from the first application. For example, the window 560 and the window 570 correspond to a same application. As shown in FIGS. 5U-5JJ, the window 560 includes a chrome region 562*a* and a content region 562*b*. The window 560 has a top edge 564*a*, a left edge 564*b*, and a right edge 564*c*. Similarly, the window 570 includes a chrome region 572*a* and a content region 572*b*. The window 520 has a bottom edge 574*a*, a left edge 574*b*, and a right edge 574*c*.

Figure 5V:
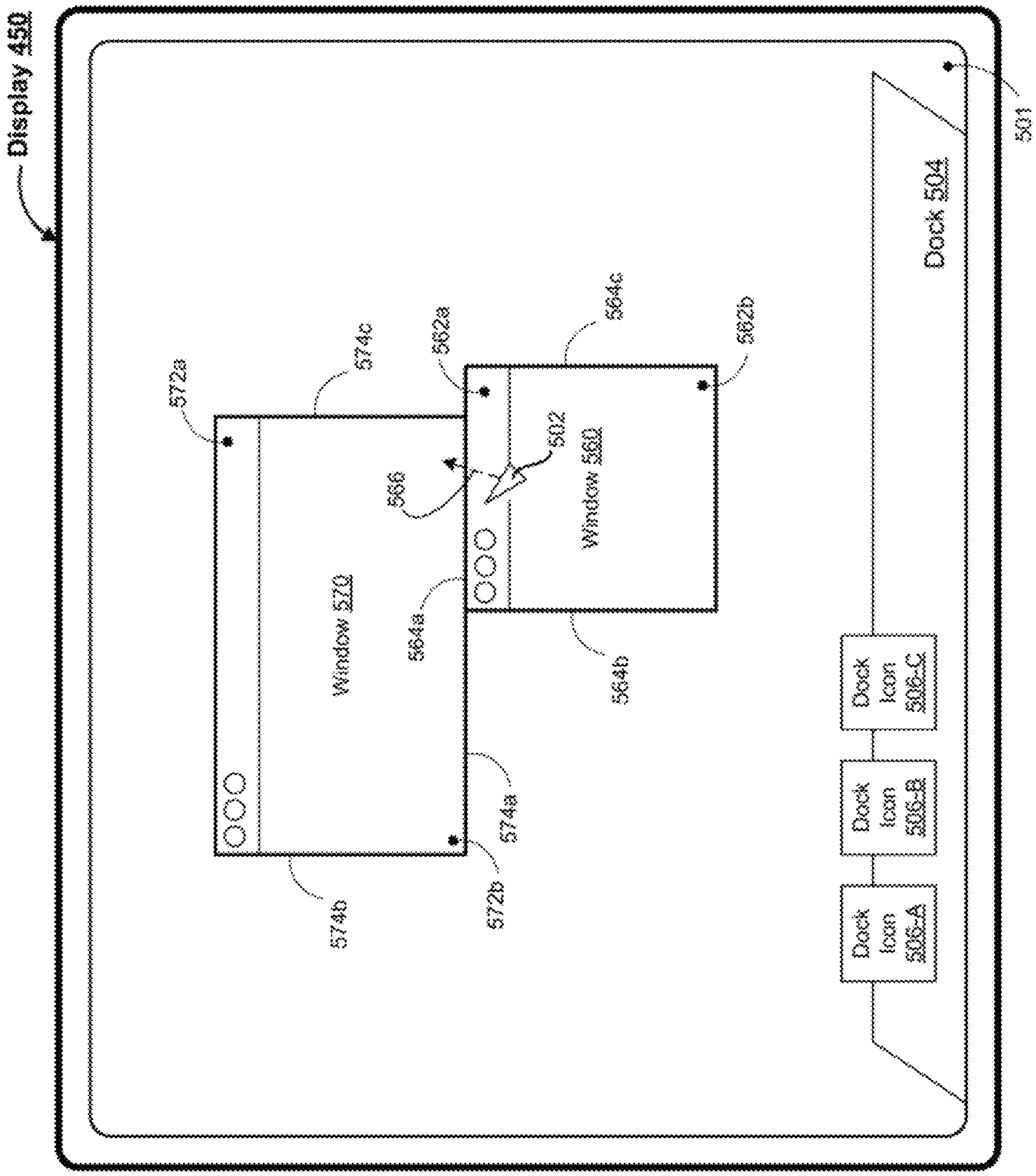
Figure 5W:
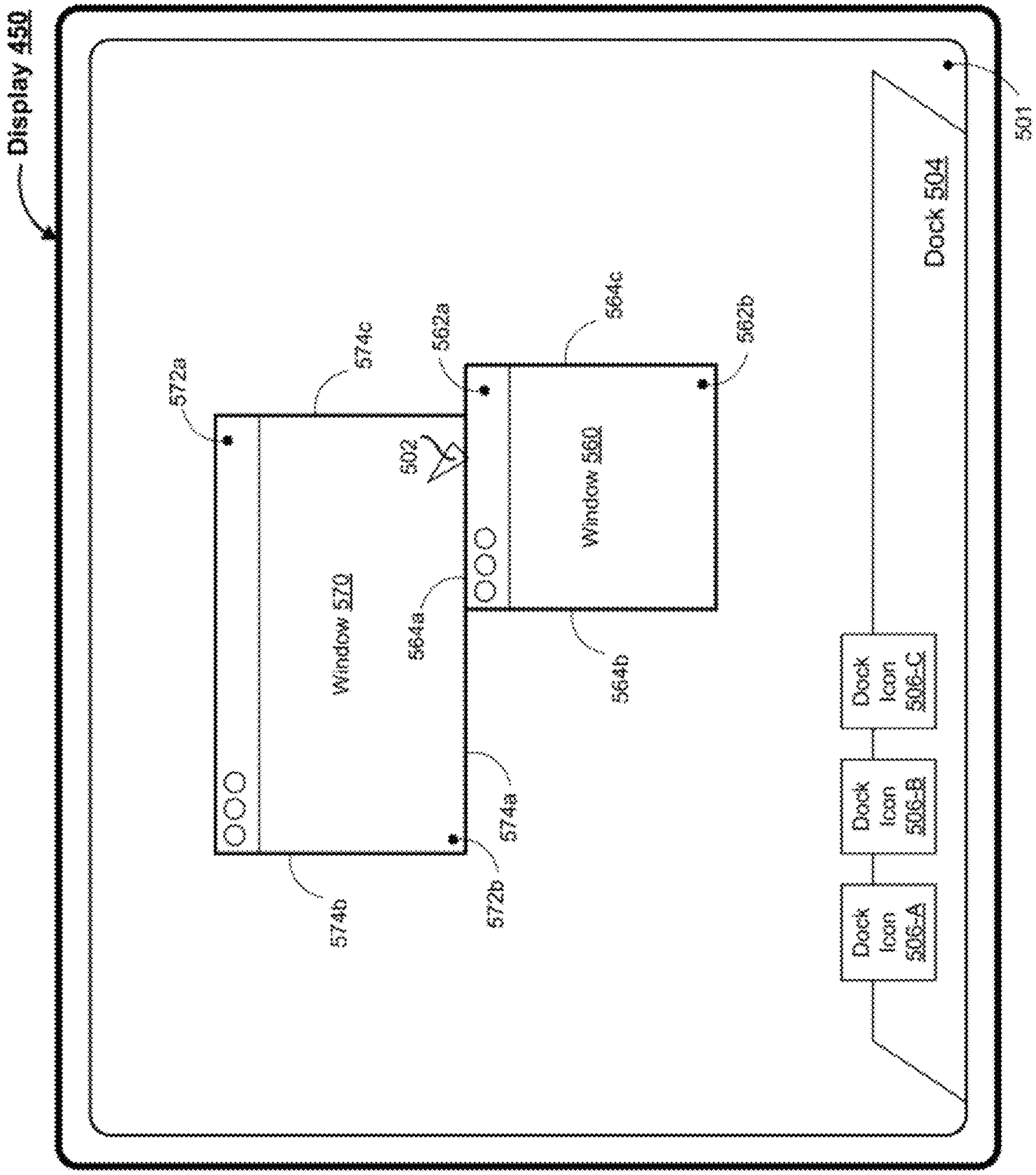

FIGS. 5U-5W illustrate a sequence in which the top edge 564*a* of the window 560 is moved toward the bottom edge 574*a* of the window 570 and the top edge 564*a* of the window 560 is paired with the bottom edge 574*a* of the window 570 according to a determination that the movement of the window 560 satisfies one or more pairing criteria. In this example, the one or more pairing criteria are satisfied when both an angle criterion and a velocity criterion are satisfied. For example, the angle criterion is satisfied when the angle of the movement deviates from a predefined axis (e.g., the edge being approached) by less than an angular threshold value (e.g., +/−45° from the predefined axis). As such, according to some embodiments, the angle criterion is satisfied when the angle of approach of the movement is between pairing values 568*a* (e.g., 45°) and 568*b* (e.g., 135°). For example, the velocity criterion is satisfied when the velocity of the movement is less than the pairing velocity threshold 518.

In FIG. 5U, the window 560 is dragged with the focus selector 502 by the chrome region 562*a* according to the movement vector 566. For example, the top edge 564*a* of the window 560 is moved toward the bottom edge 574*a* of the window 570 according to the movement vector 566. As shown in FIG. 5U, the angle of the movement vector 566 (e.g., 80°) relative to the bottom edge 574*a* of the window 570 is between the pairing values 568*a* and 568*b*. Furthermore, in FIG. 5U, the velocity associated with the movement vector 566 is less than the pairing velocity threshold 518.

As such, as shown in FIGS. 5V-5W, the top edge 564*a* of the window 560 is paired with the bottom edge 574*a* of the window 570. For example, the movement of the window 560 is stopped when the top edge 564*a* of the window 560 touches the bottom edge 574*a* of the window 570 due to satisfaction of the angle criterion and the velocity criterion. However, in FIG. 5W, the focus selector 502 moves past the line 528*a* according to the movement vector 526.

Figure 5X:
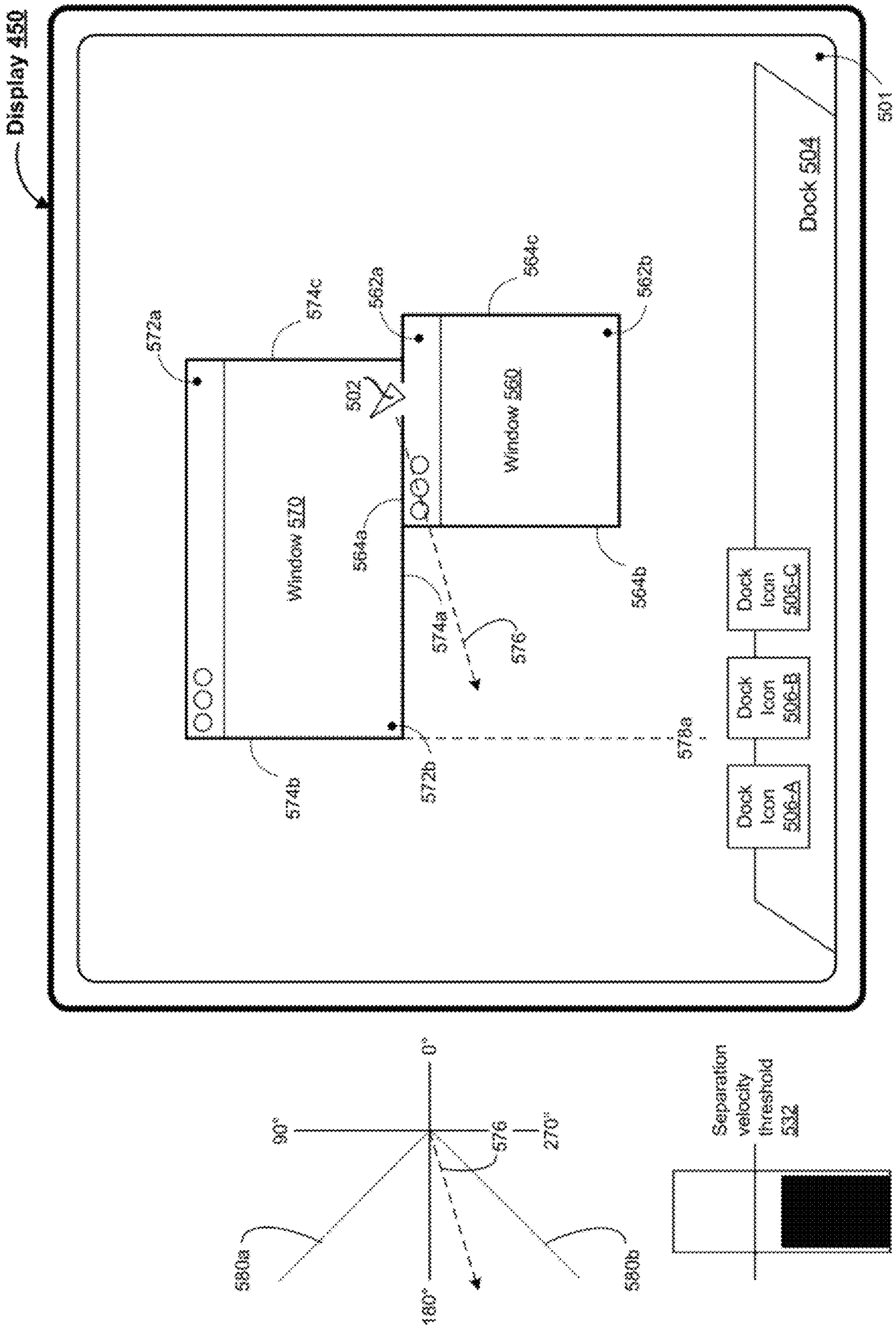
Figure 5Y:
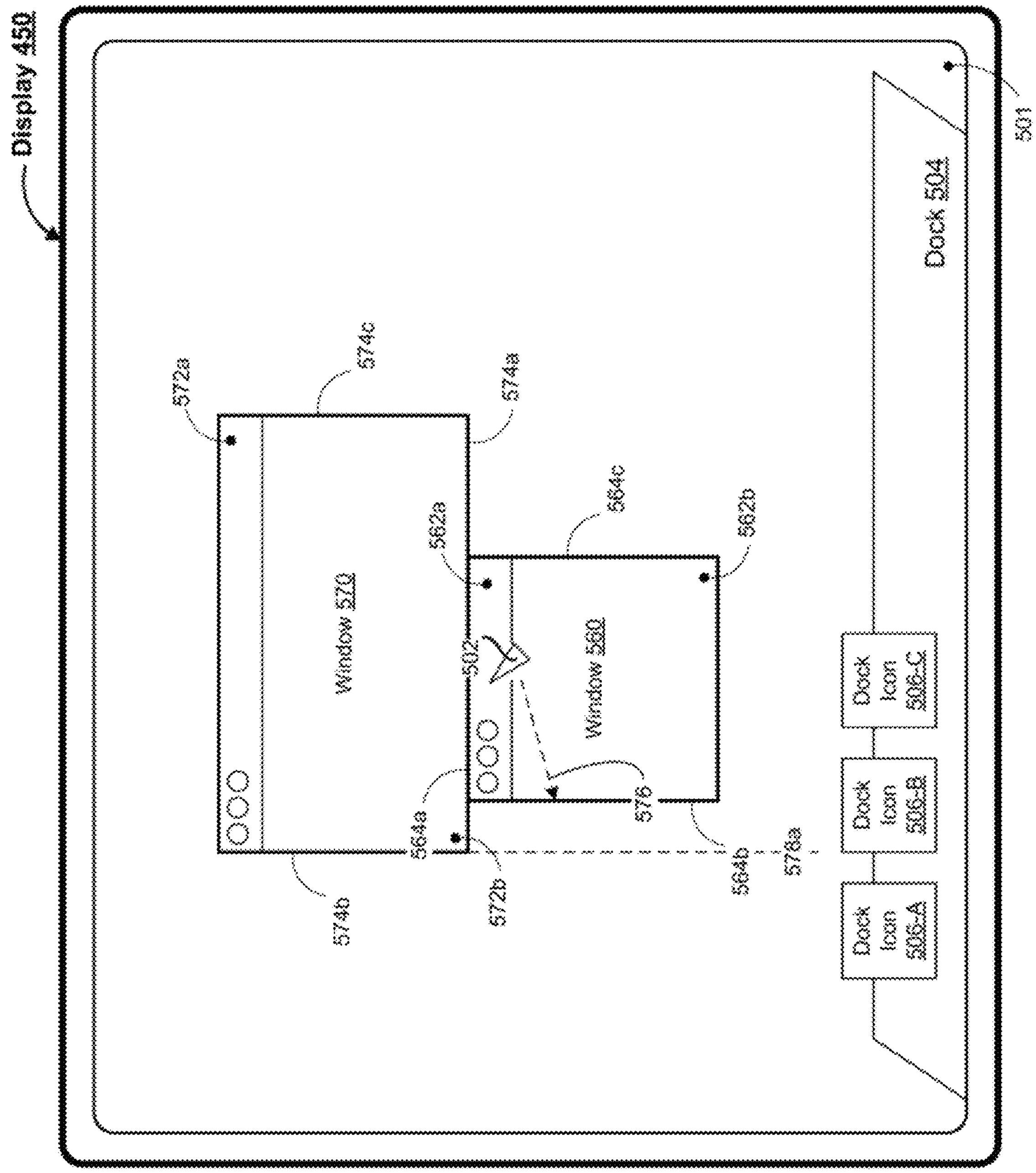
Figure 5Z:
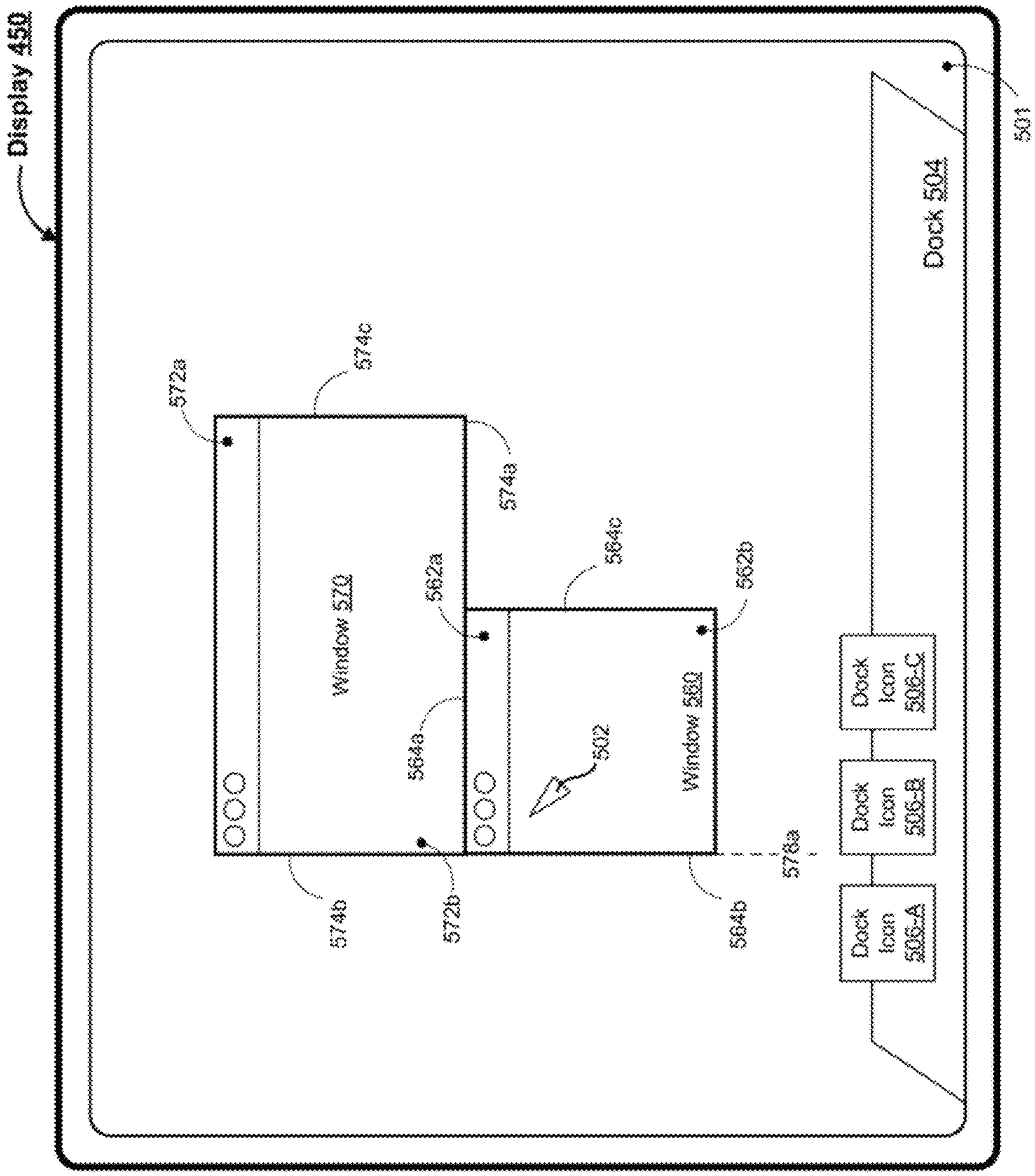
Figure 5A:
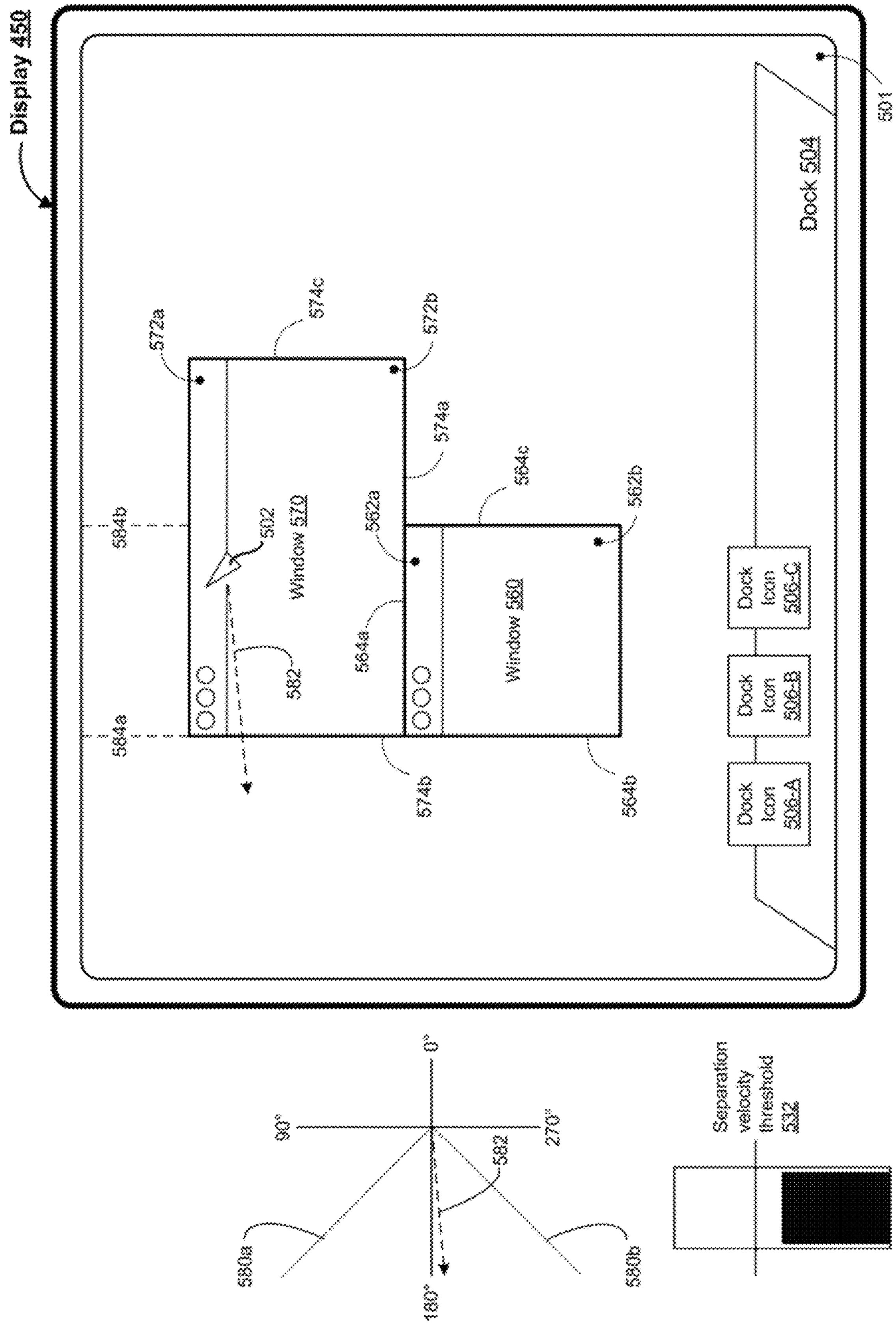
Figure 5B:
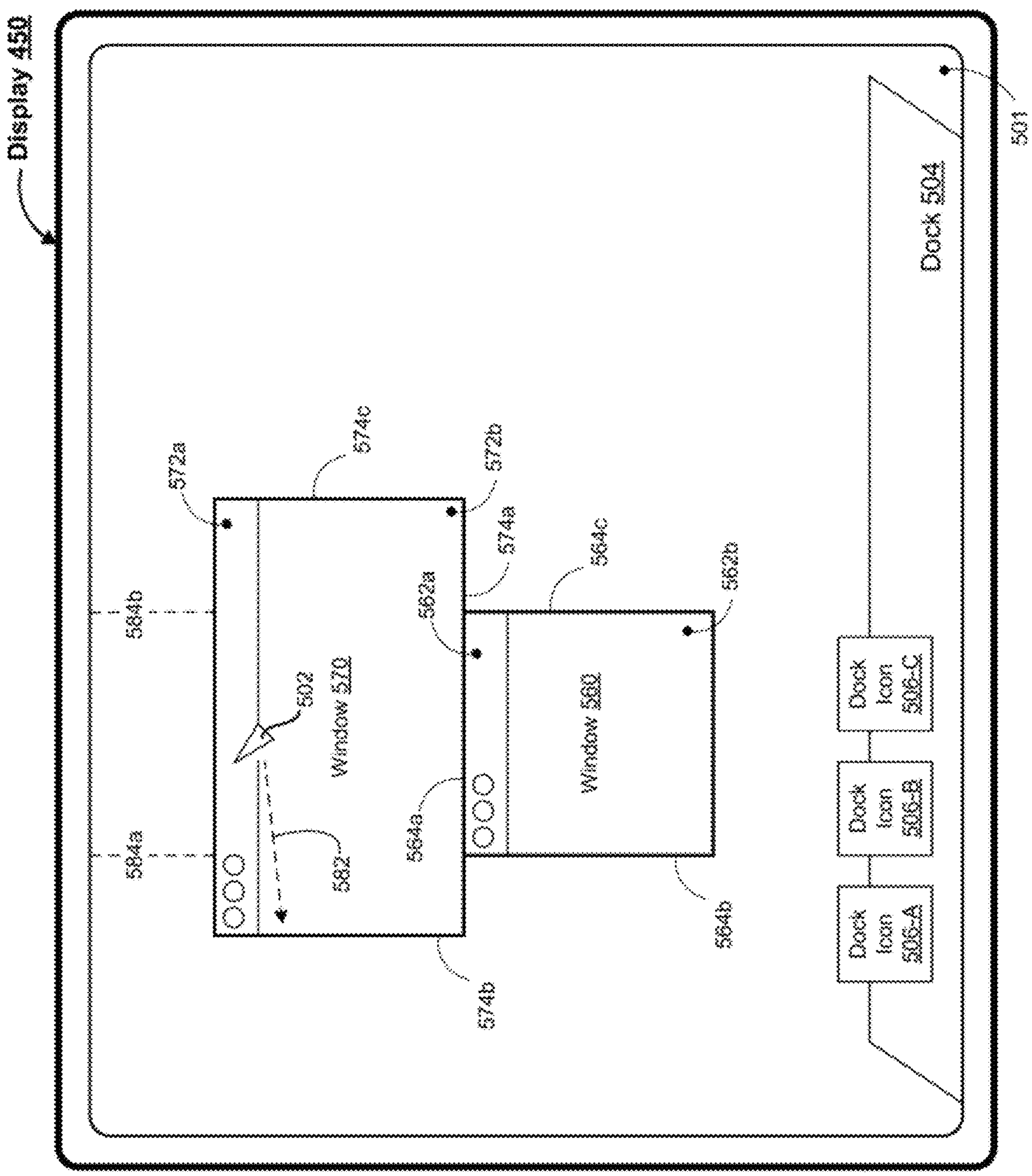
Figure 5C:
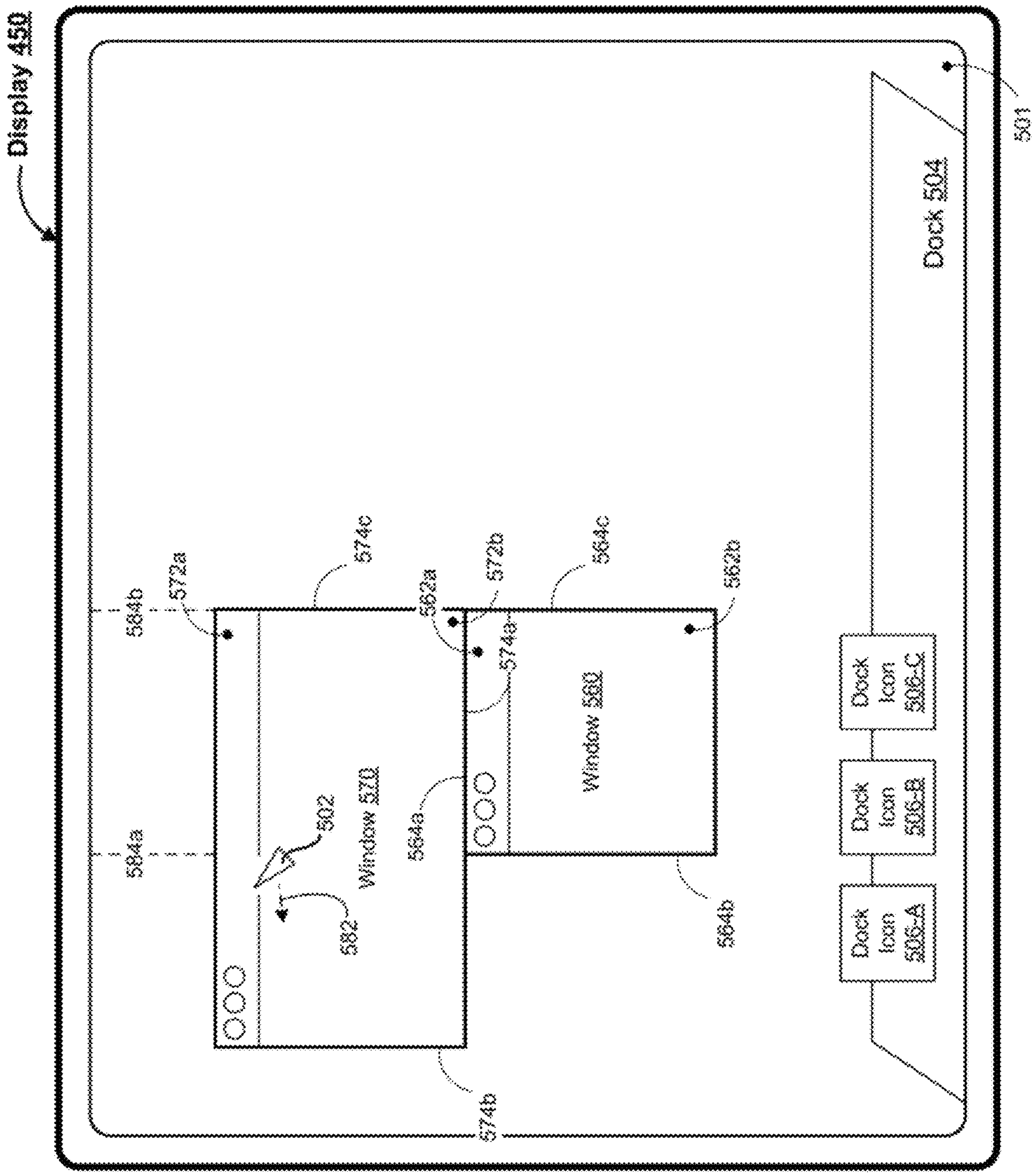
Figure 5D:
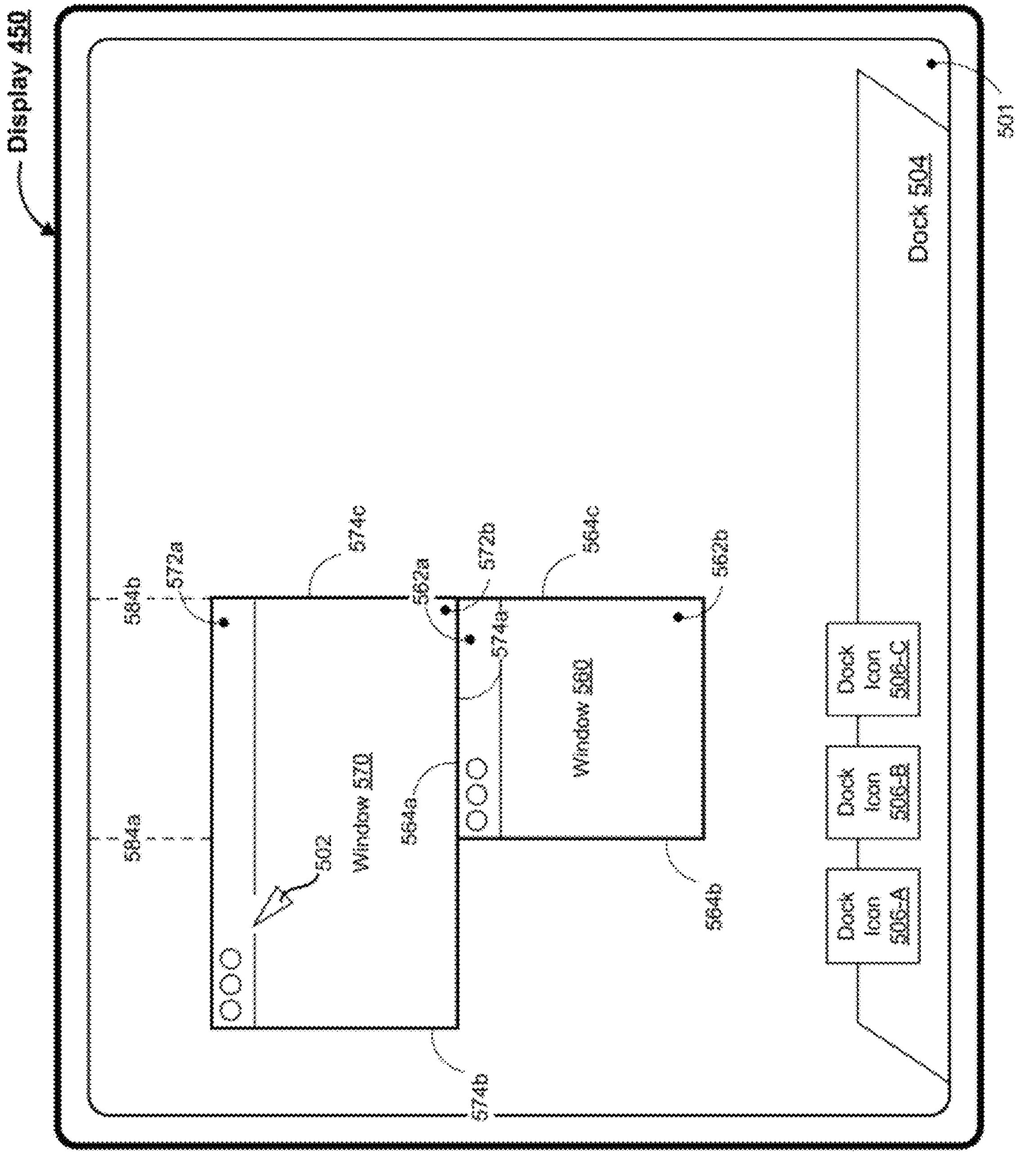
Figure 5E:
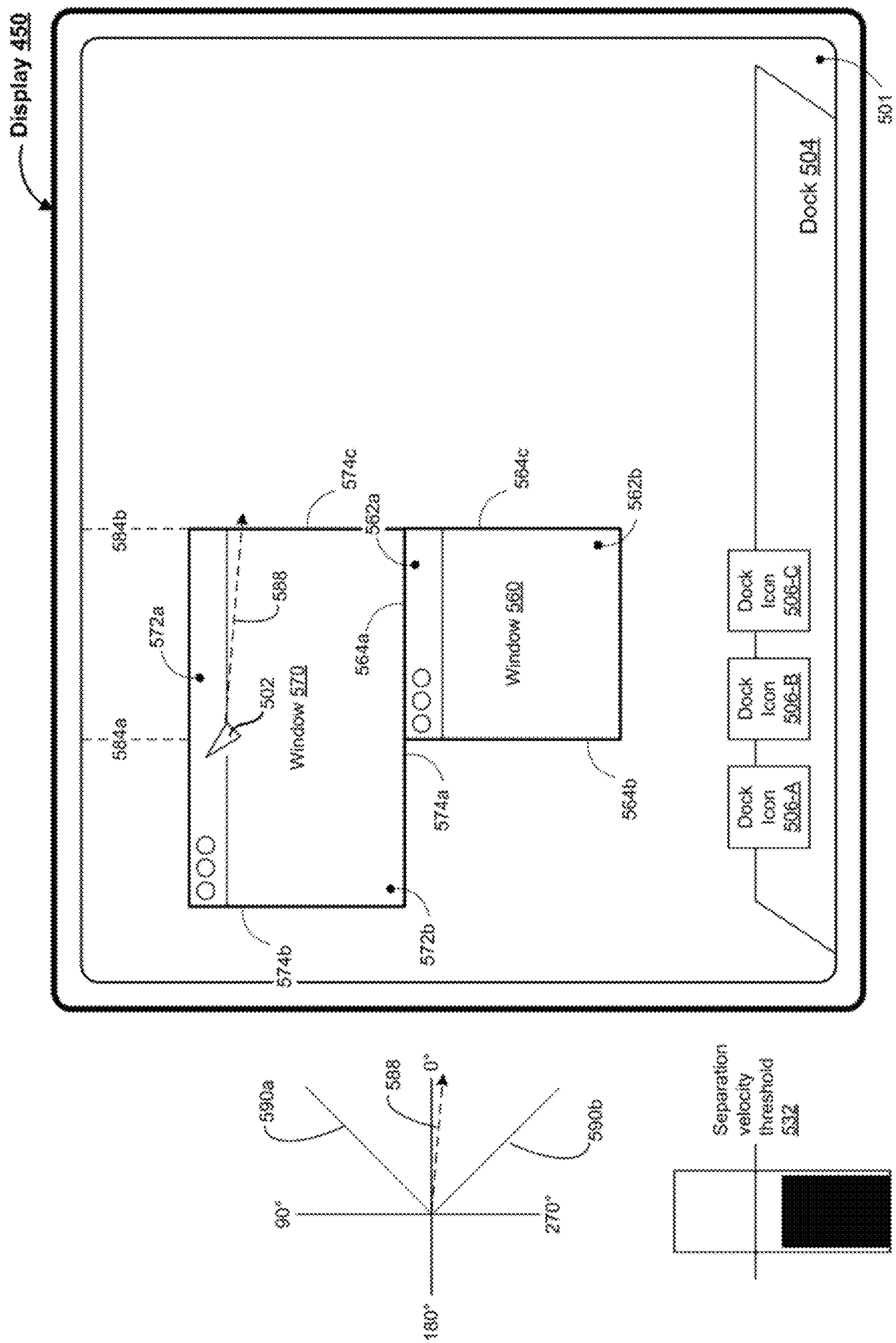
Figure 5F:
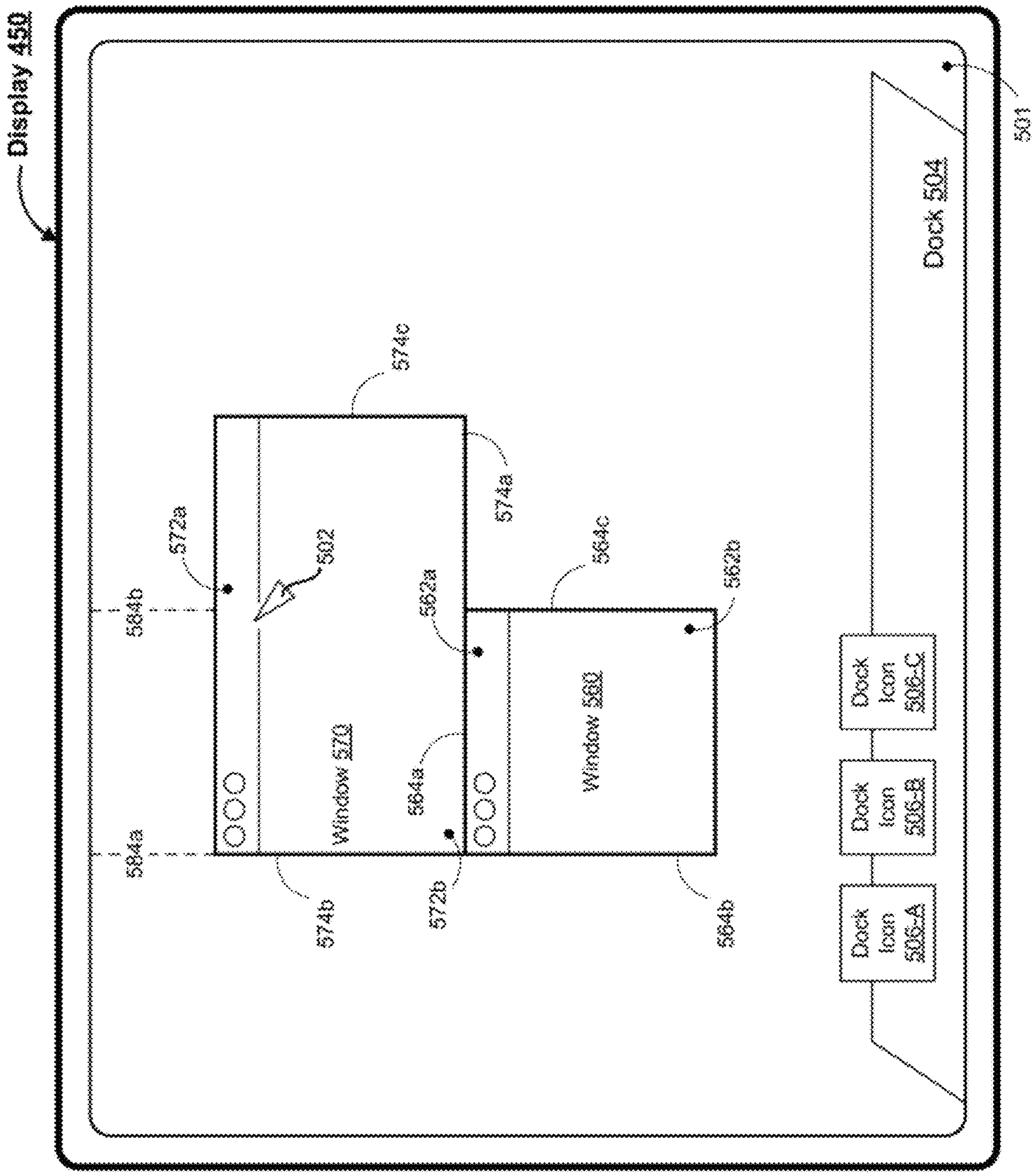
Figure 5G:
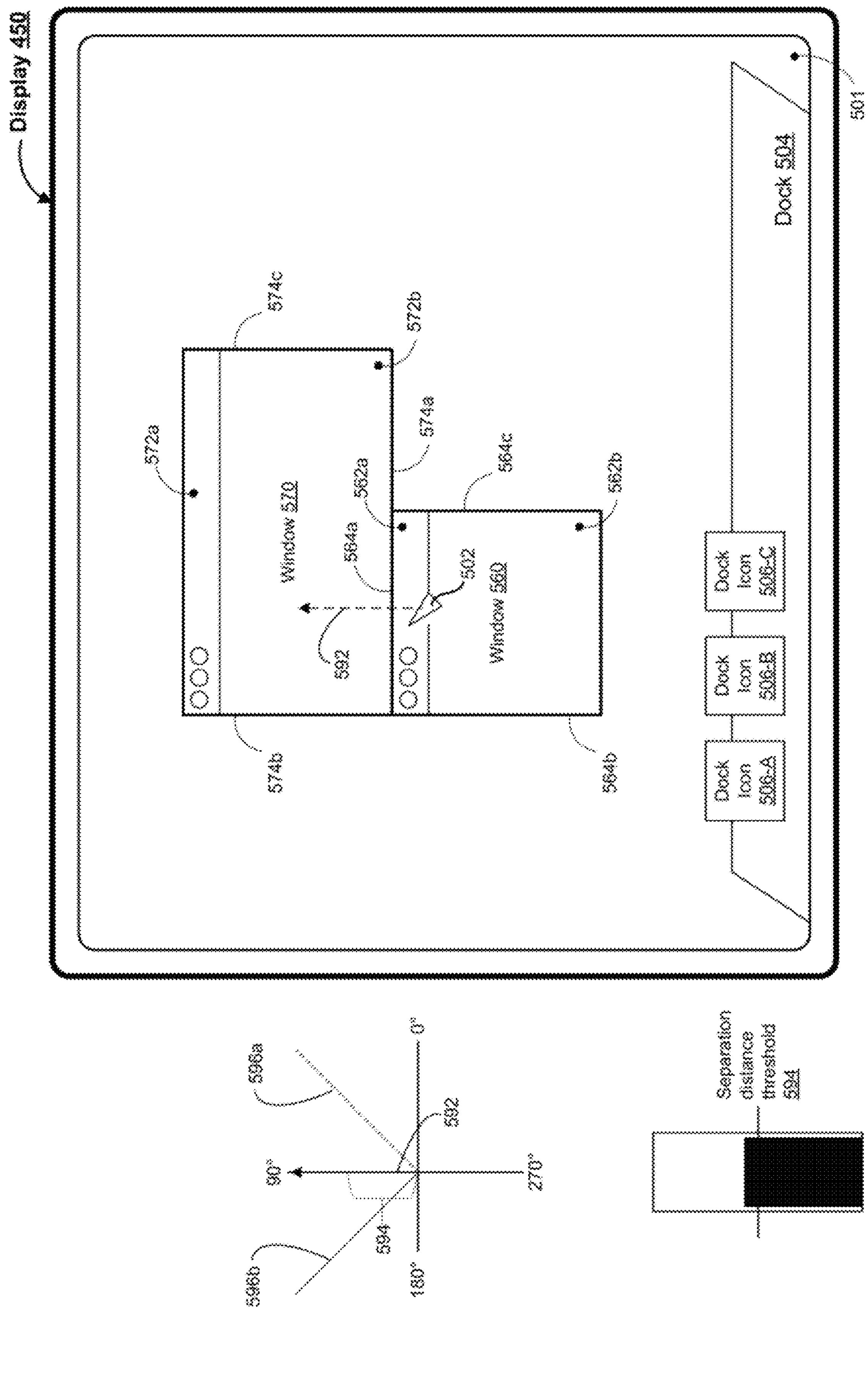
Figure 5H:
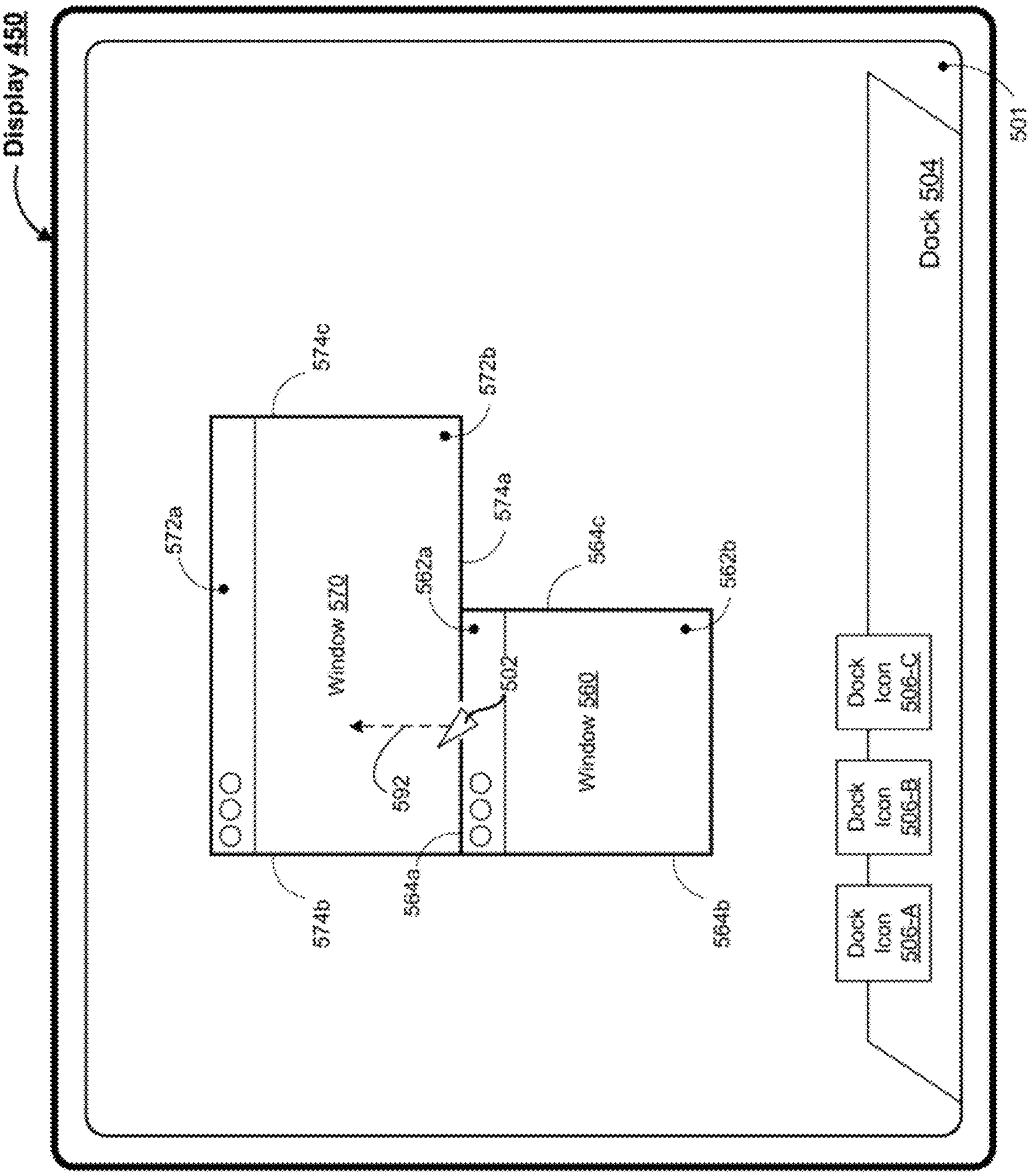
Figure 5I:
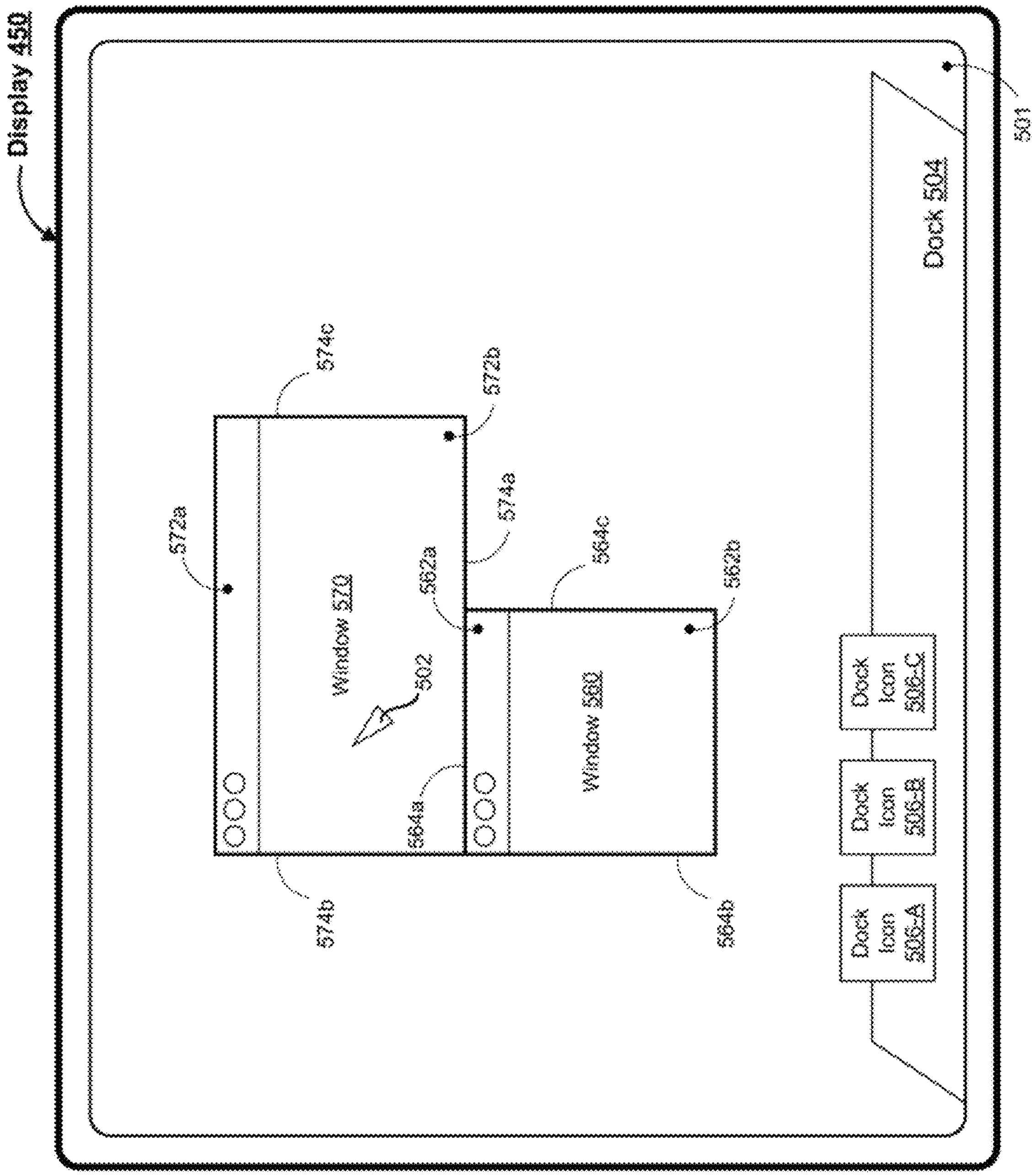
Figure 5J:
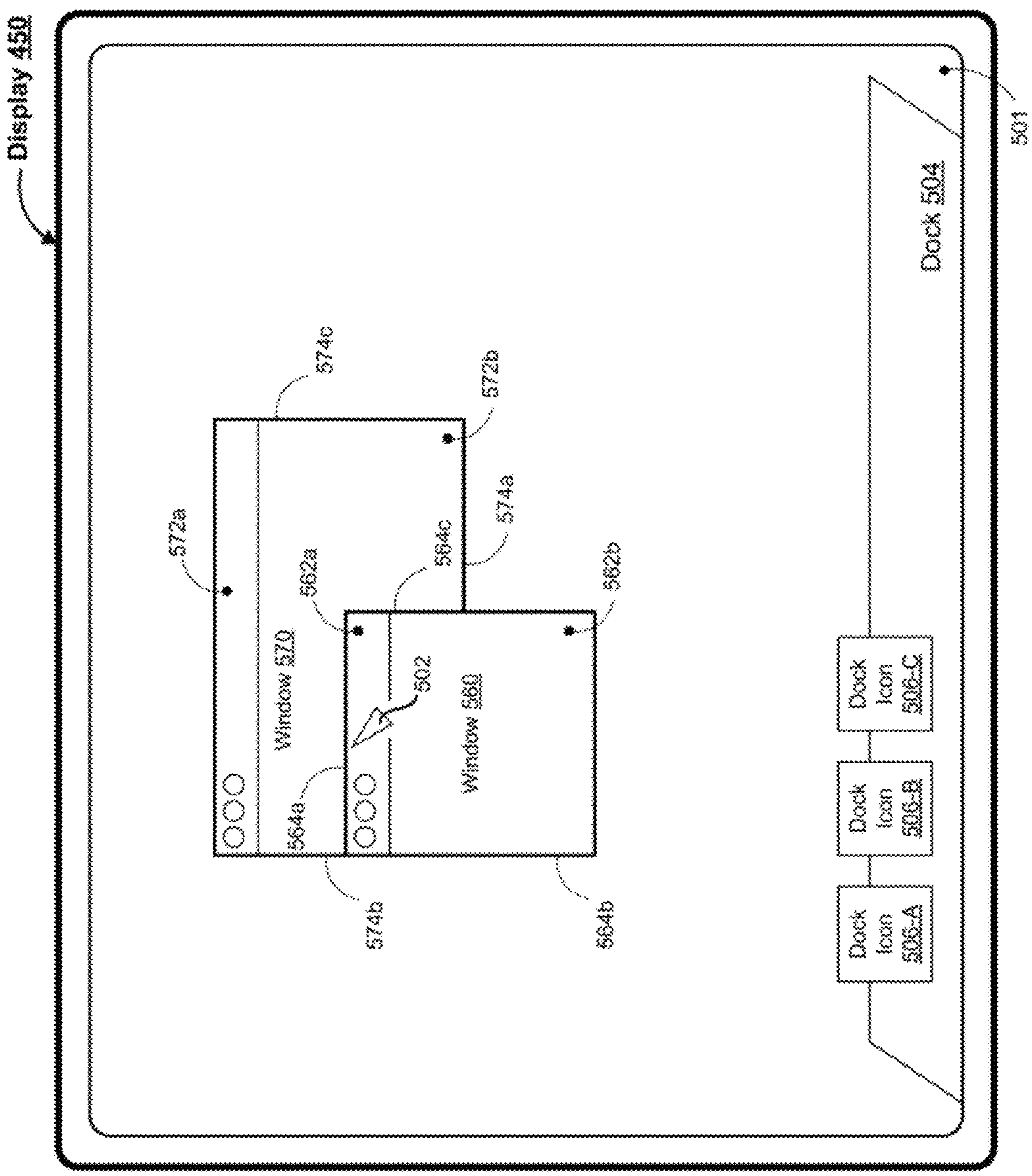
Figure 5K:
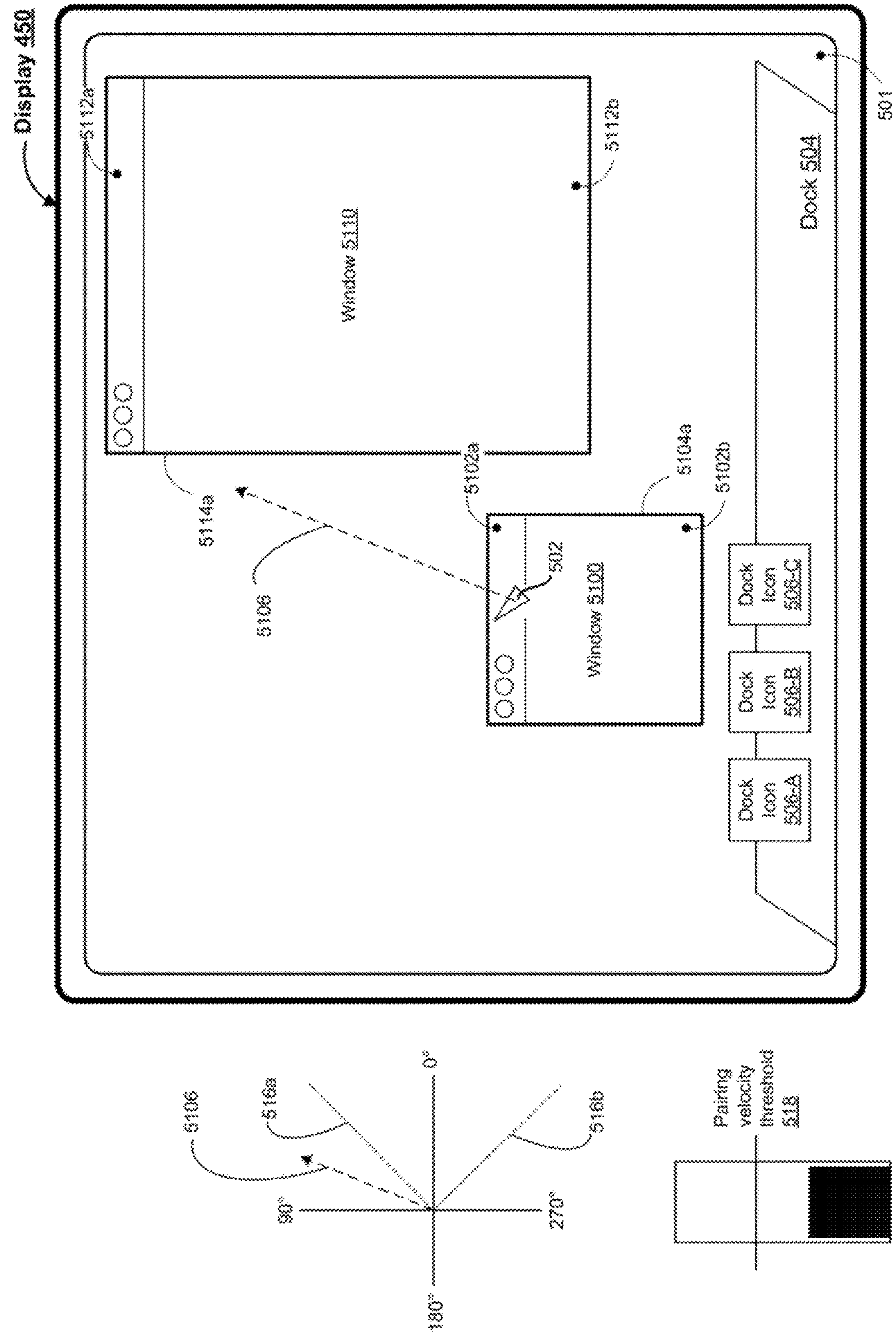
Figure 5L:
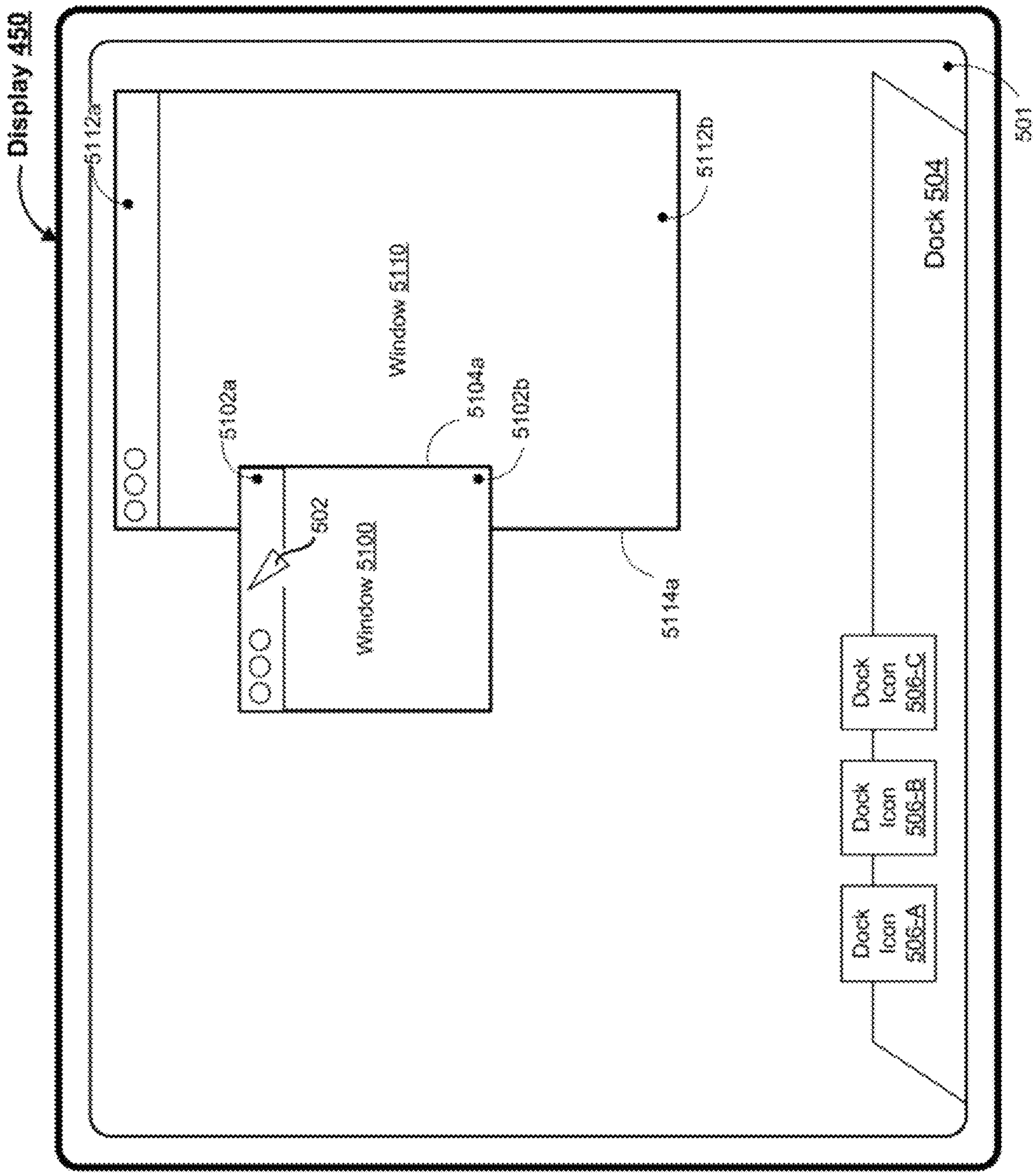
Figure 5M:
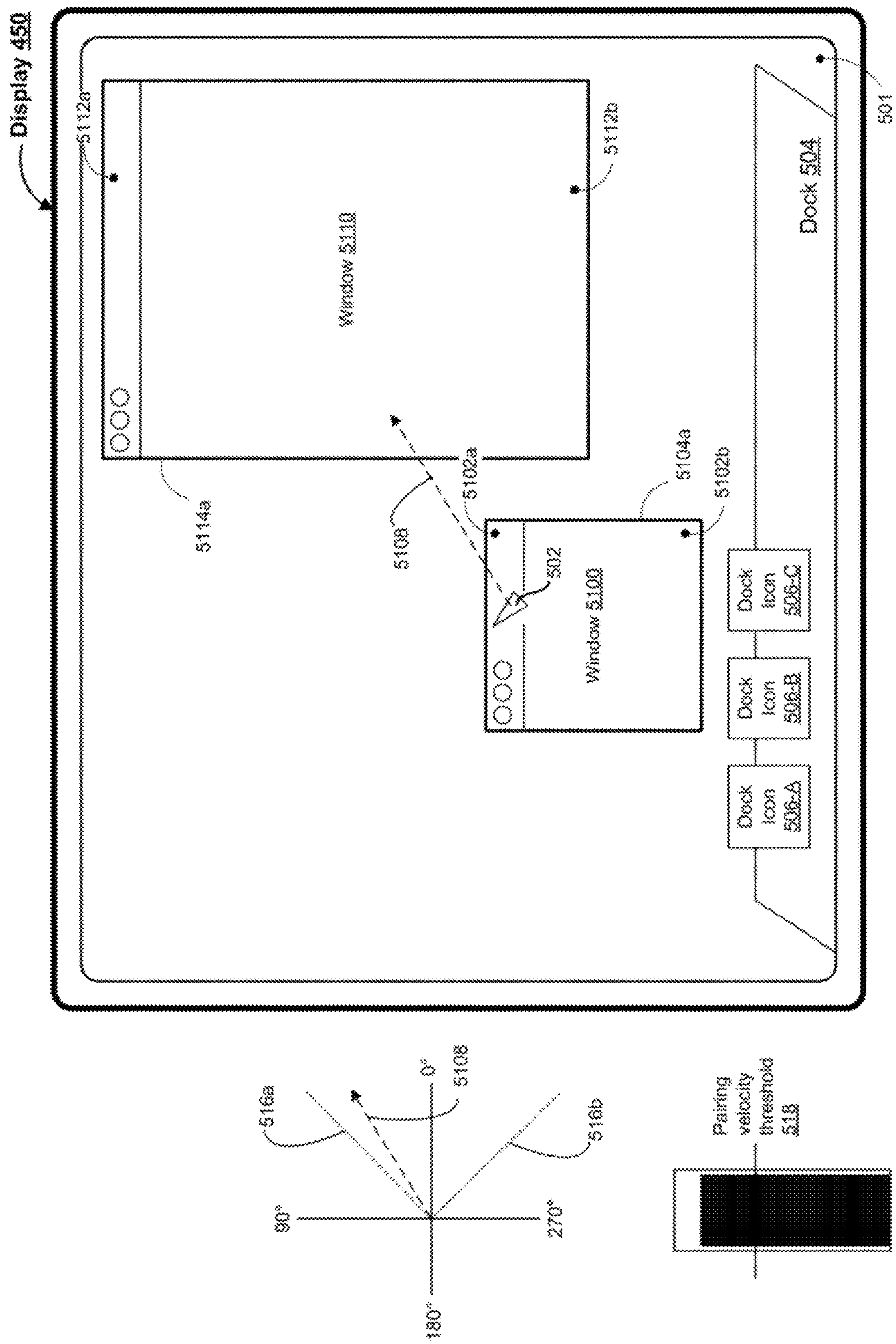
Figure 5N:
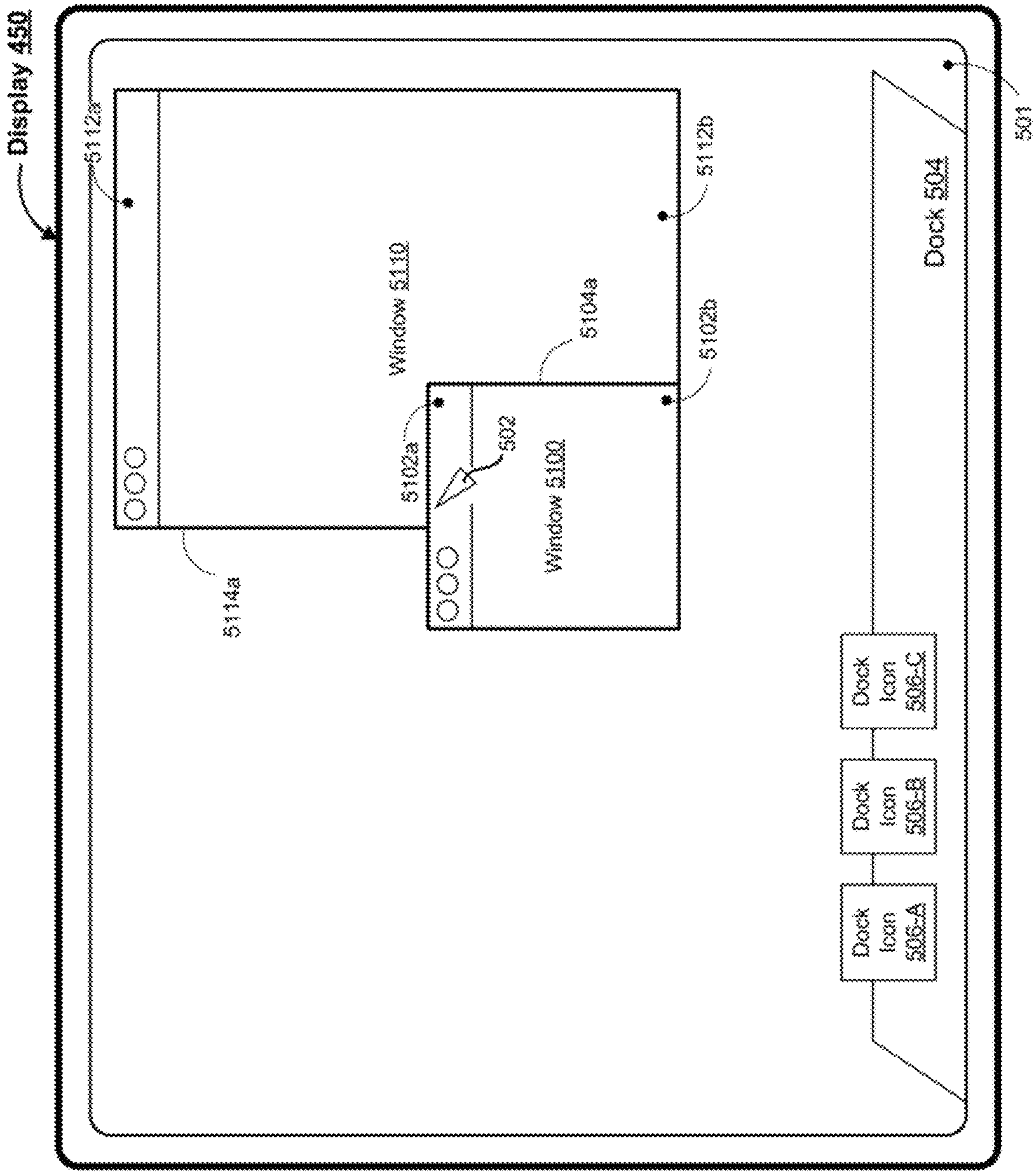
Figure 5O:
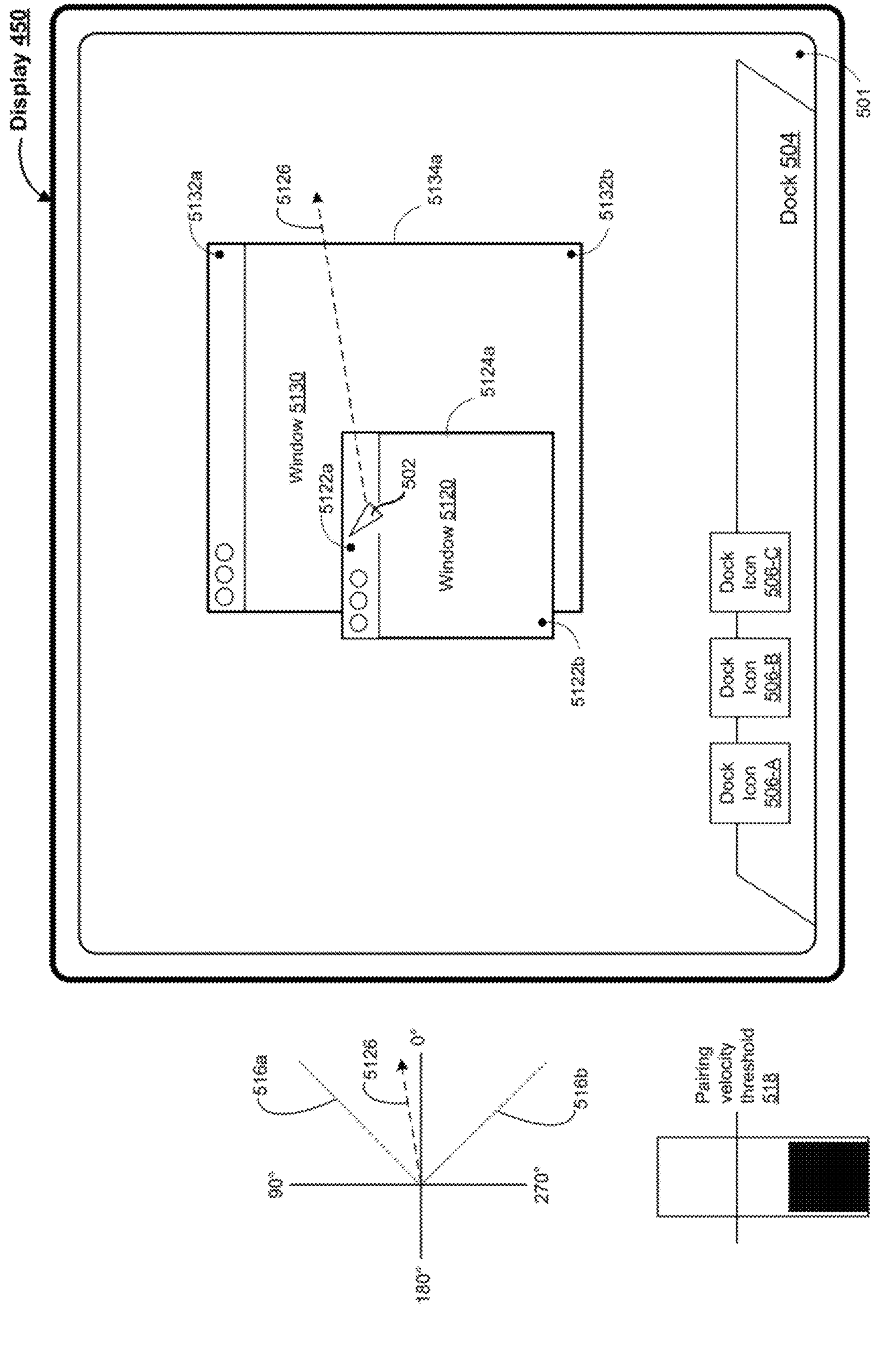
Figure 5P:
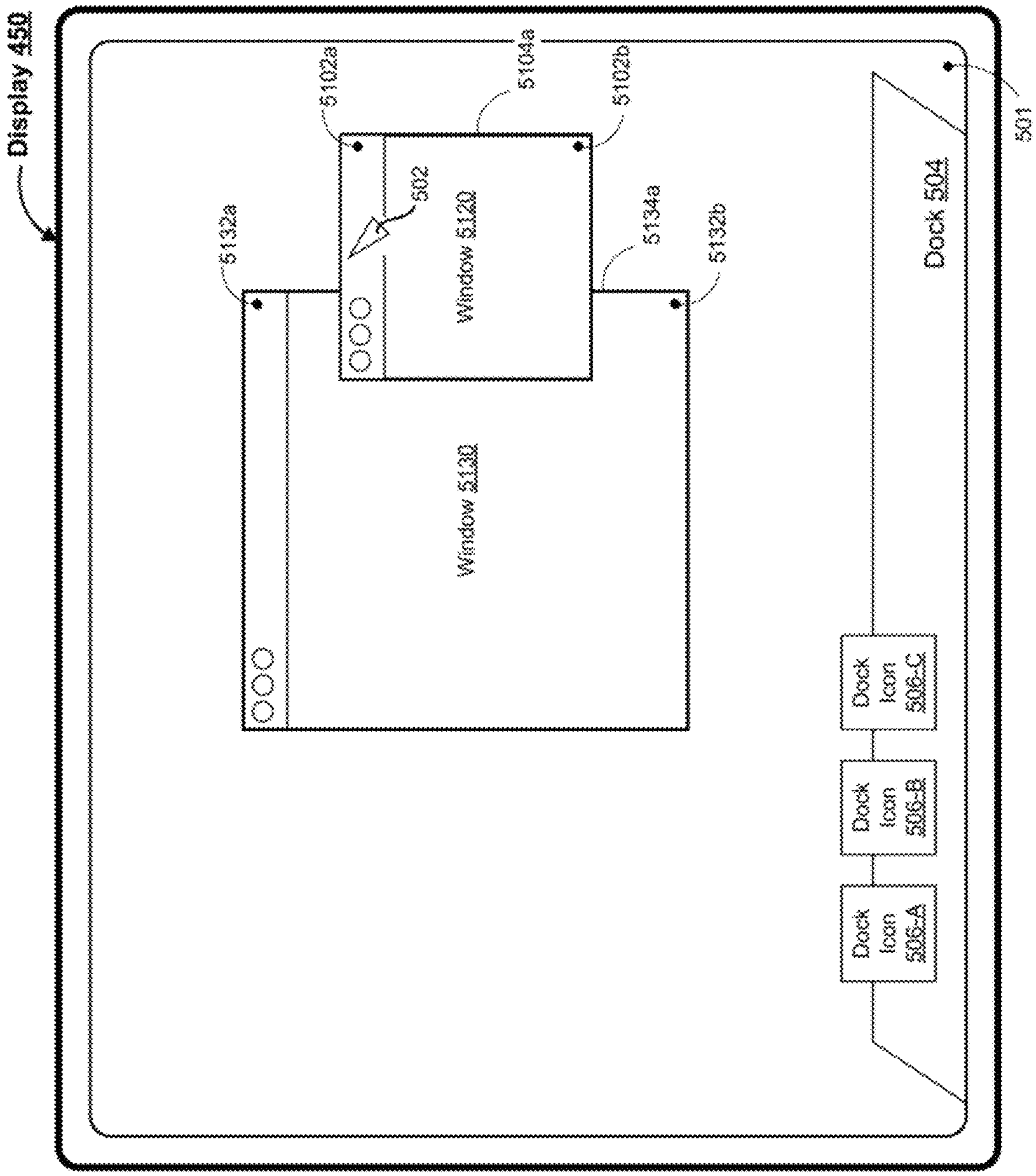
Figure 5Q:
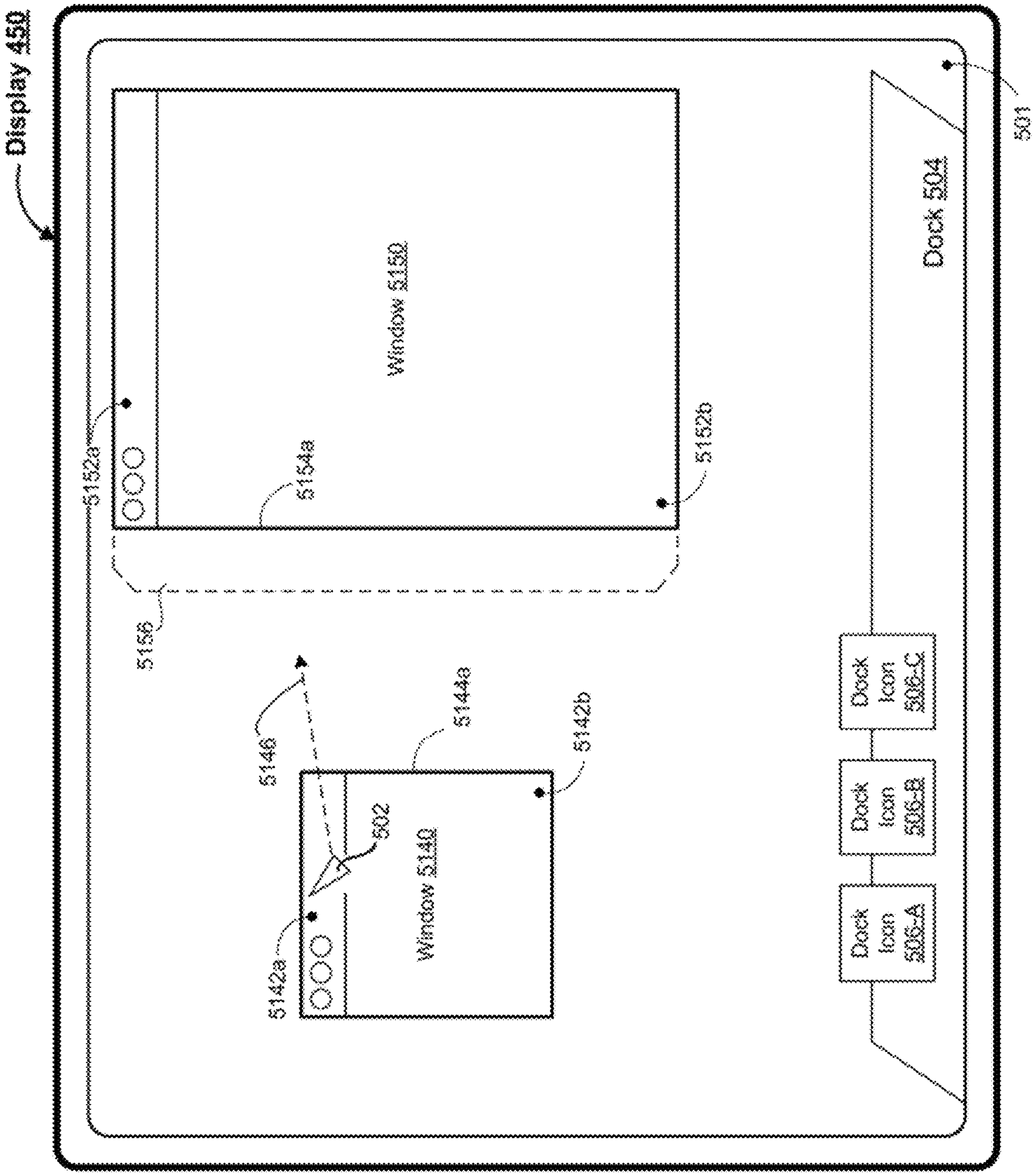
Figure 5R:
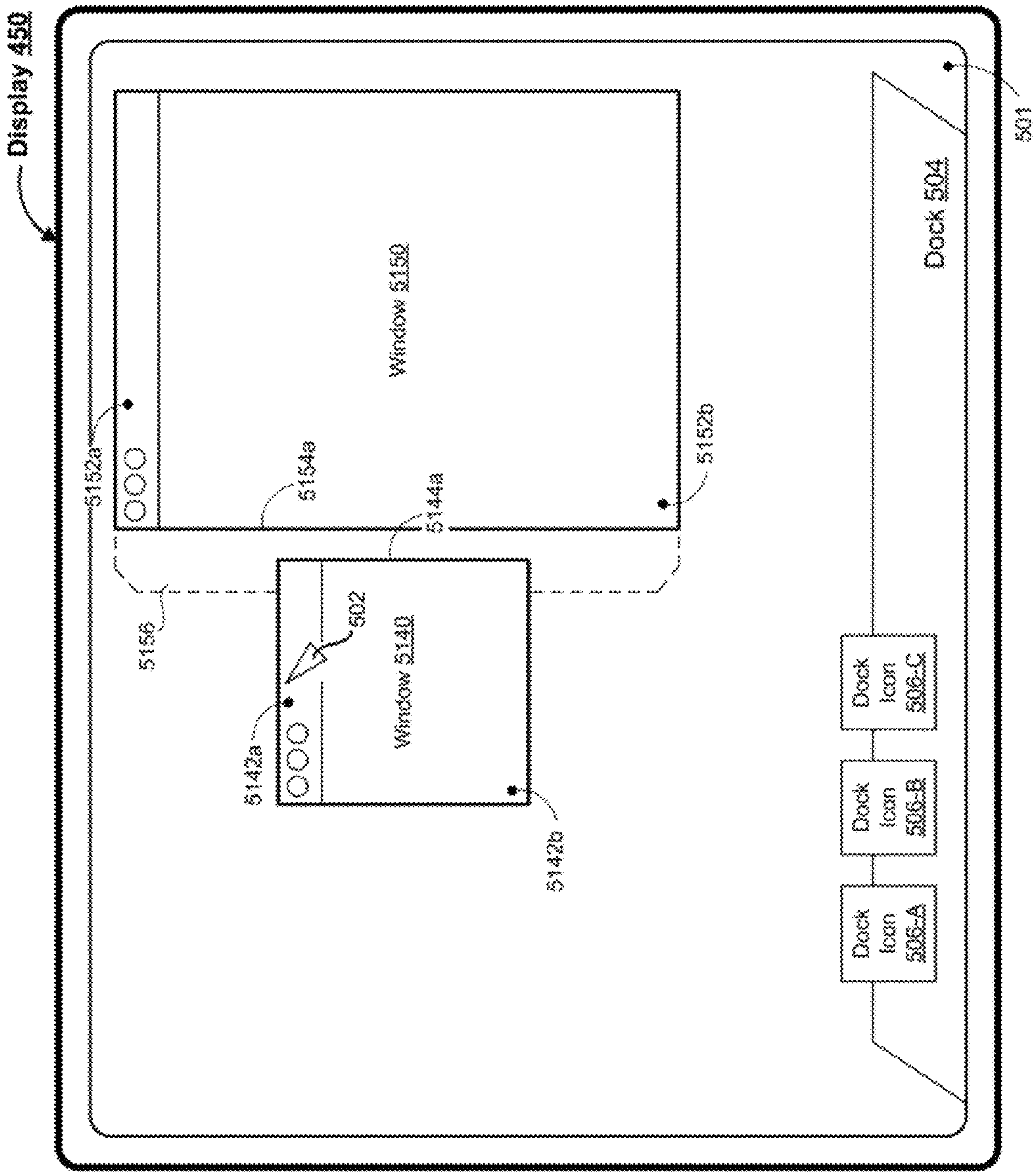
Figure 5S:
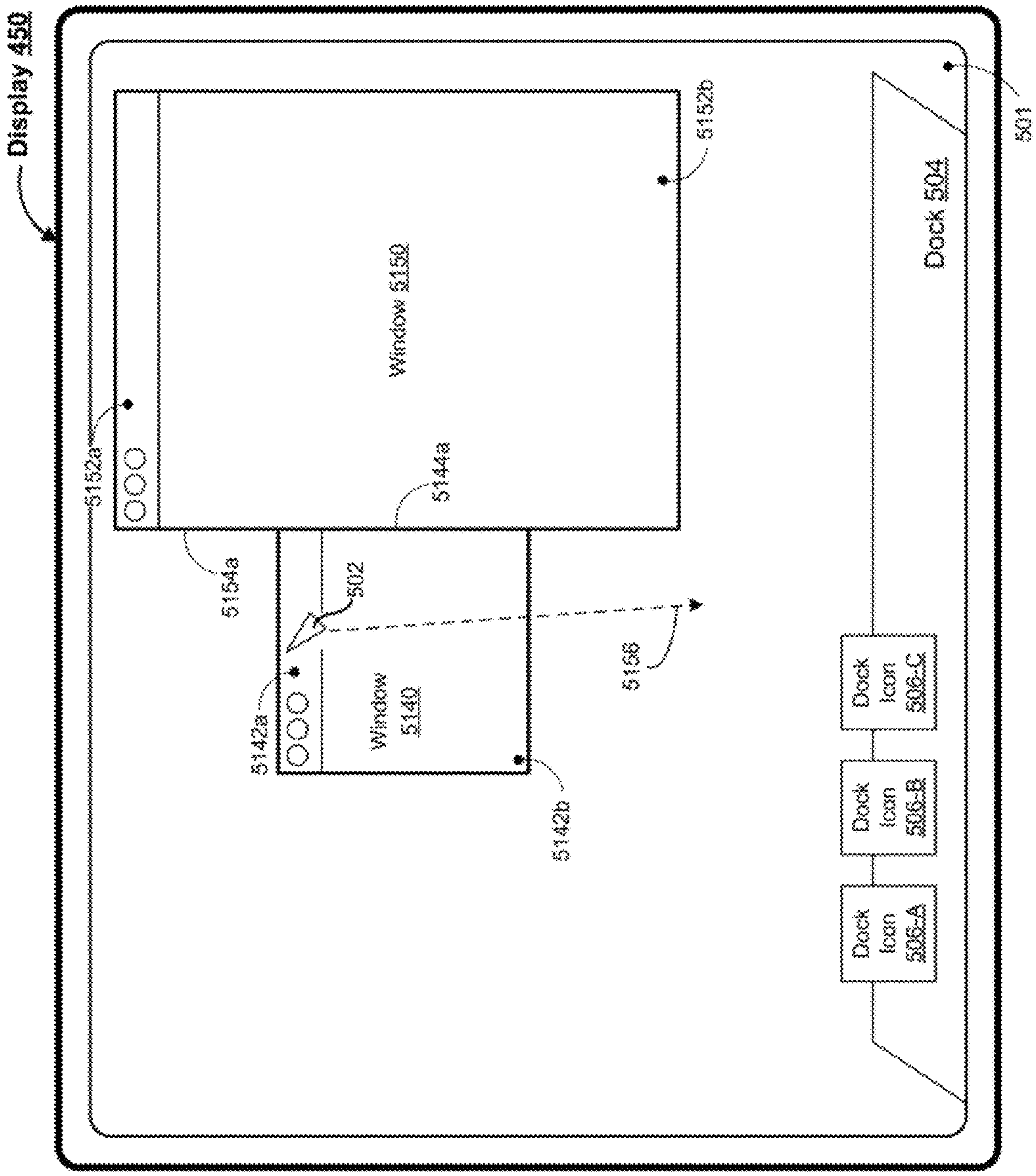
Figure 5T:
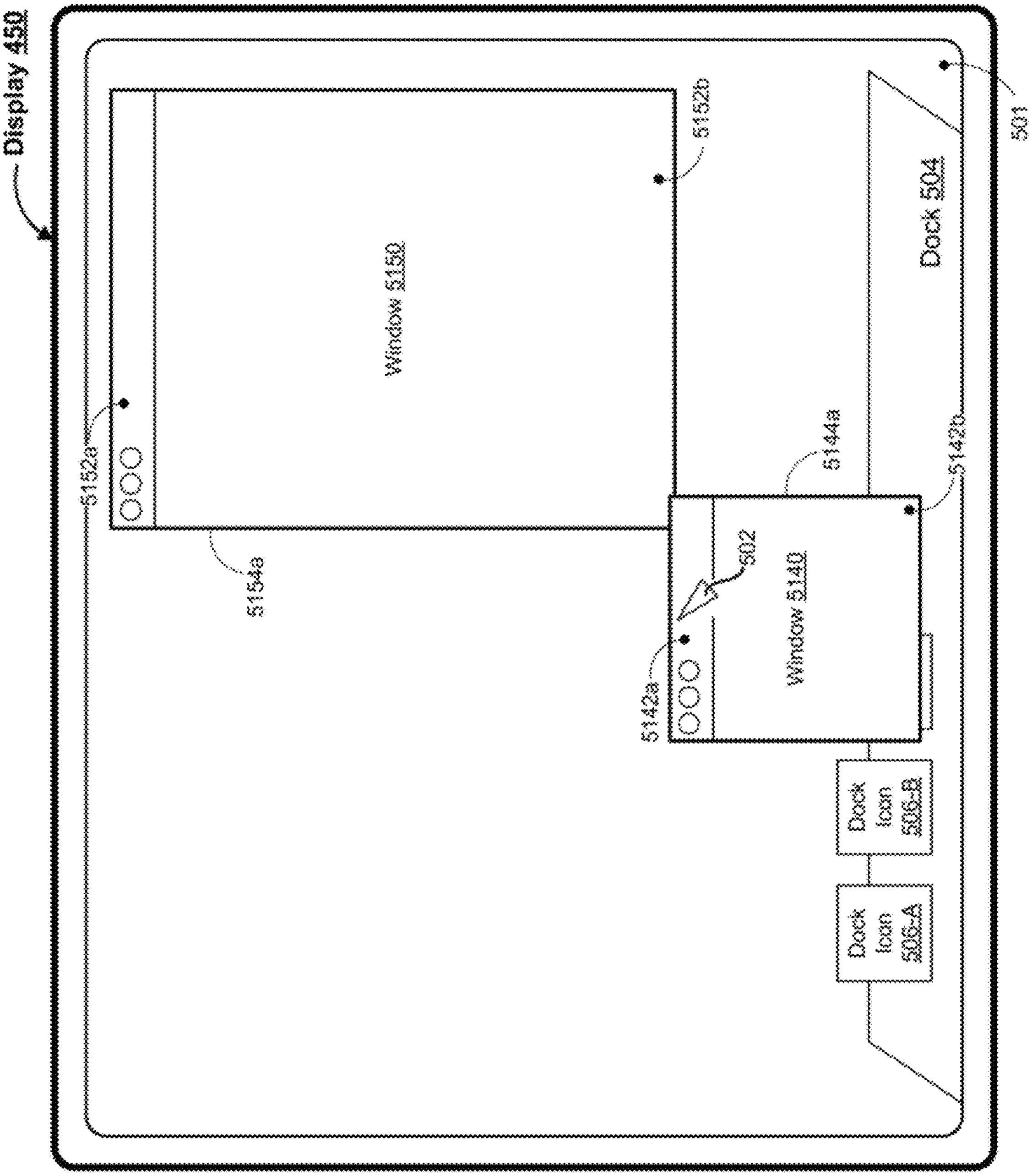
Figure 5U:
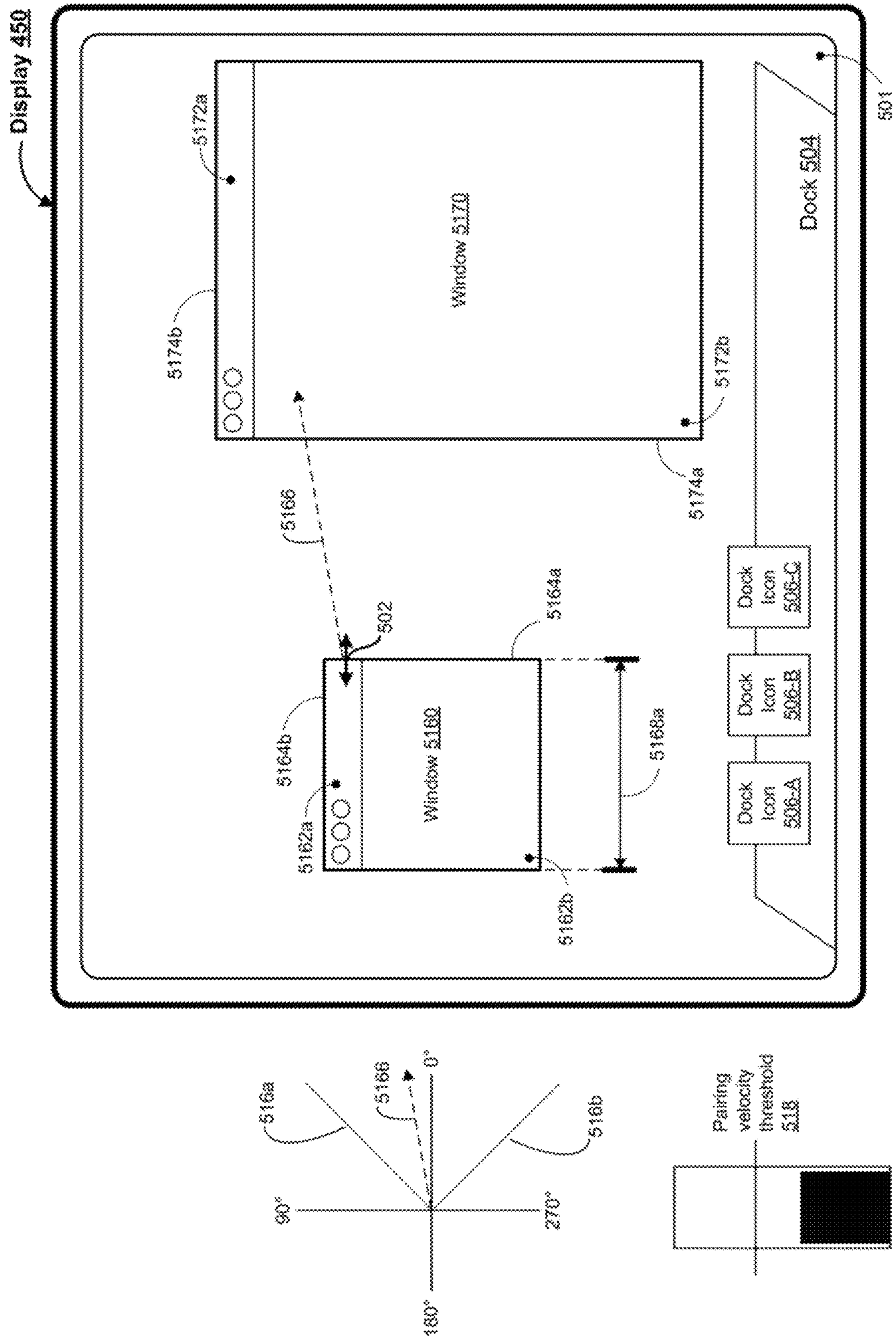
Figure 5V:
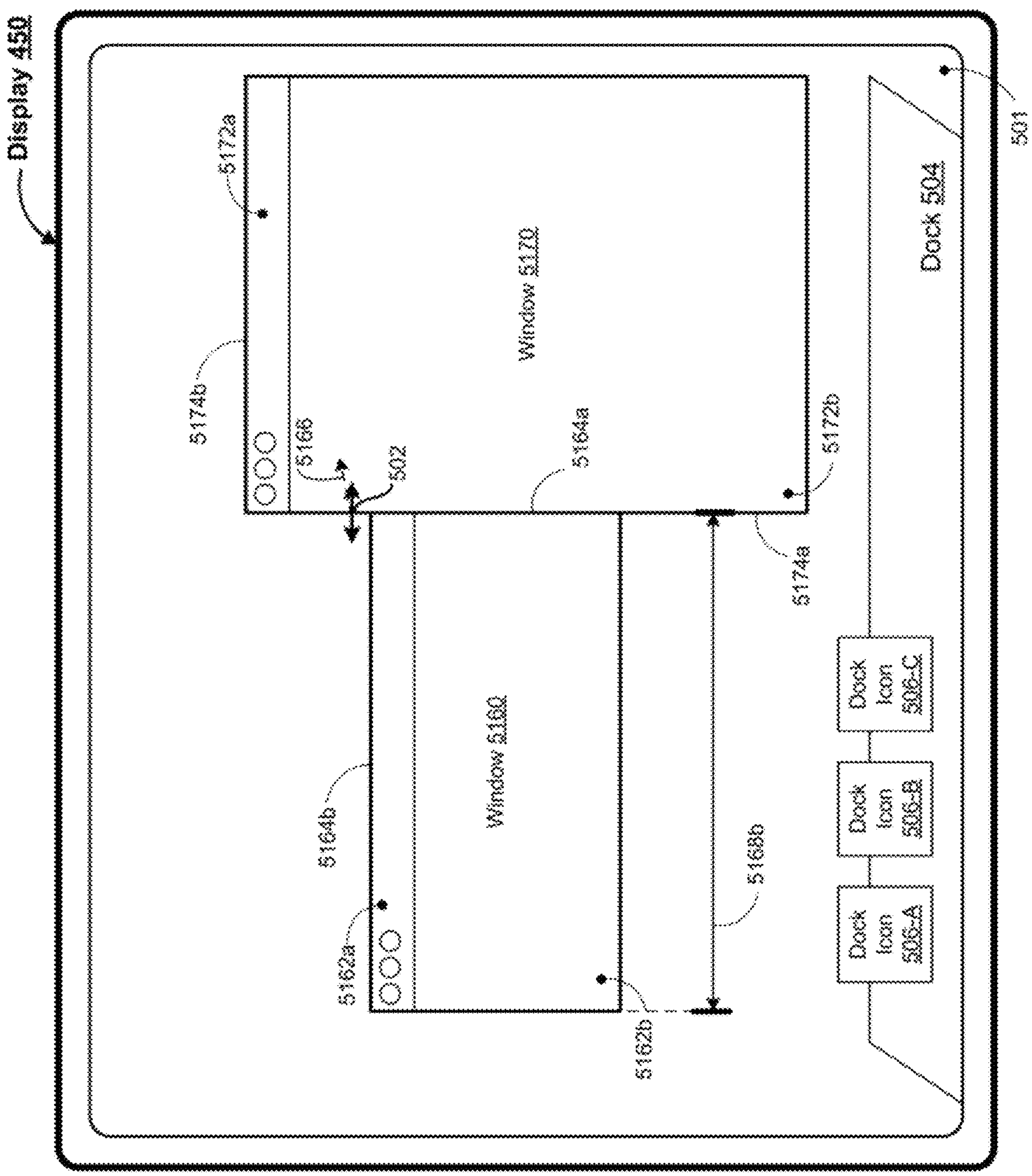
Figure 5W:
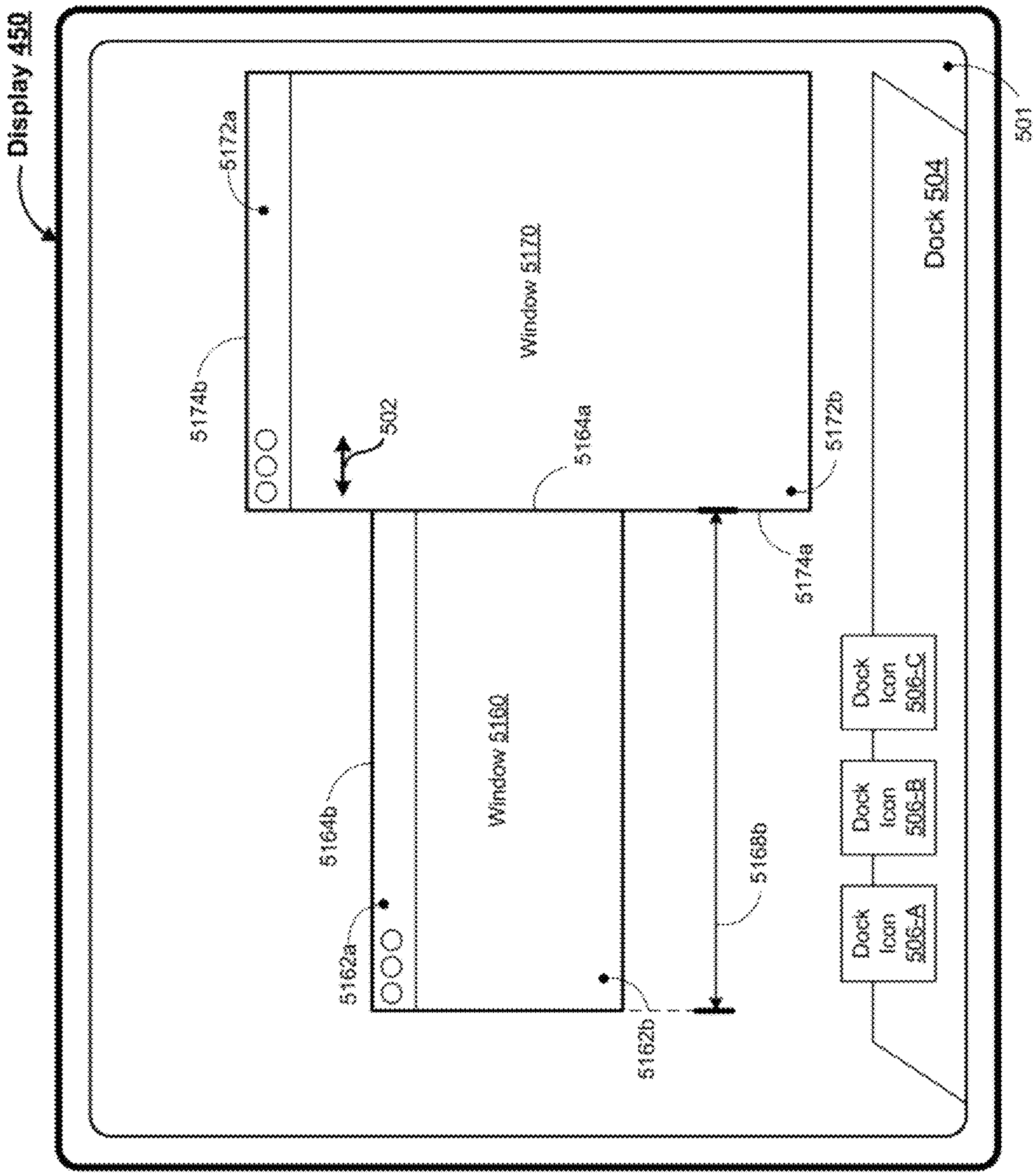
Figure 5X:
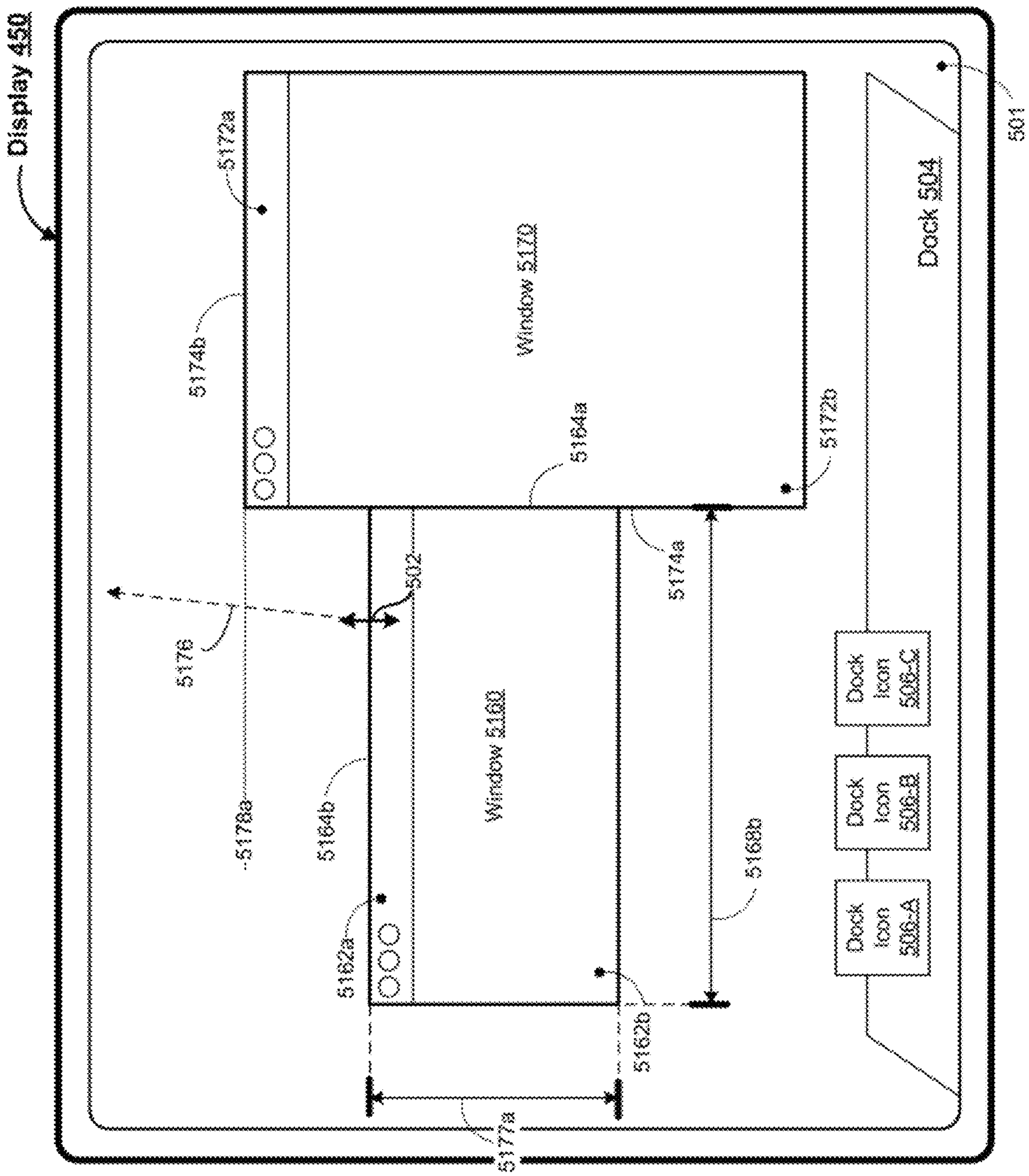
Figure 5Y:
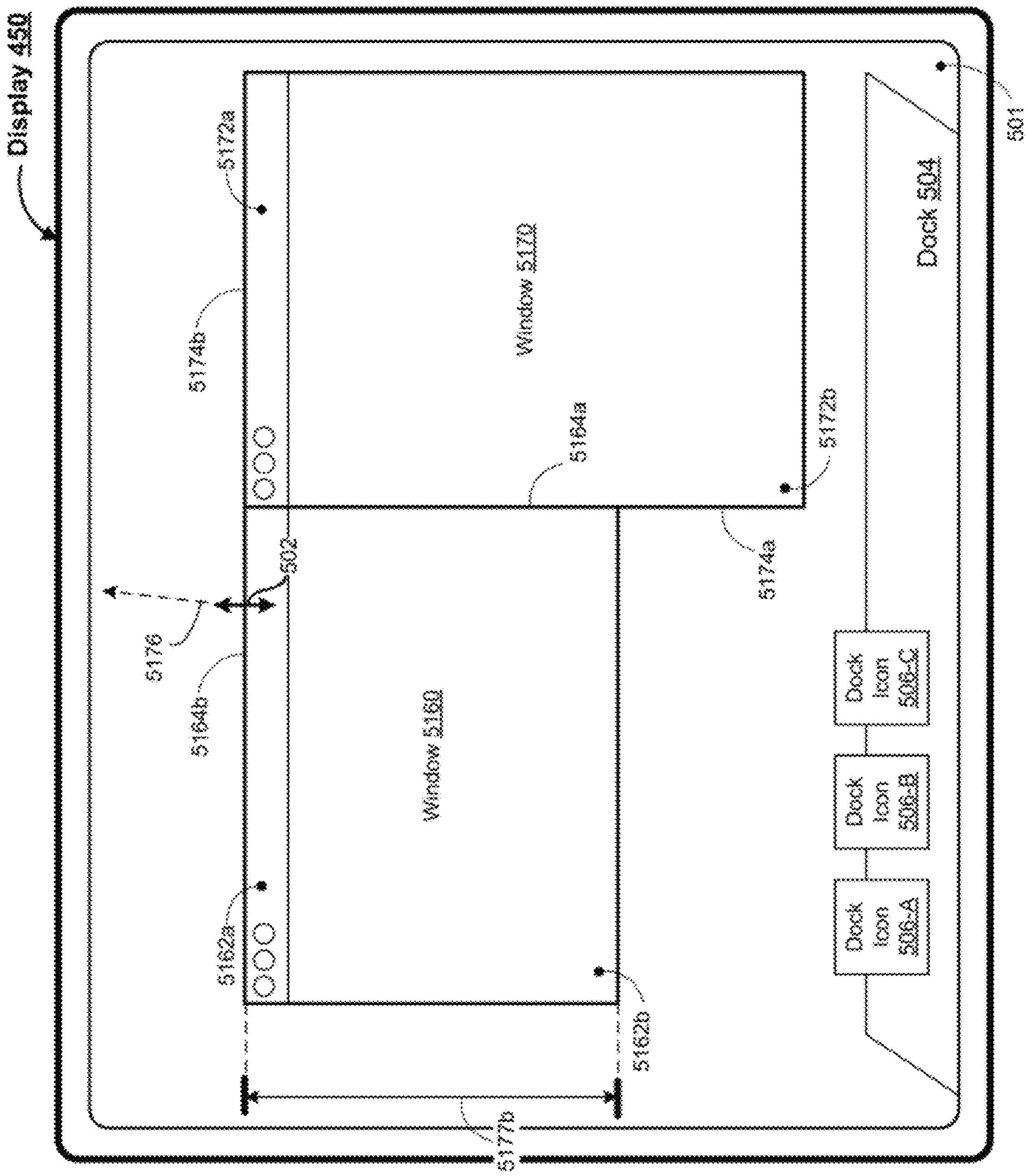
Figure 5Z:
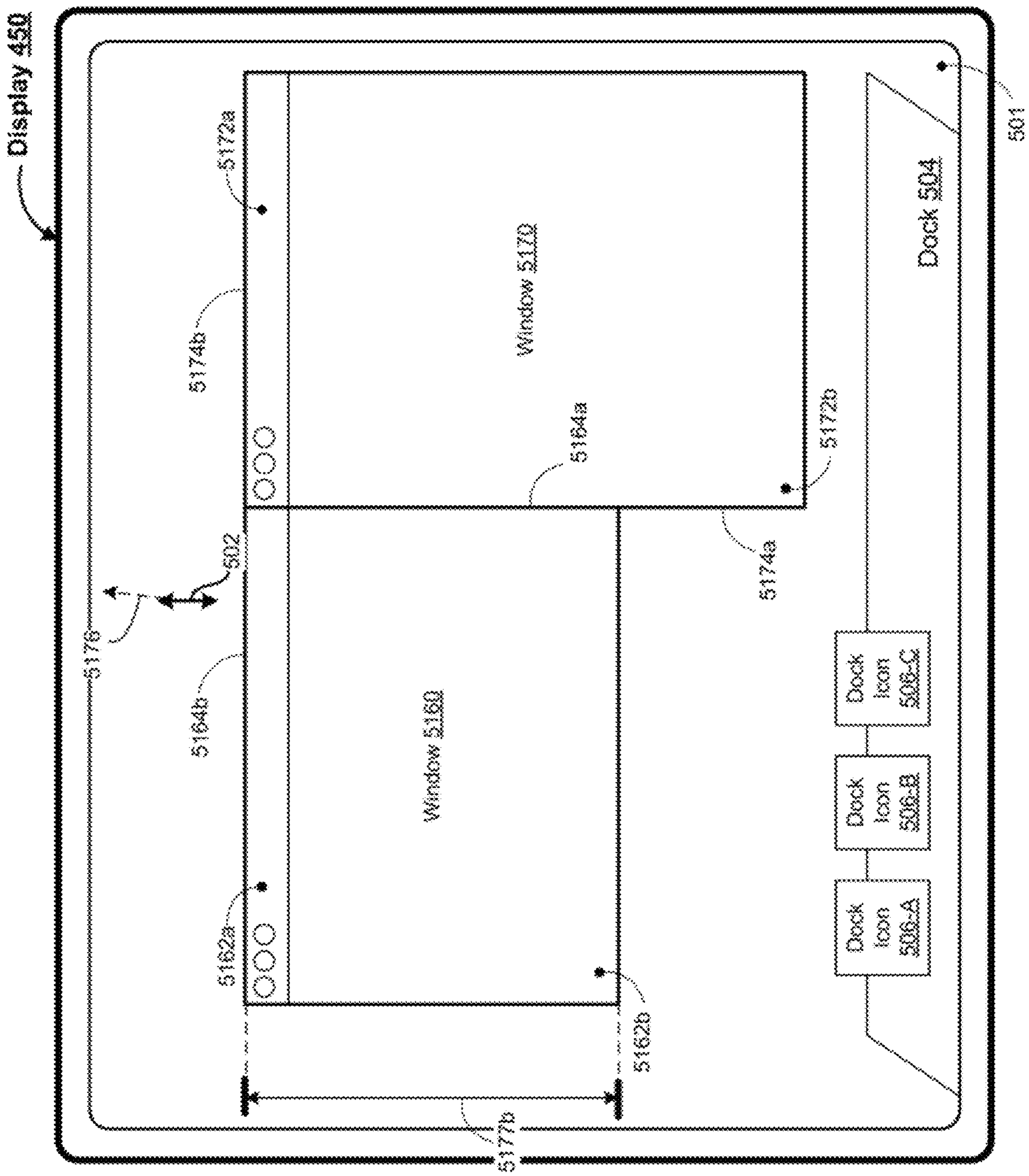

FIGS. 5X-5Z illustrate a sequence in which the window 560 is moved substantially parallel to the bottom edge 574*a* of the window 570 and the top edge 564*a* of the window 560 remains paired with the bottom edge 574*a* of the window 570 according to a determination that the movement of the window 560 does not satisfy one or more separation criteria. In this example, the one or more separation criteria are satisfied when either an angle criterion or a velocity criterion are satisfied. For example, the angle criterion is satisfied when the angle of the movement deviates from a predefined axis (e.g., the paired edges) by more than an angular threshold value (e.g., +/−45° from the predefined axis). As such, according to some embodiments, the angle criterion is satisfied when the angle of the movement is not between separation values 580*a* (e.g., 135°) and 580*b* (e.g., 225°). For example, the velocity criterion is satisfied when the velocity of the movement is greater than the separation velocity threshold 532.

In FIG. 5X, the window 560 is dragged with the focus selector 502 by the chrome region 562*a* according to the movement vector 576. For example, the movement vector 576 is a continuation of the movement in FIGS. 5U-5W (e.g., click and drag according to movement vector 566, then hold and drag according to movement vector 576). For example, the top edge 564*a* of the window 560 is moved substantially parallel to the bottom edge 574*a* of the window 570 according to the movement vector 576. As shown in FIG. 5X, the angle of the movement vector 576 (e.g., 200°) relative to the bottom edge 574*a* of the window 570 is between the separation values 580*a* and 580*b*. Furthermore, in FIG. 5X, the velocity associated with the movement vector 576 is less than the separation velocity threshold 532.

As such, as shown in FIGS. 5Y-5Z, the top edge 564*a* of the window 560 remains paired with the bottom edge 574*a* of the window 570. For example, the window 560 slides parallel to the window 570, but the window 560 remains paired to the window 570 because neither the angle criterion nor the velocity criterion associated with the one or more separation criteria are satisfied. As shown in FIG. 5Z, the parallel movement of the window 510 is constrained by a line 578*a* associated with the left edge 574*b* of the window 570.

FIGS. 5AA-5DD illustrate a sequence in which the window 570 is moved substantially parallel to the top edge 564*a* of the window 560 and the top edge 564*a* of the window 560 remains paired with the bottom edge 574*a* of the window 570 according to a determination that the movement of the window 570 does not satisfy one or more separation criteria. In this example, the one or more separation criteria are satisfied when either an angle criterion or a velocity criterion are satisfied. For example, the angle criterion is satisfied when the angle of the movement deviates from a predefined axis (e.g., the paired edges) by more than an angular threshold value (e.g., +/−45° from the predefined axis). As such, according to some embodiments, the angle criterion is satisfied when the angle of the movement is not between separation values 580*a* (e.g., 135°) and 580*b* (e.g., 225°). For example, the velocity criterion is satisfied when the velocity of the movement is greater than the separation velocity threshold 532.

In FIG. 5AA, the window 570 is dragged with the focus selector 502 by the chrome region 572*a* according to the movement vector 582. For example, the bottom edge 574*a* of the window 570 is moved substantially parallel to the top edge 564*a* of the window 560 according to the movement vector 582. As shown in FIG. 5AA, the angle of the movement vector 582 (e.g., 190°) relative to the top edge 564*a* of the window 560 is between the separation values 580*a* and 580*b*. Furthermore, in FIG. 5AA, the velocity associated with the movement vector 582 is less than the separation velocity threshold 532.

As such, as shown in FIGS. 5BB-5DD, the bottom edge 574*a* of the window 570 remains paired with the top edge 564*a* of the window 560. For example, the window 570 slides parallel to the window 560, but the window 570 remains paired to the window 560 because neither the angle criterion nor the velocity criterion associated with the one or more separation criteria are satisfied. As shown in FIG. 5DD, the parallel movement of the window 570 is constrained by a line 584*b* associated with the right edge 564*c* of the window 560.

FIGS. 5EE-5FF illustrate another sequence in which the window 570 is moved substantially parallel to the top edge 564*a* of the window 560 and the top edge 564*a* of the window 560 remains paired with the bottom edge 574*a* of the window 570 according to a determination that the movement of the window 570 does not satisfy one or more separation criteria. In this example, the one or more separation criteria are satisfied when either an angle criterion or a velocity criterion are satisfied. For example, the angle criterion is satisfied when the angle of the movement deviates from a predefined axis (e.g., the paired edges) by more than an angular threshold value (e.g., +/−45° from the predefined axis). As such, according to some embodiments, the angle criterion is satisfied when the angle of the movement is not between separation values 590*a* (e.g., 45°) and 590*b* (e.g., 315°). For example, the velocity criterion is satisfied when the velocity of the movement is greater than the separation velocity threshold 532.

In FIG. 5EE, the window 570 is dragged with the focus selector 502 by the chrome region 572*a* according to the movement vector 588. For example, the bottom edge 574*a* of the window 570 is moved substantially parallel to the top edge 564*a* of the window 560 according to the movement vector 588. As shown in FIG. 5EE, the angle of the movement vector 588 (e.g., 355°) relative to the top edge 564*a* of the window 560 is between the separation values 590*a* and 590*b*. Furthermore, in FIG. 5EE, the velocity associated with the movement vector 588 is less than the separation velocity threshold 532.

As such, as shown in FIG. 5FF, the bottom edge 574*a* of the window 570 remains paired with the top edge 564*a* of the window 560. For example, the window 570 slides parallel to the window 560, but the window 570 remains paired to the window 560 because neither the angle criterion nor the velocity criterion associated with the one or more separation criteria are satisfied. As shown in FIG. 5FF, the parallel movement of the window 570 is constrained by a line 584*a* associated with the left edge 564*b* of the window 560.

FIGS. 5GG-5JJ illustrate a sequence in which the window 560 is moved substantially perpendicular to the bottom edge 574*a* of the window 570 and the top edge 564*a* of the window 560 is unpaired from the bottom edge 574*a* of the window 570 according to a determination that the movement of the window 560 satisfies one or more separation criteria. In this example, the one or more separation criteria are satisfied when an angle criterion and a distance criterion are satisfied. For example, the angle criterion is satisfied when the angle of the movement deviates from a predefined axis (e.g., the paired edges) by less than an angular threshold value (e.g., +/−45° from the predefined axis). As such, according to some embodiments, the angle criterion is satisfied when the angle of the movement is between separation values 596*a* (e.g., 45°) and 596*b* (e.g., 135°). For example, the distance criterion is satisfied when the magnitude of the movement is greater than a separation distance threshold 594.

In FIG. 5GG, the window 560 is dragged with the focus selector 502 by the chrome region 562*a* according to the movement vector 592. For example, the top edge 564*a* of the window 560 is moved toward the bottom edge 574*a* of the window 570 in a substantially perpendicular direction according to the movement vector 592. As shown in FIG. 5GG, the angle of the movement vector 592 (e.g., 90°) relative to the bottom edge 574*a* of the window 570 is between the separation values 596*a* and 596*b*. Furthermore, in FIG. 5GG, the magnitude associated with the movement vector 592 is greater than the separation distance threshold 594.

As shown in FIG. 5HH-5II, the focus selector 502 moves according to the movement vector 592 and the right edge 514*a* of the window 510 remains paired with the left edge 524*a* of the window 520 until the separation distance threshold 594 is satisfied. When the separation distance threshold 594 is satisfied, the window 560 "jumps" between FIGS. 5II-5JJ so as to be displayed under the focus selector 502. As such, as shown in FIG. 5JJ, the top edge 564*a* of the window 560 is unpaired from the bottom edge 574*a* of the window 570. For example, the window 560 separates from the window 570 and moves according to the movement vector 592 because the angle criterion and the distance criterion associated with the one or more separation criteria are satisfied.

FIGS. 5KK-5NN show a window 5100 and a window 5110 displayed within a display area 501 of the display 450. For example, the window 5100 corresponds to a first application, and the window 5110 corresponds to a second application different from the first application. For example, the window 5100 and the window 5110 correspond to a same application. As shown in FIGS. 5KK-5NN, the window 5100 includes a chrome region 5102*a* and a content region 5102*b*, and the window 5100 has a right edge 5104*a*. Similarly, the window 5110 includes a chrome region 5112*a* and a content region 5112*b*, and the window 5110 has a left edge 5114*a*.

FIGS. 5KK-5MM illustrate a sequence in which the right edge 5104*a* of the window 5100 is moved toward the left edge 5114*a* of the window 5110 and the right edge 5104*a* of the window 5100 is not paired with the left edge 5114*a* of the window 5110 according to a determination that the movement of the window 5100 does not satisfy one or more pairing criteria. In this example, the one or more pairing criteria are satisfied when both an angle criterion and a velocity criterion are satisfied. For example, the angle criterion is satisfied when the angle of the movement deviates from a predefined axis (e.g., an axis normal or perpendicular to the edge being approached) by less than an angular threshold value (e.g., +/−45° from the predefined axis). As such, according to some embodiments, the angle criterion is satisfied when the angle of approach of the movement is between pairing values 516*a* (e.g., 45°) and 516*b* (e.g., 315°). For example, the velocity criterion is satisfied when the velocity of the movement is less than the pairing velocity threshold 518.

In FIG. 5KK, the window 5100 is dragged with the focus selector 502 by the chrome region 5102*a* according to the movement vector 5106. For example, the right edge 5104*a* of the window 5100 is moved toward the left edge 5114*a* of the window 5110 according to the movement vector 5106. As shown in FIG. 5KK, the angle of the movement vector 5106 (e.g., 80°) relative to a normal associated with the left edge 5114*a* of the window 5110 is not between the pairing values 516*a* and 516*b*. Furthermore, in FIG. 5KK, the velocity associated with the movement vector 5106 is less than the pairing velocity threshold 518.

As such, as shown in FIG. 5LL, the right edge 5104*a* of the window 5100 is not paired with the left edge 5114*a* of the window 5110. For example, the movement of the window 5100 continues according to the movement vector 5106 and overlaps the window 5110 because the angle criterion is not satisfied.

FIGS. 5MM-5NN illustrate another sequence in which the right edge 5104*a* of the window 5100 is moved toward the left edge 5114*a* of the window 5110 and the right edge 5104*a* of the window 5100 is not paired with the left edge 5114*a* of the window 5110 according to a determination that the movement of the window 5100 does not satisfy one or more pairing criteria. In this example, the one or more pairing criteria are satisfied when both an angle criterion and a velocity criterion are satisfied. For example, the angle criterion is satisfied when the angle of the movement deviates from a predefined axis (e.g., an axis normal or perpendicular to the edge being approached) by less than an angular threshold value (e.g., +/−45° from the predefined axis). As such, according to some embodiments, the angle criterion is satisfied when the angle of approach of the movement is between pairing values 516*a* (e.g., 45°) and 516*b* (e.g., 315°). For example, the velocity criterion is satisfied when the velocity of the movement is less than the pairing velocity threshold 518.

In FIG. 5MM, the window 5100 is dragged with the focus selector 502 by the chrome region 5102*a* according to the movement vector 5108. For example, the right edge 5104*a* of the window 5100 is moved toward the left edge 5114*a* of the window 5110 according to the movement vector 5108. As shown in FIG. 5MM, the angle of the movement vector 5108 (e.g., 35°) relative to a normal associated with the left edge 5114*a* of the window 5110 is between the pairing values 516*a* and 516*b*. Furthermore, in FIG. 5MM, the velocity associated with the movement vector 5108 is greater than the pairing velocity threshold 518.

As such, as shown in FIG. 5NN, the right edge 5104*a* of the window 5100 is not paired with the left edge 5114*a* of the window 5110. For example, the movement of the window 5100 continues according to the movement vector 5108 and overlaps the window 5110 because the velocity criterion is not satisfied.

FIGS. 5OO-5PP show a window 5120 and a window 5130 displayed within a display area 501 of the display 450. For example, the window 5120 corresponds to a first application, and the window 5130 corresponds to a second application different from the first application. For example, the window 5120 and the window 5130 correspond to a same application. As shown in FIGS. 5OO-5PP, the window 5120 includes a chrome region 5122*a* and a content region 5122*b*, and the window 5120 has a right edge 5124*a*. Similarly, the window

5130 includes a chrome region 5132*a* and a content region 5132*b*, and the window 5130 has a right edge 5134*a*.

FIGS. 5OO-5PP illustrate a sequence in which the right edge 5124*a* of the window 5120 is moved toward the right edge 5134*a* of the window 5130 and the right edge 5124*a* of the window 5120 is not paired with the right edge 5134*a* of the window 5130 because the window 5120 overlaps the window 5130. In this example, the one or more pairing criteria are satisfied when both an angle criterion and a velocity criterion are satisfied. For example, the angle criterion is satisfied when the angle of the movement deviates from a predefined axis (e.g., an axis normal or perpendicular to the edge being approached) by less than an angular threshold value (e.g., +/−45° from the predefined axis). As such, according to some embodiments, the angle criterion is satisfied when the angle of approach of the movement is between pairing values 516*a* (e.g., 45°) and 516*b* (e.g., 315°). For example, the velocity criterion is satisfied when the velocity of the movement is less than the pairing velocity threshold 518.

In FIG. 5OO, the window 5120 is dragged with the focus selector 502 by the chrome region 5122*a* according to the movement vector 5126. For example, the right edge 5124*a* of the window 5120 is moved toward the right edge 5134*a* of the window 5130 according to the movement vector 5126. As shown in FIG. 500, the angle of the movement vector 5126 (e.g., 10°) relative to a normal associated with the right edge 5134*a* of the window 5130 is between the pairing values 516*a* and 516*b*. Furthermore, in FIG. 500, the velocity associated with the movement vector 5126 is less than the pairing velocity threshold 518.

However, as shown in FIG. 5PP, the right edge 5124*a* of the window 5120 is not paired with the right edge 5134*a* of the window 5130. For example, the movement of the window 5120 continues according to the movement vector 5126 because the window 5120 at least partially overlaps the window 5130 prior to the movement.

FIGS. 5QQ-5TT show a window 5140 and a window 5150 displayed within a display area 501 of the display 450. For example, the window 5140 corresponds to a first application, and the window 5150 corresponds to a second application different from the first application. For example, the window 5140 and the window 5150 correspond to a same application.

As shown in FIGS. 5QQ-5TT, the window 5140 includes a chrome region 5142*a* and a content region 5142*b*, and the window 5140 has a right edge 5144*a*. Similarly, the window 5150 includes a chrome region 5152*a* and a content region 5152*b*, and the window 5150 has a left edge 5154*a*. As shown in FIGS. 5QQ-5RR, the left edge 5154*a* of the window 5150 is associated with an attraction zone 5156. For example, the attraction zone 5156 extends N pixels from the left edge 5154*a* of the window 5150. For example, if the window 5140 is moved within the attraction zone 5156 associated with the window 5150 (e.g., the movement stops within the attraction zone 5156), the right edge 5144*a* of the window 5140 is magnetically attracted to the left edge 5154*a* of the window 5150. As a result, the right edge 5144*a* of the window 5140 adjoins (e.g., touches) and does not overlap the left edge 5154*a* of the window 5150.

FIGS. 5QQ-5RR illustrate a sequence in which the right edge 5144*a* of the window 5140 is moved within the attraction zone 5156 associated with the left edge 5154*a* of the window 5150 and the right edge 5144*a* of the window 5140 is adjoined with the left edge 5154*a* of the window 5150. In FIG. 5QQ, the window 5140 is dragged with the focus selector 502 by the chrome region 5142*a* according to the movement vector 5146. For example, the right edge 5144*a* of a window 5140 is moved toward the left edge 5154*a* of the window 5150 according to the movement vector 5146. FIG. 5RR shows the window 5140 within the attraction zone 5156 after the movement vector 5146 is completed.

As such, as shown in FIG. 5SS, the right edge 5144*a* of the window 5140 is adjoined with the left edge 5154*a* of the window 5150. For example, the window 5140 is adjoined with the window 5150 due to the window 5140 being moved within the attraction zone 5156 associated with the window 5150.

FIGS. 5SS-5TT illustrate a sequence in which the window 5140 is separated from the window 5150. In FIG. 5SS, the window 5140 is dragged with the focus selector 502 by the chrome region 5142*a* according to the movement vector 5156. For example, the right edge 5144*a* of a window 5140 is moved substantially parallel to the left edge 5154*a* of the window 5150. As shown in FIG. 5TT, the right edge 5144*a* of the window 5140 is separated from with the left edge 5154*a* of the window 5150 without satisfying any separation criteria. For example, the movement of the window 5140 continues according to the movement vector 5156 because the window 5140 and the window 5150 were not paired due to the satisfaction of one or more pairing criteria.

In some embodiments, when the windows are adjoined via magnetic attraction, the windows are separated when a distance threshold is satisfied. As such, for example, there is a threshold resistance when the first window is moved towards or away from the second window. In some embodiments, when the windows are adjoined via magnetic attraction, the windows are separated without satisfying a distance threshold is satisfied. As such, for example, there is no resistance when the first window is moved towards or away from the second window.

FIGS. 5UU-5AAA show a window 5160 and a window 5170 displayed within a display area 501 of the display 450. For example, the window 5160 corresponds to a first application, and the window 5170 corresponds to a second application different from the first application. For example, the window 5160 and the window 5170 correspond to a same application. As shown in FIGS. 5UU-5AAA, the window 5160 includes a chrome region 5162*a* and a content region 5162*b*, and the window 5160 has a right edge 5164*a* and a top edge 5164*b*. Similarly, the window 5170 includes a chrome region 5172*a* and a content region 5172*b*, and the window 5170 has a left edge 5174*a* and a top edge 5174*b*.

FIGS. 5UU-5WW illustrate a sequence in which the right edge 5164*a* of the window 5160 is dragged toward the left edge 5174*a* of the window 5170 and the right edge 5164*a* of the window 5160 is paired with the left edge 5174*a* of the window 5170. In this example, the one or more pairing criteria are satisfied when both an angle criterion and a velocity criterion are satisfied. For example, the angle criterion is satisfied when the angle of the movement deviates from a predefined axis (e.g., an axis normal or perpendicular to the edge being approached) by less than an angular threshold value (e.g., +/−45° from the predefined axis). As such, according to some embodiments, the angle criterion is satisfied when the angle of approach of the movement is between pairing values 516*a* (e.g., 45°) and 516*b* (e.g., 315°). For example, the velocity criterion is satisfied when the velocity of the movement is less than the pairing velocity threshold 518.

In FIG. 5UU, the right edge 5164*a* of the window 5160 is dragged with the focus selector 502 according to the movement vector 5166. For example, the right edge 5164*a* of the window 5160 is dragged toward the left edge 5174*a* of the window 5170 according to the movement vector 5166. As shown in FIG. 5UU, the angle of the movement vector 5166 (e.g., 15°) relative to a normal associated with the left edge 5174*a* of the window 5170 is between the pairing values 516*a* and 516*b*. Furthermore, in FIG. 5UU, the velocity associated with the movement vector 5166 is less than the pairing velocity threshold 518.

As such, as shown in FIG. 5VV, the right edge 5164*a* of the window 5160 is paired with the left edge 5174*a* of the window 5170. For example, the dragging of the right edge 5164*a* of the window 5160 is stopped when the right edge 5164*a* of the window 5160 touches the left edge 5174*a* of the window 5170 due to satisfaction of the angle criterion and the velocity criterion. A first dimension (e.g., the width) of the window 5160 has a value 5168*a* in FIG. 5UU. The first dimension of the window 5160 has a value 5168*b* in FIG. 5VV after the right edge 5164*a* of the window 5160 is paired with the left edge 5174*a* of the window 5170. For example, the value 5168*a* is less than the value 5168*b*. However, in FIG. 5WW, the focus selector 502 moves past the left edge 5174*a* of the window 5170 according to the movement vector 5166.

FIGS. 5XX-5ZZ illustrate a sequence in which the top edge 5164*b* of the window 5160 is dragged substantially parallel to the left edge 5174*a* of the window 5170. In FIG. 5XX, the top edge 5164*b* of the window 5160 is dragged with the focus selector 502 according to the movement vector 5176. For example, the top edge 5164*b* of the window 5160 is dragged substantially parallel to the left edge 5174*a* of the window 5170 according to the movement vector 5176.

As such, as shown in FIG. 5XX-5ZZ, the right edge 5164*a* of the window 5160 remains paired with the left edge 5174*a* of the window 5170. A second dimension (e.g., the height) of the window 5160 has a value 5177*a* in FIG. 5XX. The second dimension of the window 5160 has a value 5177*b* in FIGS. 5YY-5ZZ after the top edge 5164*b* is dragged substantially parallel to the left edge 5174*a* of the window 5170. For example, the value 5177*a* is less than the value 5177*b*. As shown in FIGS. 5YY-5ZZ, the parallel movement of the window 510 is constrained by a line 5178*a* associated with the top edge 5174*b* of the window 5170.

As shown in FIGS. 5YY-5AAA, the focus selector 502 moves according to the movement vector 5176 and the right edge 5164*a* of the window 5160 remains paired with the left edge 5174*a* of the window 5170 until the focus selector moves a threshold distance past the line 5178*a*. When the threshold distance is satisfied, the window 5160 "jumps" between FIGS. 5ZZ-5AAA so as to be displayed under the focus selector 502 (e.g., a discontinuous animation).

FIGS. 5BBB-5GGG show a window 5180 and a window 5190 displayed within a display area 501 of the display 450. For example, the window 5180 corresponds to a first application, and the window 5190 corresponds to a second application different from the first application. For example, the window 5180 and the window 5190 correspond to a same application. As shown in FIGS. 5BBB-5GGG, the window 5180 includes a chrome region 5182*a* and a content region 5182*b*, and the window 5180 has a right edge 5184*a* and a top edge 5184*b*. Similarly, the window 5190 includes a chrome region 5192*a* and a content region 5192*b*, and the window 5190 has a left edge 5194*a* and a top edge 5194*b*.

FIGS. 5BBB-5CCC illustrate a sequence in which the right edge 5184*a* of the window 5180 is moved toward the left edge 5194*a* of the window 5190 and the right edge 5184*a* of the window 5180 is paired with the left edge 5194*a* of the window 5190 because the movement of the window 5180 satisfies the one or more pairing criteria. In this example, the one or more pairing criteria are satisfied when both an angle criterion and a distance criterion are satisfied. For example, the angle criterion is satisfied when the angle of the movement deviates from a predefined axis (e.g., an axis normal or perpendicular to the edge being approached) by less than an angular threshold value (e.g., +/−45° from the predefined axis). As such, according to some embodiments, the angle criterion is satisfied when the angle of approach of the movement is between pairing values 516*a* (e.g., 45°) and 516*b* (e.g., 315°).

For example, the distance criterion is satisfied when a portion of the magnitude of the movement is less than a distance threshold 5188. For example, the distance criterion is satisfied when the magnitude of the movement is equal to or greater than the initial distance between the right edge 5184*a* of the window 5180 and the left edge 5194*a* of the window 5190, but the portion of the magnitude of the movement that extends beyond the left edge 5194*a* of the window 5190 is also less than or equal to the distance threshold 5188.

In FIG. 5BBB, the window 5180 is dragged with the focus selector 502 by the chrome region 5182*a* according to the movement vector 5186. For example, the right edge 5184*a* of a window 5180 is moved toward the left edge 5194*a* of the window 5190 according to the movement vector 5186. As shown in FIG. 5BBB, the angle of the movement vector 5186 (e.g., 15°) relative to a normal associated with the left edge 5194*a* of the window 5190 is between the pairing values 516*a* and 516*b*. Furthermore, in FIG. 5BBB, the portion of the magnitude of the movement vector 5186 that extends beyond the left edge 5194*a* of the window 5190 is less than the distance threshold 5188.

As such, as shown in FIG. 5CCC, the right edge 5184*a* of the window 5180 is paired with the left edge 5194*a* of the window 5190. For example, the movement of the window 5180 is stopped when the right edge 5184*a* of the window 5180 touches the left edge 5194*a* of the window 5190 due to satisfaction of the angle criterion and the distance criterion.

FIGS. 5DDD-5EEE illustrate a sequence in which the window 5180 is moved substantially parallel to the left edge 5194*a* of the window 5190 and the right edge 5184*a* of the window 5180 is unpaired from the left edge 5194*a* of the window 5190 according to a determination that the movement of the window 5180 satisfies one or more separation criteria. In this example, the one or more separation criteria are satisfied when either an angle criterion or a distance criterion are satisfied. For example, the angle criterion is satisfied when the angle of the movement deviates from a predefined axis (e.g., an axis normal or perpendicular to the paired edges) by more than an angular threshold value (e.g., +/−45° from the predefined axis). As such, according to some embodiments, the angle criterion is satisfied when the angle of the movement is not between separation values 530*a* (e.g., 45°) and 530*b* (e.g., 135°). For example, the distance criterion is satisfied when a portion of the magnitude of the movement is greater than a distance threshold 5189. For example, the distance criterion is satisfied when the portion magnitude of the movement that extends beyond the line 5198*a* associated with the top edge 5194*b* of the window 5190 is greater than a distance threshold 5189.

In FIG. 5DDD, the window 5180 is dragged with the focus selector 502 by the chrome region 5182*a* according to the movement vector 5196. For example, the right edge 5184*a* of a window 5180 is moved substantially parallel to the left edge 5194*a* of the window 5190 according to the movement vector 5196. As shown in FIG. 5DDD, the angle of the movement vector 5196 (e.g., 75°) relative to a normal associated with the left edge 5194*a* of the window 5190 is between the separation values 530*a* and 530*b*. Furthermore, in FIG. 5DDD, the portion of the magnitude of the movement vector 5196 that extends beyond the left edge 5194*a* of the window 5190 extends beyond the line 5198*a* associated with the top edge 5194*b* of the window 5190 is greater than the distance threshold 5189.

As such, as shown in FIG. 5EEE, the right edge 5184*a* of the window 5180 is unpaired from the left edge 5194*a* of the window 5190. For example, the window 5180 separates from the window 5190 and moves according to the movement vector 5196 because the angle criterion and the distance criterion associated with the one or more separation criteria are satisfied.

FIGS. 5FFF-5GGG illustrate a sequence in which the right edge 5184*a* of the window 5180 is moved toward the left edge 5194*a* of the window 5190 and the right edge 5184*a* of the window 5180 is not paired with the left edge 5194*a* of the window 5190 because the movement of the window 5180 does not satisfy the one or more pairing criteria. In this example, the one or more pairing criteria are satisfied when both an angle criterion and a distance criterion are satisfied. For example, the angle criterion is satisfied when the angle of the movement deviates from a predefined axis (e.g., an axis normal or perpendicular to the edge being approached) by less than an angular threshold value (e.g., +/−45° from the predefined axis). As such, according to some embodiments, the angle criterion is satisfied when the angle of approach of the movement is between pairing values 516*a* (e.g., 45°) and 516*b* (e.g., 315°).

For example, the distance criterion is satisfied when a portion of the magnitude of the movement is less than a distance threshold 5188. For example, the distance criterion is satisfied when the magnitude of the movement is equal to or greater than the initial distance between the right edge 5184*a* of the window 5180 and the left edge 5194*a* of the window 5190, but the portion of the magnitude of the movement that extends beyond the left edge 5194*a* of the window 5190 is also less than or equal to the distance threshold 5188.

In FIG. 5FFF, the window 5180 is dragged with the focus selector 502 by the chrome region 5182*a* according to the movement vector 5202. For example, the right edge 5184*a* of a window 5180 is moved toward the left edge 5194*a* of the window 5190 according to the movement vector 5186. As shown in FIG. 5FFF, the angle of the movement vector 5202 (e.g., 15°) relative to a normal associated with the left edge 5194*a* of the window 5190 is between the pairing values 516*a* and 516*b*. Furthermore, in FIG. 5FFF, the portion of the magnitude of the movement vector 5202 that extends beyond the left edge 5194*a* of the window 5190 is greater than the distance threshold 5188.

As such, as shown in FIG. 5GGG, the right edge 5184*a* of the window 5180 is not paired with the left edge 5194*a* of the window 5190. For example, the movement of the window 5180 continues according to the movement vector 5202 and overlaps the window 5190 because the distance criterion is not satisfied.

FIGS. 5HHH-5JJJ show a window 5210, a window 5220, and a window 5230 displayed within a display area 501 of the display 450. For example, the window 5210 corresponds to a first application, the window 5220 corresponds to a second application, and the window 5230 corresponds to a third application. For example, the window 5210, the window 5220, and the window 5230 correspond to a same application. As shown in FIGS. 5HHH-5JJJ, the window 5210 includes a chrome region 5212*a* and a content region 5212*b*, and the window 5210 has a left edge 5214*a*. Similarly, the window 5220 includes a chrome region 5222*a* and a content region 5222*b*, and the window 5220 has a right edge 5224*a*. Similarly, the window 5230 includes a chrome region 5232*a* and a content region 5232*b*, and the window 5230 has a right edge 5234*a* and a left edge 5234*b*.

FIGS. 5HHH-5JJJ illustrate a sequence in which the left edge 5214*a* of the window 5210 is moved toward the right edge 5234*a* of the window 5230 and the left edge 5214*a* of the window 5210 is not paired with the right edge 5234*a* of the window 5230 because the window 5230 is partially occluded by the window 5220. In this example, the one or more pairing criteria are satisfied when both an angle criterion and a velocity criterion are satisfied. For example, the angle criterion is satisfied when the angle of the movement deviates from a predefined axis (e.g., an axis normal or perpendicular to the edge being approached) by less than an angular threshold value (e.g., +/−45° from the predefined axis). As such, according to some embodiments, the angle criterion is satisfied when the angle of approach of the movement is between pairing values 5218*a* (e.g., 135°) and 5218*b* (e.g., 225°). For example, the velocity criterion is satisfied when the velocity of the movement is less than the pairing velocity threshold 518.

In FIG. 5HHH, the window 5210 is dragged with the focus selector 502 by the chrome region 5212*a* according to the movement vector 5216. For example, the left edge 5214*a* of the window 5210 is moved toward the right edge 5234*a* of the window 5230 according to the movement vector 5216. As shown in FIG. 5HHH, the angle of the movement vector 5216 (e.g., 185°) relative to a normal associated with the right edge 5234*a* of the window 5230 is between the pairing values 5218*a* and 5218*b*. Furthermore, in FIG. 5HHH, the velocity associated with the movement vector 5216 is less than the pairing velocity threshold 518.

However, as shown in FIG. 5111, the left edge 5214*a* of the window 5210 is not paired with the right edge 5234*a* of the window 5230. For example, in FIG. 5JJJ, the movement of the window 5210 continues according to the movement vector 5216 because the right edge 5234*a* of the window 5230 is partially occluded by the window 5220 (e.g., as shown by the dotted line within the window 5220 in FIGS. 5HHH-5JJJ). In another example, according to some embodiments, assuming that the movement vector 5216 satisfies the one or more pairing criteria and that window 5220 occludes a portion of the left edge 5234*b* by the window 5230 and not a portion of the right edge 5234*a* of the window 5230 (not shown), the left edge 5214*a* of the window 5210 is paired with the right edge 5234*a* of the window 5230.

FIGS. 5KKK-5MMM show a window 5250, a window 5260, and a window 5270 displayed within a display area 501 of the display 450. For example, the window 5250 corresponds to a first application, the window 5260 corresponds to a second application, and the window 5270 corresponds to a third application. For example, the window 5250, the window 5260, and the window 5270 correspond to a same application. As shown in FIGS. 5KKK-5MMM, the window 5250 includes a chrome region 5252*a* and a content region 5252*b*, and the window 5250 has a left edge 5254*a*. Similarly, the window 5260 includes a chrome region 5262*a* and a content region 5262*b*, and the window 5260 has a right edge 5264*a*. Similarly, the window 5270 includes a chrome region 5272*a* and a content region 5272*b*, and the window 5270 has a right edge 5274*a* and a left edge 5274*b*.

FIGS. 5KKK-5MMM illustrate a sequence in which the left edge 5254*a* of the window 5250 is moved toward the right edge 5264*a* of the window 5260 and the left edge 5254*a* of the window 5250 is not paired with the right edge 5264*a* of the window 5260 because the window 5260 is partially occluded by the window 5270. In this example, the one or more pairing criteria are satisfied when both an angle criterion and a velocity criterion are satisfied. For example, the angle criterion is satisfied when the angle of the movement deviates from a predefined axis (e.g., an axis normal or perpendicular to the edge being approached) by less than an angular threshold value (e.g., +/−45° from the predefined axis). As such, according to some embodiments, the angle criterion is satisfied when the angle of approach of the movement is between pairing values 5218*a* (e.g., 135°) and 5218*b* (e.g., 225°). For example, the velocity criterion is satisfied when the velocity of the movement is less than the pairing velocity threshold 518.

In FIG. 5KKK, the window 5250 is dragged with the focus selector 502 by the chrome region 5252*a* according to the movement vector 5256. For example, the left edge 5254*a* of the window 5250 is moved toward the right edge 5264*a* of the window 5260 according to the movement vector 5256. As shown in FIG. 5KKK, the angle of the movement vector 5256 (e.g., 185°) relative to a normal associated with the right edge 5264*a* of the window 5260 is between the pairing values 5218*a* and 5218*b*. Furthermore, in FIG. 5KKK, the velocity associated with the movement vector 5256 is less than the pairing velocity threshold 518.

However, as shown in FIG. 5MMM, the left edge 5254*a* of the window 5250 is not paired with the right edge 5264*a* of the window 5260. For example, in FIGS. 5LLL-5MMM, the movement of the window 5250 continues according to the movement vector 5256 because the right edge 5264*a* of the window 5260 incident the movement vector 5256 is occluded by the window 5270 (e.g., as shown by the dotted line within the window 5270 in FIGS. 5KKK-5MMM). As such, in this example, the window 5270 occludes the position on the right edge 5264*a* of the window 5260 at which the movement vector 5256 contacts the right edge 5264*a* of the window 5260.

Figure 6A:
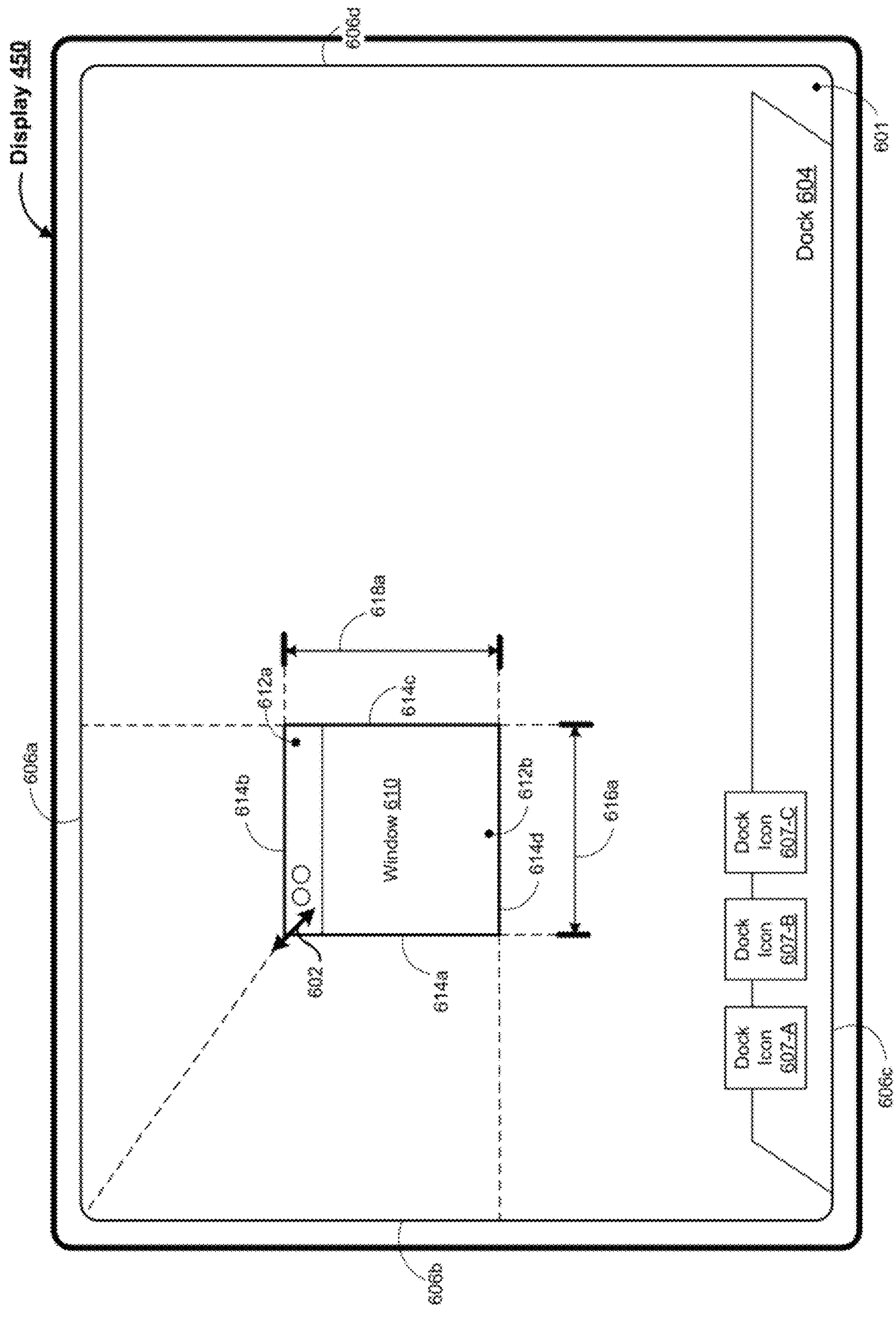
FIGS. 6A-6Y illustrate example user interfaces for resizing windows in accordance with some embodiments.
Figure 6B:
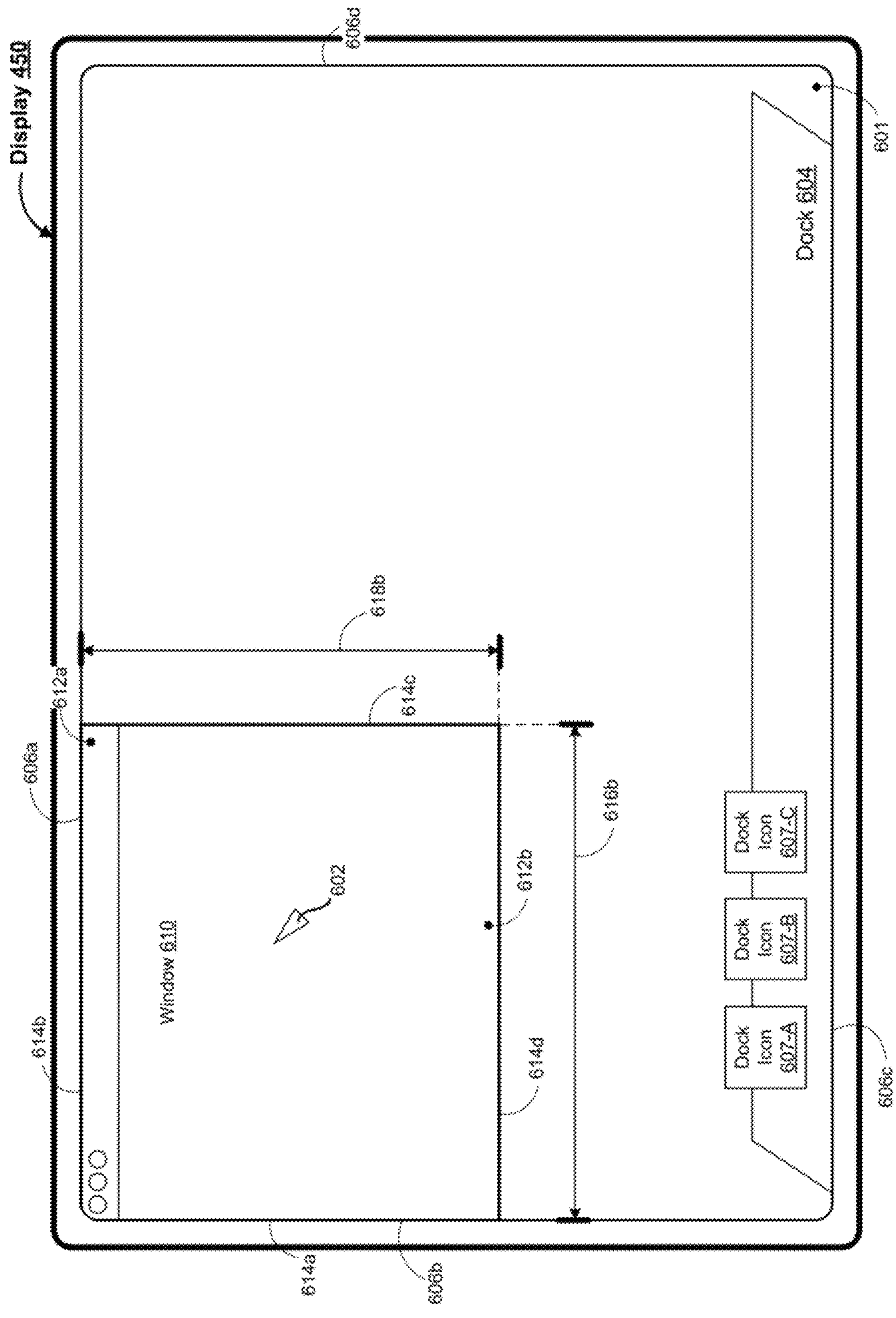
Figure 6C:
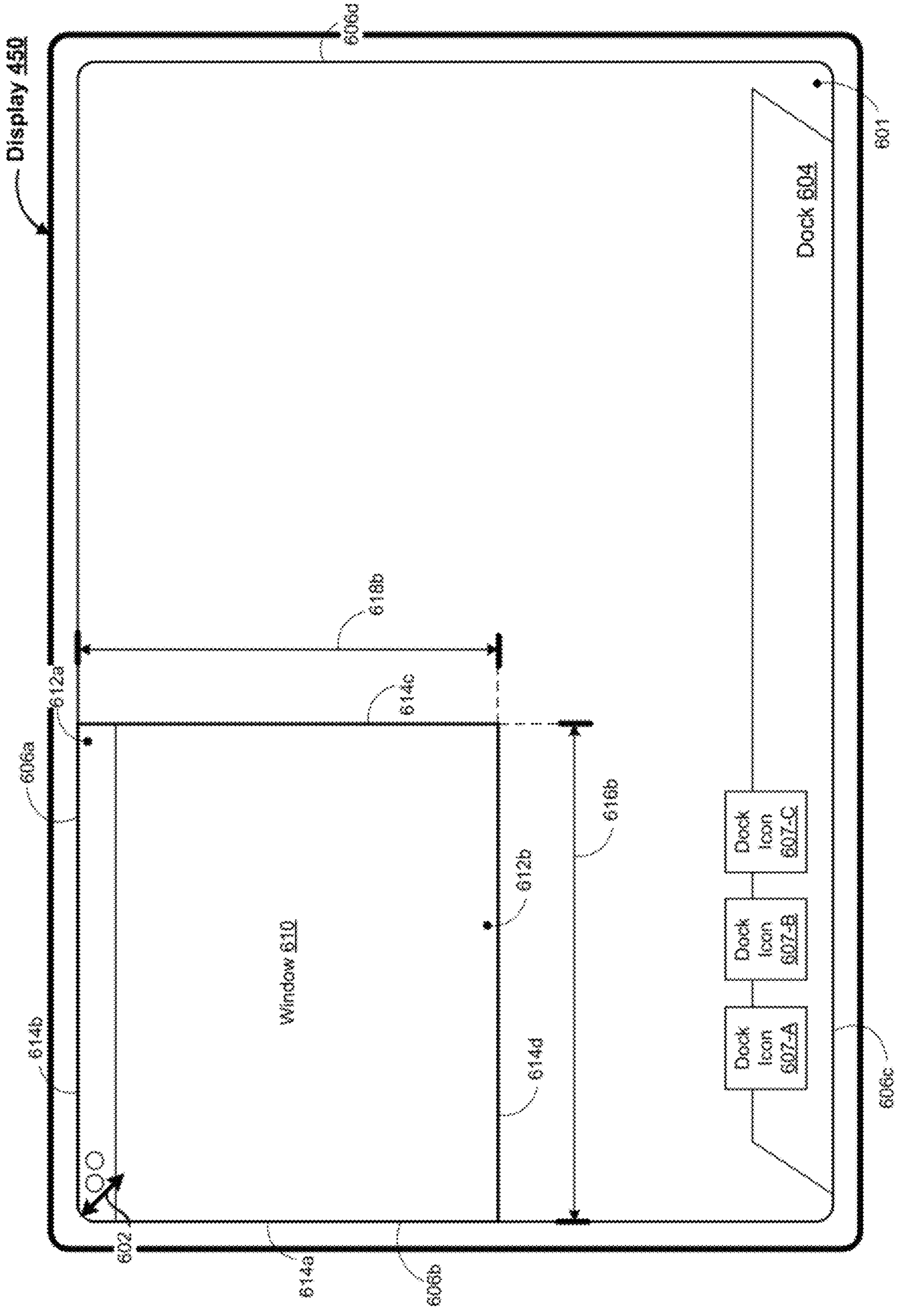
Figure 6D:
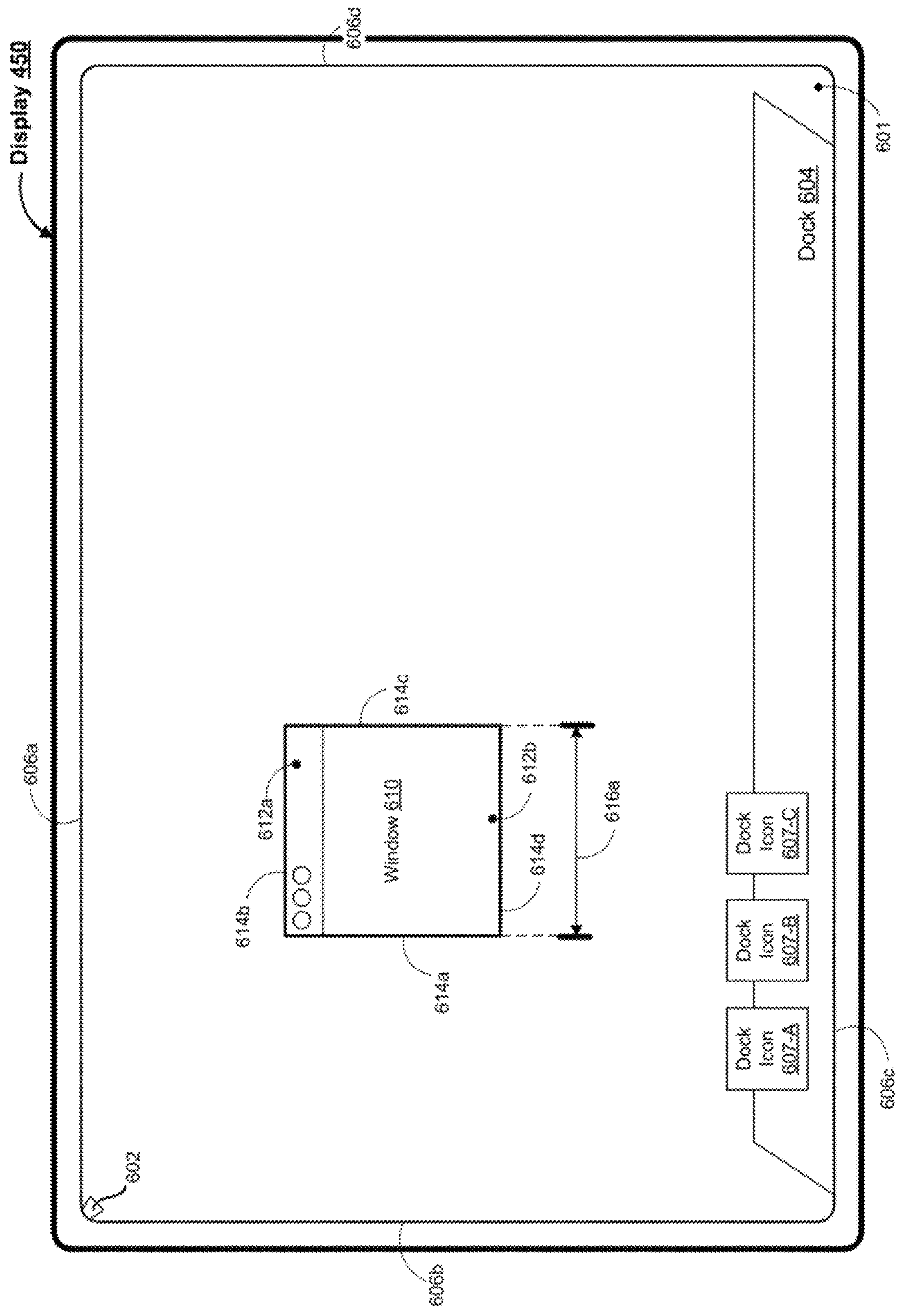
Figure 6E:
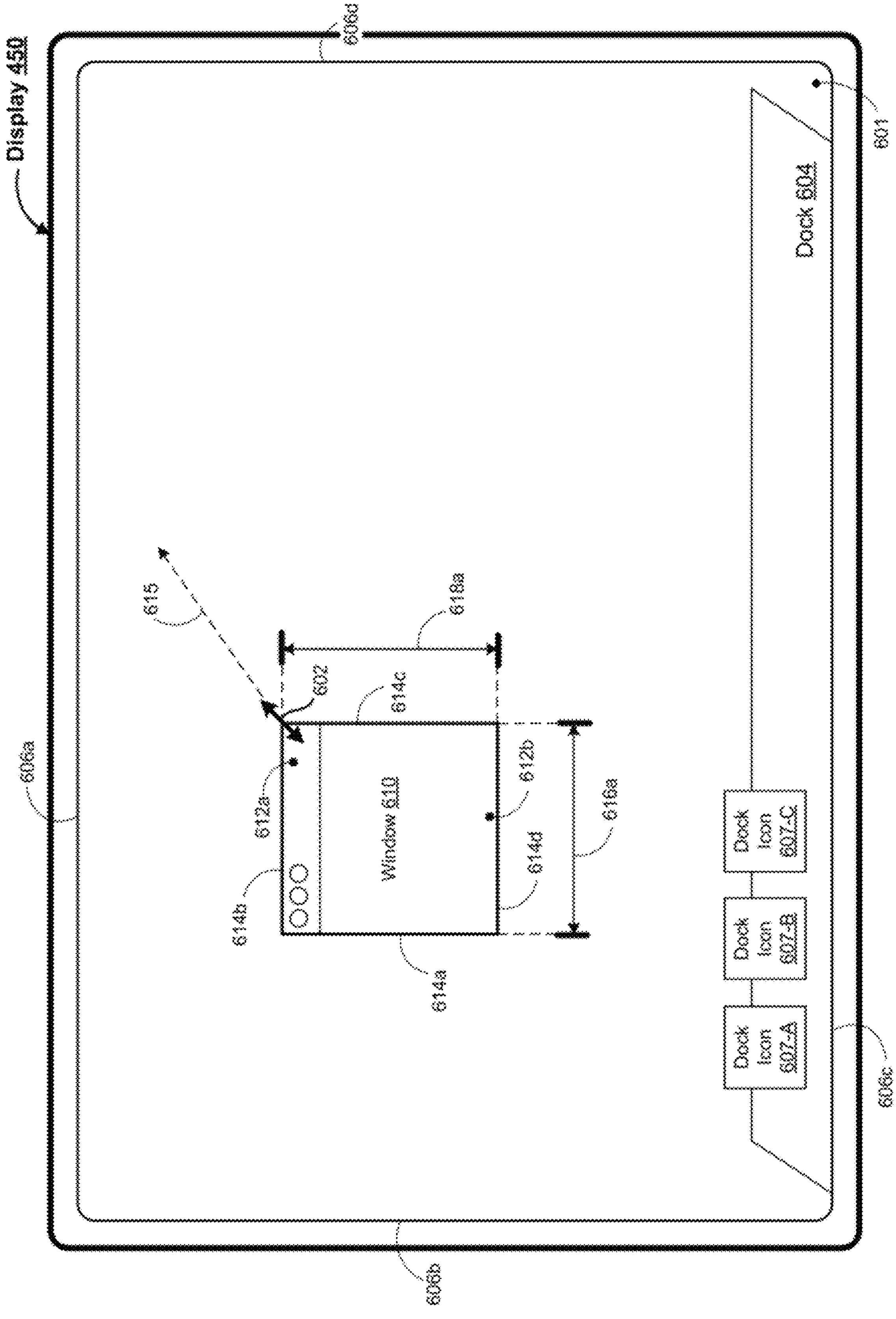
Figure 6F:
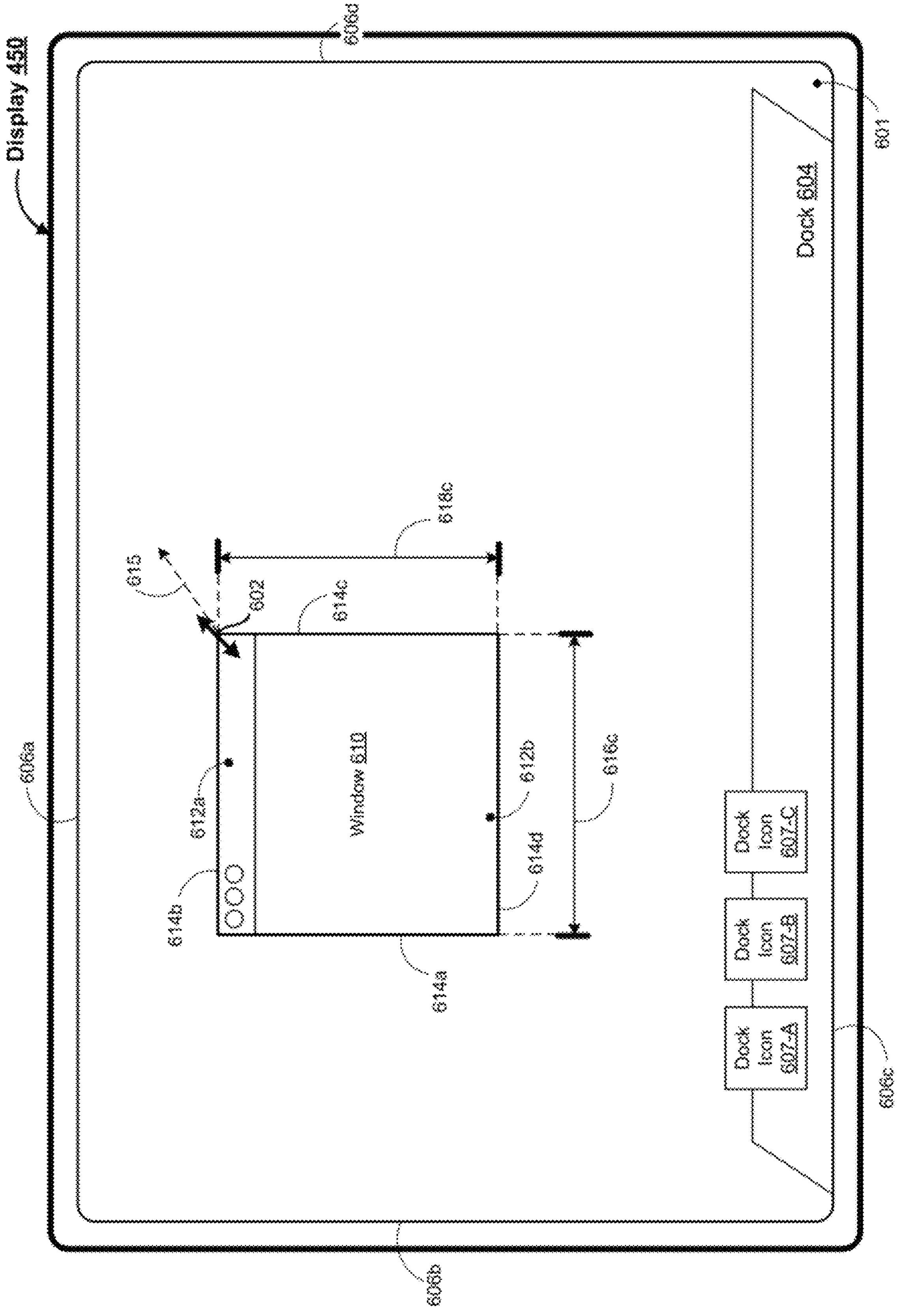
Figure 6G:
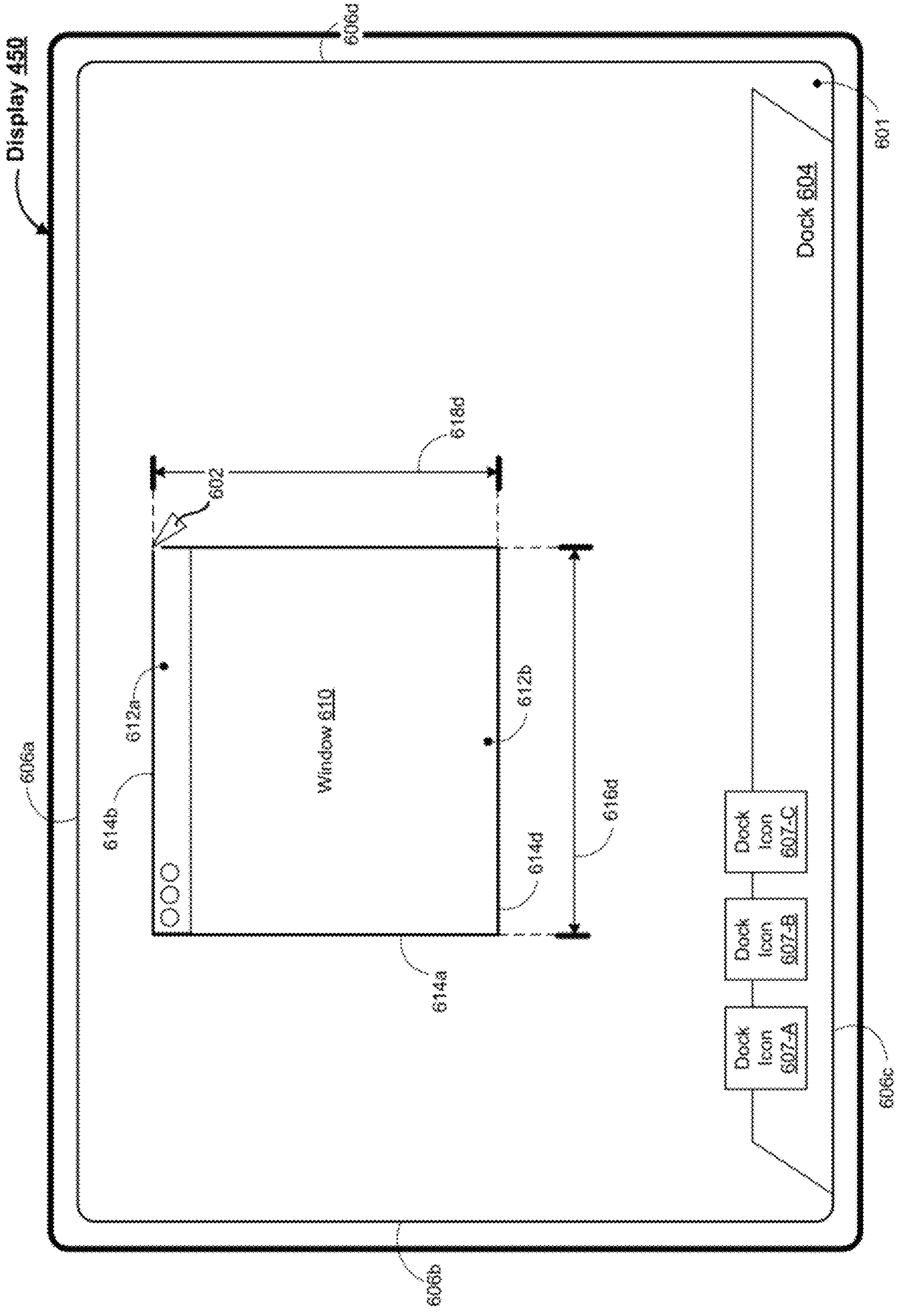
Figure 6H:
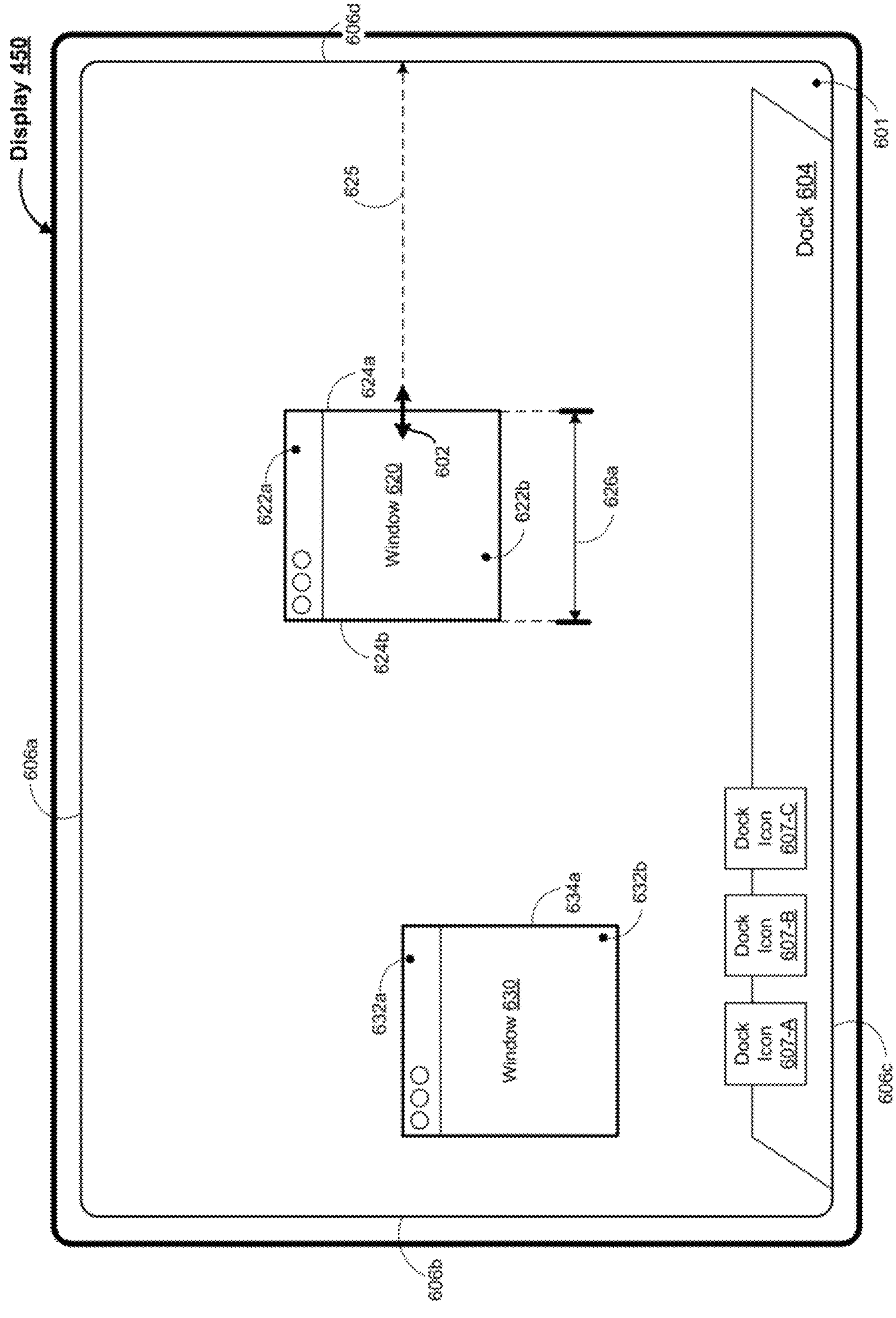
Figure 6I:
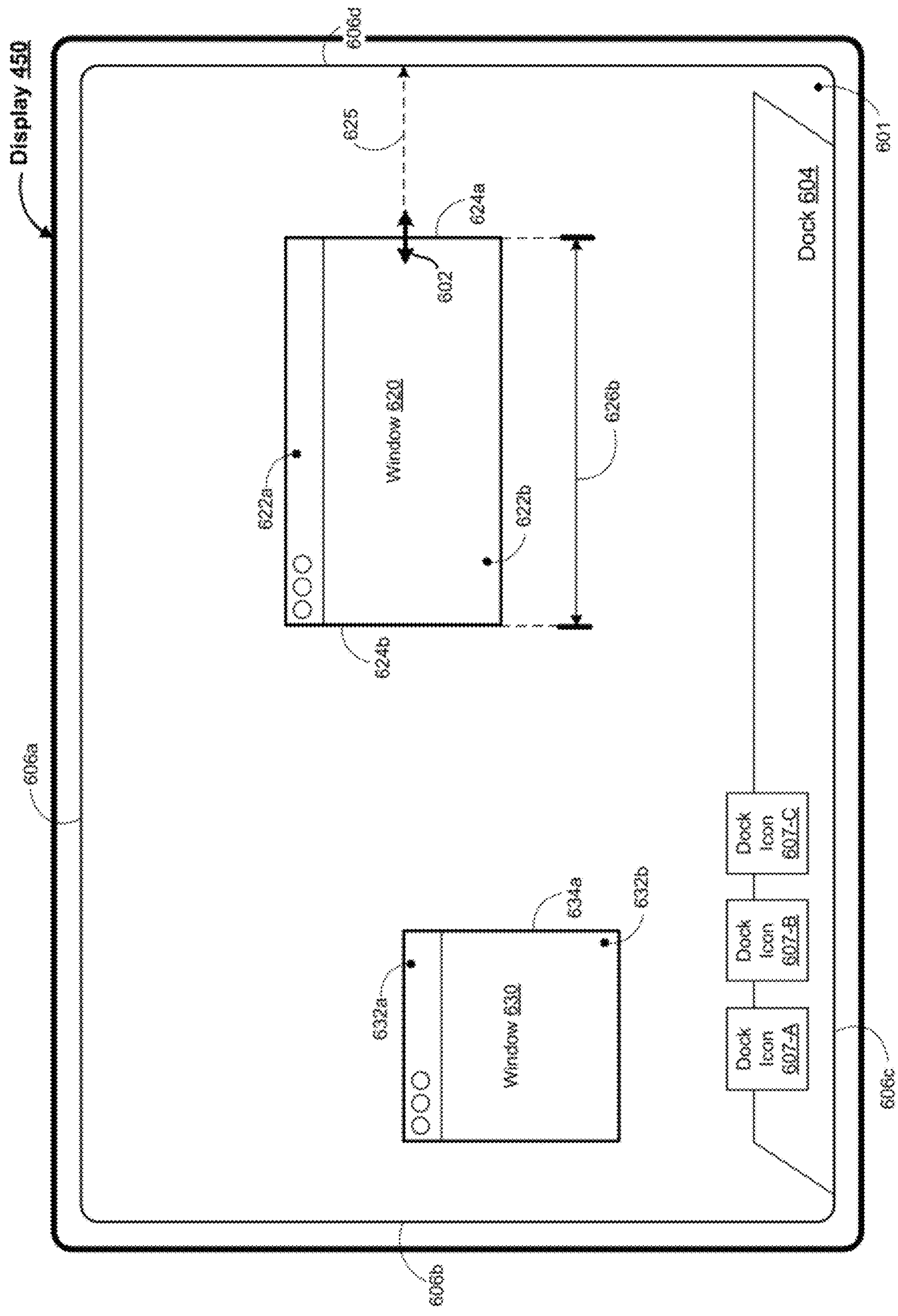
Figure 6J:
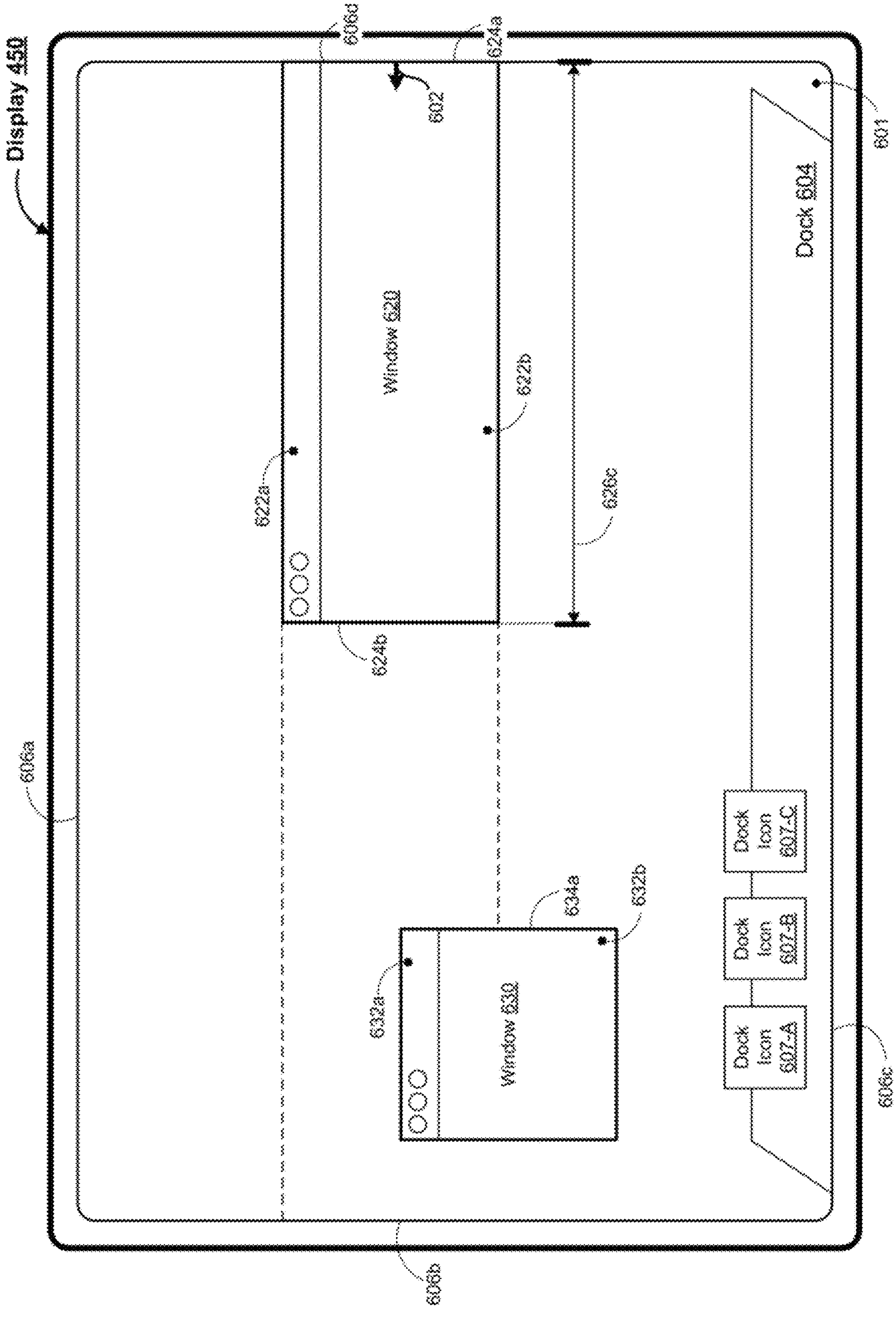
Figure 6K:
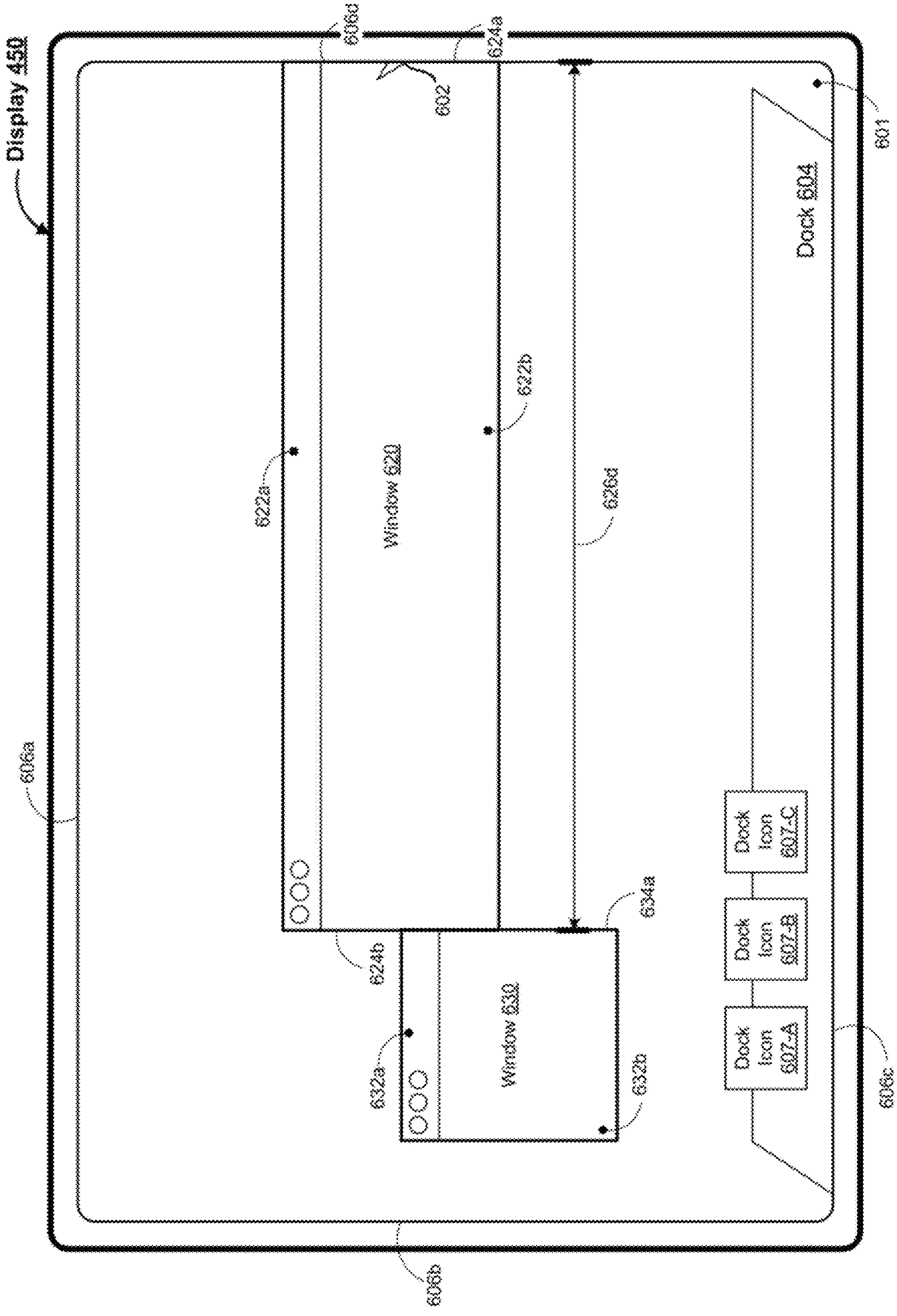
Figure 6L:
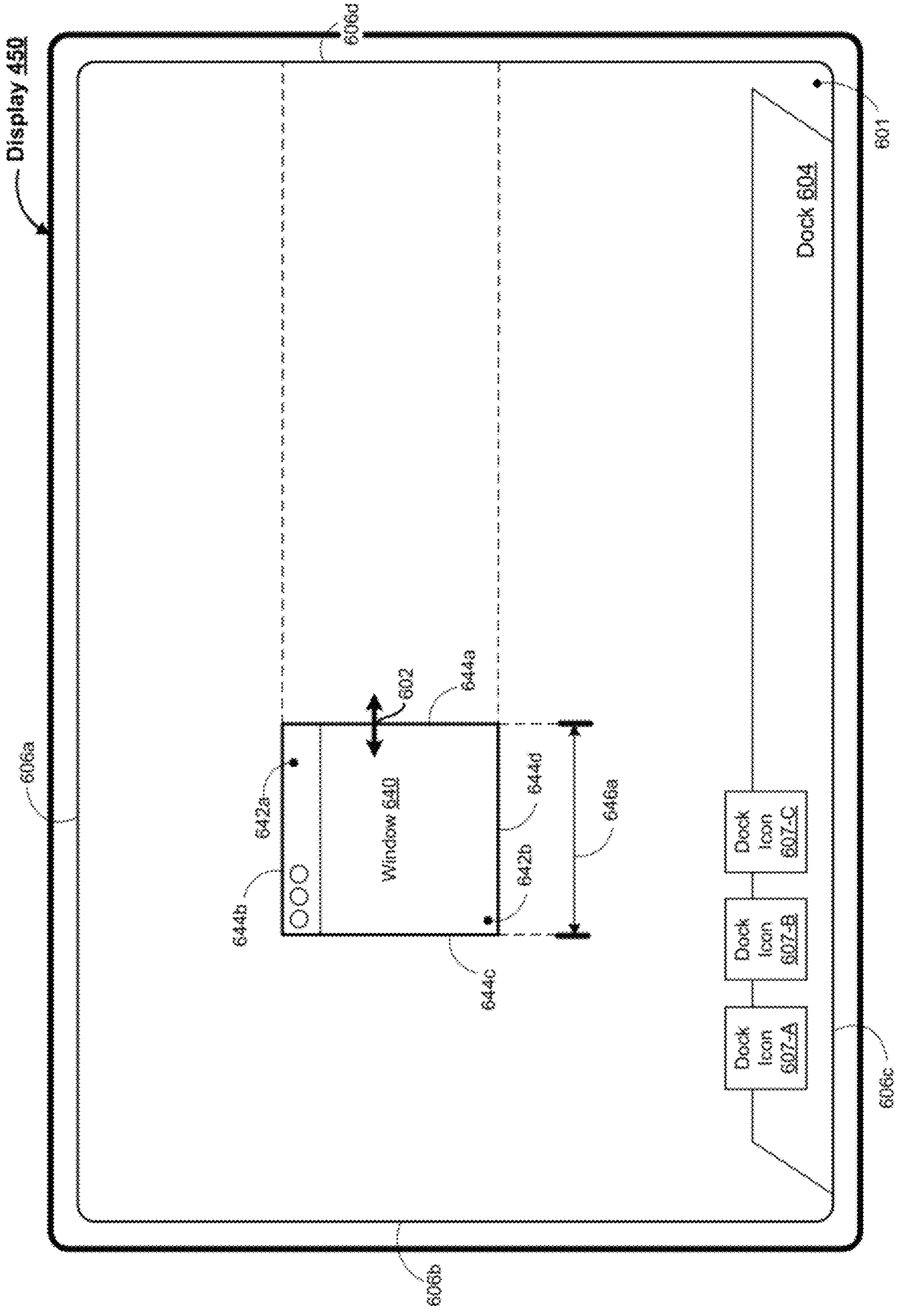
Figure 6M:
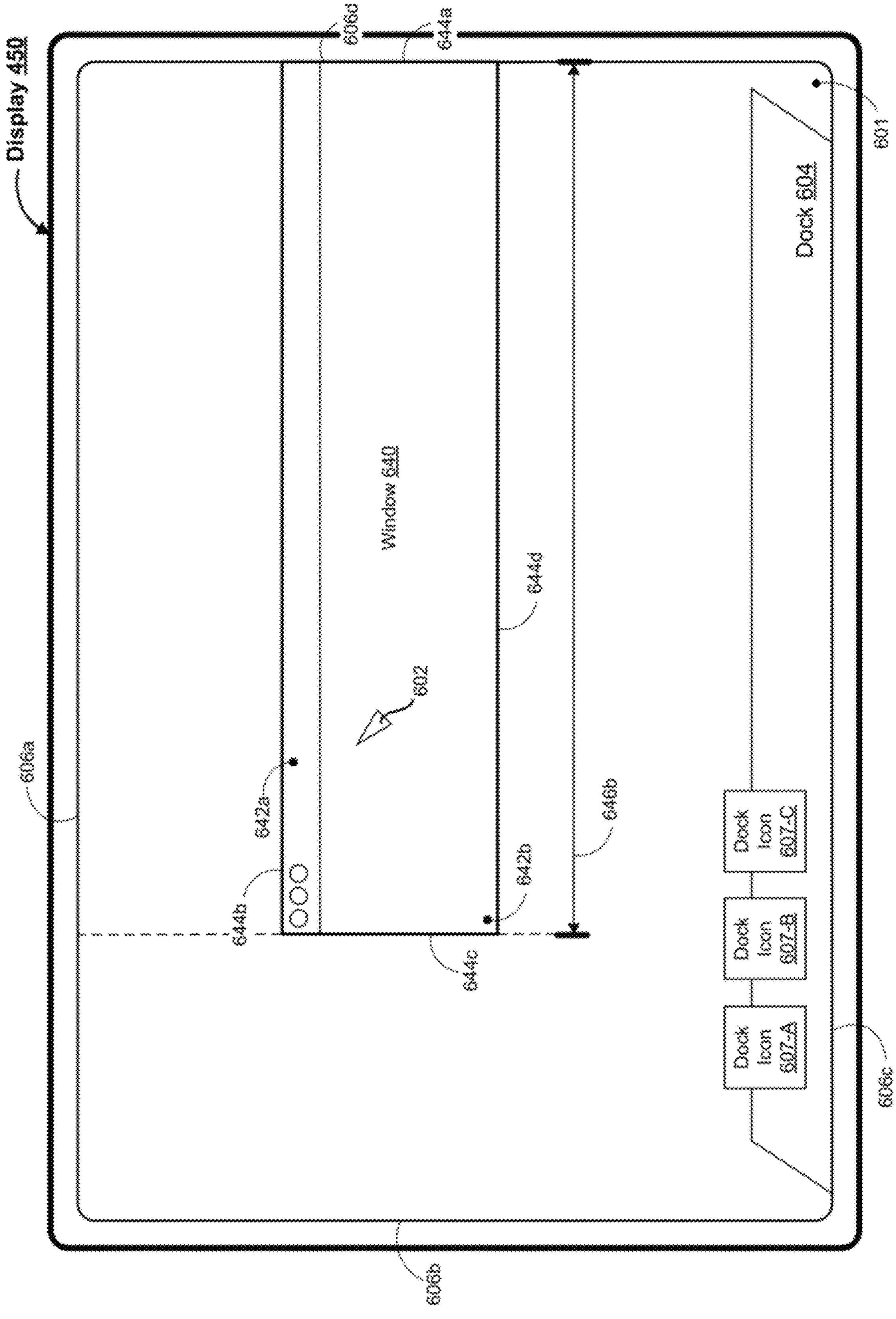
Figure 6N:
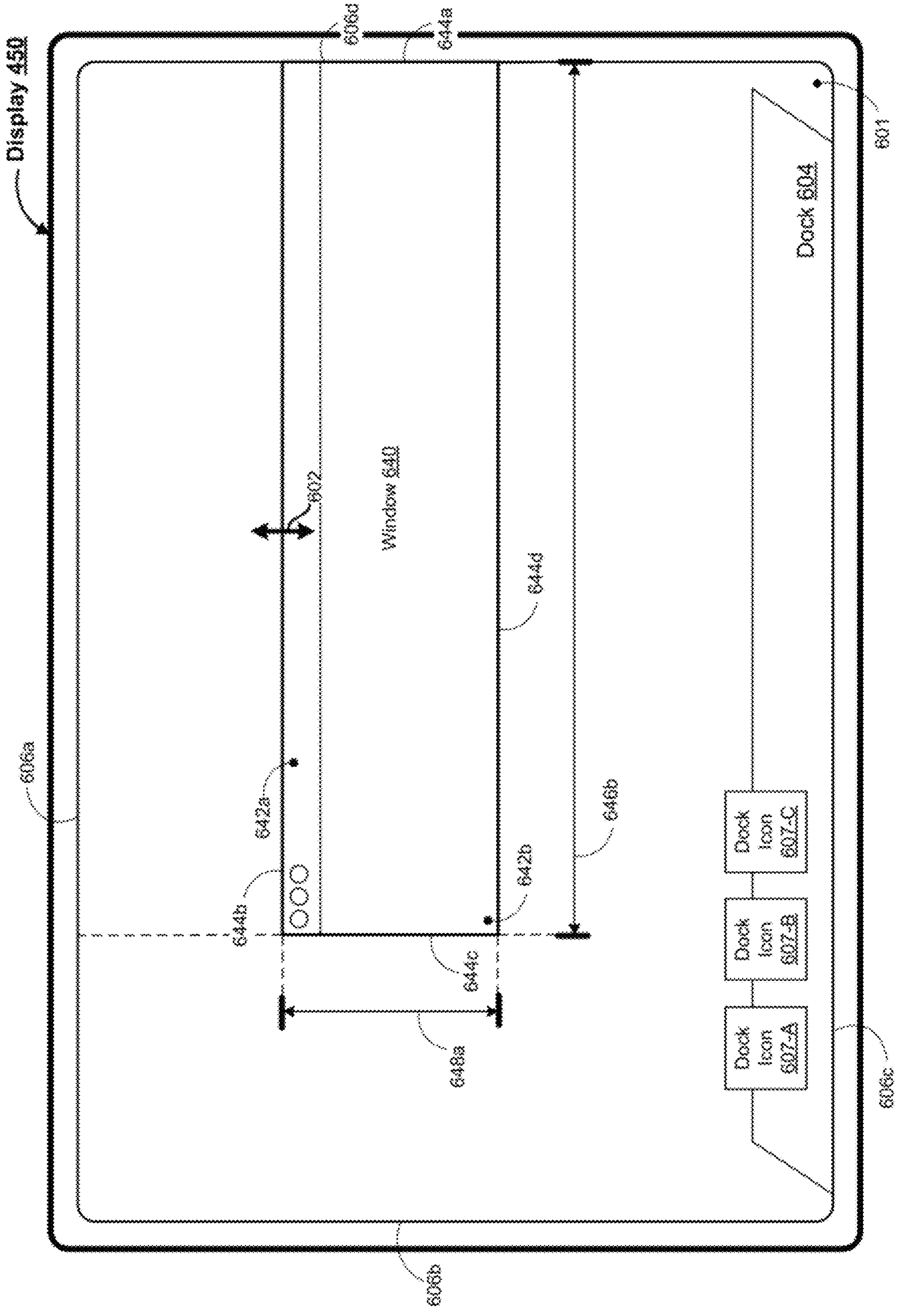
Figure 6O:
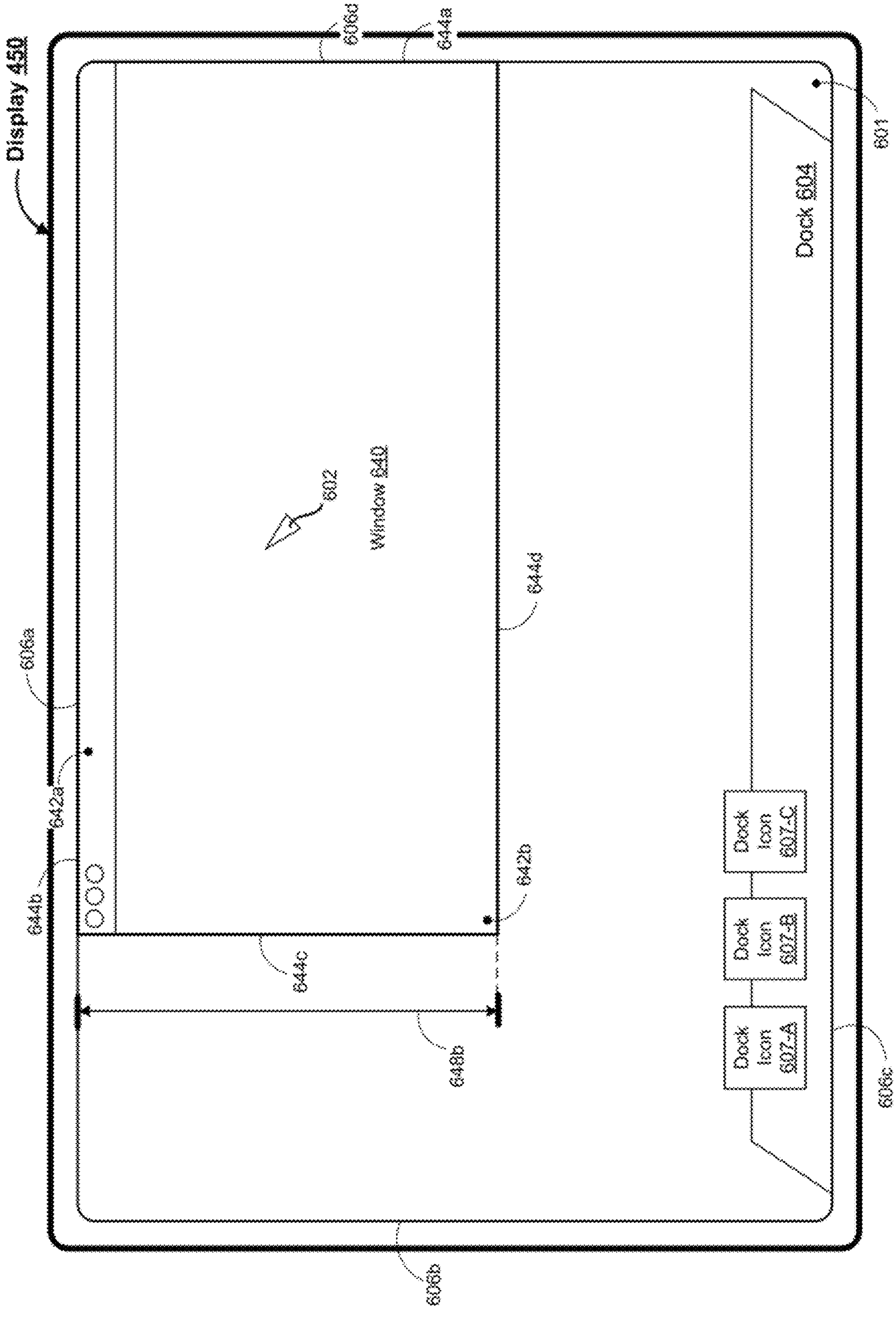
Figure 6P:
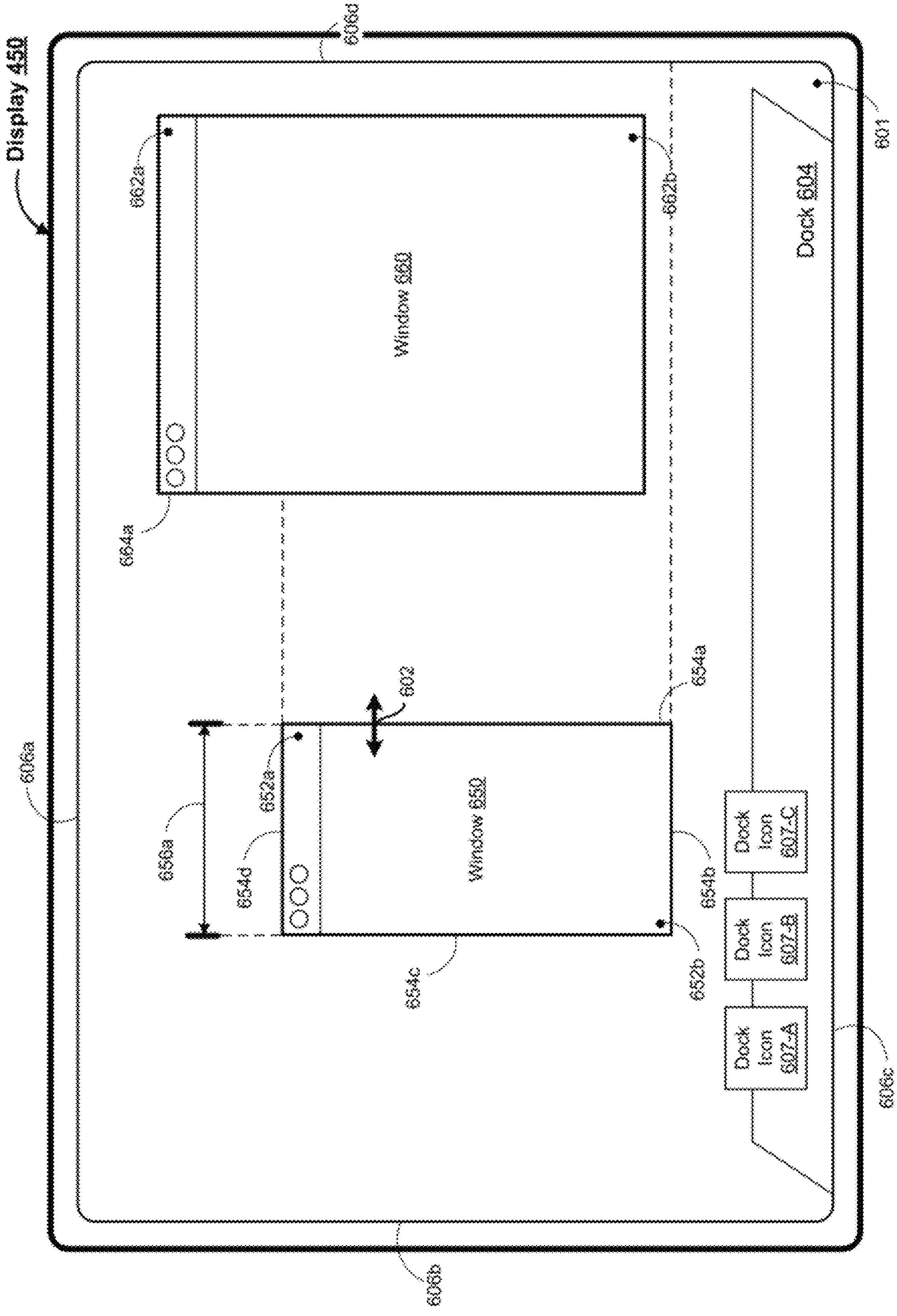
Figure 6Q:
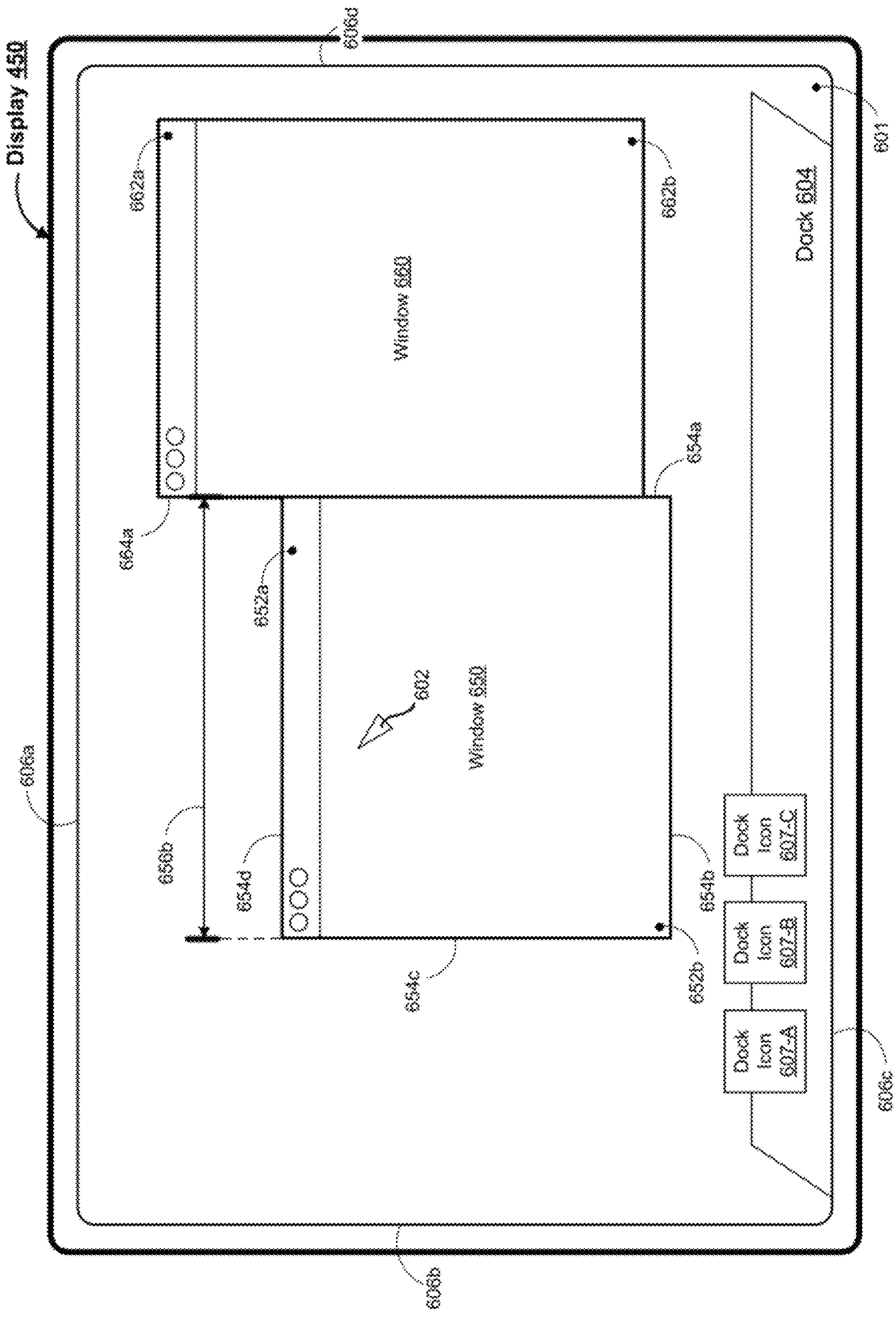
Figure 6R:
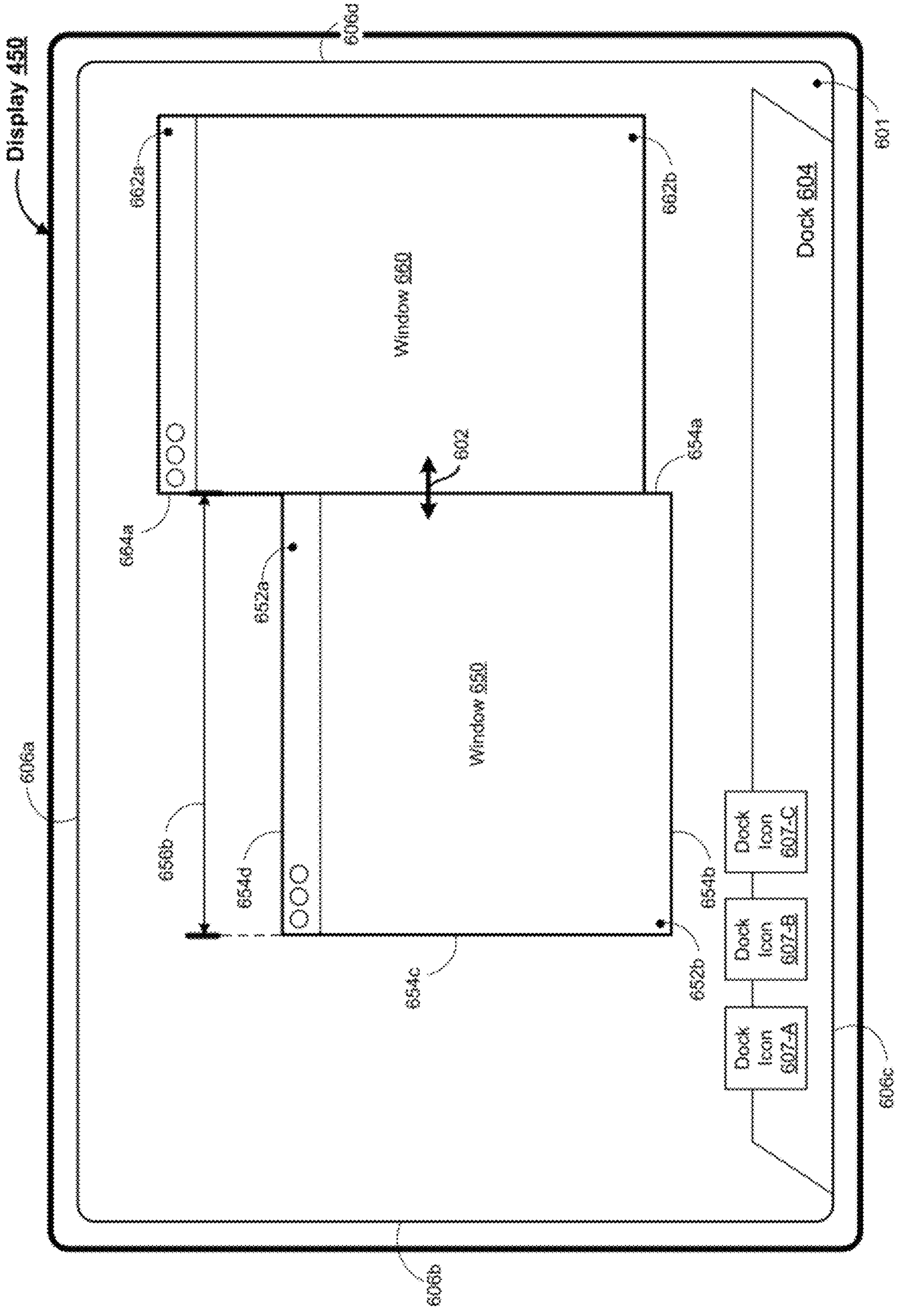
Figure 6S:
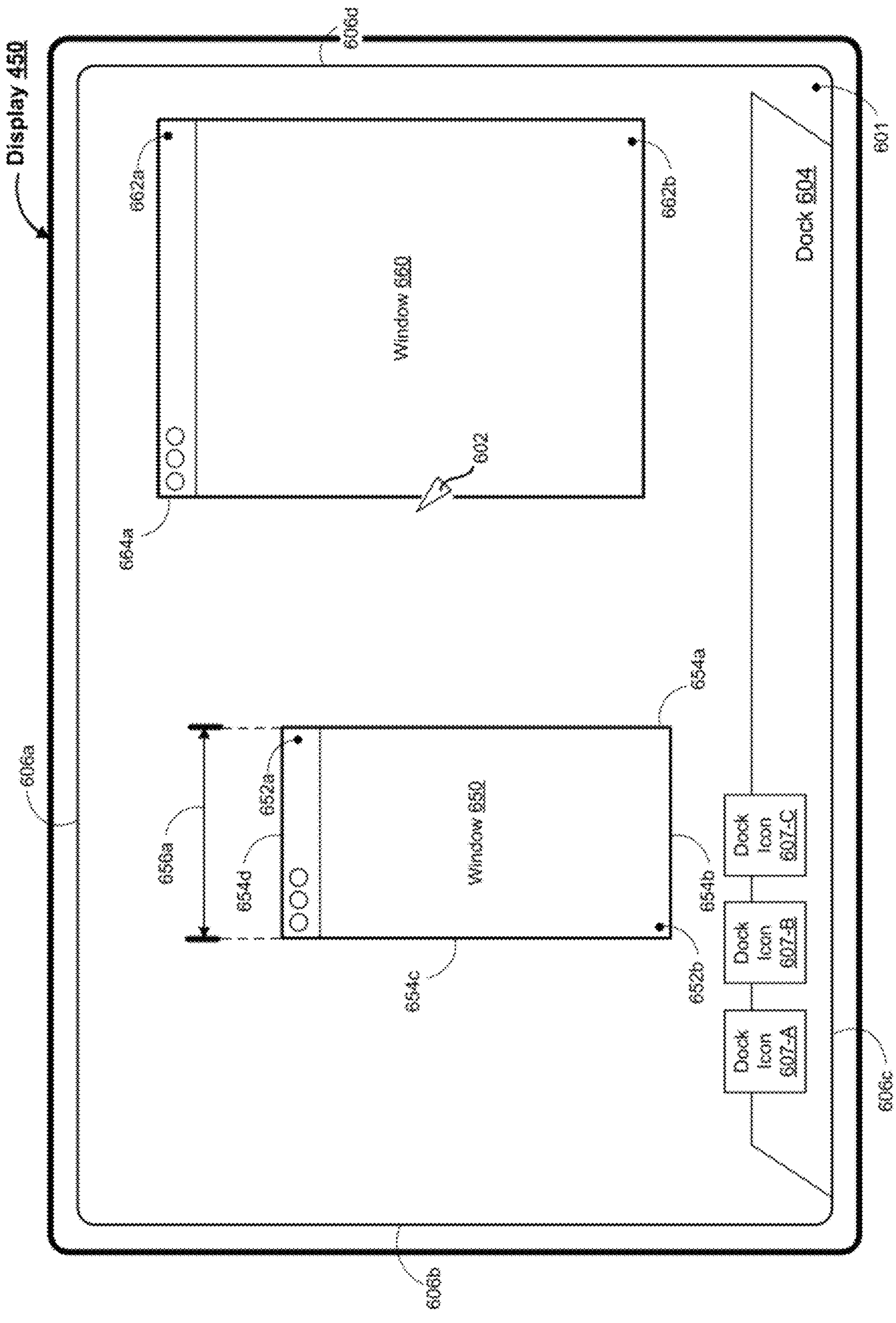
Figure 6T:
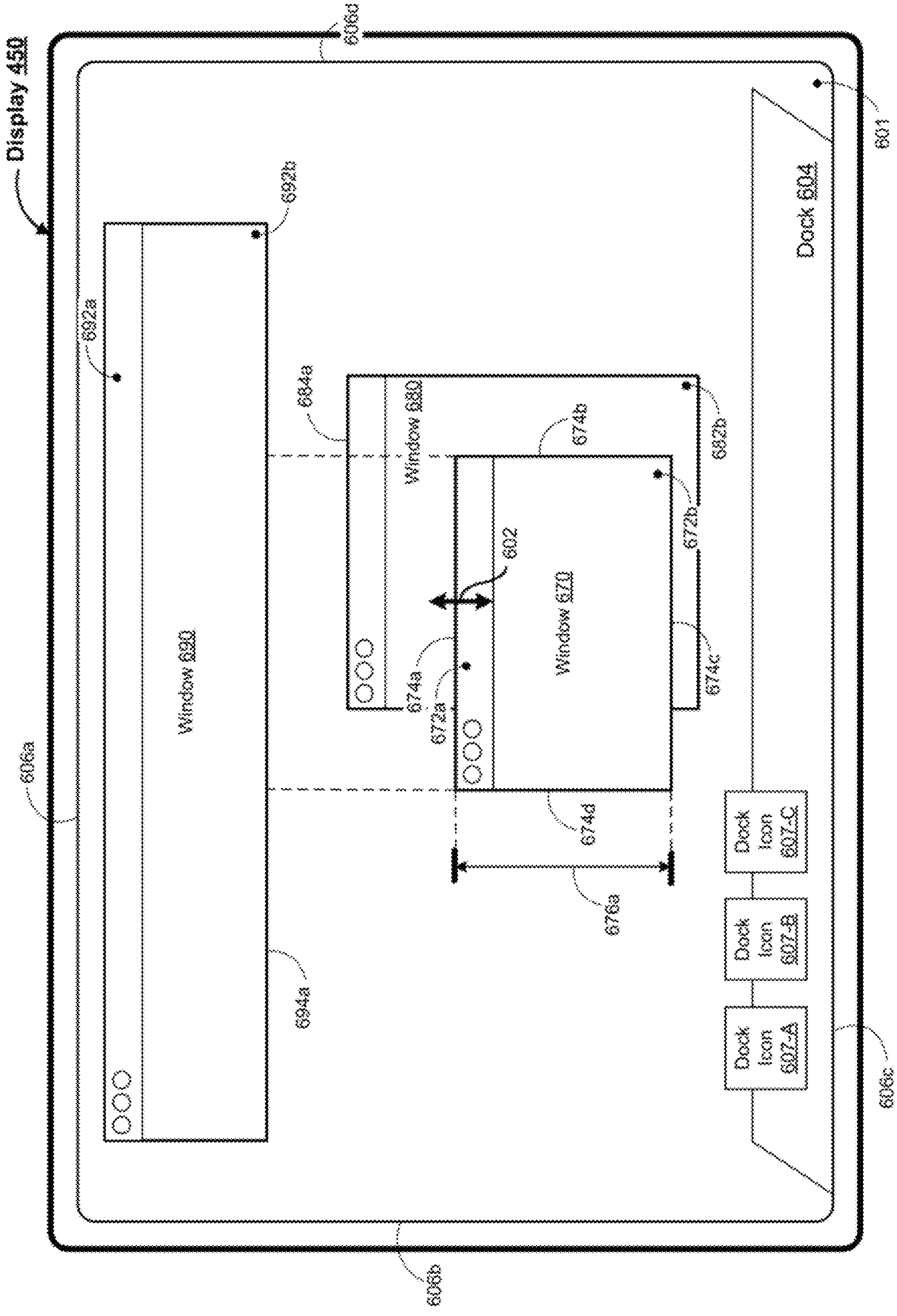
Figure 6U:
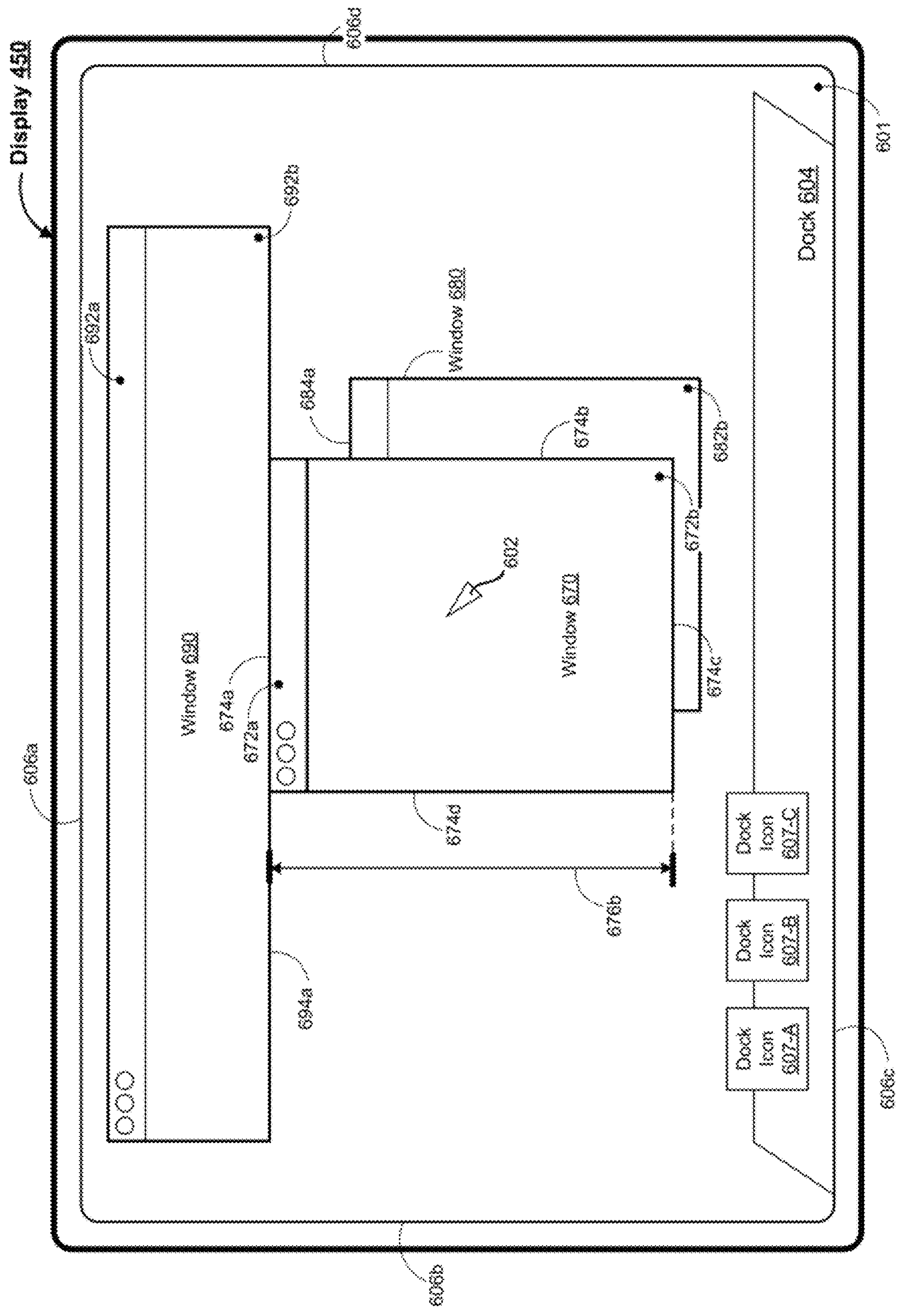
Figure 6V:
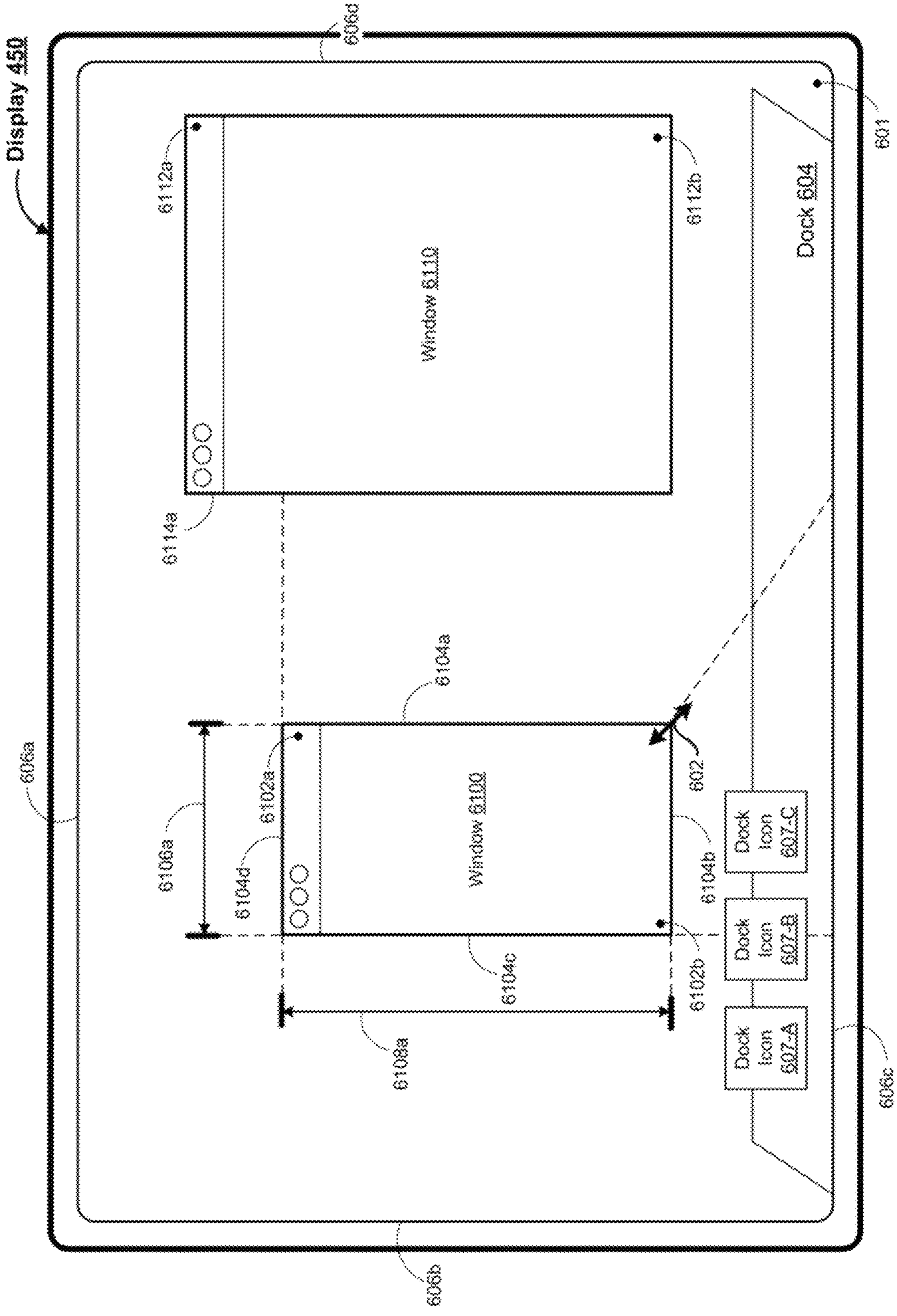
Figure 6W:
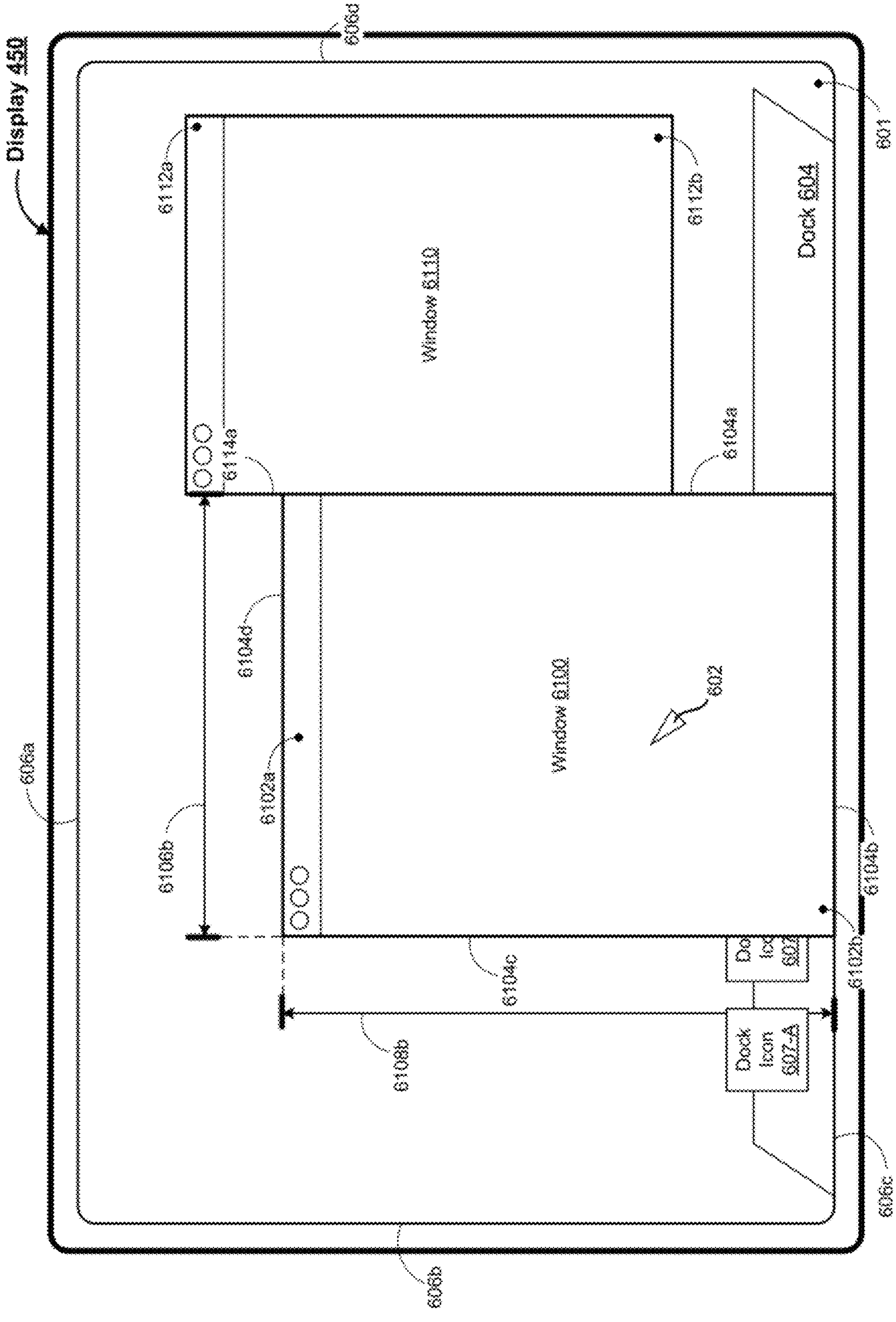
Figure 6X:
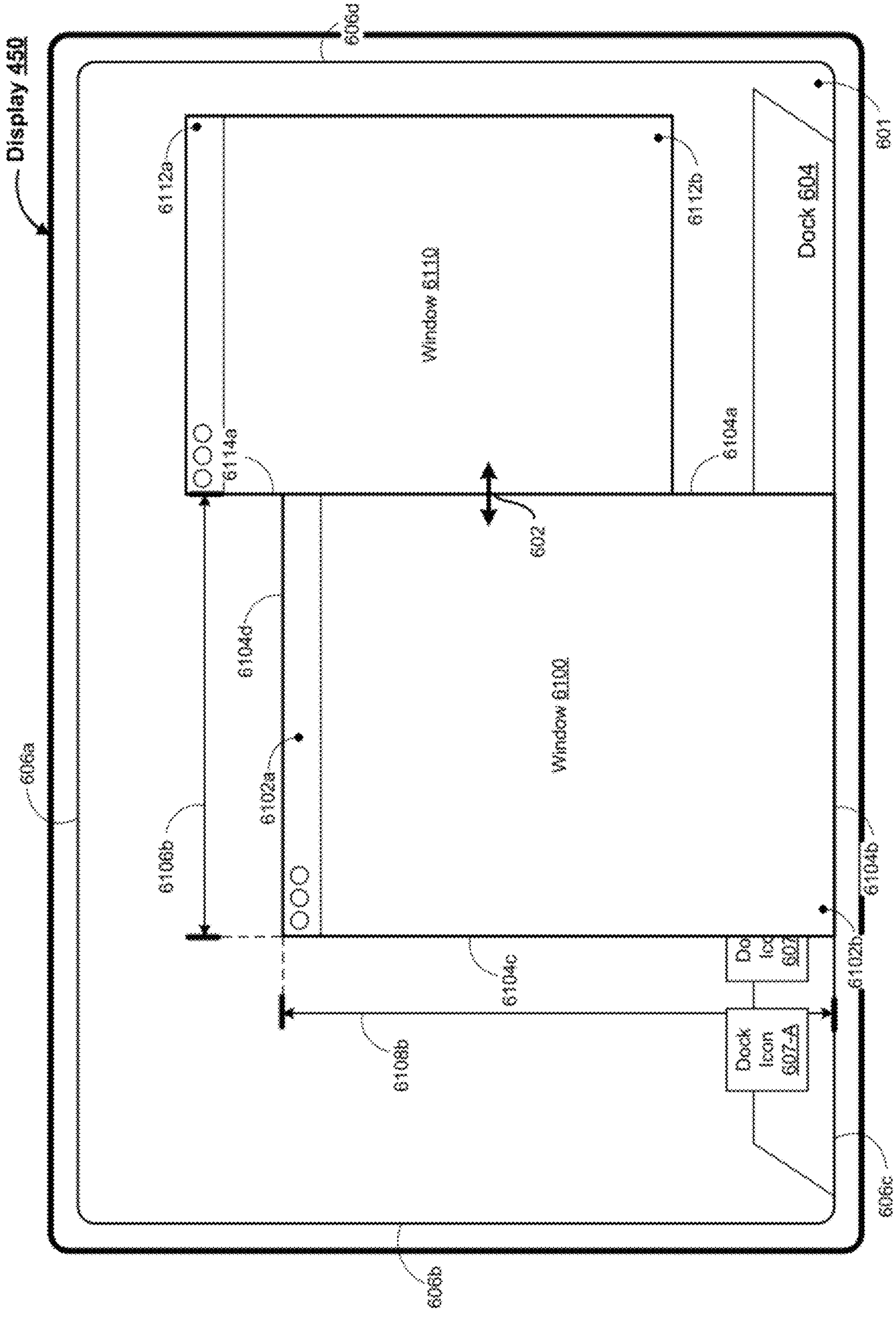
Figure 6Y:
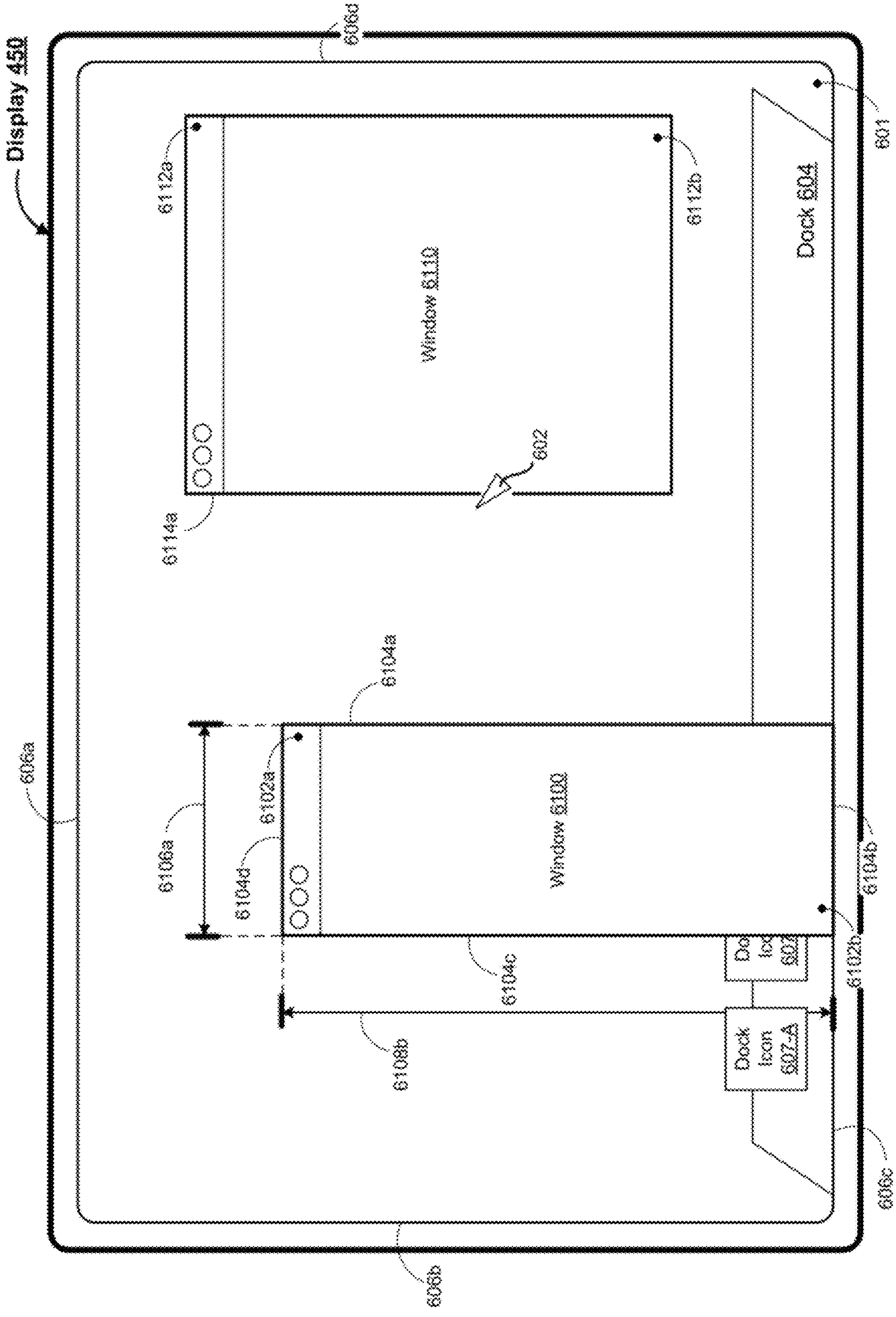

FIGS. 6A-6Y illustrate example user interfaces for resizing windows in accordance with some embodiments. The user interfaces in these figures are used to illustrate the processes described below, including the processes in FIGS. 9A-9D. Although some of the examples which follow will be given with reference to inputs on a touch-sensitive surface 451 that is separate from the display 450, in some embodiments, the device detects inputs on a touch-screen display (where the touch-sensitive surface and the display are combined), as shown in FIG. 4A.

FIGS. 6A-6G show a window 610 displayed within a display area 601 of the display 450. As shown in FIGS. 6A-6G, the window 610 includes a chrome region 612*a* and a content region 612*b*. The window 610 has a left edge 614*a*, a top edge 614*b*, a right edge 614*c*, and a bottom edge 614*d*. For example, the window 610 corresponds to a first application. FIGS. 6A-6Y show a dock 604 within the display area 601 with a plurality of dock icons 607-A, 607-B, and 607-C corresponding to different applications. In FIGS. 6A-6Y, the display area 601 includes a top edge 606*a*, a left edge 606*b*, a bottom edge 606*c*, and a right edge 606*d*.

FIGS. 6A-6B illustrate a sequence in which two edges of the window 610 move to corresponding edges of the display area 601 (e.g., so as to expand two dimensions of the window) in response to a second input type (e.g., a stationary input such as a double click) with the focus selector 602 on a corner of the window 610. FIG. 6A illustrates the focus selector 602 over the corner of the window 610 that is associated with the intersection of the left edge 614*a* and the top edge 614*b* of the window 610. In some embodiments, the focus selector 602 is displayed as a double headed arrow when positioned over an edge of a window to indicate that the user is interacting with the edge of the window. In some embodiments, the focus selector 602 is displayed as a cursor when positioned inside the chrome region of a window, inside the content region of a window, or outside of a window within the display area 601.

As shown in FIG. 6B, the left edge 614*a* of the window 610 moves to the left edge 606*b* of the display area 601, and the top edge 614*b* of the window 610 moves to the top edge 606*a* of the display area 601 in response to the double click with the focus selector 602 on the corner of the window 610 in FIG. 6A. As shown in FIG. 6B, the right edge 614*c* of the window 610 does not move to the right edge 606*d* of the display area 601, and the bottom edge 614*d* of the window 610 does not move to the bottom edge 606*c* of the display area 601. As shown in FIGS. 6A-6B, the position of the focus selector 602 does not change due to the stationary input in FIG. 6A.

In some embodiments, an outline of the expanded dimensions of the window 610 are shown within the display area 601 (e.g., as shown by the dotted lines in FIG. 6A). The first dimension (e.g., the width) of the window 610 has a value 616*a* in FIG. 6A and a value 616*b* in FIG. 6B. For example, the value 616*b* is greater than the value 616*a*. Similarly, the second dimension (e.g., the height) of the window 610 has a value 618*a* in FIG. 6A and a value 618*b* in FIG. 6B. For example, the value 618*b* is greater than the value 618*a*.

FIGS. 6C-6D illustrate a sequence in which the two edges of the window 610 move to their former positions in response to a second input type (e.g., a stationary input such as a double click) with the focus selector 602 on a corner of the window 610. FIG. 6C illustrates the focus selector 602 over the corner of the window 610 that is associated with the intersection of the left edge 614*a* and the top edge 614*b*. As shown in FIG. 6D, the left edge 614*a* of the window 610 and the top edge of the window 610 move to their former positions in FIG. 6A in response to the double click with the focus selector 602 on the corner of the window 610 in FIG. 6C. As shown in FIGS. 6C-6D, the position of the focus selector 602 does not change due to the stationary input in FIG. 6C. The first dimension (e.g., the width) of the window 610 has the value 616*b* in FIG. 6C and the value 616*a* in FIG. 6D. For example, the value 616*b* is greater than the value 616*a*. Similarly, the second dimension (e.g., the height) of the window 610 has the value 618*b* in FIG. 6C and the value 618*a* in FIG. 6D. For example, the value 618*b* is greater than the value 618*a*.

FIGS. 6E-6G illustrate a sequence in which two dimensions of the window 610 are resized in response to a first input type (e.g., a selection followed by movement such as a click and drag gesture) with the focus selector 602 on a corner of the window 610. FIG. 6E illustrates dragging the corner of the window 610 that is associated with the intersection of the right edge 614*c* and the top edge 614*b* with the focus selector 602 according to a movement vector 615. As shown in FIGS. 6F-6G, the first dimension (e.g., the width) of the window 610 expands and the second dimension (e.g., the height) of the window 610 expands according to the movement vector 615 in FIG. 6E that drags the corner of the window 610 that is associated with the intersection of the right edge 614*c* and the top edge 614*b*.

The first dimension (e.g., the width) of the window 610 has the value 616*a* in FIG. 6E, the value 616*c* in FIG. 6F, and the value 616*d* in FIG. 6G. For example, the value 616*d* is greater than the value 616*c*, which is greater than the value 616*a*. Similarly, the second dimension (e.g., the height) of the window 610 has the value 618*a* in FIG. 6E, the value 618*c* in FIG. 6F, and the value 618*d* in FIG. 6G. For example, the value 618*d* is greater than the value 618*c*, which is greater than the value 618*a*.

FIGS. 6H-6K show a window 620 and a window 630 displayed within a display area 601 of the display 450. For example, the window 620 corresponds to a first application, and the window 630 corresponds to a second application different from the first application. For example, the window 620 and the window 630 correspond to a same application. As shown in FIGS. 6H-6K, the window 620 includes a chrome region 622*a* and a content region 622*b*, and the window 620 has a right edge 624*a* and a left edge 624*b*. Similarly, the window 630 includes a chrome region 632*a* and a content region 632*b*, and the window 630 has a right edge 634*a*.

FIGS. 6H-6J illustrate a sequence in which a respective dimension (e.g., the width) of the window 620 is resized in a first direction (e.g., left-to-right) in response to a user input with the focus selector 602 on an edge of the window 610 that corresponds to the first input type (e.g., a selection followed by movement such as a click and drag gesture).

FIG. 6H illustrates dragging the right edge 624*a* of the window 620 toward the right edge 606*d* of the display area 601 with the focus selector 602 according to a movement vector 625. As shown in FIGS. 6H-6J, the first dimension (e.g., the width) of the window 620 is extended to the right edge 606*d* of the display area 601 in the first direction (e.g., left-to-right) according to the user input that drags the right edge 624*a* of the window 620 to the right edge 606*d* of the display area 601. The first dimension (e.g., the width) of the window 620 has the value 626*a* in FIG. 6H, the value 626*b* in FIG. 6I, and the value 626*c* in FIG. 6J. For example, the value 626*c* is greater than the value 626*b*, which is greater than the value 626*a*.

FIGS. 6J-6K illustrate a sequence in which the respective dimension (e.g., the width) of the window 620 is resized in a second direction (e.g., right-to-left) when the user input with the focus selector 602 that corresponds to the first input type (e.g., a selection followed by movement such as a click and drag gesture) satisfies one or more expansion criteria. FIG. 6J illustrates maintaining the focus selector 602 at the right edge 606*d* of the display area 601. For example, the user input holds the right edge 624*a* of the window 620 at the right edge of the display area 601 after dragging the right edge 624*a* of the window 620 to the right edge 606*d* of the display area 601 in FIG. 6J. In some embodiments, the one or more expansion criteria are satisfied when the click and drag input holds an edge of a window at an edge of the display area for a predefined time duration. In some embodiments, the one or more expansion criteria are satisfied when the magnitude of the click and drag input moves an edge of a window a predefined distance over an edge of the display area. In some embodiments, when the window is moved (or resized) based on an input from a device with a tactile output generator (e.g., a trackpad with a tactile output generator), a tactile output is generated when the window (e.g., window 620) is expanded (e.g., based on the satisfaction of expansion criteria such as when the click and drag input holds an edge of a window at an edge of the display area for a predefined time duration) to a boundary in the user interface (e.g., an edge of another window or an edge of the display area). In contrast, in some embodiments, if the window is not expanded (e.g., because the input moving or resizing the window does not meet the expansion criteria), then no tactile output is generated to indicate that the window has been expanded to the boundary in the user interface.

As shown in FIG. 6K, the first dimension (e.g., the width) of the window 620 is extended to the right edge 634*a* of the window 630 in the second direction (e.g., right-to-left) when the user input satisfies the one or more expansion criteria in FIG. 6G. For example, the left edge 624*b* of the window 620 expands to the right edge 634*a* of the window 630. For example, assuming that the window 630 was not located between the left edge 624*b* of the window 620 and the left edge 606*b* of the display area 601, the left edge 624*b* of the window 620 would move to the left edge 606*b* of the display area 601. Thus, in FIG. 6K, the extension of first dimension of the window 620 in the second direction is constrained by the intervening window 630. The first dimension (e.g., the width) of the window 620 has the value 626*c* in FIG. 6J and the value 626*d* in FIG. 6K. For example, the value 626*d* is greater than the value 626*c*.

FIGS. 6L-6O show a window 640 displayed within a display area 601 of the display 450. As shown in FIGS. 6L-6O, the window 640 includes a chrome region 642*a* and a content region 642*b*. The window 640 has a right edge 644*a*, a top edge 644*b*, a left edge 644*c*, and a bottom edge 644*d*. For example, the window 640 corresponds to a first application.

FIGS. 6L-6M illustrate a sequence in which a first edge of the window 640 moves to a corresponding first edge of the display area 601 in response to the second input type (e.g., a stationary input such as a double click) with the focus selector 602 on the first edge of the window 640. FIG. 6L illustrates the focus selector 602 over the right edge 644*a* of the window 640.

As shown in FIG. 6M, the right edge 644*a* of the window 640 moves to the right edge 606*d* of the display area 601 in response to the double click with the focus selector 602 on the right edge 644*a* of the window 640 in FIG. 6L. As shown in FIG. 6M, the top edge 644*b* of the window 640 does not move to the top edge 606*a* of the display area 601, the left edge 644*c* of the window 610 does not move to the left edge 606*b* of the display area 601, the bottom edge 644*d* of the window 610 does not move to the bottom edge 606*c* of the display area 601. As shown in FIGS. 6L-6M, the position of the focus selector 602 does not change due to the stationary input in FIG. 6L.

In some embodiments, an outline of the expanded dimensions of the window 640 are shown within the display area 601 (e.g., as shown in FIG. 6L). The first dimension (e.g., the width) of the window 610 has a value 646*a* in FIG. 6L and a value 646*b* in FIG. 6M. For example, the value 646*b* is greater than the value 646*a*.

FIGS. 6N-6O illustrate a sequence in which a second edge of the window 640 moves to corresponding second edge of the display area 601 in response to the second input type (e.g., a stationary input such as a double click) with the focus selector 602 on the second edge of the window 640. FIG. 6N illustrates the focus selector 602 over the top edge 644*b* of the window 640.

As shown in FIG. 6O, the top edge 644*b* of the window 640 moves to the top edge 606*a* of the display area 601 in response to the double click with the focus selector 602 on the top edge 644*b* of the window 640 in FIG. 6N. As shown in FIG. 6O, the left edge 644*c* of the window 610 does not move to the left edge 606*b* of the display area 601, and the bottom edge 644*d* of the window 610 does not move to the bottom edge 606c of the display area 601. As shown in FIGS. 6N-6O, the position of the focus selector 602 does not change due to the stationary input in FIG. 6N.

In some embodiments, an outline of the expanded dimensions of the window 640 are shown within the display area 601 (e.g., as shown in FIG. 6N). The second dimension (e.g., the height) of the window 640 has a value 648a in FIG. 6N and a value 648b in FIG. 6O. For example, the value 648b is greater than the value 648a.

FIGS. 6P-6S show a window 650 and a window 660 displayed within a display area 601 of the display 450. For example, the window 650 corresponds to a first application, and the window 660 corresponds to a second application different from the first application. For example, the window 650 and the window 660 correspond to a same application. As shown in FIGS. 6P-6S, the window 650 includes a chrome region 652a and a content region 652b, and the window 650 has a right edge 654a, a bottom edge 654b, a left edge 654c, and a top edge 654d. Similarly, the window 660 includes a chrome region 662a and a content region 662b, and the window 660 has a right edge 664a.

FIGS. 6P-6Q illustrate a sequence in which an edge of the window 650 moves to an intervening edge of the window 660, which is between the edge of the window 650 and a corresponding edge of the display area 601, in response to the second input type (e.g., a stationary input such as a double click) with the focus selector 602 on the edge of the window 650. FIG. 6P illustrates the focus selector 602 over the right edge 654a of the window 650.

As shown in FIG. 6Q, the right edge 654a of the window 650 moves to the right edge 664a of the window 660 in response to the double click with the focus selector 602 on the right edge 654a of the window 650 in FIG. 6P. As shown in FIG. 6Q, the bottom edge 654b of the window 650 does not move to the bottom edge 606c of the display area 601, the left edge 654c of the window 650 does not move to the left edge 606b of the display area 601, and the top edge 654d of the window 650 does not move to the top edge 606a of the display area 601. As shown in FIGS. 6P-6Q, the position of the focus selector 602 does not change due to the stationary input in FIG. 6P. In some embodiments, an outline of the expanded dimensions of the window 650 are shown within the display area 601 (e.g., as shown in FIG. 6P).

For example, assuming that the window 660 was not located between the right edge 654a of the window 650 and the right edge 606d of the display area 601, the right edge 654a of the window 650 would move to the right edge 606d of the display area 601. Thus, in FIG. 6Q, the movement of the right edge 654a of the window 650 is constrained by the intervening window 660. The first dimension (e.g., the width) of the window 650 has a value 656a in FIG. 6P and a value 656b in FIG. 6Q. For example, the value 656b is greater than the value 656a.

FIGS. 6R-6S illustrate a sequence in which the edge of the window 650 moves to its former position in response to the second input type (e.g., a stationary input such as a double click) with the focus selector 602 on the edge of the window 650. FIG. 6R illustrates the focus selector 602 over the right edge 654a of the window 650. As shown in FIG. 6S, the right edge 654a of the window 650 moves to its former position in FIG. 6P in response to the double click with the focus selector 602 on the right edge 654a of the window 650 in FIG. 6R. As shown in FIGS. 6R-6S, the position of the focus selector 602 does not change due to the stationary input in FIG. 6R. The first dimension (e.g., the width) of the window 650 has the value 656b in FIG. 6R and the value 656a in FIG. 6S. For example, the value 656b is greater than the value 656a.

FIGS. 6T-6U show a window 670, a window 680, and a window 690 displayed within a display area 601 of the display 450. For example, the window 670 corresponds to a first application, the window 680 corresponds to a second application, and the window 690 corresponds to a third application. For example, the window 670, the window 680, and the window 690 correspond to a same application. As shown in FIGS. 6T-6U, the window 670 includes a chrome region 672a and a content region 672b, and the window 670 has a top edge 674a, a right edge 674b, a bottom edge 674c, and a left edge 674d. Similarly, the window 680 includes a chrome region 682a and a content region 682b, and the window 680 has a top edge 684a. Similarly, the window 690 includes a chrome region 692a and a content region 692b, and the window 690 has a bottom edge 694a. As shown in FIG. 6R, the window 670 at least partially overlaps the window 680.

FIGS. 6T-6U illustrate a sequence in which an edge of the window 670 moves to an intervening edge of the window 690, which is between the edge of the window 670 and a corresponding edge of the display area 601, in response to the second input type (e.g., a stationary input such as a double click) with the focus selector 602 on the edge of the window 670. FIG. 6T illustrates the focus selector 602 over the top edge 674a of the window 670.

As shown in FIG. 6U, the top edge 674a of the window 670 moves to the bottom edge 694a of the window 690 in response to the double click with the focus selector 602 on the top edge 674a of the window 670 in FIG. 6T. As shown in FIG. 6U, the right edge 674b of the window 670 does not move to the right edge 606d of the display area 601, the bottom edge 674c of the window 670 does not move to the bottom edge 606c of the display area 601, and the left edge 674d of the window 670 does not move to the left edge 606b of the display area 601. As shown in FIGS. 6T-6U, the position of the focus selector 602 does not change due to the stationary input in FIG. 6T. In some embodiments, an outline of the expanded dimensions of the window 670 are shown within the display area 601 (e.g., as shown in FIG. 6T).

For example, assuming that the window 690 was not located between the top edge 674a of the window 670 and the top edge 606a of the display area 601, the top edge 674a of the window 670 would move to the top edge 606a of the display area 601. Thus, in FIG. 6U, the movement of the top edge 674a of the window 670 is constrained by the intervening window 690.

Moreover, the top edge 674a of the window 670 is not constrained by the top edge 684a of the window 680 because the window 670 at least partially overlaps the window 680 prior to the double click with the focus selector 602 on the top edge 674a of the window 670 in FIG. 6T. As such, the movement of the top edge 674a of the window 670 is constrained by the intervening window 690 but not by the overlapped (background) window 680. Similarly, in some embodiments, the movement of edges of windows to edges of the display area are not constrained by occluded edges of windows. The first dimension (e.g., the width) of the window 670 has a value 676a in FIG. 6T and a value 676b in FIG. 6U. For example, the value 676b is greater than the value 676a.

FIGS. 6V-6Y show a window 6100 and a window 6110 displayed within a display area 601 of the display 450. For example, the window 6100 corresponds to a first application, and the window 6110 corresponds to a second application different from the first application. For example, the window 6100 and the window 6110 correspond to a same application. As shown in FIGS. 6V-6Y, the window 6100 includes a chrome region 6102*a* and a content region 6102*b*, and the window 6100 has a right edge 6104*a*, a bottom edge 6104*b*, a left edge 6104*c*, and a top edge 6104*d*. Similarly, the window 6110 includes a chrome region 6112*a* and a content region 6112*b*, and the window 6110 has a left edge 6114*a*.

FIGS. 6V-6Y illustrate a sequence in which two edges of the window 6100 move to corresponding edges of the display area 601 in response to a second input type (e.g., a stationary input such as a double click) with the focus selector 602 on a corner of the window 6100. FIG. 6V illustrates the focus selector 602 over the corner of the window 6100 that is associated with the intersection of the right edge 6104*a* and the bottom edge 6104*b* of the window 6100.

As shown in FIG. 6W, the right edge 6104*a* of the window 6100 moves to the left edge 6114*a* of the window 6110, and the bottom edge 6104*b* of the window 6100 moves to the bottom edge 606*c* of the display area 601 in response to the double click with the focus selector 602 on the corner of the window 6100 in FIG. 6V. As shown in FIG. 6W, the left edge 6104*c* of the window 6100 does not move to the left edge 606*b* of the display area 601, and the top edge 6104*d* of the window 6100 does not move to the top edge 606*a* of the display area 601. As shown in FIGS. 6V-6W, the position of the focus selector 602 does not change due to the stationary input in FIG. 6W. In some embodiments, an outline of the expanded dimensions of the window 6100 are shown within the display area 601 (e.g., as shown in FIG. 6V).

In some embodiments, the expansion of dimensions of windows to edges of the display area are not constrained by the dock 604. In some embodiments, the expansion of dimensions of windows to edges of the display area are constrained by the dock 604.

For example, assuming that the window 6110 was not located between the right edge 6104*a* of the window 6100 and the right edge 606*d* of the display area 601, the right edge 6104*a* of the window 6100 would move to the right edge 606*d* of the display area 601. Thus, in FIG. 6W, the movement of the right edge 6104*a* of the window 6100 is constrained by the intervening window 6110. The first dimension (e.g., the width) of the window 6100 has a value 6106*a* in FIG. 6V and a value 6106*b* in FIG. 6W. For example, the value 6106*b* is greater than the value 6106*a*. Similarly, the second dimension (e.g., the height) of the window 6100 has a value 6108*a* in FIG. 6V and a value 6108*b* in FIG. 6W. For example, the value 6108*b* is greater than the value 6108*a*.

FIGS. 6X-6Y illustrate a sequence in which an edge of the window 6100 moves to its former position in response to the second input type (e.g., a stationary input such as a double click) with the focus selector 602 over the edge of the window 6100. As shown in FIG. 6Y, the right edge 6104*a* of the window 6100 moves to its former position in FIG. 6V in response to the double click with the focus selector 602 on the right edge 6104*a* of the window 6100. Furthermore, as shown in FIG. 6Y, the bottom edge 6104*b* of the window 6100 maintains its position in response to the double click with the focus selector 602 on the right edge 6104*a* of the window 6100. As shown in FIGS. 6X-6Y, the position of the focus selector 602 does not change due to the stationary input in FIG. 6X. The first dimension (e.g., the width) of the window 6100 has the value 6106*b* in FIG. 6X and the value 6106*a* in FIG. 6Y. For example, the value 6106*b* is greater than the value 6106*a*.

Figure 7A:
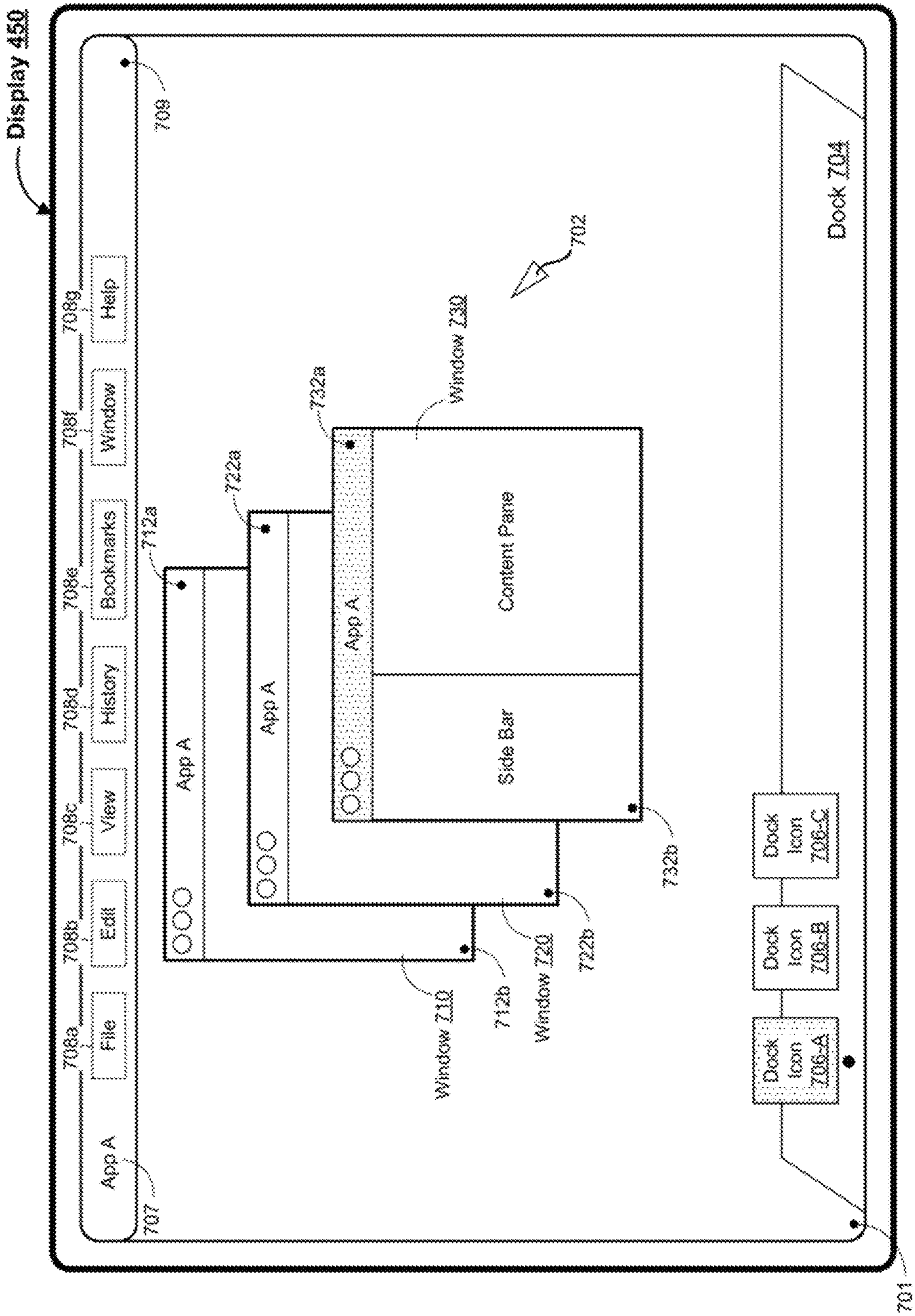
FIGS. 7A-7R illustrate example user interfaces for providing tabbed window functionality in accordance with some embodiments.
Figure 7B:
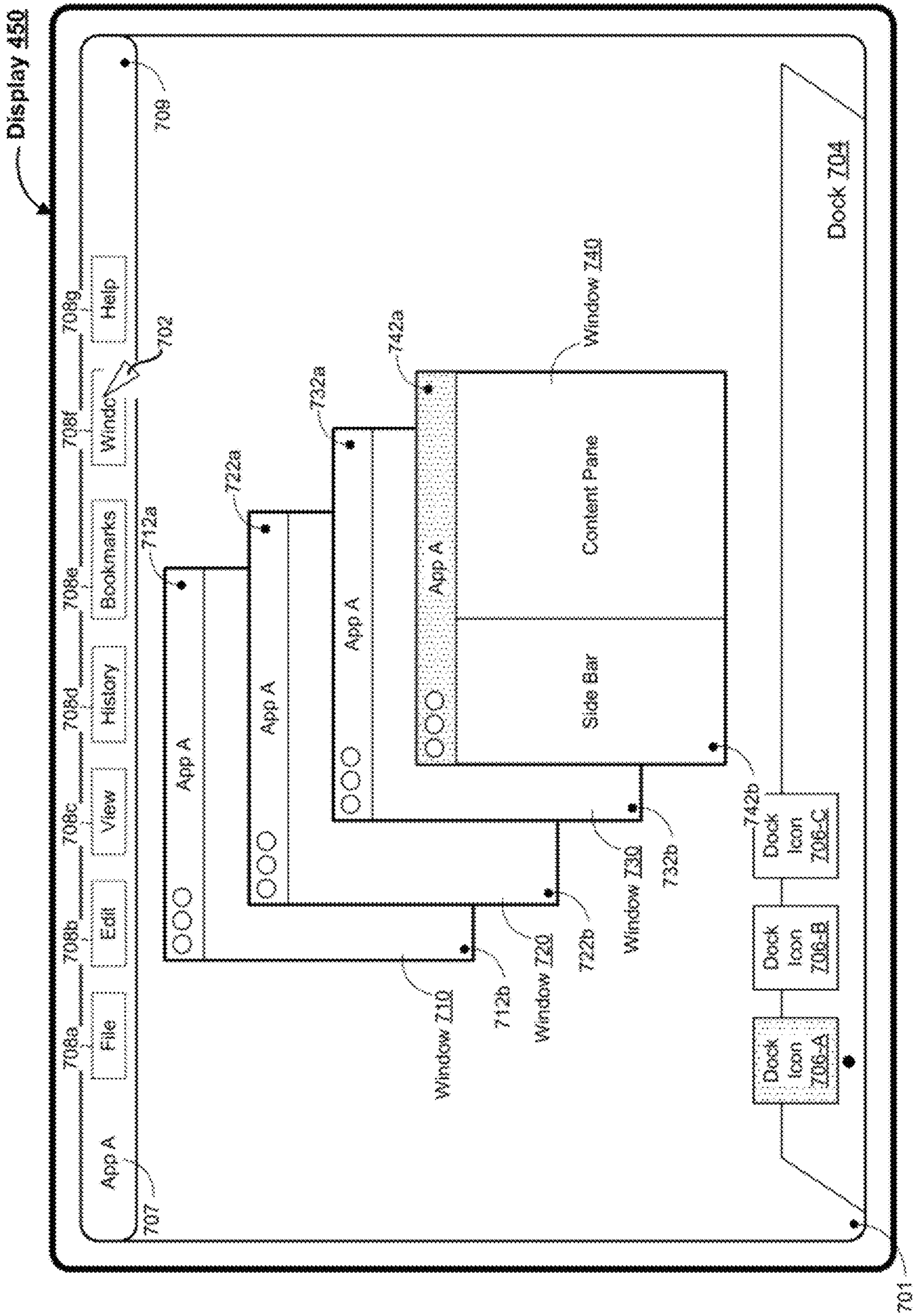
Figure 7C:
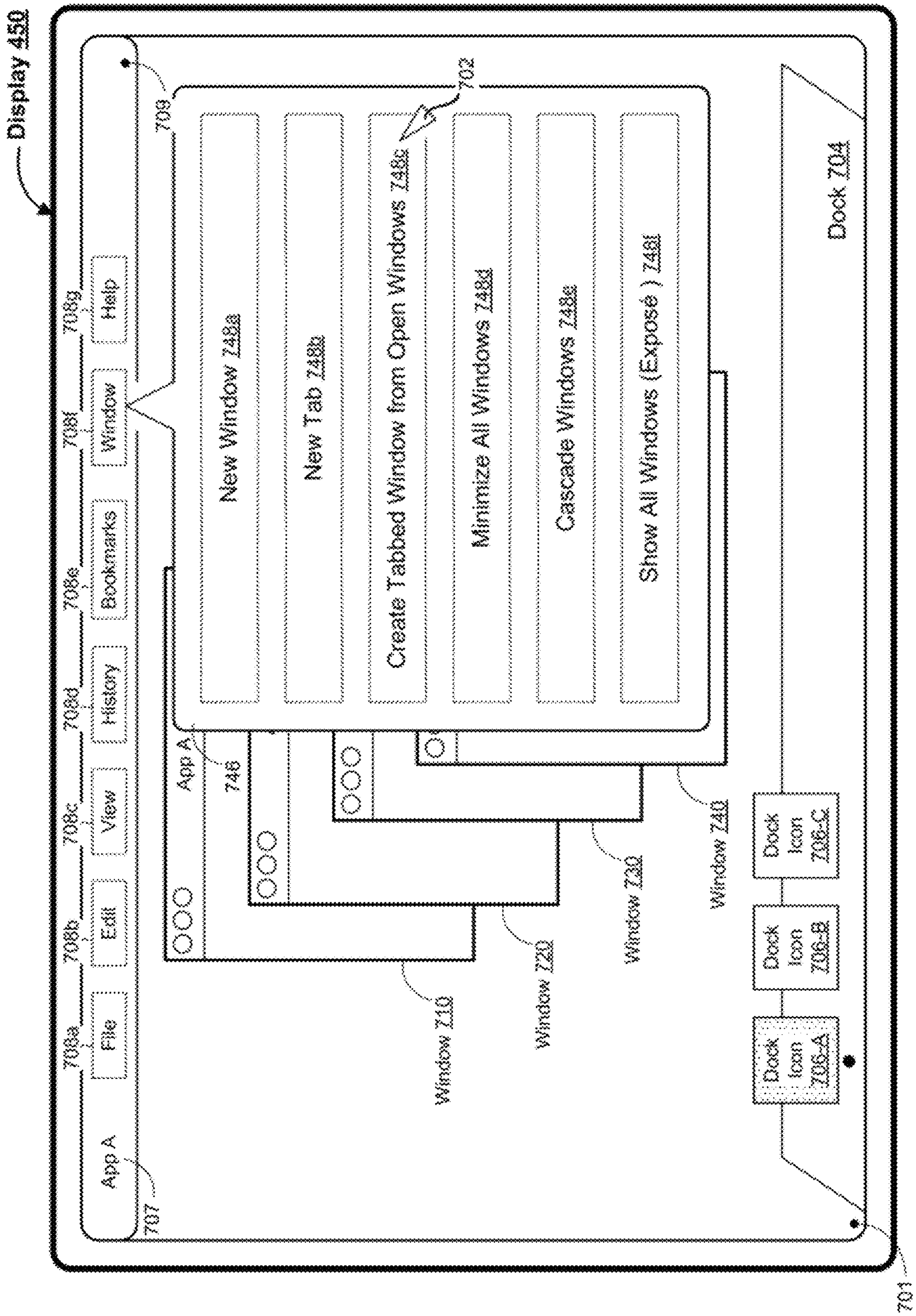
Figure 7D:
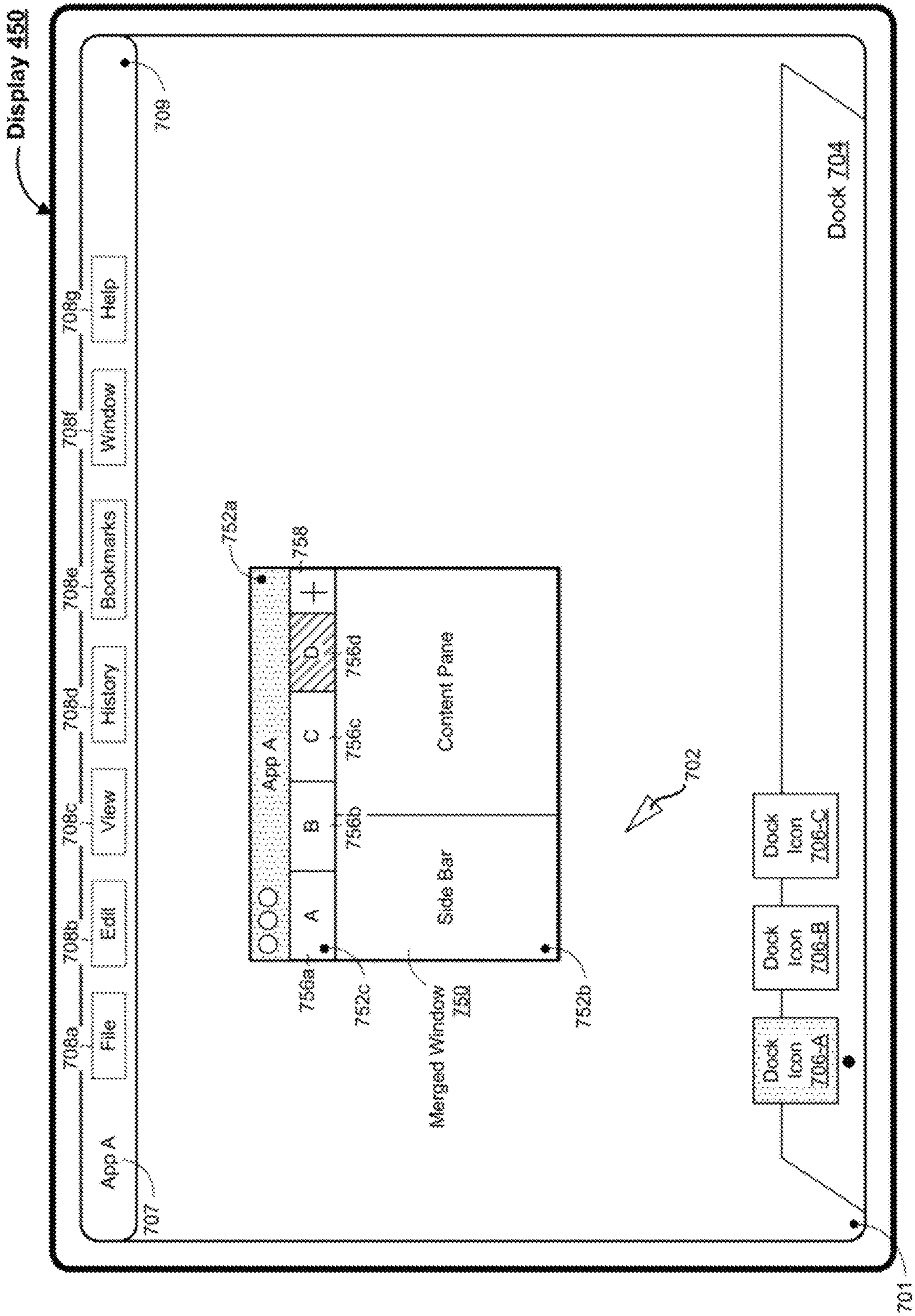
Figure 7E:
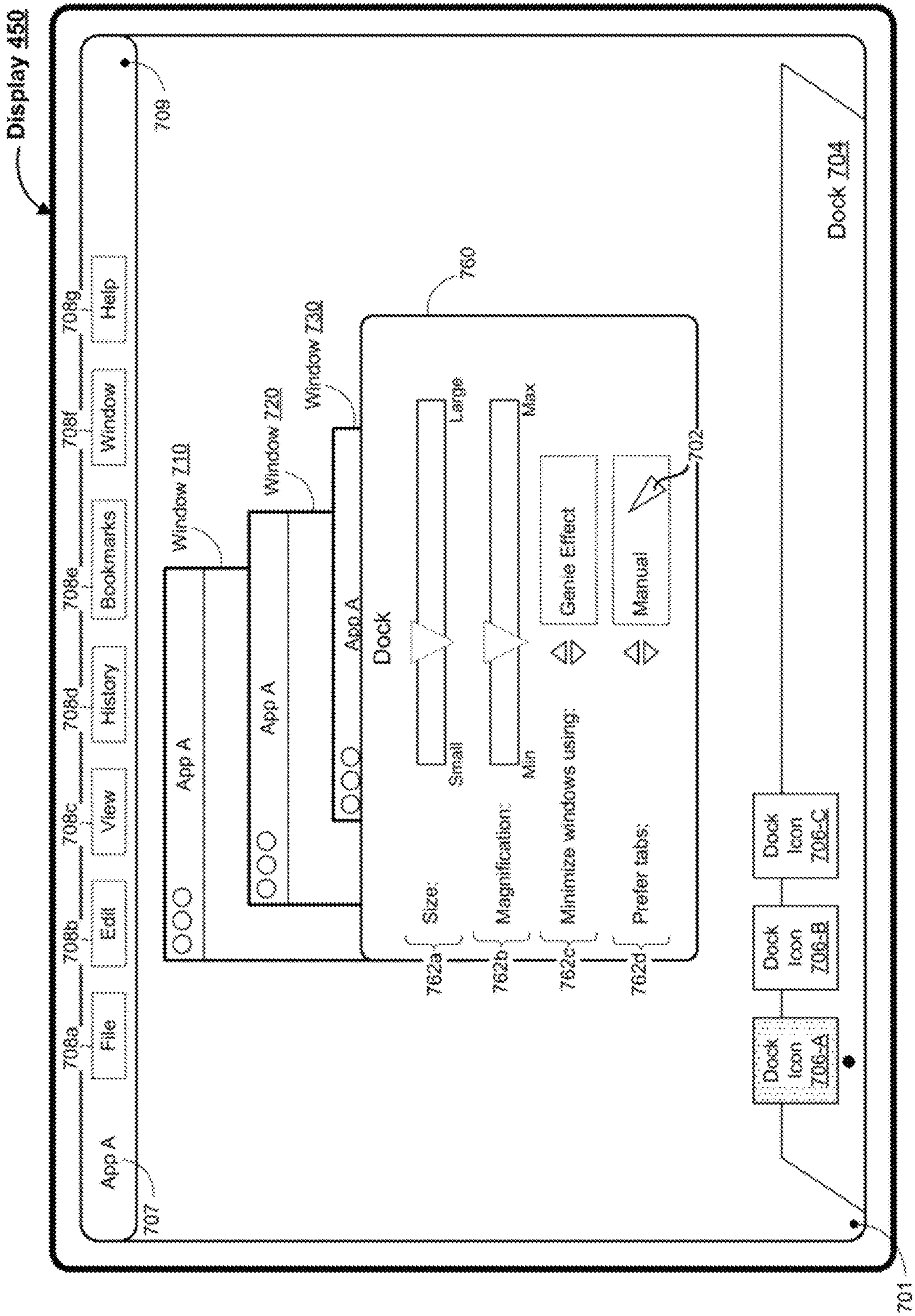
Figure 7F:
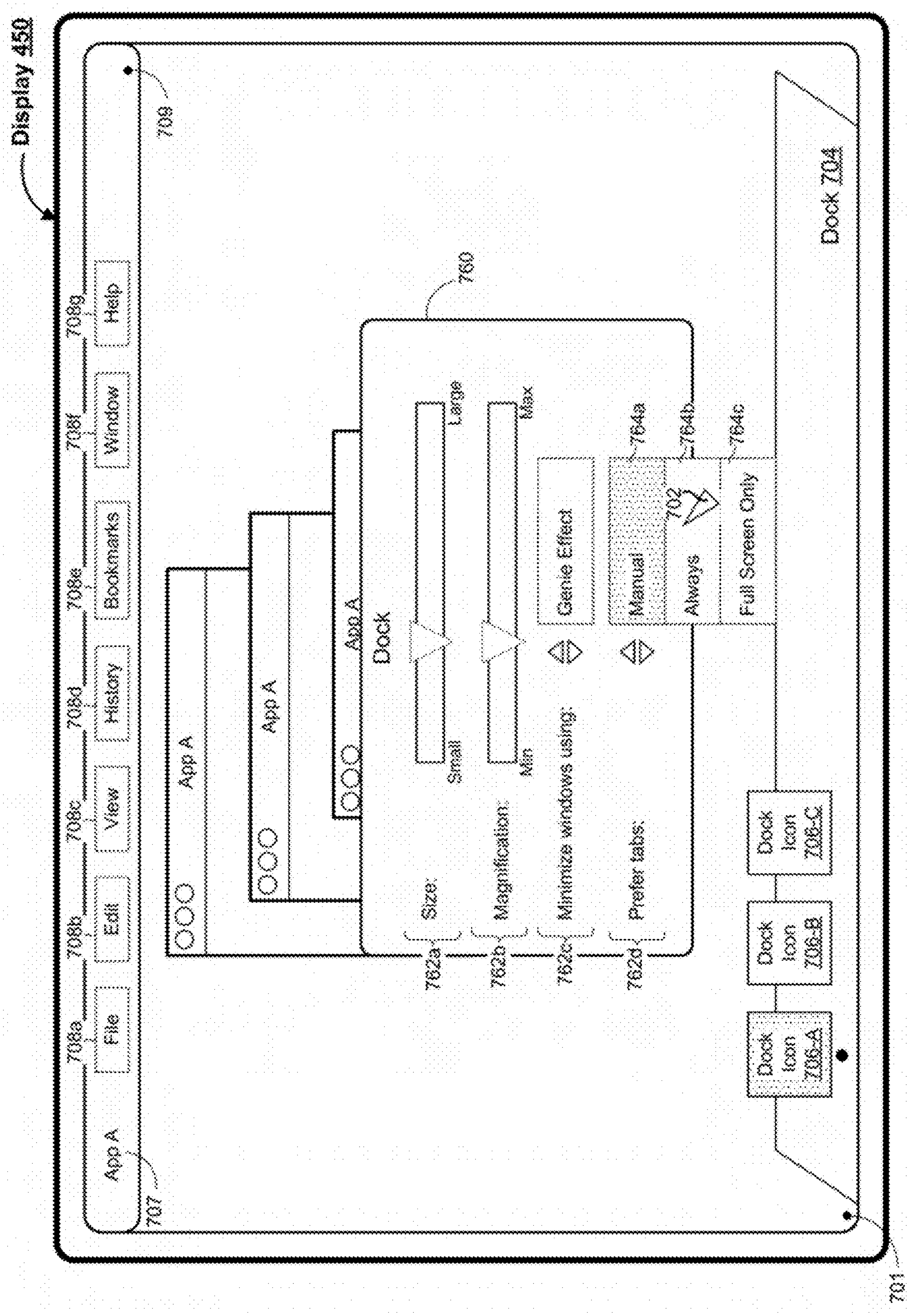
Figure 7G:
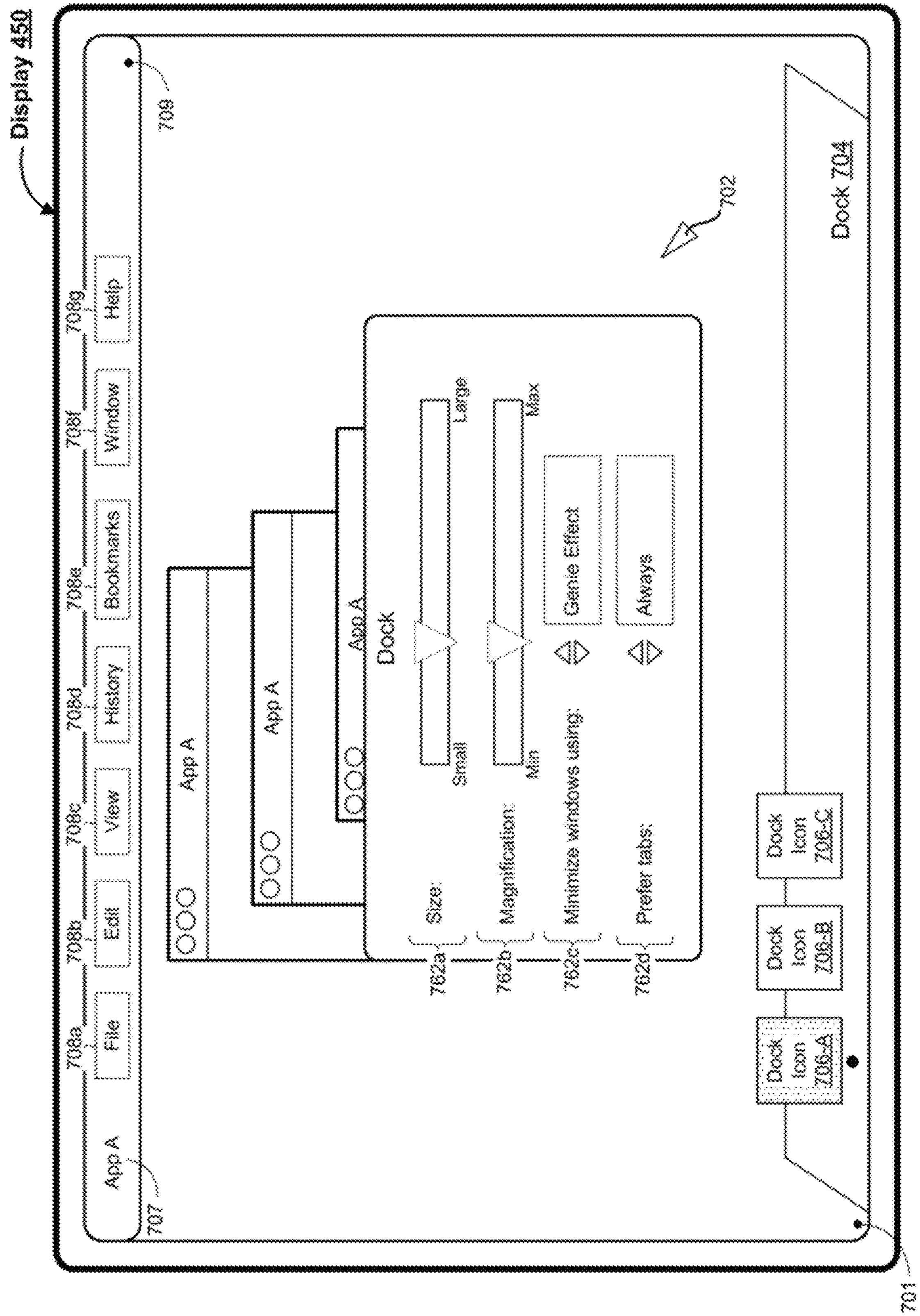
Figure 7H:
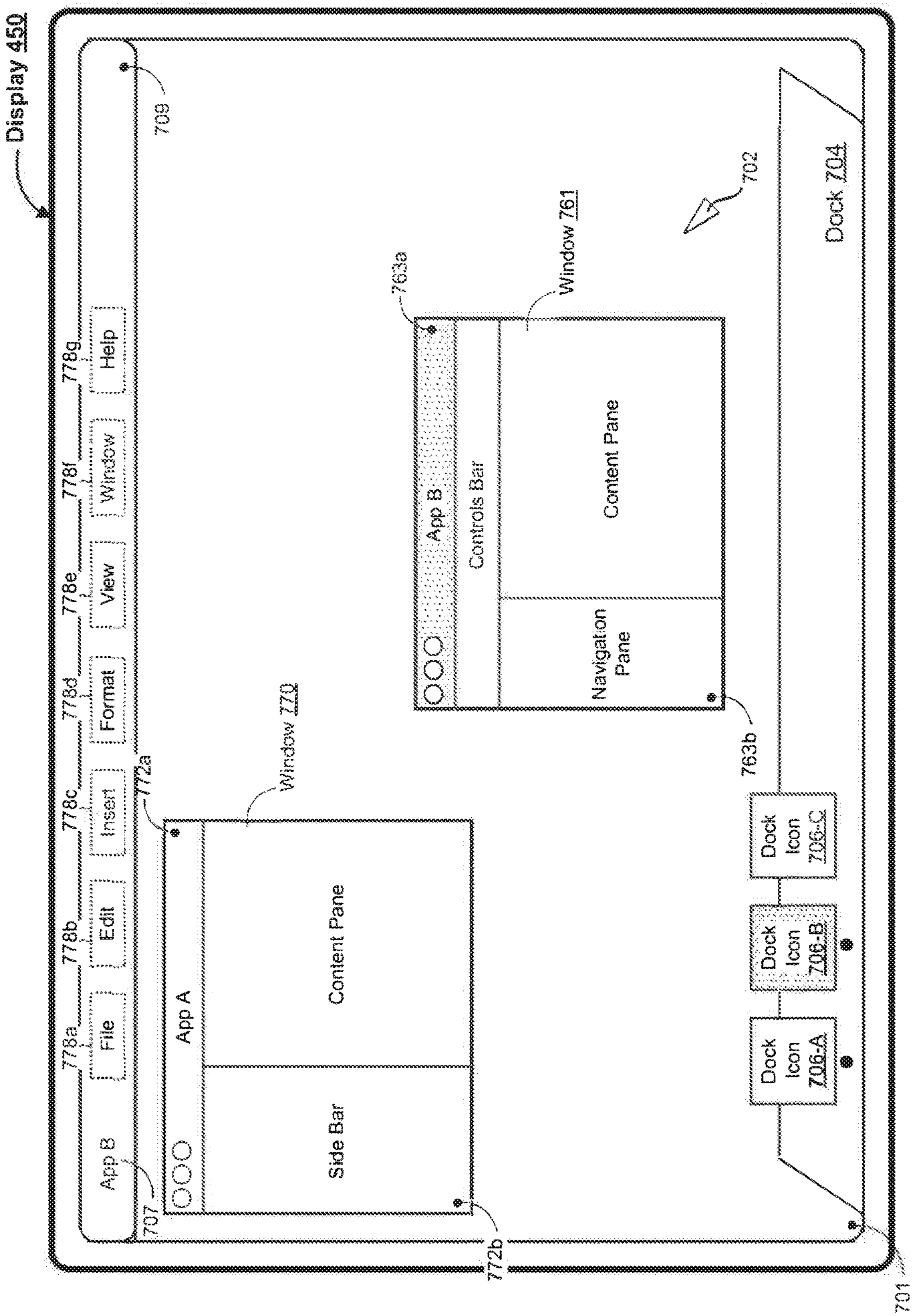
Figure 7I:
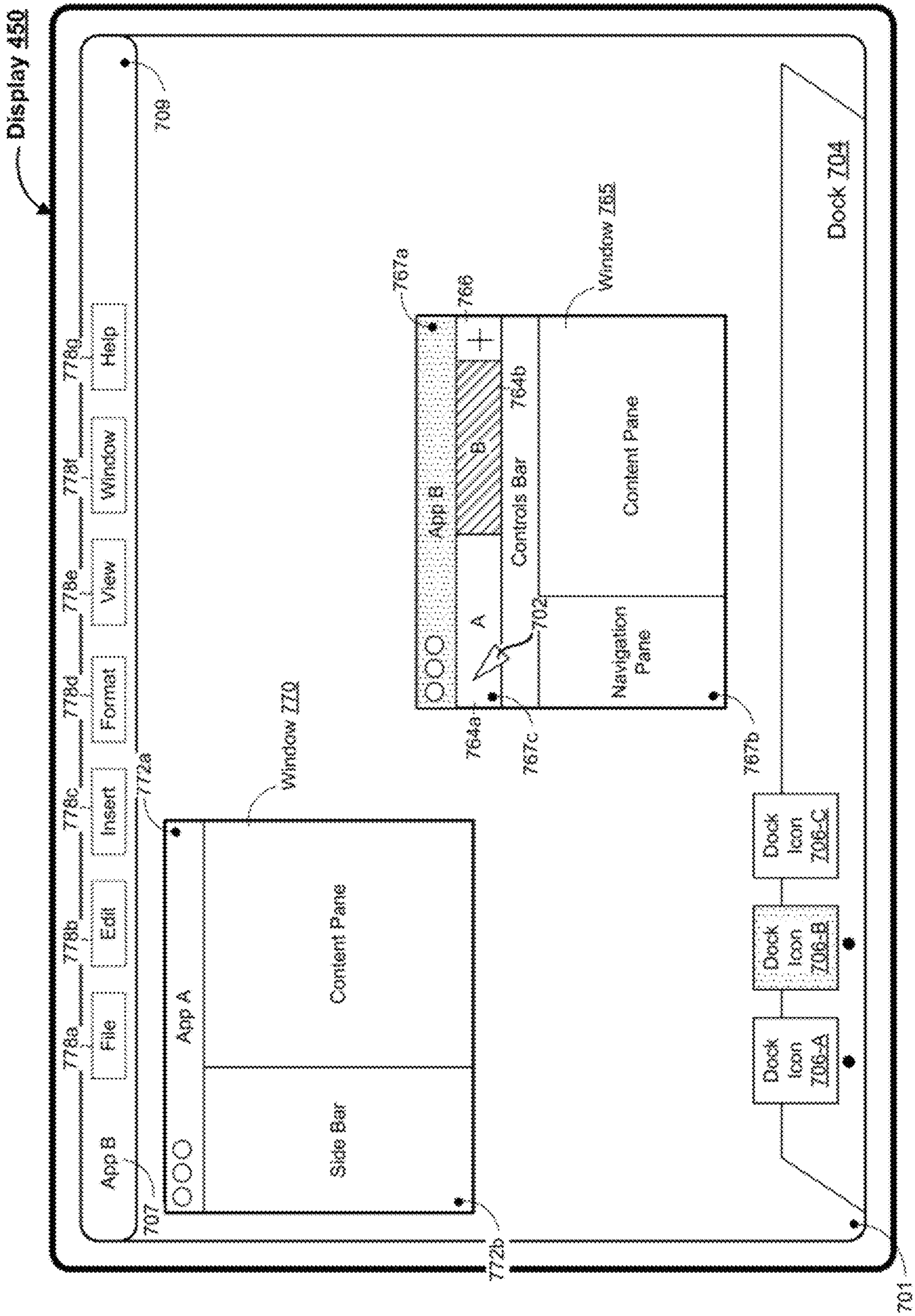
Figure 7J:
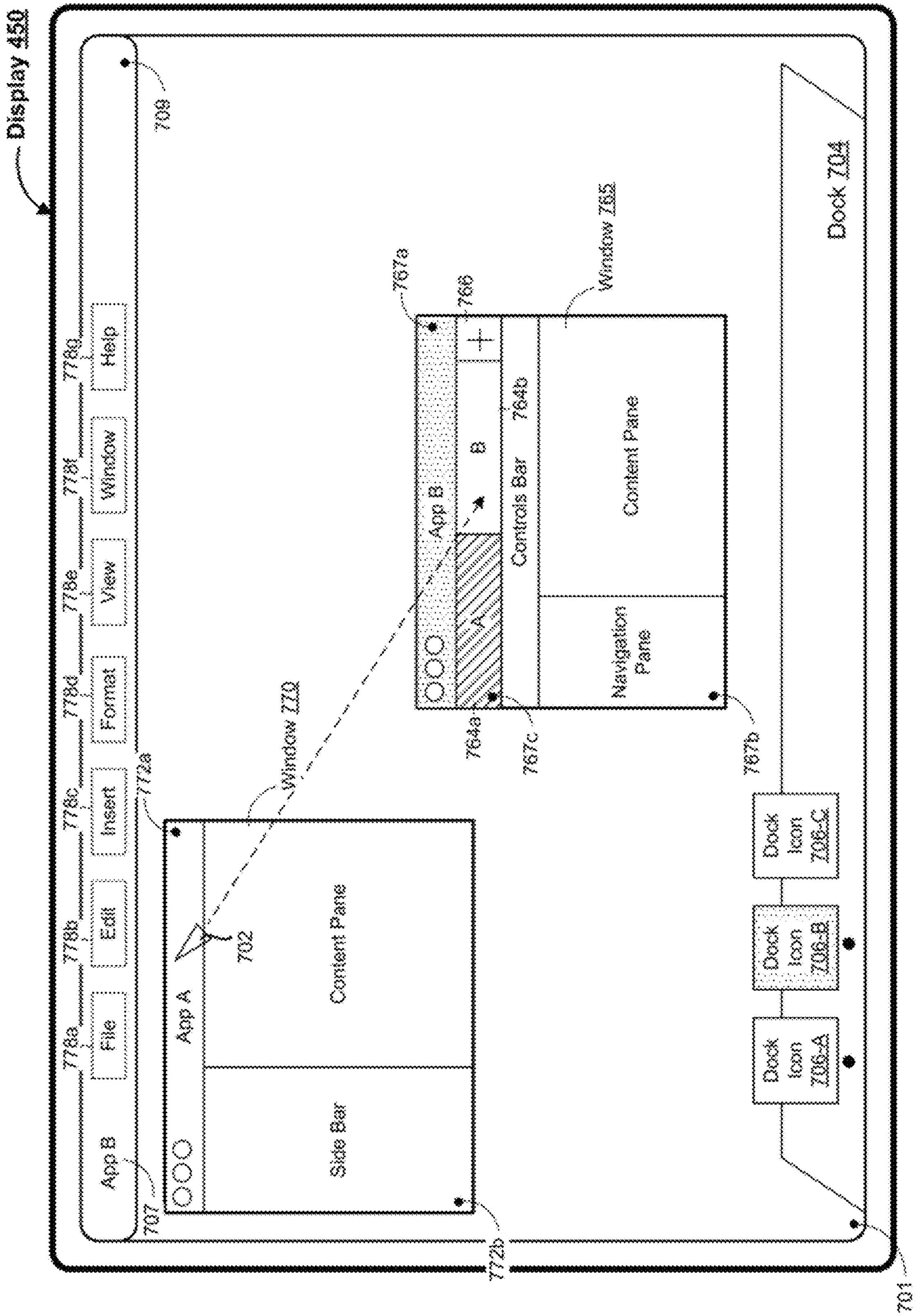
Figure 7K:
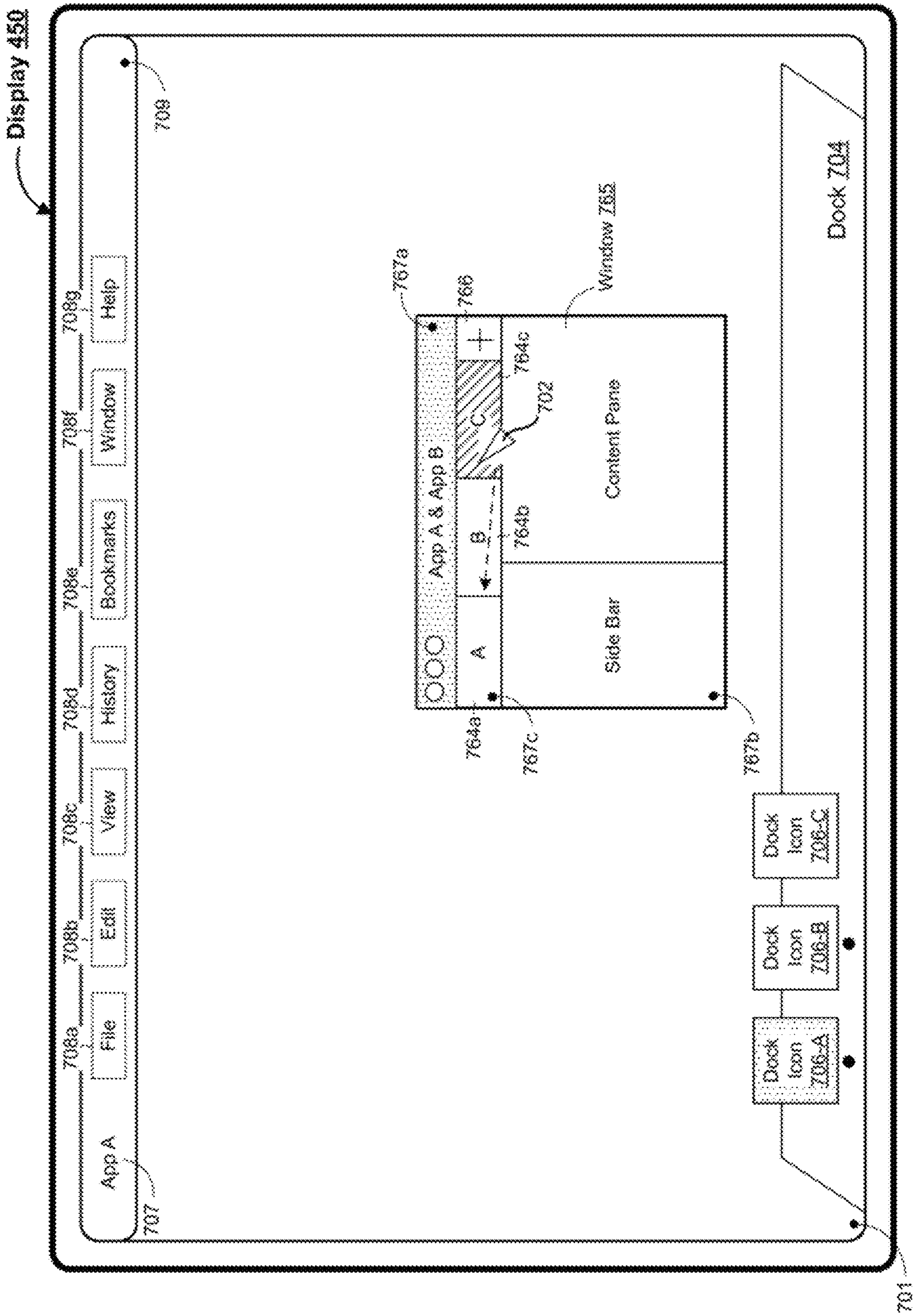
Figure 7L:
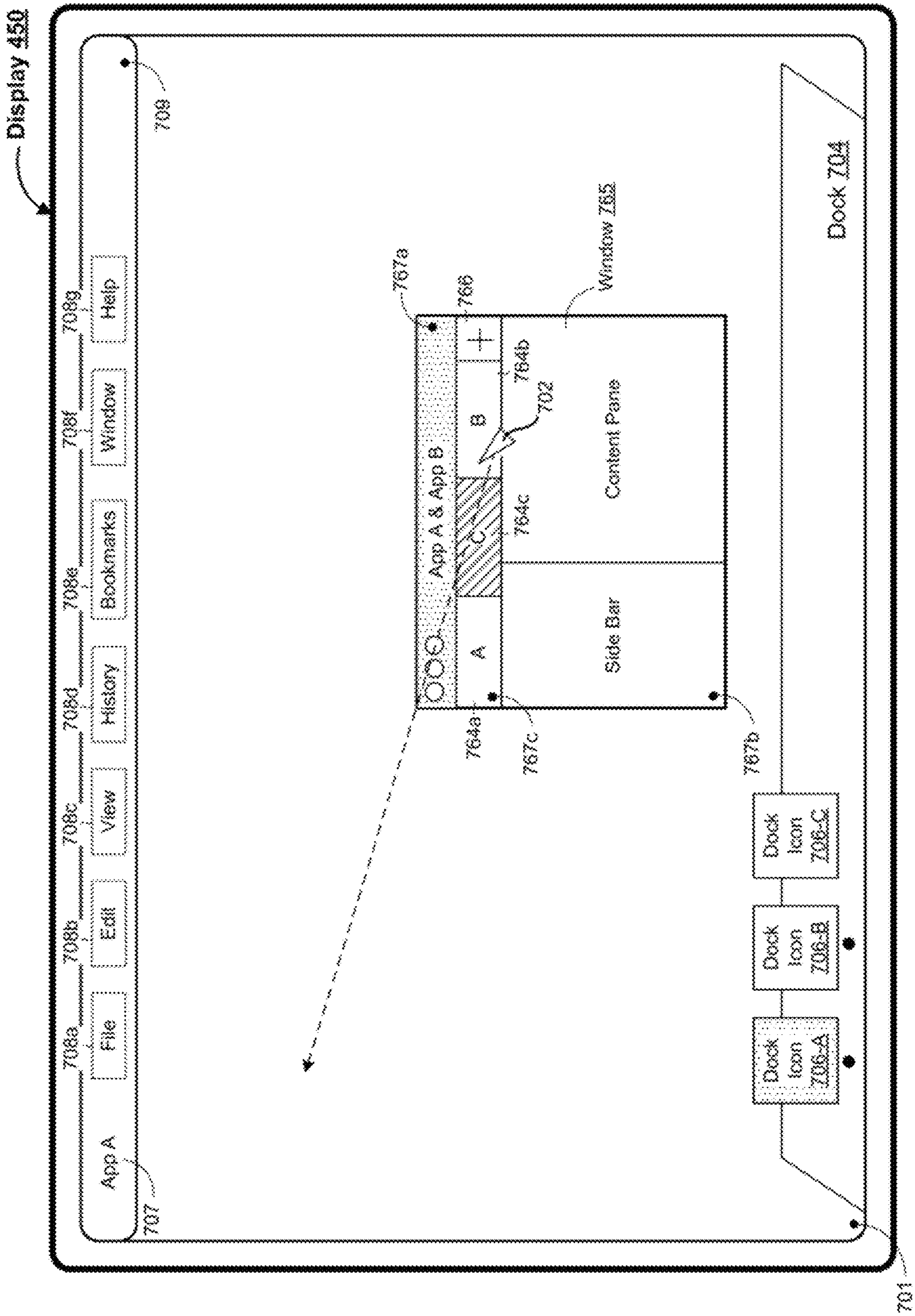
Figure 7M:
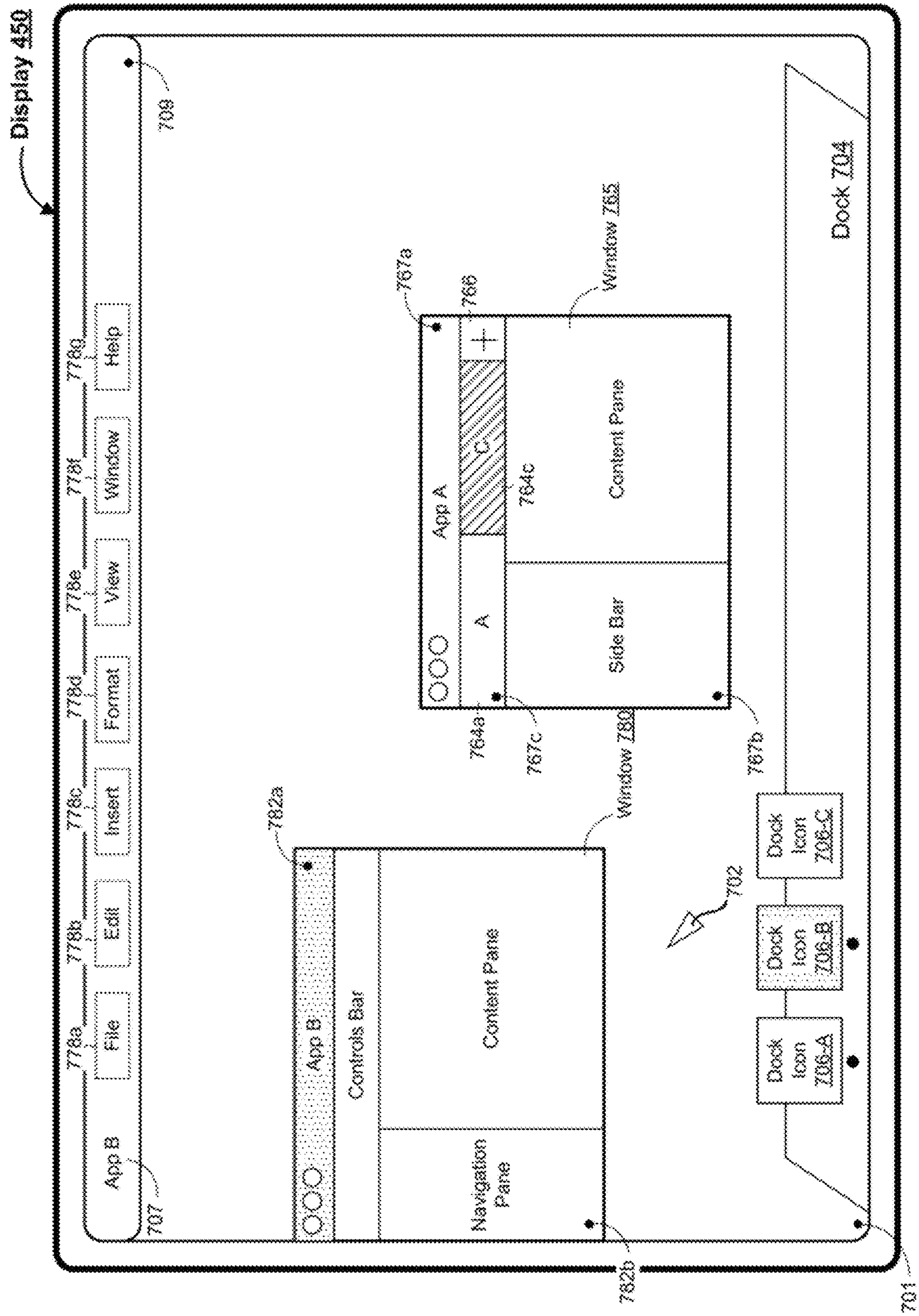
Figure 7N:
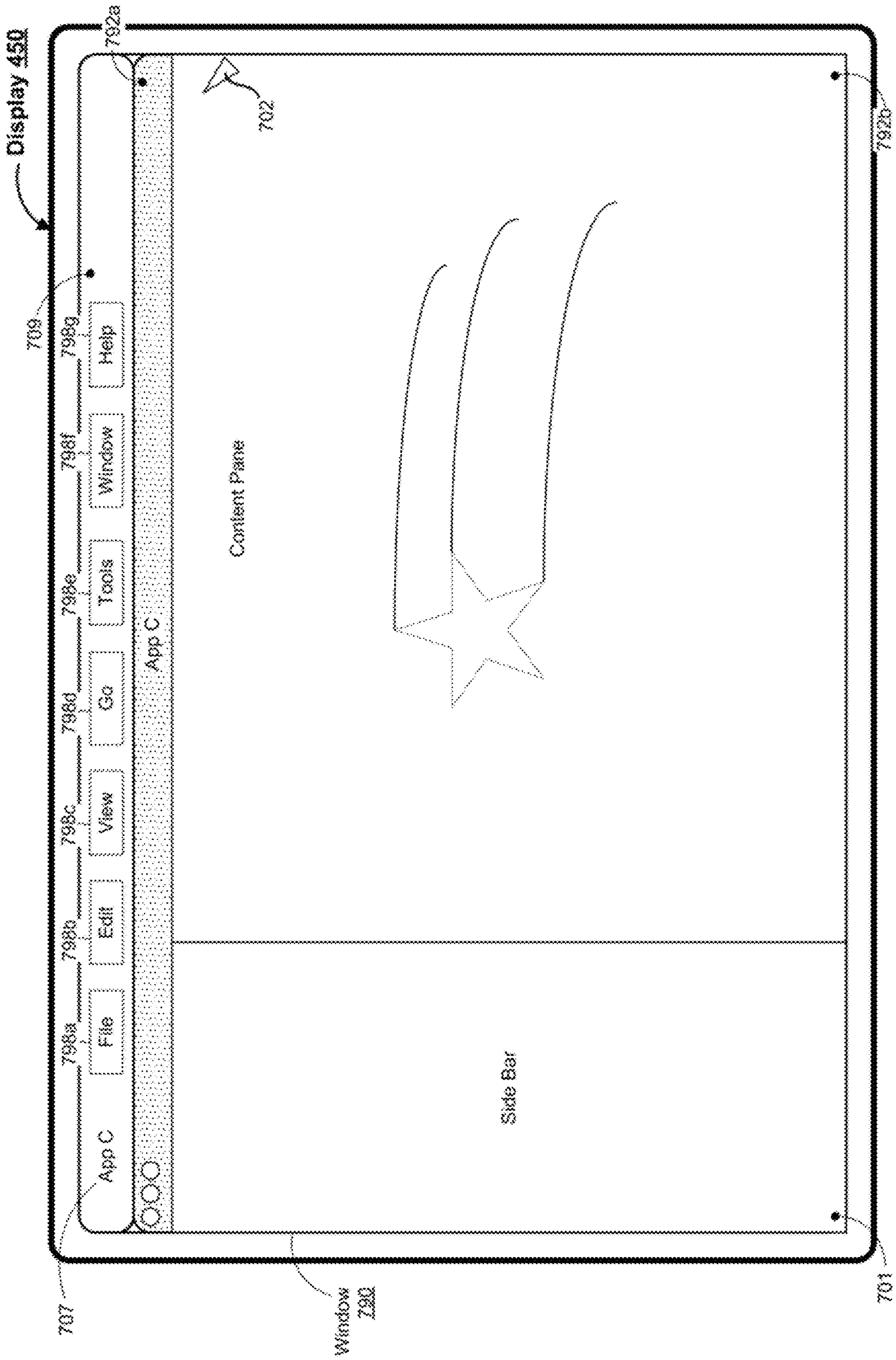
Figure 7O:
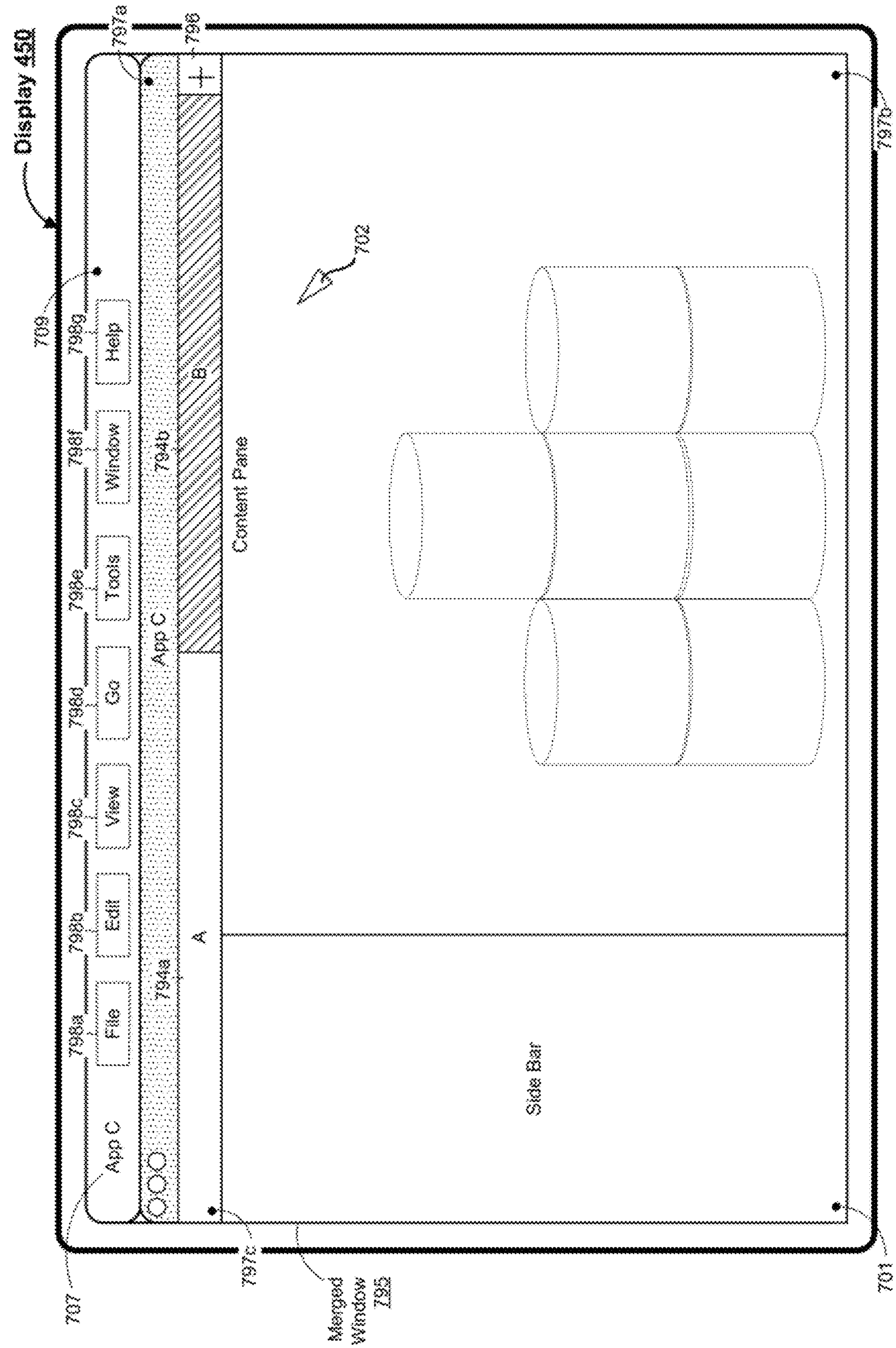
Figure 7P:
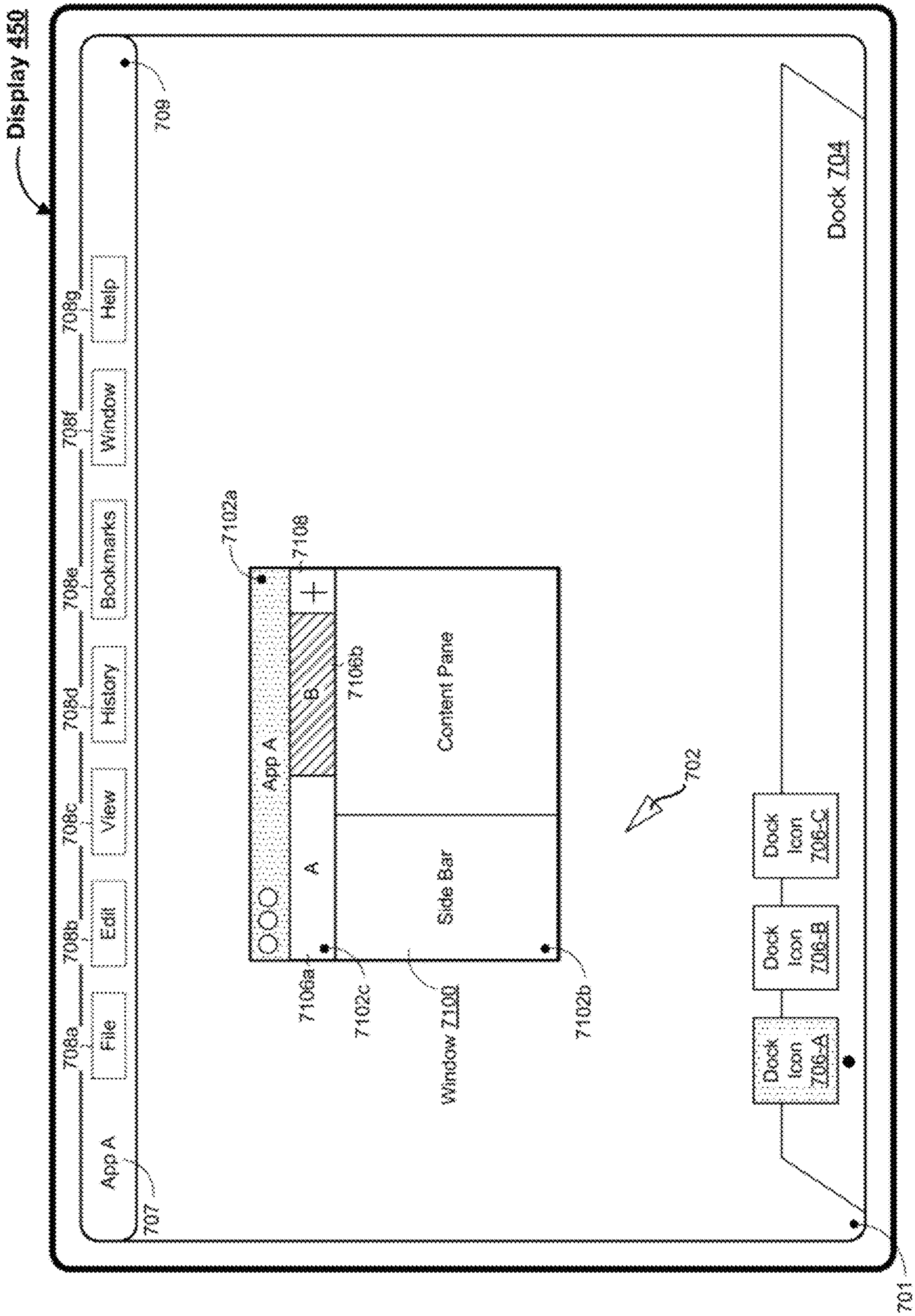
Figure 7Q:
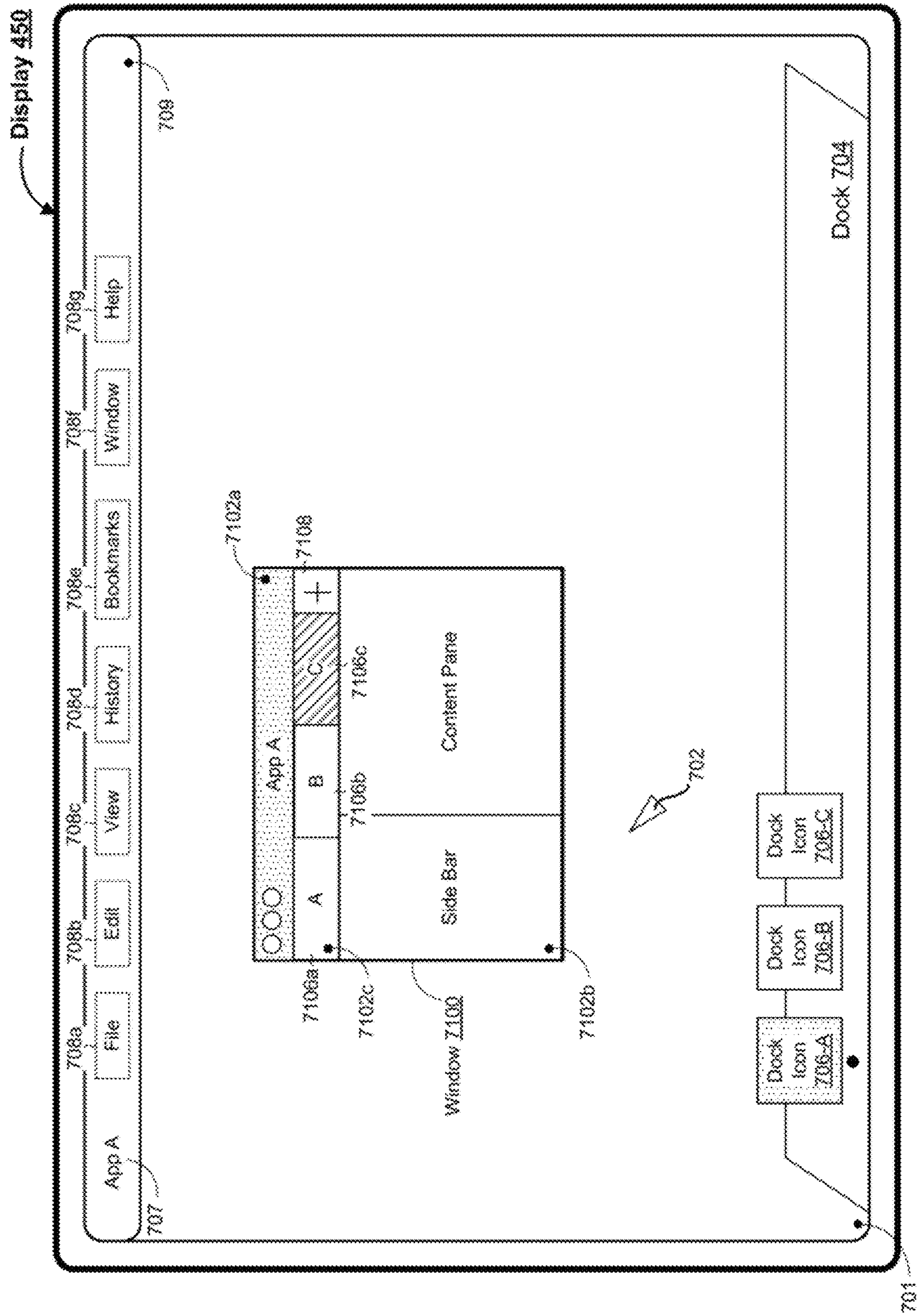
Figure 7R:
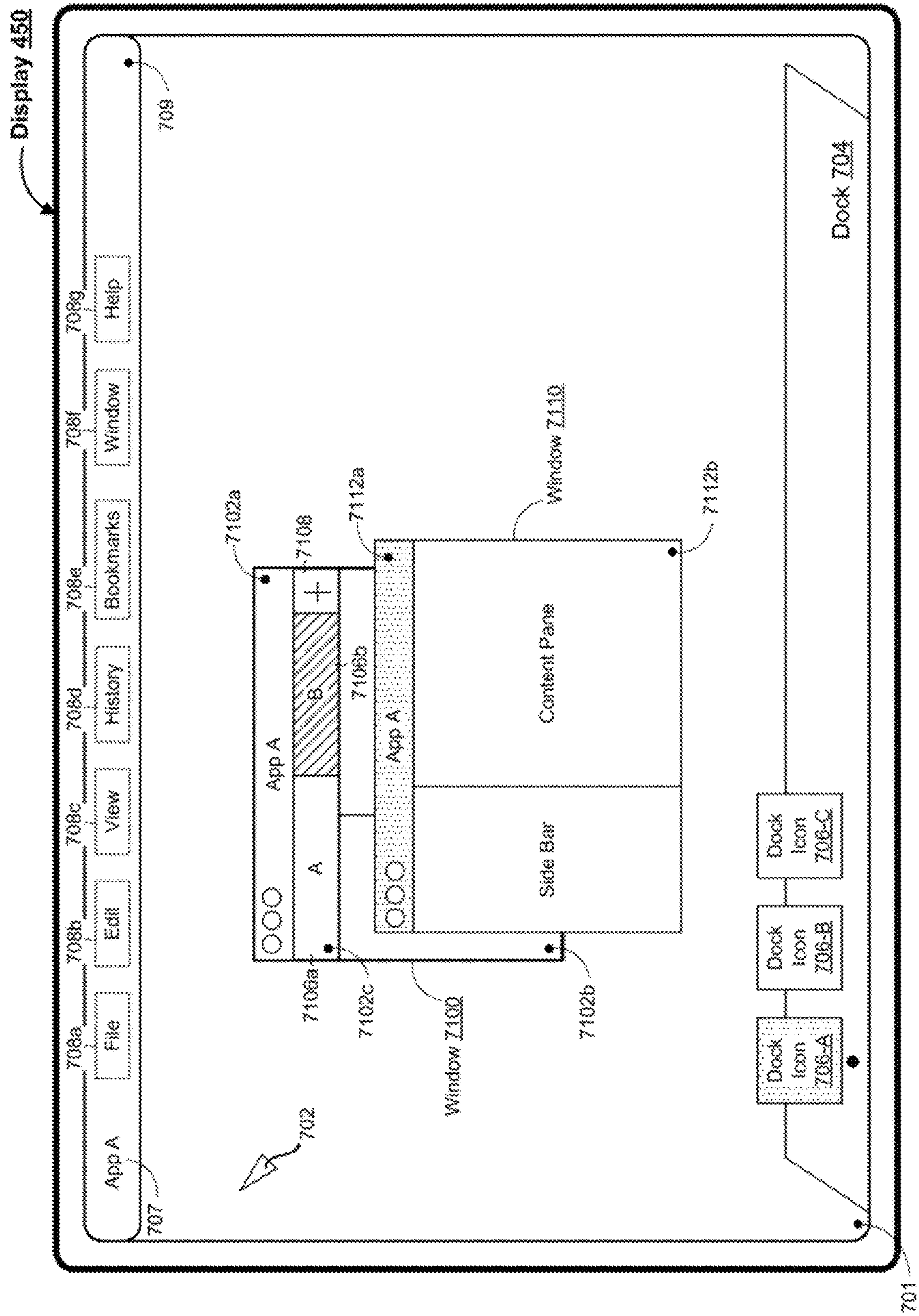
Figure 8A:
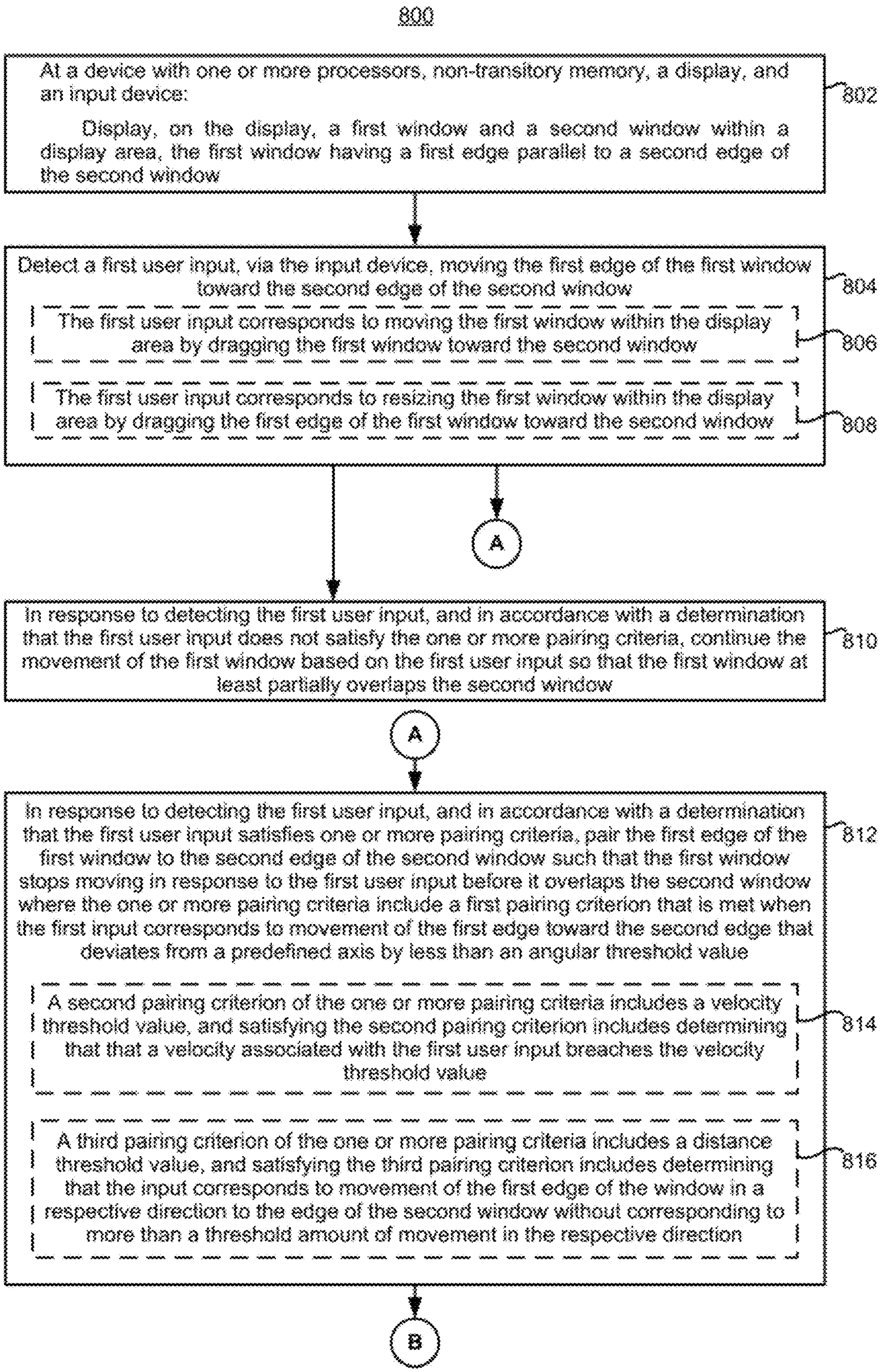
Figure 8E:
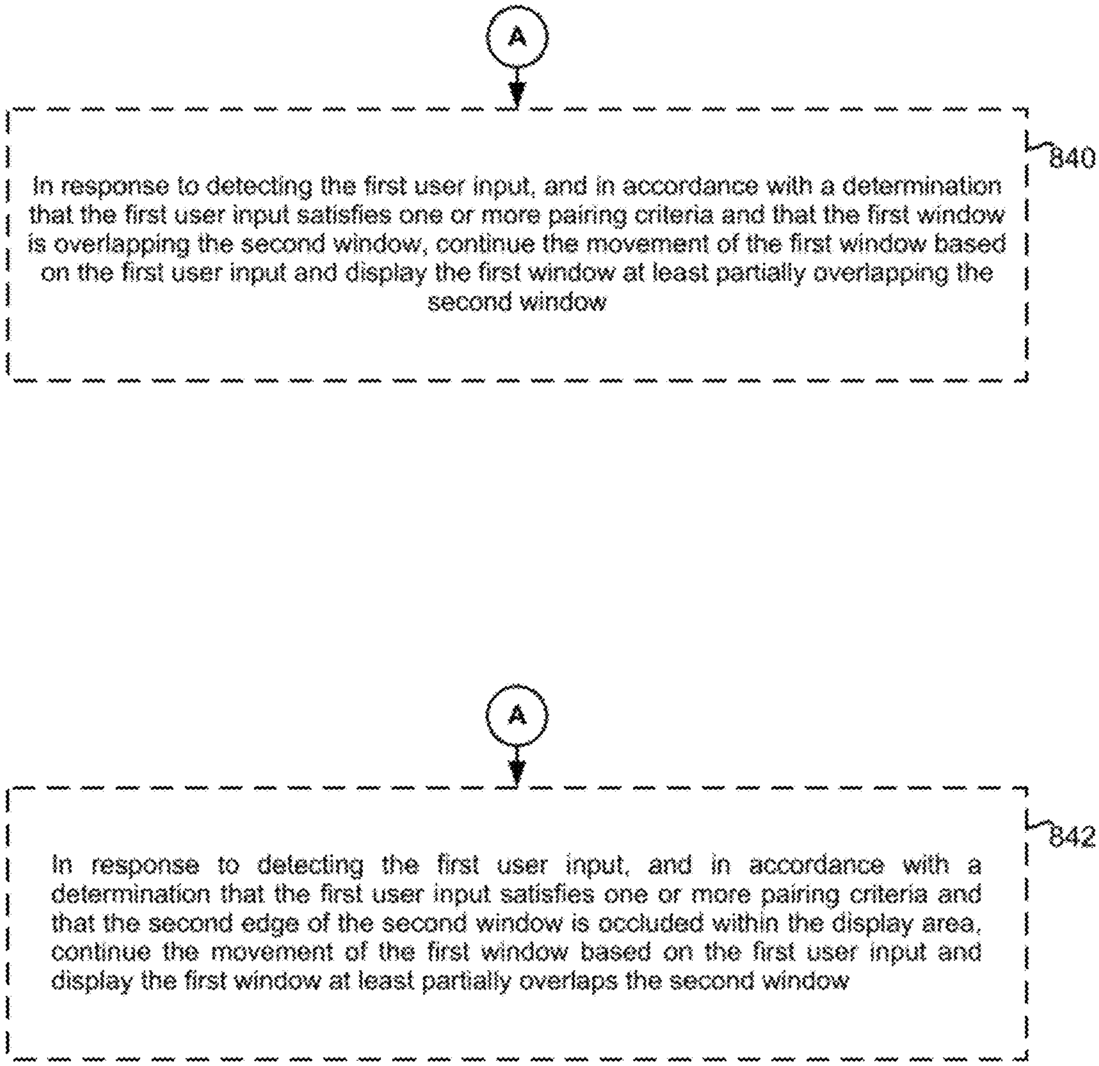
Figure 9A:
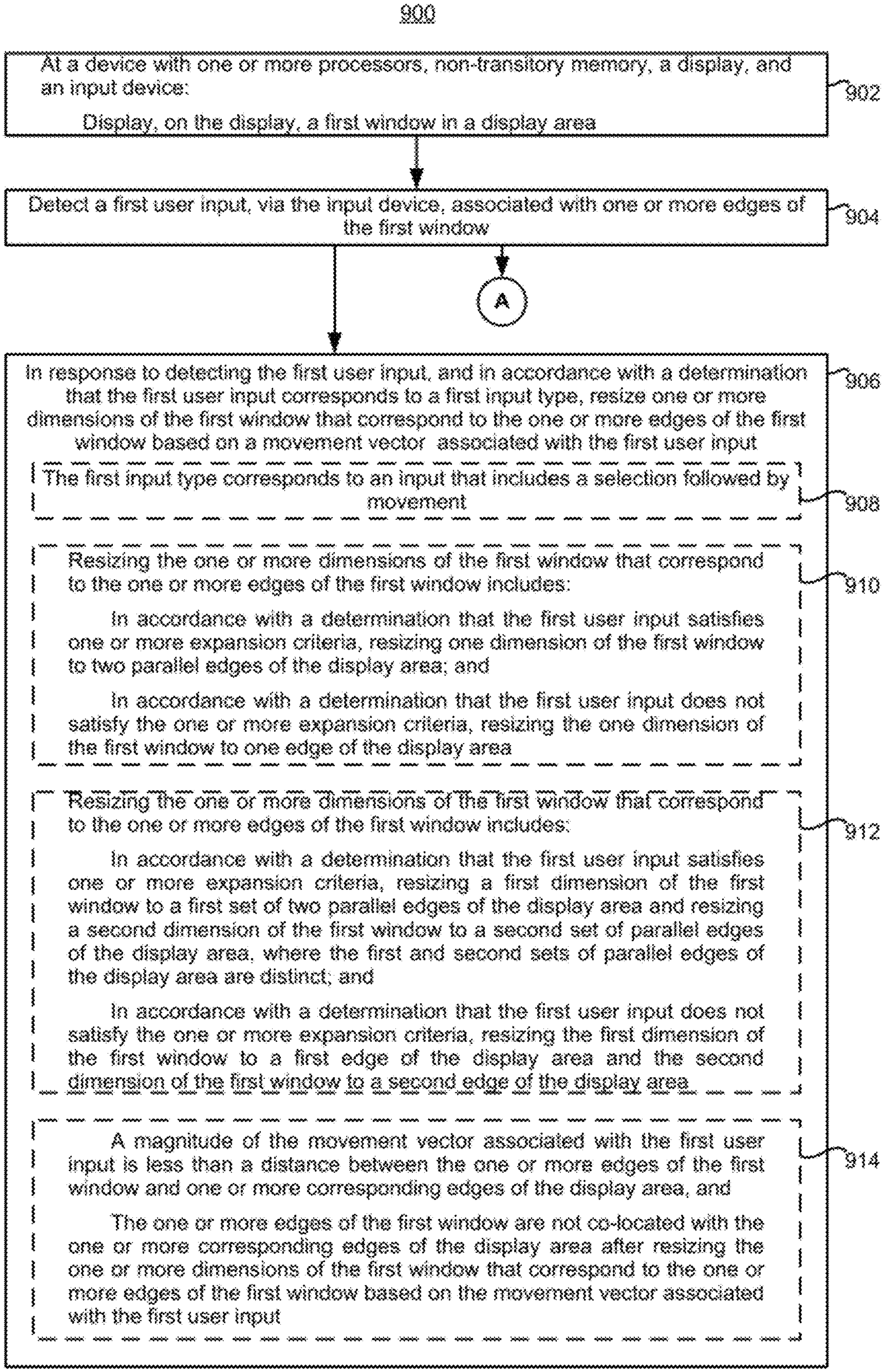
Figure 9D:
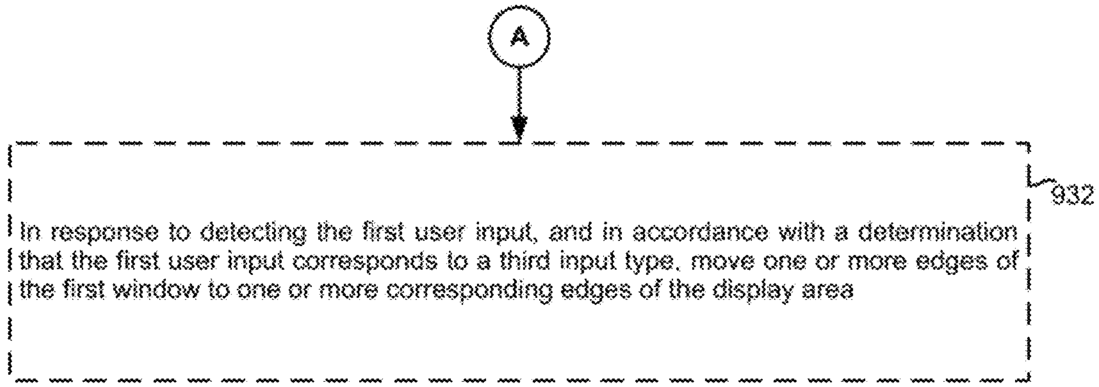

FIGS. 7A-7R illustrate example user interfaces for providing tabbed window functionality in accordance with some embodiments. The user interfaces in these figures are used to illustrate the processes described below, including the processes in FIGS. 10A-10C. Although some of the examples which follow will be given with reference to inputs on a touch-sensitive surface 451 that is separate from the display 450, in some embodiments, the device detects inputs on a touch-screen display (where the touch-sensitive surface and the display are combined), as shown in FIG. 4A.

FIGS. 7A-7B show windows 710, 720, and 730 associated with application A displayed within a display area 701 of the display 450. FIGS. 7A-7M show a dock 704 within the display area 701 with a plurality of dock icons 706-A, 706-B, and 706-C corresponding to different applications. For example, the dock icon 706-A corresponds to application A (e.g., a web browser application), the dock icon 706-B corresponds to application B (e.g., a word processing application), and the dock icon 706-B corresponds to application C (e.g., an image viewing and editing application).

As shown in FIGS. 7A-7B, the window 710 includes a chrome region 712*a* and a content region 712*b*. Similarly, the window 720 includes a chrome region 722*a* and a content region 722*b*. And, the window 730 includes a chrome region 732*a* and a content region 732*b*. In FIG. 7A, the window 730 is displayed in the foreground as indicated by the shading of the chrome region 732*a*.

As shown in FIGS. 7A-7G, a menu bar 709 for application A is also displayed within the display area 701. In FIGS. 7A-7G, the menu bar 709 includes a plurality of affordances associated with commands, functions, and/or operations of application A. For example, the menu bar 709 for application A includes: a file affordance 708*a*, which, when activated (e.g., with the focus selector 702), causes a drop-down menu of file options associated with application A to be overlaid on the display area 701; an edit affordance 708*b*, which, when activated (e.g., with the focus selector 702), causes a drop-down menu of edit options associated with application A to be overlaid on the display area 701; a view affordance 708*c*, which, when activated (e.g., with the focus selector 702), causes a drop-down menu of view options associated with application A to be overlaid on the display area 701; a history affordance 708*d*, which, when activated (e.g., with the focus selector 702), causes a list of previously viewed/visited electronic documents (e.g., documents, images, web pages, etc.) associated with application A to be overlaid on the display area 701; a bookmarks affordance 708*e*, which, when activated (e.g., with the focus selector 702), causes a list of favorited/bookmarked electronic documents (e.g., documents, images, web pages, etc.) associated with application A to be overlaid on the display area 701; a window affordance 708*f*, which, when activated (e.g., with the focus selector 702), causes a drop-down menu of window options associated with application A to be overlaid on the display area 701; and a help affordance 708*g*, which, when activated (e.g., with the focus selector 702), causes a drop-down menu of help options associated with application A to be overlaid on the display area 701.

In FIGS. 7A-7B, application A is running in the foreground as indicated by the shading of the dock icon 706-A, and the text description 707 in the menu bar 709. In FIGS. 7A-7B, application A is operating in windowed mode (e.g., non-full screen mode), and the operating system is operating in manual tab mode (e.g., the "Manual" behavior described in greater detail with reference to FIGS. 7E-7G). As such, in some embodiments, when a new window command is issued to application A (e.g., a new window menu option is selected, a predefined new window gesture is performed, a predefined new window combination of keystrokes is performed such as "Ctrl+N", a predefined new window verbal command is performed, or the like), a new window is displayed in the display area 701.

FIGS. 7A-7B illustrate a sequence in which a new window is added to the user interface in response to a new window command issued to an application while the application is in windowed mode. FIG. 7B illustrates displaying window 740 associated with application A within the display area 701 in response to a new window command issued to application A (e.g., by way of a "Ctrl+N" operation). As shown in FIG. 7B, the window 740 includes a chrome region 742*a* and a content region 742*b*. In FIG. 7A, the window 740 is displayed in the foreground as indicated by the shading of the chrome region 742*a*.

FIGS. 7B-7D illustrate a sequence in which a plurality of windows associated with a respective application are merged into a single window with tabs for each of the plurality of windows. FIG. 7B also illustrates the focus selector 702 at a location corresponding to the window affordance 708*f*. FIG. 7C illustrates a drop-down menu 746 of window options overlaid on the display area 701 in response to selection of the window affordance 708*f* (e.g., with a single or double click of the focus selector 702) in FIG. 7B.

As shown in FIG. 7C, the drop-down menu 746 of window options includes: a new window affordance 748*a*, which, when activated (e.g., with the focus selector 702), causes a new window associated with application A to be displayed; a new tab affordance 748*b*, which, when activated (e.g., with the focus selector 702), causes a new tab associated with application A to be displayed; a "create tabbed window" affordance 748*c*, which, when activated (e.g., with the focus selector 702), causes open windows to be merged into a single tabbed window; a maximize all windows affordance 748*d*, which, when activated (e.g., with the focus selector 702), causes open windows associated with application A to be displayed in full screen mode; a cascade windows affordance 748*e*, which, when activated (e.g., with the focus selector 702), causes open windows associated with application A to be cascaded within the display area 701; and a show all windows affordance 748*e*, which, when activated (e.g., with the focus selector 702), causes open windows associated with application A to be displayed in exposé mode.

FIG. 7C also illustrates the focus selector 702 at a location corresponding to the "create tabbed window" affordance 748*c*. FIG. 7D illustrates displaying a merged window 750 within the display area 701 in response to selection of the "create tabbed window" affordance 748*c* (e.g., with a single or double click of the focus selector 702) in FIG. 7C.

As shown in FIG. 7D, the merged window 750 includes a chrome region 752*a*, a content region 752*b*, and a tab bar 752*c*. In FIG. 7D, the tab bar 752*c* includes a tab 756*a* associated with the window 710, a tab 756*b* associated with the window 720, a tab 756*c* associated with the window 730, and a tab 756*d* associated with the window 740 (e.g., from FIG. 7B). In FIG. 7D, the tab 756*d* associated with the window 740 is displayed in the foreground within the merged window 750 as indicated by the shading of the tab 756*d*. In FIG. 7D, the tab bar 752*c* also includes an addition affordance 758 provided to add a new tab associated with application A to the merged window 750. For example, the new tab is added as a foreground or background tab.

In some embodiments, the "create tabbed window" affordance 748*c* enables windows associated with applications that do not have native tab functionality to be displayed in a tabbed window. As such, for example, open windows are resized to a same size and stacked on top of one another such that the foreground window is displayed on the top of the stack. In this example, the tabs are displayed within a virtual tab bar superimposed on the top window of the stack of windows by the operating system. In some embodiments, if another tab is selected within the tab bar, a window associated with selected tab is moved to the top of the stack of windows.

In some embodiments, if a close tab command is issued to a tab, the operating system issues a command to the application to close a window that corresponds to the tab. In some embodiments, if a close/exit command is issued to the merged window, the operating system issues a command to the application to close each of the windows that correspond to the tabs in the merged window. According to some embodiments, tabs may be dragged out of the tab bar to move a window out of the stack of windows and to view the window separate from the stack of windows. According to some embodiments, windows may be dragged into the merged window and consequently added to the merged window as a new tab (e.g., either as a foreground or background tab). Thus, in some embodiments, tabbing functionality is enabled by the operating system for applications without native tab functionality.

FIGS. 7E-7G illustrate a sequence in which a tab setting associated with an operating system (OS) is changed. FIG. 7E illustrates a dock menu 760 overlaid on the windows 710, 720, and 730 (e.g., from FIG. 7A). For example, the dock menu 760 includes a plurality of options associated with the operating system. For example, the dock menu 760 is accessed through a control panel or system preferences interface. As shown in FIG. 7E, the dock menu 760 includes: a slider 762*a* for adjusting the size of the dock 704; a magnification slider 762*d* for adjusting the magnification of size of the dock 704, a picker menu 762*c* for changing the animation used to minimize windows (e.g., a scaling or genie effect); and a picker menu 762*d* for changing the tabs preference (e.g., "Manual" mode in which open new windows as windows, "Always" mode in which open new windows as tabs, or "Full Screen Only" mode in which open new windows as tabs only while in full screen mode). In FIG. 7E, the current setting associated with the picker menu 762*c* is the "Genie Effect," and the current setting associated with the picker menu 762*d* is the "Manual" behavior. As such, for example, the "Manual" behavior was in effect in FIGS. 7A-7D.

In some embodiments, the tabs preference associated with the picker menu 762*d* applies to applications without native tabbing functionality. In some embodiments, the tabs preference associated with the picker menu 762*d* applies to all applications. In some embodiments, the tabs preference associated with the picker menu 762*d* applies to all application save applications included on an opt-out list.

FIG. 7E also illustrates the focus selector 702 at a location corresponding to current setting for the picker menu 762*d*. FIG. 7F illustrates a plurality of options for the picker menu 762*d* overlaid on the display area 701. As shown in FIG. 7F, the picker menu 762*d* includes a "Manual" option 764*a*, where a new window operation issued to an application opens a window and a new tab operation issued to the application opens a new tab when the application has native tabbing functionality. The picker menu 762*d* also includes an "Always" option 764*b*, where a new window operation issued to an application opens a new tab and (optionally) a new tab operation issued to the application opens a new window. The picker menu 762*d* further includes a "Full Screen Only" option 764*c*, where a new window operation issued to an application while in full screen mode opens a new tab and (optionally) a new tab operation issued to the application while in full screen mode opens a new window.

FIG. 7F also illustrates the focus selector 702 at a location corresponding to the "Always" option 764*b*. FIG. 7G shows "Always" as the current setting associated with the picker menu 762*d* in response to selection of the "Always" option 764*b* (e.g., with a single or double click of the focus selector 702) in FIG. 7F. As such, for example, the "Always" behavior is in effect in FIGS. 7H-7M.

FIG. 7H shows a window 761 associated with application B and a window 770 associated with application A displayed within a display area 701 of the display 450. As shown in FIG. 7H, the window 761 includes a chrome region 763*a* and a content region 763*b*. Similarly, the window 770 includes a chrome region 772*a* and a content region 772*b*. In FIG. 7H, the window 761 is displayed in the foreground as indicated by the shading of the chrome region 763*a*. In FIG. 7H, application B is running in the foreground as indicated by the shading of the dock icon 706-B, and the text description 707 in the menu bar 709.

As shown in FIGS. 7H-7J, a menu bar 709 for application B is also displayed within the display area 701. In FIGS. 7H-7J, the menu bar 709 includes a plurality of affordances associated with commands, functions, and/or operations of application B. For example, the menu bar 709 for application B includes: a file affordance 778*a*, which, when activated (e.g., with the focus selector 702), causes a drop-down menu of file options associated with application B to be overlaid on the display area 701; an edit affordance 778*b*, which, when activated (e.g., with the focus selector 702), causes a drop-down menu of edit options associated with application B to be overlaid on the display area 701; a view affordance 778*c*, which, when activated (e.g., with the focus selector 702), causes a drop-down menu of view options associated with application B to be overlaid on the display area 701; an insert affordance 778*d*, which, when activated (e.g., with the focus selector 702), causes a drop-down menu of edit options associated with application B to be overlaid on the display area 701; a format affordance 778*e*, which, when activated (e.g., with the focus selector 702), causes a drop-down menu of formatting options associated with application B to be overlaid on the display area 701; a window affordance 778*f*, which, when activated (e.g., with the focus selector 702), causes a drop-down menu of window options associated with application B to be overlaid on the display area 701; and a help affordance 778*g*, which, when activated (e.g., with the focus selector 702), causes a drop-down menu of help options associated with application B to be overlaid on the display area 701.

In FIGS. 7H-7M, application B is operating in windowed mode (e.g., non-full screen mode), and the operating system is operating in automatic tab mode (e.g., the "Manual" behavior described in greater detail with reference to FIGS. 7E-7G). As such, in some embodiments, when a new window command is issued to application B (e.g., a new window menu option is selected, a predefined new window gesture is performed, a predefined new window combination of keystrokes is performed such as "Ctrl+N", a predefined new window verbal command is performed, or the like), a merged window is displayed with a background tab associated with the previous foreground window (e.g., the window 761) and a new foreground tab associated with the new foreground window.

FIGS. 7H-7I illustrate a sequence in which a new window for a second application is added as a foreground tab within a merged window. FIG. 7I illustrates displaying merged window 765 within the display area 701 in response to a new window command issued to application B (e.g., by way of a "Ctrl+N" operation). As shown in FIG. 7I, the merged window 765 includes a chrome region 767*a*, a content region 767*b*, and a tab bar 767*c*. In FIG. 7I, the merged window 765 is displayed in the foreground as indicated by the shading of the chrome region 767*a*.

As shown in FIG. 7I, the tab bar 767*c* includes a tab 764*a* that corresponds to the window 761 (e.g., from FIG. 7H) and a tab 764*b* that corresponds to the new window associated with application B. In FIG. 7I, the tab 764*b* associated with the new window is displayed in the foreground within the merged window 765 as indicated by the shading of the tab 764*b*. In FIG. 7I, the tab bar 767*c* also includes an addition affordance 766 for adding a new tab associated with application B to the merged window 765. For example, the new tab is added as a foreground or background tab.

In some embodiments, the merged window 765 enables windows associated with applications that do not have native tab functionality to be displayed in a tabbed window. As such, for example, the windows that correspond to the tabs 764*a* and 764*b* are resized to a same size and stacked on top of one another such that the foreground window is displayed on the top of the stack of windows (e.g., the new window associated with the tab 764*b* in FIG. 7I). According to some embodiments, the tabs are displayed within a virtual tab bar superimposed on the new foreground window by the operating system. Thus, in some embodiments, tabbing functionality is enabled by the operating system for applications without native tab functionality.

FIGS. 7I-7J illustrate a sequence in which the foreground tab within the merged window is changed. FIG. 7I also illustrates the focus selector 702 at a location corresponding to the tab 764*a*. FIG. 7J shows that the tab 764*a* associated the window 761 (e.g., from FIG. 7H) is displayed in the foreground within the merged window 765 as indicated by the shading of the tab 764*a* in response to selection of the tab 764*a* (e.g., with a single or double click of the focus selector 702) in FIG. 7I. As such, according to some embodiments, the window 761 (e.g., from FIG. 7H) is moved to the top of the stack of windows associated with the tabs 764*a* and 764*b*, and the virtual tab bar 767*c* is redisplayed on top of the window 761.

FIGS. 7J-7K illustrate a sequence in which a window for a first application is added as a foreground tab in the merged window. FIG. 7J also illustrates dragging the window 770 associated with application A by the chrome region 772*a* to the tab bar 767*c* of the merged window 765 with the focus selector 702. FIG. 7K shows a tab 764*c* that corresponds to the window 770 (e.g., from FIG. 7J) in response to dragging the window 770 into the tab bar 767*c* in FIG. 7J. In FIG. 7K, the tab 764*c* corresponds to the window 770 (e.g., from FIG. 7J) is displayed in the foreground within the merged window 765 as indicated by the shading of the tab 764*c*. Furthermore, in FIG. 7K, application A is running in the foreground as indicated by the shading of the dock icon 706-A, and the text description 707 in the menu bar 709.

As such, according to some embodiments, the window 770 (e.g., from FIG. 7J) is added to the top of the stack of windows associated with the tabs 764*a*, 764*b*, and 764*c*, and the virtual tab bar 767*c* is redisplayed on top of the window 770. Thus, the merged window 765 includes tabs the 764*a* and 764*b* that correspond to windows associated with application B and the tab 764*c* corresponding to a window associated with application A.

FIGS. 7K-7L illustrate a sequence in which a tab is rearranged within the tab bar of the merged window. FIG. 7K also illustrates dragging the tab 764*c* from a first location to the second location within the tab bar 767*c* with the focus selector 702. FIG. 7L shows the tab 764*c* between tabs 764*b* and 764*b* (e.g., a different location as compared to FIG. 7K) in response to dragging the tab 764*c* within the tab bar 767*c* in FIG. 7K.

FIGS. 7L-7M illustrate a sequence in which a tab is dragged out of the tab bar of the merged window. FIG. 7L illustrates dragging the tab 764*b* out of the tab bar 767*c* of the merged window 765 with the focus selector 702. FIG. 7M illustrates displaying a window 780 associated with application B within the display area 701 in response to dragging the tab 764*b* out of the tab bar 767*c* in FIG. 7L. For example, the window 780 corresponds to the tab 764*b* in FIG. 7L.

As shown in FIG. 7M, the window 780 includes a chrome region 782*a* and a content region 782*b*. In FIG. 7M, the window 780 is displayed in the foreground as indicated by the shading of the chrome region 782*a*. In FIG. 7M, application B is running in the foreground as indicated by the shading of the dock icon 706-B, and the text description 707 in the menu bar 709.

FIGS. 7N-7O show window 790 associated with application C displayed within a display area 701 of the display 450. As shown in FIGS. 7N-7O, the window 790 includes a chrome region 792*a* and a content region 792*b*. In FIG. 7N, the window 790 is displayed in the foreground as indicated by the shading of the chrome region 792*a*.

As shown in FIGS. 7N-7O, a menu bar 709 for application C is also displayed within the display area 701. In FIGS. 7N-7O, the menu bar 709 includes a plurality of affordances associated with commands, functions, and/or operations of application C. For example, the menu bar 709 for application C includes: a file affordance 798*a*, which, when activated (e.g., with the focus selector 702), causes a drop-down menu of file options associated with application C to be overlaid on the display area 701; an edit affordance 798*b*, which, when activated (e.g., with the focus selector 702), causes a drop-down menu of edit options associated with application C to be overlaid on the display area 701; a view affordance 798*c*, which, when activated (e.g., with the focus selector 702), causes a drop-down menu of view options associated with application C to be overlaid on the display area 701; an go affordance 798*d*, which, when activated (e.g., with the focus selector 702), causes a drop-down menu of navigation options associated with application C to be overlaid on the display area 701; a tools affordance 798*e*, which, when activated (e.g., with the focus selector 702), causes a drop-down menu of tools associated with application C to be overlaid on the display area 701; a window affordance 798*f*, which, when activated (e.g., with the focus selector 702), causes a drop-down menu of window options associated with application C to be overlaid on the display area 701; and a help affordance 798*g*, which, when activated (e.g., with the focus selector 702), causes a drop-down menu of help options associated with application C to be overlaid on the display area 701.

In FIGS. 7N-7O, application C is running in the foreground as indicated by the text description 707 in the menu bar 709. In FIGS. 7N-7O, application C is operating in full screen mode, and the operating system is operating in full screen tab mode (e.g., the "Full Screen Only" behavior described in greater detail with reference to FIGS. 7E-7G). As such, in some embodiments, when a new window command is issued to application C (e.g., a new window menu option is selected, a predefined new window gesture is performed, a predefined new window combination of keystrokes is performed such as "Ctrl+N", a predefined new window verbal command is performed, or the like), a merged window in full screen mode is displayed with a background tab associated with the previous foreground window (e.g., the window 790) and a new foreground tab associated with the new foreground window.

FIGS. 7N-7O illustrate a sequence in which a new tab is added to a window in response to a new window command issued to an application while the application is in full screen mode. FIG. 7O illustrates displaying merged window 795 within the display area 701 in response to a new window command issued to application C (e.g., by way of a "Ctrl+N" operation). As shown in FIG. 7O, the merged window 795 includes a chrome region 797*a*, a content region 797*b*, and a tab bar 797*c*. In FIG. 7O, the merged window 795 is displayed in the foreground as indicated by the shading of the chrome region 797*a*.

As shown in FIG. 7O, the tab bar 797*c* includes a tab 794*a* that corresponds to the window 790 (e.g., from FIG. 7N) and a tab 794*b* that corresponds to the new associated with application C. In FIG. 7O, the tab 794*b* associated with the new window is displayed in the foreground within the merged window 795 as indicated by the shading of the tab 794*b*. In FIG. 7N, the tab bar 797*c* also includes an addition affordance 796 for adding a new tab associated with application C to the merged window 795. For example, the new tab is added as a foreground or background tab.

In some embodiments, the merged window 795 enables windows associated with applications that do not have native tab functionality to be displayed in a tabbed window. As such, for example, the windows that correspond to the tabs 794*a* and 794*b* are full screen windows stacked on top of one another such that the foreground window is displayed on the top of the stack (e.g., the new window associated with the tab 794*b* in FIG. 7O). According to some embodiments, the tabs are displayed within a virtual tab bar superimposed on the new foreground window by the operating system. Thus, in some embodiments, tabbing functionality is enabled by the operating system for applications without native tab functionality.

FIGS. 7P-7R are similar to and adapted from FIG. 7A. As such, FIG. 7A and FIGS. 7P-7R include similar user interfaces and elements labeled with the same reference number in both figures have the same function, with only the differences are described herein for the sake of brevity. In FIGS. 7P-7R, application A is running in the foreground as indicated by the shading of the dock icon 706-A, and the text description 707 in the menu bar 709. FIGS. 7P-7R shows a window 7100 associated with application A displayed within a display area 701 of the display 450. As shown in FIGS. 7P-7R, the window 7100 includes a chrome region 7102*a*, a content region 7102*b*, and a tab bar 7102*c*. In FIG. 7P, the window 7100 is displayed in the foreground as indicated by the shading of the chrome region 7102*a*.

In FIG. 7P, the tab bar 7102*c* includes a tab 7106*a* and a tab 7106*b*. In FIG. 7P, the tab 7106*b* is displayed in the foreground within the window 7100 as indicated by the shading of the tab 7106*b*. In FIG. 7P, the tab bar 7102*c* also includes an addition affordance 7108 provided to add a new tab associated with application A to the window 7100. For example, the new tab is added as a foreground or background tab.

In FIGS. 7P-7R, the window 7100 has native tab functionality (e.g., the application A is opted out of the global tab setting). As shown in FIGS. 7P-7R, application A is operating in windowed mode (e.g., non-full screen mode). As such, in some embodiments, when a new window command is issued to application A (e.g., a new window menu option is selected, a predefined new window gesture is performed, a predefined new window combination of keystrokes is performed such as "Ctrl+N", a predefined new window verbal command is performed, or the like), a new window associated with the application A is displayed within the display area 701 (e.g., as shown in FIG. 7R). As such, in some embodiments, when a new tab command is issued to application A (e.g., a new tab menu option is selected, a predefined new tab gesture is performed, a predefined new tab combination of keystrokes is performed such as "Ctrl+T", a predefined new tab verbal command is performed, or the like), a new foreground tab associated with the application A is displayed within the window 7100 (e.g., as shown in FIG. 7Q).

FIGS. 7P-7Q illustrate a sequence in which a new tab is added the tabbed window in response to a new tab command issued to application A while operating in windowed mode. FIG. 7Q illustrates displaying a new tab 7106*c* within the tab bar 7102*c* in response to a new window command issued to application A (e.g., by way of a "Ctrl+N" operation).

FIG. 7P and FIG. 7R illustrate a sequence in which a new window is added the tabbed window in response to a new tab command issued to application A while operating in windowed mode. FIG. 7R illustrates displaying a new window 7110 in response to a new window command issued to application A (e.g., by way of a "Ctrl+T" operation). As shown in FIG. 7R, the window 7110 includes a chrome region 7112*a* and a content region 7112*b*.

FIGS. 8A-8E illustrate a flow diagram of a method 800 of pairing edges of windows in accordance with some embodiments. The method 800 is performed at an electronic device (e.g., the portable multifunction device 100 in FIG. 1A, or the device 300 in FIG. 3) with a one or more processors, non-transitory memory, a display, and an input device. In some embodiments, the display is a touch-screen display and the input device is on or integrated with the display. In some embodiments, the display is separate from the input device. Some operations in method 800 are, optionally, combined and/or the order of some operations is, optionally, changed.

As described below, the method 800 provides an intuitive way to pair edges of windows. The method reduces the cognitive burden on a user when pairing edges of windows, thereby creating a more efficient human-machine interface. For battery-operated electronic devices, enabling a user to pair edges of windows faster and more efficiently conserves power and increases the time between battery charges.

The device displays (802), on the display, a first window and a second window within a display area, the first window having a first edge parallel to a second edge of the second window. In some embodiments, the first and second windows are rectangular. In some embodiments, the first and second windows are arranged horizontally within the display area with a non-zero distance between the first and second window. For example, the first edge is the right edge of the first window, and the second edge if the left edge of the second window. In another example, the first edge is the left edge of the first window, and the second edge if the right edge of the second window. In some embodiments, the first and second windows are arranged vertically within the display area with a non-zero distance between the first and second windows. For example, the first edge is the bottom edge of the first window, and the second edge if the top edge of the second window. In another example, the first edge is the top edge of the first window, and the second edge if the bottom edge of the second window. FIG. 5A, for example, shows a first window 510 and a second window 520 displayed within the display area 501, where the right edge 514*a* of the first window 510 (e.g., the first edge) is parallel to the left edge 524*a* of the second window 520 (e.g., the second edge).

The device detects (804) a first user input, via the input device, moving the first edge of the first window toward the second edge of the second window. In some embodiments, the first user input is associated with a movement vector incident to the second edge. For example, assuming that the first and second windows are arranged horizontally, a right edge of the first window is moved toward a left edge of the second window. In another example, assuming the first and second windows are arranged vertically, a top edge of the first window is moved toward a bottom edge of a second window.

In some embodiments, the first user input corresponds to (806) moving the first window within the display area by dragging the first window toward the second window. In some embodiments, the first user input includes selection of the chrome region of the first window with a focus selector and movement of the first window (e.g., a click and drag the window), where the first edge leads the movement associated with the first user input. As one example, FIGS. 5A-5C show a sequence in which the window 510 is moved towards the window 520. As another example, FIGS. 5U-5W show a sequence in which the window 560 is moved toward the window 570.

In some embodiments, the first user input corresponds to (808) resizing the first window within the display area by dragging the first edge of the first window toward the second window. In some embodiments, the first user input includes selection of the edge of the first window with a focus selector and movement of the first edge (e.g., click and drag the first edge), where the first edge leads the movement associated with the first user input. As one example, FIGS. 5UU-5WW show a sequence in which the right edge 5164*a* of the window 5160 is dragged toward the left edge 5174*a* of the window 5170.

In response to detecting the first user input, and in accordance with a determination that the first user input does not satisfy the one or more pairing criteria, the device continues (810) the movement of the first window based on the first user input so that the first window at least partially overlaps the second window. As one example, FIGS. 5KK-5LL illustrate a sequence in which the window 5100 is moved toward the left edge 5114*a* of the window 5110. In this example, the right edge 5104*a* of the window 5100 does not pair with the left edge 5114*a* of the window 5110 and the window 5100 moves over the window 5110 because a first pairing criterion (e.g., the angle criterion) is not satisfied. As another example, FIGS. 5MM-5NN illustrate a sequence in which the window 5100 is moved toward the left edge 5114*a* of the window 5110. In this example, the right edge 5104*a* of the window 5100 does not pair with the left edge 5114*a* of the window 5110 and the window 5100 moves over the window 5110 because a second pairing criterion (e.g., the velocity criterion) is not satisfied. As yet another example, FIGS. 5FF-5GG illustrate a sequence in which the window 5180 is moved toward the left edge 5194a of the window 5190. In this example, the right edge 5184a of the window 5180 does not pair with the left edge 5194a of the window 5190 and the window 5180 moves over the window 5190 because a third pairing criterion (e.g., the distance criterion) is not satisfied. As such, according to some embodiments, windows are moved and aligned according to conventional behavior when the one or more pairing criteria are not satisfied according to user expectations.

In response to detecting the first user input, and in accordance with a determination that the first user input satisfies one or more pairing criteria (e.g., one or more conditions for pairing the first and second windows). the device pairs (812) the first edge of the first window to the second edge of the second window such that the first window stops moving in response to the first user input before it overlaps the second window, where the one or more pairing criteria include a first pairing criterion that is met when the first input corresponds to movement of the first edge toward the second edge that deviates from a predefined axis by less than an angular threshold value.

According to some embodiments, the first window is paired with the second window by stopping the movement of first edge of the first window so that the first edge of the first window is touching (and not overlapping) the second edge of the second window. As such, pairing the windows includes stopping the movement of the first window once the first and second edges are adjoining. For example, no pixels associated with the first window overlap the second window. For example, there are 0 pixels between the first and second windows. In some embodiments, there is no magnetic attraction between the first and second windows. Instead, the movement at least reaches the second edge of the second window but not more than a threshold value past the second edge. For example, the user deliberately moves the first window to be side-by-side or stacked with the second window. Continuing with this example, if the one or more pairing criteria are satisfied, the first and second windows are paired. As such, according to some embodiments, the user is able to more easily manage the alignment and arrangement of windows within the display area saving the user time and effort.

In some embodiments, the predefined axis is perpendicular to or normal to the first edge and the second edge. For example, in some embodiments, the angle criterion is satisfied when the angle of approach deviates less than 45° or 60° relative to a normal of the second edge of the second window. As such, the first and second edges are paired when the first user input is substantially parallel to the second edge, and the first and second edges overlap when the first user input is substantially perpendicular to the second edge.

In some embodiments, a second pairing criterion of the one or more pairing criteria includes (814) a velocity threshold value, and satisfying the second pairing criterion includes determining that that a velocity associated with the first user input breaches the velocity threshold value. As one example, FIGS. 5A-5C show a sequence in which the right edge 514a of the window 510 is paired with the left edge 524a of the window 520 due to satisfaction of the angle criterion (e.g., the angle of the movement vector 508 deviates less than the values 516a and 516b from a normal of the left edge 524a of the window 520) and the velocity criterion (e.g., the velocity of the movement vector 508 is less than the pairing threshold velocity 518). As another example, FIGS. 5U-5W show a sequence in which the top edge 564a of the window 560 is paired with the bottom edge 574a of the window 570 due to satisfaction of the angle criterion (e.g., the angle of the movement vector 566 deviates less than the values 568a and 568b from a normal of the bottom edge 574a of the window 570) and the velocity criterion (e.g., the velocity of the movement vector 566 is less than the pairing threshold velocity 518).

In some embodiments, a third pairing criterion of the one or more pairing criteria includes (816) a distance threshold value, and satisfying the third pairing criterion includes determining that the input corresponds to movement of the first edge of the window in a respective direction to the edge of the second window without corresponding to more than a threshold amount of movement in the respective direction. In some embodiments, the third pairing criterion when a magnitude of the first user input is greater than or equal to an initial distance value between the first edge of the first window and the second edge of the second window prior to the first user input, and when the magnitude of the first user input is less than or equal a sum of the initial distance and the distance threshold value. As such, the magnitude of the first user input at least touches the first and second edges but is not greater than a threshold distance beyond the second edge. As one example, FIGS. 5BBB-5CCC show a sequence in which the right edge 5184a of the window 5180 is paired with the left edge 5194a of the window 5190 due to satisfaction of the angle criterion (e.g., the angle of the movement vector 5186 deviates less than the values 516a and 516b from a normal of the left edge 5194a of the window 5190) and the distance criterion (e.g., the magnitude of a component of the movement vector 5186 that is over the left edge 5194a of the window 5190 is less than the distance threshold 5188).

In some embodiments, the device (820): while the first edge of the first window is paired with the second edge of the second window, detecting a second user input, via the input device, moves the first window away from the second window; and, in response to the second user input, unpairs the first edge of the first window from the second edge of the second window and moves the first window according to a movement vector associated with the second user input. According to some embodiments, if the second user input moves the second window substantially perpendicular to and away from the first edge of the first window, the second window similarly separates from the first window. In some embodiments, the second user input is associated with a movement vector having a component perpendicular to the second edge that satisfies an angular separation threshold criterion. For example, the angular separation criterion is satisfied when the angle of the second user input deviates from a normal of the second edge by less than a threshold angle value. In some embodiments, the windows are immediately unpaired when the second user input is perpendicular to and away from the paired edges (e.g., a 180° angle relative to a normal of the second edge). As such, the windows are unpaired without a distance separation criterion or without any resistance if the angular separation criterion is satisfied. In some embodiments, the windows are unpaired when the second user input is perpendicular to and away from the paired edges and satisfies a distance separation criterion. As such, according to some embodiments, the user is able to unpair windows without resistance. This, for example, enables the user is able to more easily manage the alignment and arrangement of windows within the display area saving the user time and effort.

For example, FIGS. 5K-5M show a sequence in which the window 510 is moved away from the window 520 at a 180° angle relative to a normal of the left edge 524a of the window 520. In this example, the right edge 514a of the window 510 is unpaired from the left edge 524*a* of the window 520 without satisfying a distance criterion.

In some embodiments, the device (822): while the first edge of the first window is paired with the second edge of the second window, detects a second component of the first user input moving the first window away from the second window; and, in response to the second component of the first user input and in accordance with a determination that a magnitude of the second component breaches a distance threshold (e.g., at least equal to the magnitude of the first component), unpairs the first edge of the first window from the second edge of the second window and moves the first window according to a movement vector associated with the second component of the first user input. For example, a first component of the first user input moves the first edge towards the second wedge, and a second component of the first user input moves the first edge away from the second edge. In some embodiments, for continuous movement, the first window is unpaired from the second window when the first window is moved by at least the distance the first window was moved to pair the first and second windows (e.g., the distance threshold). As such, according to some embodiments, the user is able to unpair windows with some resistance. This, for example, enables the user is able to more easily manage the alignment and arrangement of windows within the display area saving the user time and effort.

In some embodiments, while the first edge of the first window is paired with the second edge of the second window, the device detects (824) a second user input, via the input device, moving the first window toward the second edge of the second window. In response to detecting the second user input, and in accordance with a determination that the second user input satisfies one or more separation criteria (e.g., one or more conditions for separating the first and second paired windows), the device unpairs the first edge of the first window from the second edge of the second window and moves the first window over the second window according to a movement vector associated with the second user input. In response to detecting the second user input, and in accordance with a determination that the second user input does not satisfy the one or more separation criteria, the device maintains the pairing between the first edge of the first window and the second edge of the second window and foregoes moving the first window over the second window. According to some embodiments, if the second user input moves the second window substantially perpendicular to and toward the first edge of the first window, the second window similarly separates from the first window or remains paired with the first window. In some embodiments, when the movement is substantially perpendicular to and toward from the paired edges, the windows are unpaired when the second user input satisfies the angular separation criterion (e.g., the angle of the movement towards the second edge deviates less than +/−45° from a normal of the second edge) and a distance criterion (e.g., the magnitude of the movement is greater than or equal to a separation distance threshold). As such, according to some embodiments, the user is able to unpair windows with some resistance by reducing the accidental unpairing of windows from each other. This, for example, enables the user is able to more easily manage the alignment and arrangement of windows within the display area saving the user time and effort.

For example, FIGS. 5Q-5T show a sequence in which the window 510 is moved toward the window 520. In this example, the right edge 514*a* of the window 510 unpaired from the left edge 524*a* of the window 520 due to satisfaction of the angular separation criterion (e.g., the angle of the movement vector 548 deviates from the normal of the second edge by less than the values 552*a* and 552*b*) and the distance criterion (e.g., the magnitude of the movement vector 548 is greater than the separation distance threshold 550).

In some embodiments, if the second user input is perpendicular to and away from the second edge of the second window, the paired windows are separated when the magnitude of the second user input exceeds a first predefined value. In some embodiments, if the second user input is perpendicular to and toward from the second edge of the second window, the paired windows are separated when the magnitude of the second user input exceeds a second predefined value. In some embodiments, if the second user input is substantially parallel to the first edge of the first window, the paired windows are separated when the magnitude of the second user input exceeds the second predefined value and an angle of the second user input exceeds a predefined value relative to a normal of the second edge of the second window. In some embodiments, the second predefined value is greater than the first predefined value.

In some embodiments, moving the first window over the second window according to the movement vector associated with the second user input includes (826): in accordance with a determination that the second user input corresponds to moving a focus selector over the second window, displaying an animation such that moving the first window over the second window is discontinuous (e.g., "jump" the first window such that the chrome region appears under the focus selector when the unpairing occurs); and in accordance with a determination that the second user input does not correspond to moving the focus selector over the second window, foregoing displaying the animation such that moving the first window over the second window is continuous. In some embodiments, the first window jumps, if the focus selector moves out from over window while window is paired with another window (e.g., when a bottom window in a stack of paired windows is dragged toward the top window). However, the first window does not "jump", if the focus selector does not move out from over the window (e.g., when a left window in a side-by-side pair of windows is dragged toward the right window). As such, according to some embodiments, the first window "catches up" to the focus selector so as to provide a smooth user experience. As one example, FIGS. 5Q-5T show a sequence in which the right edge 514*a* of the window 510 unpaired from the left edge 524*a* of the window 520. In FIG. 5S, the focus selector moves into the content region 522*b* of the window 520 according to the movement vector 548. However, as shown in FIGS. 5S-5T, the window 510 discontinuously "jumps" under the location of the focus selector 502 when the distance separation criterion is satisfied.

In some embodiments, while the first edge of the first window is paired with the second edge of the second window, the device detects (828) a second user input, via the input device, which corresponds to movement of the first edge relative to the second edge. In response to detecting the second user input, and in accordance with a determination that the second user input corresponds to movement of the first window such that the first edge of the first window moves over the second edge, the device delays movement of the first window until the second user input has reached a movement threshold. In response to detecting the second user input, and in accordance with a determination that the second user input corresponds to movement of the first window such that the first edge of the first window moves away from the second edge, the device starts to move the first window before the second user input has reached the movement threshold. As one example, FIGS. 5Q-5T show a sequence in which the right edge 514*a* of the window 510 is unpaired from the left edge 524*a* of the window 520 when the movement vector 548 distance separation criterion is satisfied (e.g., delay movement). As another example, FIGS. 5K-5M show a sequence in which the right edge 514*a* of the window 510 is immediately unpaired from the left edge 524*a* of the window 520 (e.g., do not delay movement).

In some embodiments, while the first edge of the first window is paired with the second edge of the second window, the device detects (830) a second user input, via the input device, moving the first window along the second edge of the second window. In response to detecting the second user input, and in accordance with a determination that the second user input satisfies one or more separation criteria, the device unpairs the first edge of the first window from the second edge of the second window and moves the first window according to a movement vector associated with the second user input. In response to detecting the second user input, and in accordance with a determination that the second user input does not satisfy any of the one or more separation criteria, the device maintains the pairing between the first edge of the first window and the second edge of the second window and moves the first window parallel to the second edge of the second window according to the second user input. In one example, assuming that the first and second windows are paired side-by-side, if first window is moved away from or toward the second window, the first window is separated from the second window. In another example, assuming that the first and second windows are paired side-by-side, if the first window is moved substantially parallel to the second window toward the top or bottom of the second window, the first window slides parallel to the second window and remains paired with the second window. As such, according to some embodiments, the user is able to more easily manage the alignment and arrangement of windows within the display area saving the user time and effort.

In some embodiments, the separation criteria are the converse of the pairing criteria. In some embodiments, the separation criteria are similar to and adapted from the pairing criteria. For example, the separation criteria are satisfied when the second user exceeds a predefined escape velocity, the angle of the second user input relative to a parallel of the second edge of the second window is greater than a predefined value, and/or the magnitude of the second user input is greater than a predefined value.

As one example, FIGS. 5N-5P show a sequence in which the right edge 514*a* of the window 510 is unpaired from the left edge 524*a* of the window 520 due to satisfaction of the angular separation criterion (e.g., the angle of the movement vector 544 deviates less than +/−45° from a normal of the second edge) and the distance separation criterion (e.g., the magnitude of the movement vector 544 is greater than the separation distance threshold 546). As another example, FIGS. 5D-5F show a sequence in which the right edge 514*a* of the window 510 remains paired with the left edge 524*a* of the window 520 because the angular separation criterion (e.g., the angle of the movement vector 526 deviates more than +/−45° from a normal of the second edge) and the velocity separation criterion (e.g., the velocity of the movement vector 526 is less than the separation velocity threshold 532) are not satisfied.

In some embodiments, the parallel movement of the first window is constrained (832) by a third edge of the second window, and the third edge of the second window is perpendicular to the second edge of the second window. For example, the first window stops moving when an edge of the first window that is parallel to the third edge of the second window is aligned with the third edge of the second window. In some embodiments, the parallel sliding movement is not constrained by the third edge of the second window. For example, in FIGS. 5E-5F, the parallel movement of the window 510 is constrained by the line 528*a* associated with the top edge 524*b* of the window 520. In some embodiments, the parallel movement is not constrained by the third edge of the second window. As such, according to some embodiments, the user is able to more easily manage the alignment and arrangement of windows within the display area saving the user time and effort (e.g., windows with equal height or width).

In some embodiments, while the first edge of the first window is paired with the second edge of the second window, the device detects (834) a second user input, via the input device, moving the second window along the first edge of the first window. In response to detecting the second user input, and in accordance with a determination that the second user input satisfies one or more separation criteria, the device unpairs the second edge of the second window from the first edge of the first window and moves the second window according to second user input. In response to detecting the second user input, and in accordance with a determination that the second user input does not satisfy any of the one or more of the separation criteria, the device maintains the pairing between the first edge of the first window and the second edge of the second window and moves the second window parallel to the first edge of the first window according to a movement vector associated with the second user input. As such, according to some embodiments, the user is able to more easily manage the alignment and arrangement of windows within the display area saving the user time and effort. In one example, assuming that the first and second windows are paired side-by-side, if second window is moved away from or toward the first window, the second window is separated from the first window. In another example, assuming that the first and second windows are paired side-by-side, if the second window is moved substantially parallel to the first window toward the top or bottom of the second window, the second window slides parallel to the first window and remains paired with the first window. In some embodiments, the parallel movement of the second window is bound by to a fourth edge of the first window, where the fourth edge of the first window is perpendicular to the first edge of the first window.

In some embodiments, while the first edge of the first window is paired with the second edge of the second window, the device detects (836) a second user input, via the input device, dragging a respective edge of the first window along the second edge of the second window, where the respective edge of the first window is perpendicular to the second edge of the second window. In response to detecting the second user input, the device resizes a dimension of the first window associated with the respective edge according to the second user input. As one example, FIGS. 5XX-5ZZ show a sequence in which the top edge 5164*b* of the window 5160 is dragged along the left edge 5174*a* of the window 5170. In this example, a second dimension (e.g., the height) of the window 5160 is expanded from a value 5177*a* to a value 5177*b*, where the value 5177*b* is greater than the value 5177*a*. According to some embodiments, if the second user input drags an edge of the second window that is perpendicular to the first edge of the first window in a direction parallel to the first edge of the first window, the second window is resized.

In some embodiments, the resized dimension of the first window is constrained (838) by a third edge of the second window, and the third edge of the second window is perpendicular to the second edge of the second window. As one example, FIGS. 5XX-5ZZ show a sequence in which the top edge 5164*b* of the window 5160 is dragged along the left edge 5174*a* of the window 5170. In this example, the movement off the top edge 5164*b* of the window 5160 is constrained by the line 5178*a* associated with the top edge 5174*b* of the window 5170. In some embodiments, the parallel resizing is not constrained by the third edge of the second window.

In some embodiments, in response to detecting the first user input, and in accordance with a determination that the first user input satisfies one or more pairing criteria and that the first window is overlapping the second window, the device continues (840) the movement of the first window based on the first user input and displaying the first window at least partially overlapping the second window. For example, there is a non-zero distance between the first and second windows. Furthermore, the first and second edges are not both bottom edges of their respective windows, and the first and second edges are not both top edges of their respective windows. As such, edges of windows that are being approached from inside the window cannot be paired with such as edges where the edge of the first window is already overlapping the second window when it is approaching the edge of the second window. For example, FIGS. 5OO-5PP show a sequence in which the right edge 5124*a* of the window 5120 does not pair with the right edge 5134*a* of the window 5130 because the window 5120 partially overlaps the window 5130 even though the pairing criteria are satisfied (e.g., the angle criterion and the velocity criterion). As such, according to some embodiments, the user is able to more easily manage the alignment and arrangement of windows within the display area saving the user time and effort.

In some embodiments, in response to detecting the first user input, and in accordance with a determination that the first user input satisfies one or more pairing criteria and that the second edge of the second window is occluded within the display area, the device continues (842) the movement of the first window based on the first user input and displaying the first window at least partially overlaps the second window. In some embodiments, edges of windows that are hidden in the user interface, such as windows that are occluded by other windows, cannot be paired with. As one example, FIGS. 5HHH-5JJJ show a sequence in which the left edge 5214*a* of the window 5210 does not pair with the right edge 5234*a* of the window 5230 because the right edge 5234*a* of the window 5230 is partially occluded by the window 5220 even though the pairing criteria are satisfied (e.g., the angle criterion and the velocity criterion). As another example, FIGS. 5KKK-5MMM show a sequence in which the left edge 5254*a* of the window 5250 does not pair with the right edge 5264*a* of the window 5260 because the right edge 5264*a* of the window 5260 incident the movement vector 5256 is occluded by the window 5270. As such, according to some embodiments, the user is able to more easily manage the alignment and arrangement of windows within the display area saving the user time and effort.

It should be understood that the particular order in which the operations in FIGS. 8A-8E have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900 and 1000) are also applicable in an analogous manner to method 800 described above with respect to FIGS. 8A-8E. For example, the user interface objects and focus selectors described above with reference to method 800 optionally have one or more of the characteristics of the user interface objects and focus selectors described herein with reference to other methods described herein (e.g., methods 900 and 1000). For brevity, these details are not repeated here.

FIGS. 9A-9D illustrate a flow diagram of a method 900 of resizing windows in accordance with some embodiments. The method 900 is performed at an electronic device (e.g., the portable multifunction device 100 in FIG. 1A, or the device 300 in FIG. 3) with a one or more processors, non-transitory memory, a display, and an input device. In some embodiments, the display is a touch-screen display and the input device is on or integrated with the display. In some embodiments, the display is separate from the input device. Some operations in method 900 are, optionally, combined and/or the order of some operations is, optionally, changed.

As described below, the method 900 provides an intuitive way to resize windows. The method reduces the cognitive burden on a user when resizing windows, thereby creating a more efficient human-machine interface. For battery-operated electronic devices, enabling a user to resize windows faster and more efficiently conserves power and increases the time between battery charges.

The device displays (902), on the display, a first window in a display area. For example, the first window is rectangular with four edges. As one example, FIG. 6A shows a window 610 with a left edge 614*a*, a top edge 614*b*, a right edge 614*c*, and a bottom edge 614*d* displayed within the display area 601. In this example, a first dimension (e.g., the width) of the window 610 has a value 616*a*, and a second dimension (e.g., the height) of the window 610 has a value 618*a*.

The device detects (904) a first user input, via the input device, associated with one or more edges of the first window. For example, the first user input includes a selection followed by movement such as a click and drag gesture on an edge or corner of the first window with the focus selector. In another example, the first user input includes a stationary input such as a single or double click on an edge or corner of the first window with the focus selector.

In response to detecting the first user input, and in accordance with a determination that the first user input corresponds to a first input type (e.g., dragging an edge of the first window), the device resizes (906) one or more dimensions of the first window that correspond to the one or more edges of the first window based on a movement vector (e.g., distance and direction) associated with the first user input. As one example, click on the right edge of the first window and drag to resize the width of the first window. As another example, click on the corner of the first window and drag to resize the height and width of the first window. For example, FIGS. 6E-6G show a sequence in which the first and second dimensions of the window 610 are resized in response to a click and drag gesture on a corner associated with the intersection of the top edge 614*b* and the right edge 614*c* of the window 610. In this example, in FIGS. 6E-6F, the first dimension (e.g., the width) of the window 610 is increased from the value 616*a* to the value 616*c*, and the second dimension (e.g., the height) of the window 610 is increased from the value 618*a* to the value 618*c*. Continuing with this example, in FIGS. 6F-6G, the first dimension (e.g., the width) of the window 610 is increased from the value 616*c* to the value 616*d*, and the second dimension (e.g., the height) of the window 610 is increased from the value 618*c* to the value 618*d*. As such, according to some embodiments, the user is able to more easily manage the resizing of windows within the display area saving the user time and effort.

In some embodiments, the first input type corresponds to (908) an input that includes a selection followed by movement. In some embodiments, when the first user input corresponds to the first input type, the first user input includes a selection followed by movement such as a click and drag gesture on an edge of the first window with the focus selector. In some embodiments, when the first user input corresponds to the first input type, the first user input includes a selection followed by movement such as a click and drag gesture on a corner of the first window with the focus selector.

In some embodiments, resizing the one or more dimensions of the first window that correspond to the one or more edges of the first window includes (910): in accordance with a determination that the first user input satisfies one or more expansion criteria, resizing one dimension of the first window to two parallel edges of the display area; and, in accordance with a determination that the first user input does not satisfy the one or more expansion criteria, resizing the one dimension of the first window to one edge of the display area. For example, an edge of the window is dragged toward an edge of display area based on a magnitude of a first portion of a gesture (e.g., the portion of the dragging gesture to the edge of the display area). In some embodiments, if the expansion criteria are met for a second portion of the gesture (e.g., the portion of the dragging gesture at the edge of the display area), the opposite edge of the window is moved toward the opposite edge of the display area. In some embodiments, if the expansion criteria are not met for the second portion of the gesture, forgo moving the opposite edge of the window to the opposite edge of the display area. In some embodiments, the expansion criteria are satisfied if the dragging gesture is held at the edge of the display area for a threshold duration. In some embodiments, the expansion criteria are satisfied when the magnitude of dragging gesture over the edge of the display area is greater than or equal to a threshold distance. As such, according to some embodiments, the user is able to more easily resize windows within the display area saving the user time and effort.

For example, the right edge of the window is dragged to the right edge of the display area and held there for X seconds. If X is greater than the time threshold, move the left edge of the window to the left edge of the display area. However, if X is less than the time threshold, maintain the left edge of the window in its position prior to the first user input. As one example, FIGS. 6H-6J show a sequence in which the right edge 624*a* of the window 620 is dragged to the right edge 606*d* of the display area 601. As such, a dimension (e.g., the width) of the window 620 is increased from the value 626*a* to the value 626*c* in a first direction (e.g., left-to-right). Continuing with this example, FIGS. 6J-6I show a sequence in which left edge 624*b* of the window 620 is moved to the right edge 634*a* of the window 630 when the expansion criteria are satisfied (e.g., the focus selector 602 is held at the right edge 606*d* of the display area 601 for X seconds). As such, the dimension (e.g., the width) of the window 620 is increased from the value 626*c* to the value 626*d* in a second direction (e.g., right-to-left).

In some embodiments, resizing the one or more dimensions of the first window that correspond to the one or more edges of the first window includes (912): in accordance with a determination that the first user input satisfies one or more expansion criteria, resizing a first dimension of the first window to a first set of two parallel edges of the display area and resizing a second dimension of the first window to a second set of parallel edges of the display area, where the first and second sets of parallel edges of the display area are distinct; and, in accordance with a determination that the first user input does not satisfy the one or more expansion criteria, resizing the first dimension of the first window to a first edge of the display area and the second dimension of the first window to a second edge of the display area.

In some embodiments, a magnitude of the movement vector associated with the first user input is (914) less than a distance between the one or more edges of the first window and one or more corresponding edges of the display area, and the one or more edges of the first window are not co-located with the one or more corresponding edges of the display area after resizing the one or more dimensions of the first window that correspond to the one or more edges of the first window based on the movement vector (e.g., distance and direction) associated with the first user input. As one example, FIGS. 6E-6G show a sequence in which the first and second dimensions of the window 610 are resized in response to a click and drag gesture on a corner associated with the intersection of the top edge 614*b* and the right edge 614*c* of the window 610. In this example, after resizing the window 610, the top edge 614*b* of the window 610 is not co-located with the top edge 606*a* of the display area 601, and the right edge 614*c* of the window 610 is not co-located with the right edge 606*d* of the display area 601.

In response to detecting the first user input, and in accordance with a determination that the first user input corresponds to a second input type (e.g., a stationary input such as a single or double click on an edge or corner of the first window), the device moves (916) the one or more edges of the first window (e.g., so as to expand the window) to one or more corresponding edges of the display area while maintaining respective one or more opposite edges of the first window. As one example, if the user double clicks on the top edge of the first window, the top edge of the first window moves to a top edge of the display area in order to increase the height of the first window. As another example, if the user double clicks on the top-right corner of the first window, the top and right edges of the first window move the top and right edges of the display area. In some embodiments, a double click inside of the chrome of the first window causes the window to expand in all directions (e.g., go full screen). In some embodiments, a double click inside of the chrome of the first window causes the window to expand in both vertical directions. As such, according to some embodiments, the user is able to more easily the resize windows within the display area saving the user time and effort.

In some embodiments, the second input type corresponds to (918) a stationary input. In some embodiments, when the first user input corresponds to the second input type, the first user input includes a stationary input such as a single or double click on an edge of the first window. In some embodiments, when the first user input corresponds to the second input type, the first user input includes a stationary input such as a single or double click on a corner of the first window.

In some embodiments, moving the one or more edges of the first window to one or more corresponding edges of the display area includes (920) moving a single edge of the first window to a corresponding edge of the display area in accordance with a determination that the first user input corresponds to the single edge of the first window. As one example, FIGS. 6L-6M show a sequence in which the right edge 644*a* of the window 640 moves to the right edge 606*d* of the display area 601 in response to the second input type (e.g., the stationary input) on the right edge 644*a* of the window 640. As such, a first dimension (e.g., the width) of the window 640 increases from the value 646*a* to the value 646*b*. As another example, FIGS. 6N-6O show a sequence in which the top edge 644*b* of the window 640 moves to the top edge 606*a* of the display area 601 in response to the second input type (e.g., the stationary input) on the top edge 644*b* of the window 640. As such, a second dimension (e.g., the height) of the window 640 increases from the value 648*a* to the value 648*b*. As such, according to some embodiments, the user is able to more easily resize a dimension of a window in one direction saving the user time and effort when managing the alignment and arrangement of windows within the display area.

In some embodiments, the device (922): after moving the single edge of the first window to the edge of the display area that corresponds to the single edge of the first window, detecting a second user input, via the input device, associated with the single edge of the first window; and, in response to detecting the second user input, and in accordance with a determination that the second user input corresponds to the second input type (e.g. a stationary input such as a double click), moving the single edge of the first window to a position at which the single edge was located on the display prior (e g, immediately prior) detecting to the first user input. For example, after moving the top edge of the first window to the top edge of the display area due to a first double click on the top edge of the first window, if the user double clicks on the top edge of the first window for a second time, the top edge of the first window moves to its former position prior to the first double click. As such, according to some embodiments, the user is able to more easily revert a dimension of a window to a former size in one direction saving the user time and effort when managing the alignment and arrangement of windows within the display area.

For example, FIGS. 6P-6Q show a sequence in which the right edge 654*a* of the window 650 moves to the left edge 664*a* of the window 660 in response to the second input type (e.g., the stationary input) on the right edge 654*a* of the window 650. As such, a first dimension (e.g., the width) of the window 650 increases from the value 656*a* to the value 656*b*. Continuing with this example, FIGS. 6Q-6R show a sequence in which the right edge 654*a* of the window 650 moves to its former position in FIG. 6P in response to the second input type (e.g., the stationary input) on the right edge 654*a* of the window 650. As such, a first dimension (e.g., the width) of the window 650 decreases from the value 656*b* to the value 656*a*.

In some embodiments, prior to detecting the first user input, a second window is displayed (924) within the display area between the first window and the edge of the display area that corresponds to the single edge of the first window, and, in accordance with a determination that first user input corresponds to the single edge of the first window and the second input type (e.g. a stationary input such as a double click), the movement of the single edge of the first window to the corresponding edge of the display area is bound by an edge of the second window that is parallel to the single edge of the first window. For example, the second window is located between the top edge of the first window and the top edge of the display area. As such, if the user double clicks on the top edge of the first window, move the top edge of the first window to the bottom edge of the second window. In some embodiments, if the second window is partially occluded ignore this behavior. For example, FIGS. 6P-6Q show a sequence in which the right edge 654*a* of the window 650 moves to the left edge 664*a* of the window 660 in response to the second input type (e.g., the stationary input) on the right edge 654*a* of the window 650. As such, the movement of the right edge 654*a* of the window 650 is constrained by the window 660, which intervenes between the right edge 654*a* of the window 650 and the right edge 606*d* of the display area 601.

In some embodiments, moving the one or more edges of the first window to one or more corresponding edges of the display area includes (926) moving two edges of the first window that are adjacent to a corner of the first window to two corresponding edges of the display area in accordance with a determination that the first user input corresponds to the corner of the first window. In some embodiments, the two edges of the first window intersect (or are adjacent to) one another. Similarly, the corresponding two edges of the display area intersect (or are adjacent to) one another. As such, according to some embodiments, the user is able to more easily resize a first dimension of a window in one direction and a second dimension of the window in one direction saving the user time and effort when managing the alignment and arrangement of windows within the display area.

As one example, FIGS. 6A-6B show a sequence in which the left edge 614*a* of the window 610 moves to the left edge 606*b* of the display area 601 and the top edge 614*b* of the window 610 moves to the top edge 606*a* of the display area 601 in response to the second input type (e.g., the stationary input) on the corner of the window 610 associated with the intersection of the left edge 614*a* and the top edge 614*b*. As such, the first dimension (e.g., the width) of the window 610 increases from a value 616*a* to a value 616*b*, and the second dimension (e.g., the height) of the window 610 increases from a value 618*a* to a value 618*b*.

In some embodiments, after moving two edges of the first window that are adjacent to the corner of the first window to the two corresponding edges of the display area, the device detects (928) a second user input, via the input device, associated with at least one edge of the first window. In response to detecting the second user input, and in accordance with a determination that the second user input corresponds to a single edge of the first window and in accordance with a determination that the second user input corresponds to the second input type (e.g. a stationary input such as a double click), the device moves the single edge of the first window to a position at which the single edge was located on the display prior (e.g., immediately prior) detecting to the first user input. In response to detecting the second user input, and in accordance with a determination that the second user input corresponds to a corner of the first window and in accordance with a determination that the second user input corresponds to the second input type (e.g. a stationary input such as a double click), the device moves the two edges of the first window that correspond to the corner of the first window to position at which the two edges were located on the display prior (e.g., immediately prior) detecting to the first user input. As such, according to some embodiments, the user is able to more easily revert one or more dimensions of a window to a former size in one direction saving the user time and effort when managing the alignment and arrangement of windows within the display area.

For example, after the top edge of the first window moves to the top edge of the display area and the left edge of the first window to the left edge of the display area due to a first double click on the top-left edge of the first window, if the user double clicks on the top-left edge of the first window for a second time, the top and left edges of the first window move back to their former positions prior to the first double click. As one example, FIGS. 6C-6D show a sequence in which the top edge 614*b* and the left edge 614*a* of the window 610 move to their former positions in FIG. 6A in response to the second input type (e.g., the stationary input) on the corner the window 610 associated with the intersection of the top edge 614*b* and the left edge 614*a* of the window 610. As such, the first dimension (e.g., the width) of the window 610 decreases from the value 616*b* to the value 616*a*, and the second dimension (e.g., the height) of the window 610 decreases from the value 618*b* to the value 618*a*.

For example, after the top edge of the first window moves to the top edge of the display area and the left edge of the first window to the left edge of the display area due to a first double click on the top-left edge of the first window, if the user double clicks on the top edge of the first window for a second time, the top edge of the first window moves back to its former positions prior to the first double click and the left edge of the first window maintains its position after the first double click. As one example, FIGS. 6V-6W show a sequence in which the right edge 6104*a* of the window 6100 moves to the right edge 6116*a* of the window 6110 and the bottom edge 6104*b* of the window 6100 moves to the bottom edge 606*c* of the display area 601 in response to the second input type (e.g., the stationary input) on the corner of the window 610 associated with the intersection of the right edge 6104*a* and the bottom edge 6104*b*. As such, the first dimension (e.g., the width) of the window 6100 increases from a value 6106*a* to a value 6106*b*, and the second dimension (e.g., the height) of the window 6100 increases from a value 6108*a* to a value 6108*b*. Continuing with this example, FIGS. 6X-6Y show a sequence in which the right edge 6104*a* of the window 6100 move to its former position in FIG. 6V and the bottom edge 6104*b* maintains its position in response to the second input type (e.g., the stationary input) on the right edge 6104*a* of the window 6100. As such, the first dimension (e.g., the width) of the window 6100 decreases from the value 6106*b* to the value 6106*a*.

In some embodiments, prior to detecting the first user input, a second window is displayed (930) within the display area between the first window and at least one of the two corresponding edges of the display area, and, in accordance with a determination that first user input corresponds to the corner of the first window and in accordance with a determination that second user input corresponds to the second input type (e.g. a stationary input such as a double click), the movement of at least one of the two edges of the first window that are adjacent to the corner of the first window to two corresponding edges of the display area is bound by at least one edge of the second window that is parallel to the two edges of the first window. For example, FIGS. 6V-6W show a sequence in which the right edge 6104*a* of the window 6100 moves to the right edge 6116*a* of the window 6110 and the bottom edge 6104*b* of the window 6100 moves to the bottom edge 606*c* of the display area 601 in response to the second input type (e.g., the stationary input) on the corner of the window 610 associated with the intersection of the right edge 6104*a* and the bottom edge 6104*b*. As such, the movement of the right edge 6104*a* of the window 6100 is constrained by the window 6110, which intervenes between the right edge 6104*a* of the window 6100 and the right edge 606*d* of the display area 601.

In some embodiments, in response to detecting the first user input, and in accordance with a determination that the first user input corresponds to a third input type, the device moves (932) one or more edges of the first window to one or more corresponding edges of the display areas. In some embodiments, the third user input type corresponds to a stationary input within a predefined region of the first window. For example, when the first user input corresponds to the third input type the first user input includes a double or single click on the chrome region of the first window. In one example, a first dimension (e.g., the height) of the first window expands to two parallel edges of the display area (e.g., both vertical directions) in response to the third input type. In another example, a second dimension (e.g., the width) of the first window expands to two parallel edges of the display area (e.g., both horizontal directions) in response to the third input type. In yet another example, the dimensions of the first window expand to fill the display area (e.g., full screen mode) in response to the third input type. As such, according to some embodiments, the user is able to more easily manage the resizing of windows within the display area saving the user time and effort.

It should be understood that the particular order in which the operations in FIGS. 9A-9D have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800 and 1000) are also applicable in an analogous manner to method 900 described above with respect to FIGS. 9A-9D. For example, the user interface objects and focus selectors described above with reference to method 900 optionally have one or more of the characteristics of the user interface objects and focus selectors described herein with reference to other methods described herein (e.g., methods 800 and 1000). For brevity, these details are not repeated here.

FIGS. 10A-10C illustrate a flow diagram of a method 1000 of providing tabbed window functionality in accordance with some embodiments. The method 1000 is performed at an electronic device (e.g., the portable multifunction device 100 in FIG. 1A, or the device 300 in FIG. 3) with a one or more processors, non-transitory memory, a display, and an input device. In some embodiments, the display is a touch-screen display and the input device is on or integrated with the display. In some embodiments, the display is separate from the input device. Some operations in method 1000 are, optionally, combined and/or the order of some operations is, optionally, changed.

As described below, the method 1000 provides an intuitive way to provide tabbed window functionality. The method reduces the cognitive burden on a user when providing tabbed window functionality, thereby creating a more efficient human-machine interface. For battery-operated electronic devices, enabling a user to utilize tabbed window functionality faster and more efficiently conserves power and increases the time between battery charges.

The device displays (1002), on the display, a first window associated with a first application within a display area. In some embodiments, the first window is currently in the foreground or "in focus" within the display area. As one example, FIG. 7A shows a window 730 associated with application A operating in windowed mode (e.g., non-full screen mode). In FIG. 7A, the window 730 is displayed in the foreground as indicated by the shading of the chrome region 732*a*. As another example, FIG. 7N shows a window 790 associated with application C operating in full screen mode (e.g., non-windowed mode). In FIG. 7N, the window 790 is displayed in the foreground as indicated by the shading of the chrome region 792*a*.

The device detects (1004) a first user input, via the input device, that corresponds to a request to add a second window associated with the first application.

In some embodiments, the first user input corresponds to (1006) selection of an affordance within the first window that causes an instruction to be sent to the first application to generate a new window associated with the first application. For example, with reference to FIG. 7A, the window 730 includes an affordance (not shown) provided to open a new window associated with application A. As another example, with reference to FIG. 7C, the drop-down menu 746 includes a new window affordance 748*a* provided to open a new window associated with application A.

In some embodiments, the first user input corresponds to (1008) a combination of one or more keystrokes that causes an instruction to be sent to the first application to generate a new window associated with the first application. For example, the combination of one or more keystrokes that causes an instruction to be sent to the application to generate a new window associated with the application is a "Ctrl+N" combination. As one example, FIGS. 7A-7B show a sequence in which a new window 740 is displayed within the display area 701 in response to a "Ctrl+N" keystroke combination issued to application A while application A is operating in windowed mode. As another example, FIGS. 7N-7O show a sequence in which a merged window 795 is created with a tab 794*a* for the previous window 790 and new tab 794*b* is displayed in response to a "Ctrl+N" keystroke combination issued to application C while application C is operating in full screen mode.

In some embodiments, a combination of one or more keystrokes that causes an instruction to be sent to the first application to generate a new tab associated with the first application results in a new window associated with the first application (e.g., "Ctrl+T"). In some embodiments, if a user input corresponds to a combination of one or more keystrokes that causes an instruction to be sent to the first application to generate a new tab associated with the first application plus a modifier key (e.g., "Ctrl+Opt+T"), a new window associated with the first application is displayed. In some embodiments, if a user input corresponds to a combination of one or more keystrokes that causes an instruction to be sent to the first application to generate a new window associated with the first application plus a modifier key (e.g., "Ctrl+Opt+N"), a new tab associated with the first application is displayed.

In response to detecting the first user input, and in accordance with a determination that the first window is displayed within the display area in full screen mode, the device adds (1010) the second window as a new tab within a tab bar associated with the first window. In some embodiments, the first window becomes a background tab, and the new tab associated with the second window is displayed in the foreground. In some embodiments, the new tab associated with the second window is added as a background tab and the first window remains in the foreground. For example, FIGS. 7N-7O show a sequence in which a merged window 795 is created with a tab 794*a* for the previous window 790 and new tab 794*b* is displayed in response to a new window command (e.g., a "Ctrl+N" keystroke combination) issued to application C while application C is operating in full screen mode. Thus, according to some embodiments, tabbing functionality is enabled by the operating system for applications without native tab functionality. This, for example, provides the user with a more intuitive interface that is less cluttered.

In some embodiments, adding the second window as the new tab within the tab bar associated with the first window includes (1012) displaying the second window as a tab within the second window as the new tab within the tab bar associated with the first window after the second application generates the second window. In some embodiments, the first application does not have native tabbing functionality. Thus, the operating system treats the new window as a virtual tab and overlays the tab bar on the first and second windows independent of the first application. As such, for example, in FIG. 7O, the windows that correspond to the tabs 794*a* and 794*b* are full screen windows stacked on top of one another such that the foreground window is displayed on the top of the stack (e.g., the new window associated with the tab 794*b* in FIG. 7O). According to some embodiments, the tabs are displayed within a virtual tab bar superimposed on the new foreground window by the operating system. Thus, in some embodiments, tabbing functionality is enabled by the operating system for applications without native tab functionality. This, for example, provides the user with a more intuitive interface that is less cluttered.

In some embodiments, adding the second window as a new tab within a tab bar associated with the first window includes (1014): determining whether a global tabbed window functionality is enabled; and, in accordance with the determination that the first window is displayed within the display area in full screen mode and in accordance with a determination that the global tabbed window setting is enabled, adding the second window as a new tab within a tab bar associated with the first window. In some embodiments, the operating system includes a global tab setting that can be adjusted to enable tabbed windows to be created manually, to always be created, or to only be created when an application is operating in full screen mode. For example, FIGS. 7E-7G show a sequence in which the global tab setting is changed from "Manual" to "Always." In some embodiments, the tabs preference associated with the picker menu 762*d* in FIGS. 7E-7G applies to applications without native tabbing functionality. This, for example, provides the user with a more intuitive interface that is less cluttered. In some embodiments, the tabs preference associated with the picker menu 762*d* in FIGS. 7E-7G applies to all applications. In some embodiments, the tabs preference associated with the picker menu 762*d* applies in FIGS. 7E-7G to all application but ones included on an opt-out list.

As shown in FIG. 7F, the picker menu 762*d* includes a "Manual" option 764*a*, where a new window operation issued to the foreground application opens a window associated with the foreground application and a new tab operation issued to the foreground application opens a new tab associated with the foreground application when the foreground application has native tabbing functionality. In some embodiments, entry of a modifier key plus new window key combination overrides the default setting. For example, open in tabbed window associated with the foreground application if default is to open in a new window (e.g., the "Manual" behavior). As another example, open in a new window associated with the foreground application if default is to open in tabbed window (e.g., the "Always" behavior). In some embodiments, entry of a modifier key plus clicking on a dock icon overrides the default setting. As one example, open in tabbed window for the application that corresponds to the dock icon if default is to open in a new window (e.g., the "Manual" behavior). As another example, open in a new window for the application that corresponds to the dock icon if default is to open in tabbed window (e.g., the "Always" behavior).

As shown in FIG. 7F, the picker menu 762*d* also includes an "Always" option 764*b*, where a new window operation issued to the foreground application opens a new tab associated with the foreground application and (optionally) a new tab operation issued to the foreground application opens a new window associated with the foreground application. As shown in FIG. 7F, the picker menu 762*d* further includes a "Full Screen Only" option 764*c*, where a new window operation issued to the foreground application while in full screen mode opens a new tab associated with the foreground application and (optionally) a new tab operation issued to the foreground application while in full screen mode opens a new window associated with the foreground application.

As one example, the "Always" behavior applies to FIGS. 7H-7M after changing the global tab setting from "Manual" to "Always" in FIGS. 7E-7G. As another example, the "Manual" behavior applies to FIGS. 7A-7D before changing the global tab setting from "Manual" to "Always" in FIGS. 7E-7G. As another example, the "Full Screen Only" behavior applies to FIGS. 7N-7O.

In some embodiments, the first application is not included (1016) on an opt-out list for the global tabbed window functionality. In some embodiments, the global tab setting applies to all application that are not included on an opt-out list. For example, the opt-out list includes applications with native tab functionality, user specified application, and/or application developed by the same developer as the operating system. Thus, according to some embodiments, applications with native tab functionality may be exempted from the global tab setting thereby avoiding potentially duplicitous tabbing functionality.

In some embodiments, after detecting the first user input, the device detects (1018) a subsequent user input, via the input device, to add a third window associated with a second application. In response to detecting the subsequent user input, and in accordance with a determination that the first window is displayed within the display area in full screen mode, the device adds the third window as a new tab in a tab bar associated with the first window. In response to detecting the subsequent user input, and in accordance with a determination that the first window is displayed within the display area in windowed mode, the device displays the third window as a separate window within the display area. For example, with reference to FIGS. 7N-7O, another tab would be added to the merged window 795 if a subsequent new window command was issued to a different application (not shown). For example, with reference to FIGS. 7A-7B, another window would be added within the display area 701 if a subsequent new window command was issued to a different application (not shown). Thus, according to some embodiments, tabbing functionality is enabled across multiple applications. For example, a merged window with tabs for more multiple applications provides the user with a more intuitive interface that is less cluttered.

In response to detecting the first user input, and in accordance with a determination that the first window is displayed within the display area in windowed mode, the device displays (1020) the second window separate from the first window within the display area. In some embodiments, the second window is positioned behind the first window, and the first window remains in the foreground or "in focus". In some embodiments, the second window is overlaid on the first window, and the second window is the foreground window or "in focus". As one example, FIGS. 7A-7B show a sequence in which a new window 740 is displayed within the display area 701 in response to a new window command (e.g., a "Ctrl+N" keystroke combination) issued to application A while application A is operating in windowed mode.

In some embodiments, after displaying the second window separate from the first window within the display area, the device detects (1022) a second user input, via the input device, to merge the first and second windows into a single tabbed window, and, in response to detecting the second user input, the device replaces display of the separate first and second windows with a merged window that includes a tab bar with a first tab associated with the first window and a second tab associated with the second window. According to some embodiments, generation of tabbed windows from multiple open windows is handled by the operating system. For example, the operating system hides open windows other than a "top" open window associated with a foreground tab and moves/resizes the hidden windows when they are requested to be displayed so that they are displayed on top of one another. Thus, in some embodiments, tabbing functionality is enabled by the operating system for applications without native tab functionality. This, for example, provides the user with a more intuitive interface that is less cluttered.

In some embodiments, the application is not aware of the fact that its windows are being displayed in a single tabbed window. According to some embodiments, the application is able to perform operations with respect to the windows as it normally would, treating them as though they were just stacked on top of each other. For example, to improve performance, the application is optionally asked to resize windows only when the windows are moved to the foreground of the tabbed window.

For example, FIGS. 7B-7D show a sequence in which a plurality of windows 710, 720, 730, and 740 associated with application A are merged into a single merged window 750 with tabs 756*a*, 756*b*, 756*c*, and 756*d* corresponding to the plurality of windows 710, 720, 730, and 740. In some embodiments, the "create tabbed window" affordance 748*c* within the drop-down menu 746 in FIG. 7C enables windows associated with applications that do not have native tab functionality to be displayed in a tabbed window. As such, for example, open windows 710, 720, 730, and 740 are resized to a same size and stacked on top of one another such that the foreground window is displayed on the top of the stack (e.g., the window 740 associated with the tab 756*d*). In this example, the tabs 756*a*, 756*b*, 756*c*, and 756*d* are displayed within a virtual tab bar 752*c*, which is superimposed on the top window of the stack of windows by the operating system. For example, if another tab is selected within the tab bar 752*c*, a window associated with selected tab is moved to the top of the stack of windows.

According to some embodiments, if a close tab command is issued to one of the tabs 756*a*, 756*b*, 756*c*, and 756*d*, the operating system issues a command to application A to close a window that corresponds to the tab. According to some embodiments, if a close/exit command is issued to the merged window 750, the operating system issues a command to application A to close each of the windows 710, 720, 730, and 740 that correspond to the tabs 756*a*, 756*b*, 756*c*, and 756*d* in the merged window 750.

According to some embodiments, if one of the tabs 756*a*, 756*b*, 756*c*, and 756*d* is dragged out of the tab bar 752*c*, a window corresponding to the tab is displayed separate from the stack of windows (e.g., as shown in FIGS. 7L-7M). In some embodiments, the tabs 756*a*, 756*b*, 756*c*, and 756*d* may be dragged out of the merged window 750 and into a spaces bar associated with the top edge of the display area 701. According to some embodiments, if a window is dragged into the merged window 750, a new tab is added to the merged window 750 as either a foreground or background tab (e.g., as shown in FIGS. 7J-7K).

In some embodiments, the tab bar is displayed (1024) in a chrome region of the merged window, and where the tab bar is generated and controlled independent of the first application. In some embodiments, the first application does not have native tabbing functionality. Thus, according to some embodiments, the operating system treats the first and second windows as virtual tabs and displays the tab bar independent of the first application. This, for example, provides the user with a more intuitive interface that is less cluttered. For example, with reference to FIG. 7D, the tabs 756*a*, 756*b*, 756*c*, and 756*d* are displayed within a virtual tab bar 752*c* superimposed on the top window of the stack of windows by the operating system. In this example, the virtual tab bar 752*c* is superimposed on the chrome region of the window 740 associated with the foreground tab 756*d*. As such, in FIG. 7D, the window 740 is the top window in the stack of windows 710, 720, 730, and 740.

In some embodiments, after displaying the merged window, the device detects (1026) a third user input, via the input device, to close the merged window, and, in response to detecting the third user input, the device sends window close instructions to the first application to close the first and second windows. For example, with reference to FIG. 7D, if a close/exit command (e.g., selection of a close affordance in the chrome region 752*a*) is issued to the merged window 750, the operating system issues a command to application A to close each of the windows 710, 720, 730, and 740 that correspond to the tabs 756*a*, 756*b*, 756*c*, and 756*d* in the merged window 750 (not shown).

In some embodiments, after displaying the merged window, the device detects (1028) a third user input, via the input device, dragging a third window separate from the merged window into the tab bar of the merged window, where the third window is associated with a second application; and, in response to the third user input, the device adds a new tab associated with the third window to the tab bar of the merged window. For example, the third window includes one or more tabs corresponding to windows of the second application. For example, FIGS. 7J-7K show a sequence in which the window 770 associated with application A is added as a new foreground tab 764*c* to the merged window 765 that includes the tabs 764*a* and 764*b* associated with application B. As such, in FIG. 7K, the merged window 765 includes the tabs 764*a* and 764*b* associated with application B and the foreground tab 764*c* associated with application A. Thus, according to some embodiments, the tabbing functionality provided by operating system operates similar to application with native tabbing functionality.

In some embodiments, after displaying the merged window, the device detects (1030) a third user input, via the input device, dragging the merged window into a third window separate from the merged window, where the third window is associated with a second application, and, in response to the third user input, the device adds a new tab associated with the third window to the tab bar of the merged window. In some embodiments, a virtual tab bar is overlaid on the third window and tabs are created within the new virtual tab bar for the third window and the tabs of the merged window. For example, with reference to FIG. 7J, the merged window 765 is dragged into the chrome region 772*a* of the window 770 (not shown). As a result, continuing with this example, a virtual tab bar with a tab corresponding to the window 770 and the tabs 764*a* and 764*b* is overlaid on a merged window (not shown). Thus, according to some embodiments, the tabbing functionality provided by operating system operates similar to application with native tabbing functionality. This, for example, provides the user with a more intuitive interface that is less cluttered.

In some embodiments, after adding the new tab associated with the third window to the tab bar of the merged window, the device detects (1032) a fourth user input, via the input device, to close the merged window, and, in response to detecting the fourth user input, the device sends a first window close instruction to the first application to close the first and second windows and a second window close instruction to the second application to close the third window. For example, with reference to FIG. 7K, if a close/exit command (e.g., selection of a close affordance in the chrome region 767*a*) is issued to the merged window 765, the operating system issues a command to application A to close each of the windows that correspond to the tabs 764*a* and 764*b* and the window that corresponds to the tab 764*c* (not shown).

It should be understood that the particular order in which the operations in FIGS. 10A-10C have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800 and 900) are also applicable in an analogous manner to method 1000 described above with respect to FIGS. 10A-10C. For example, the user interface objects and focus selectors described above with reference to method 1000 optionally have one or more of the characteristics of the user interface objects and focus selectors described herein with reference to other methods described herein (e.g., methods 800 and 900). For brevity, these details are not repeated here.

Figure 11:
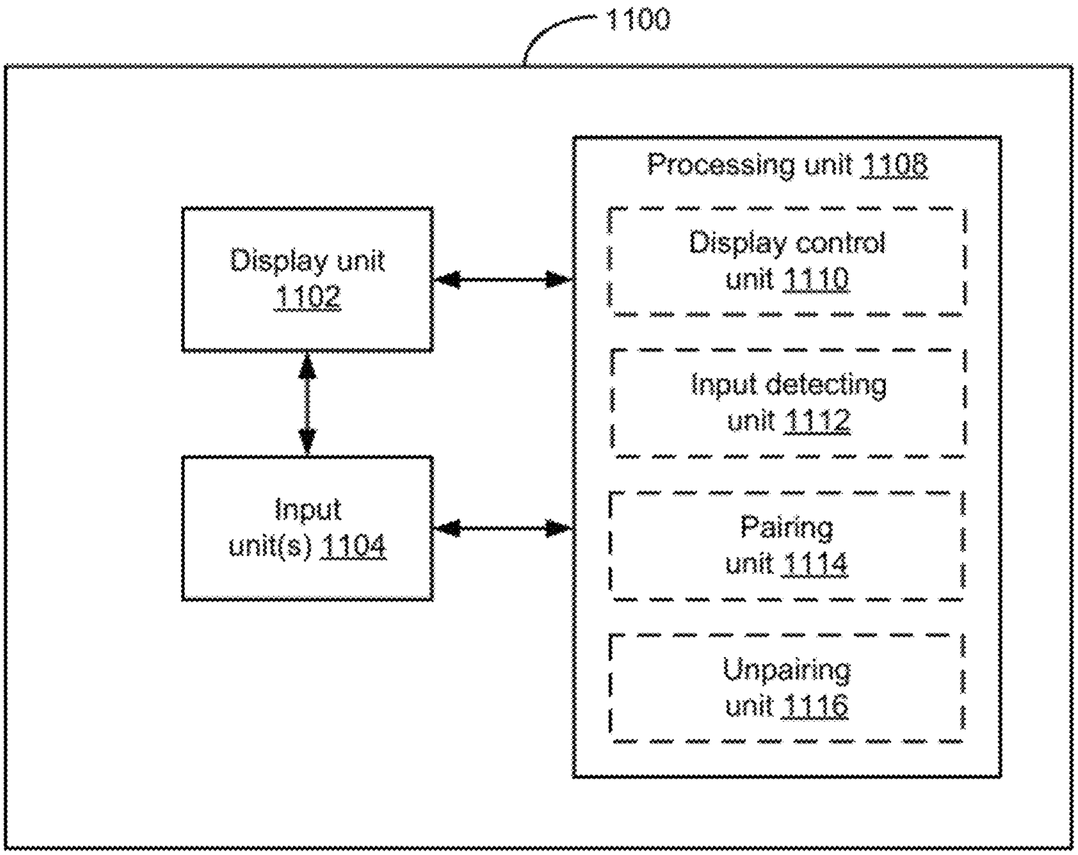
FIGS. 11-13 are functional block diagrams of an electronic device in accordance with some embodiments.

In accordance with some embodiments, FIG. 11 shows a functional block diagram of an electronic device 1100 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, an electronic device 1100 includes a display unit 1102 configured to display a user interface, one or more input units 1104 configured to receive user inputs, and a processing unit 1108 coupled to the display unit 1102 and the one or more input units 1104. In some embodiments, the processing unit 1108 includes: a display control unit 1110, an input detecting unit 1112, a pairing unit 1114, and an unpairing unit 1116.

The processing unit 1108 is configured to: enable display of (e.g., with the display control unit 1110), on the display unit 1102, a first window and a second window within a display area, the first window having a first edge parallel to a second edge of the second window; and detecting (e.g., with the input detecting unit 1112) a first user input, via the one or more input units 1103, moving the first edge of the first window toward the second edge of the second window. In response to detecting the first user input, and in accordance with a determination that the first user input satisfies one or more pairing criteria, the processing unit 1108 is further configured to pair (e.g., with the pairing unit 1114) the first edge of the first window to the second edge of the second window such that the first window stops moving in response to the first user input before it overlaps the second, where the one or more pairing criteria include a first pairing criterion that is met when the first input corresponds to movement of the first edge toward the second edge that deviates from a predefined axis by less than an angular threshold value. In response to detecting the first user input, and in accordance with a determination that the first user input does not satisfy the one or more pairing criteria, the processing unit 1108 is further configured to continue the movement (e.g., with the display control unit 1110) of the first window based on the first user input so that the first window at least partially overlaps the second window.

In some embodiments, the first user input corresponds to moving the first window within the display area by dragging the first window toward the second window.

In some embodiments, the first user input corresponds to resizing the first window within the display area by dragging the first edge of the first window toward the second window.

In some embodiments, a second pairing criterion of the one or more pairing criteria includes a velocity threshold value, and satisfying the second pairing criterion includes determining that that a velocity associated with the first user input breaches the velocity threshold value.

In some embodiments, a third pairing criterion of the one or more pairing criteria includes a distance threshold value, and satisfying the third pairing criterion includes determining that the input corresponds to movement of the first edge of the window in a respective direction to the edge of the second window without corresponding to more than a threshold amount of movement in the respective direction.

In some embodiments, in response to detecting the first user input, and in accordance with a determination that the first user input satisfies one or more pairing criteria and that the first window is overlapping the second window, the processing unit 1108 is further configured to continue the movement (e.g., with the display control unit 1110) of the first window based on the first user input and enable display of (e.g., with the display control unit 1110) the first window at least partially overlapping the second window.

In some embodiments, in response to detecting the first user input, and in accordance with a determination that the first user input satisfies one or more pairing criteria and that the second edge of the second window is occluded within the display area, the processing unit 1108 is further configured to continue the movement (e.g., with the display control unit 1110) of the first window based on the first user input and enable display of (e.g., with the display control unit 1110) the first window at least partially overlaps the second window.

In some embodiments, while the first edge of the first window is paired with the second edge of the second window, the processing unit 1108 is further configured to detect (e.g., with the input detecting unit 1112) a second user input, via the one or more input units 1104, moving the first window away from the second window. In response to the second user input, the processing unit 1108 is further configured to unpair (e.g., with unpairing unit 1116) the first edge of the first window from the second edge of the second window and move (e.g., with the display control unit 1110) the first window according to a movement vector associated with the second user input.

In some embodiments, while the first edge of the first window is paired with the second edge of the second window, the processing unit 1108 is further configured to detect (e.g., with the input detecting unit 1112) a second component of the first user input moving the first window away from the second window. In response to the second component of the first user input and in accordance with a determination that a magnitude of the second component breaches a distance threshold, the processing unit 1108 is further configured to unpair (e.g., with unpairing unit 1116) the first edge of the first window from the second edge of the second window and move (e.g., with the display control unit 1110) the first window according to a movement vector associated with the second component of the first user input.

In some embodiments, while the first edge of the first window is paired with the second edge of the second window, the processing unit 1108 is further configured to detect (e.g., with the input detecting unit 1112) a second user input, via the one or more input units 1104, moving the first window toward the second edge of the second window. In response to detecting the second user input, and in accordance with a determination that the second user input satisfies one or more separation criteria, the processing unit 1108 is further configured to unpair (e.g., with unpairing unit 1116) the first edge of the first window from the second edge of the second window and move (e.g., with the display control unit 1110) the first window over the second window according to a movement vector associated with the second user input. In response to detecting the second user input, and in accordance with a determination that the second user input does not satisfy the one or more separation criteria, processing unit 1108 is further configured to maintain (e.g., with the pairing unit 1114) the pairing between the first edge of the first window and the second edge of the second window and forego moving the first window over the second window.

In some embodiments, moving the first window over the second window according to the movement vector associated with the second user input includes: in accordance with a determination that the second user input corresponds to moving a focus selector over the second window, displaying an animation such that moving the first window over the second window is discontinuous; and, in accordance with a determination that the second user input does not correspond to moving the focus selector over the second window, foregoing displaying the animation such that moving the first window over the second window is continuous.

In some embodiments, while the first edge of the first window is paired with the second edge of the second window, the processing unit 1108 is further configured to detect (e.g., with the input detecting unit 1112) a second user input, via the one or more input units 1104, that corresponds to movement of the first edge relative to the second edge. In response to detecting the second user input, and in accordance with a determination that the second user input corresponds to movement of the first window such that the first edge of the first window moves over the second edge, the processing unit 1108 is further configured to delay (e.g., with the display control unit 1110) movement of the first window until the second user input has reached a movement threshold. In response to detecting the second user input, and in accordance with a determination that the second user input corresponds to movement of the first window such that the first edge of the first window moves away from the second edge, the processing unit 1108 is further configured to start (e.g., with the display control unit 1110) to move the first window before the second user input has reached the movement threshold.

In some embodiments, while the first edge of the first window is paired with the second edge of the second window, the processing unit 1108 is further configured to detect (e.g., with the input detecting unit 1112) a second user input, via the one or more input units 1104, moving the first window along the second edge of the second window. In response to detecting the second user input, and in accordance with a determination that the second user input satisfies one or more separation criteria, the processing unit 1108 is further configured to unpair (e.g., with unpairing unit 1116) the first edge of the first window from the second edge of the second window and move (e.g., with the display control unit 1110) the first window according to a movement vector associated with the second user input. In response to detecting the second user input, and in accordance with a determination that the second user input does not satisfy any of the one or more separation criteria, the processing unit 1108 is further configured to maintain (e.g., with the pairing unit 1114) the pairing between the first edge of the first window and the second edge of the second window and move (e.g., with the display control unit 1110) the first window parallel to the second edge of the second window according to the second user input.

In some embodiments, the parallel movement of the first window is constrained by a third edge of the second window, and the third edge of the second window is perpendicular to the second edge of the second window.

In some embodiments, while the first edge of the first window is paired with the second edge of the second window, the processing unit 1108 is further configured to detect (e.g., with the input detecting unit 1112) a second user input, via the one or more input units 1104, moving the second window along the first edge of the first window. In response to detecting the second user input, and in accordance with a determination that the second user input satisfies one or more separation criteria, the processing unit 1108 is further configured to unpair (e.g., with unpairing unit 1116) the second edge of the second window from the first edge of the first window and move (e.g., with the display control unit 1110) the second window according to second user input. In response to detecting the second user input, and in accordance with a determination that the second user input does not satisfy any of the one or more of the separation criteria, the processing unit 1108 is further configured to maintain (e.g., with the pairing unit 1114) the pairing between the first edge of the first window and the second edge of the second window and move (e.g., with the display control unit 1110) the second window parallel to the first edge of the first window according to a movement vector associated with the second user input.

In some embodiments, while the first edge of the first window is paired with the second edge of the second window, the processing unit 1108 is further configured to detect (e.g., with the input detecting unit 1112) a second user input, via the one or more input units 1104, dragging a respective edge of the first window along the second edge of the second window, where the respective edge of the first window is perpendicular to the second edge of the second window. In response to detecting the second user input, the processing unit 1108 is further configured to resize (e.g., with the display control unit 1110) a dimension of the first window associated with the respective edge according to the second user input.

In some embodiments, the resized dimension of the first window is constrained by a third edge of the second window, and the third edge of the second window is perpendicular to the second edge of the second window.

Figure 12:
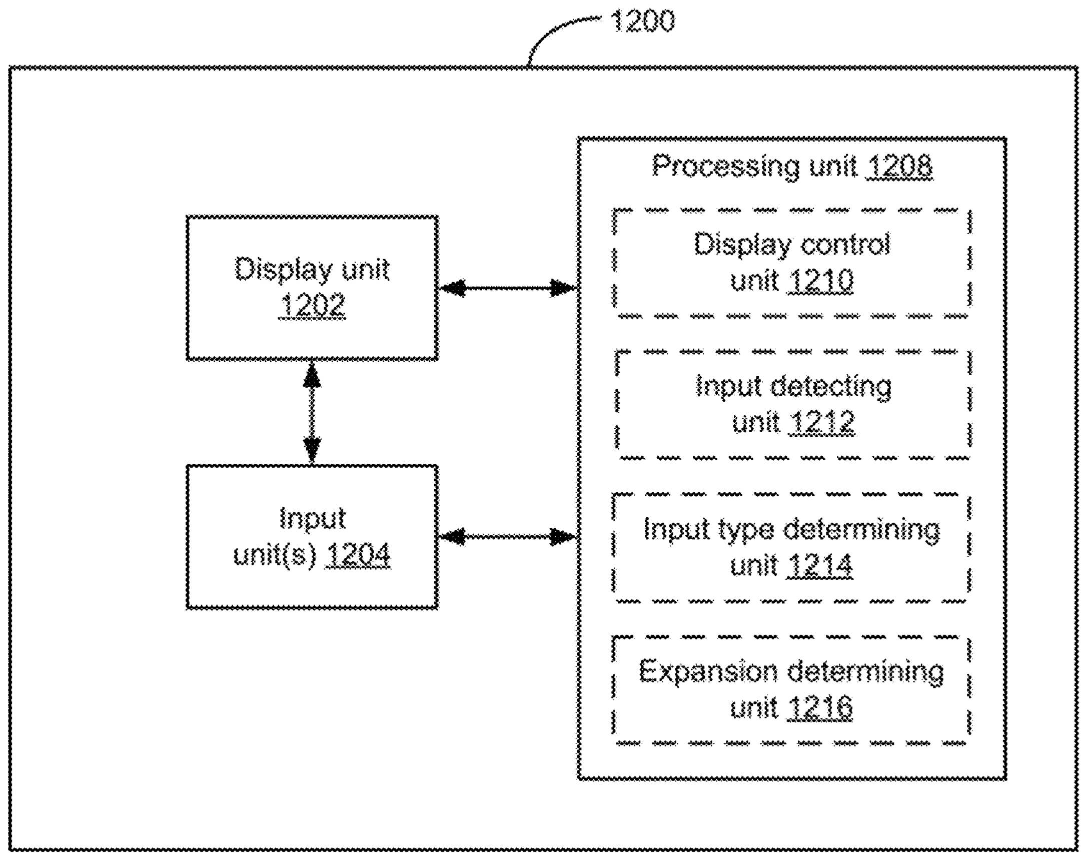

In accordance with some embodiments, FIG. 12 shows a functional block diagram of an electronic device 1200 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, an electronic device 1200 includes a display unit 1202 configured to display a user interface, one or more input units 1204 configured to receive user inputs, and a processing unit 1208 coupled to the display unit 1202 and the one or more input units 1204. In some embodiments, the processing unit 1208 includes: a display control unit 1210, an input detecting unit 1212, an input type determining unit 1214, and an expansion determining unit 1216.

The processing unit 1208 is configured to: enable display of (e.g., with the display control unit 1210), on the display unit 1202, a first window in a display area; and detect (e.g., with the input detecting unit 1212) a first user input, via the one or more input units 1204, associated with one or more edges of the first window. In response to detecting the first user input, and in accordance with a determination (e.g., with the input type determining unit 1214) that the first user input corresponds to a first input type, the processing unit 1208 is further configured to resize (e.g., with the display control unit 1210) one or more dimensions of the first window that correspond to the one or more edges of the first window based on a movement associated with the first user input. In response to detecting the first user input, and in accordance with a determination (e.g., with the input type determining unit 1214) that the first user input corresponds to a second input type, the processing unit 1208 is further configured to move (e.g., with the display control unit 1210) the one or more edges of the first window to one or more corresponding edges of the display area while maintaining respective one or more opposite edges of the first window.

In some embodiments, the first input type corresponds to an input that includes a selection followed by movement.

In some embodiments, the second input type corresponds to a stationary input.

In some embodiments, moving the one or more edges of the first window to one or more corresponding edges of the display area includes moving a single edge of the first window to a corresponding edge of the display area in accordance with a determination that the first user input corresponds to the single edge of the first window.

In some embodiments, after moving the single edge of the first window to the edge of the display area that corresponds to the single edge of the first window, the processing unit 1208 is further configured to detect (e.g., with the input detecting unit 1212) a second user input, via the one or more input unit 1204, associated with the single edge of the first window. In response to detecting the second user input, and in accordance with a determination (e.g., with the input type determining unit 1214) that the second user input corresponds to the second input, the processing unit 1208 is further configured to move (e.g., with the display control unit 1210) the single edge of the first window to a position at which the single edge was located on the display unit 1202 prior detecting to the first user input.

In some embodiments, prior to detecting the first user input, a second window is displayed within the display area between the first window and the edge of the display area that corresponds to the single edge of the first window, and, in accordance with a determination (e.g., with the input type determining unit 1214) that first user input corresponds to the single edge of the first window and the second input type, the movement of the single edge of the first window to the corresponding edge of the display area is bound by an edge of the second window that is parallel to the single edge of the first window.

In some embodiments, moving the one or more edges of the first window to one or more corresponding edges of the display area includes moving two edges of the first window that are adjacent to a corner of the first window to two corresponding edges of the display area in accordance with a determination that the first user input corresponds to the corner of the first window.

In some embodiments, after moving two edges of the first window that are adjacent to the corner of the first window to the two corresponding edges of the display area, the processing unit 1208 is further configured to detect (e.g., with the input detecting unit 1212) a second user input, via the one or more input unit 1204, associated with at least one edge of the first window. In response to detecting the second user input, and in accordance with a determination that the second user input corresponds to a single edge of the first window and in accordance with a determination (e.g., with the input type determining unit 1214) that the second user input corresponds to the second input, the processing unit 1208 is further configured to move (e.g., with the display control unit 1210) the single edge of the first window to a position at which the single edge was located on the display unit 1202 prior detecting to the first user input. In response to detecting the second user input, and in accordance with a determination that the second user input corresponds to a corner of the first window and in accordance with a determination (e.g., with the input type determining unit 1214) that the second user input corresponds to the second input type, the processing unit 1208 is further configured to move (e.g., with the display control unit 1210) the two edges of the first window that correspond to the corner of the first window to position at which the two edges were located on the display unit 1202 prior detecting to the first user input.

In some embodiments, prior to detecting the first user input, a second window is displayed within the display area between the first window and at least one of the two corresponding edges of the display area, and, in accordance with a determination that first user input corresponds to the corner of the first window and in accordance with a determination (e.g., with the input type determining unit 1214) that second user input corresponds to the second input type, the movement of at least one of the two edges of the first window that are adjacent to the corner of the first window to two corresponding edges of the display area is bound by at least one edge of the second window that is parallel to the two edges of the first window.

In some embodiments, resizing the one or more dimensions of the first window that correspond to the one or more edges of the first window includes: in accordance with a determination (e.g., with the expansion determining unit 1216) that the first user input satisfies one or more expansion criteria, resizing one dimension of the first window to two parallel edges of the display area; and, in accordance with a determination (e.g., with the expansion determining unit 1216) that the first user input does not satisfy the one or more expansion criteria, resizing the one dimension of the first window to one edge of the display area.

In some embodiments, resizing the one or more dimensions of the first window that correspond to the one or more edges of the first window includes: in accordance with a determination (e.g., with the expansion determining unit 1216) that the first user input satisfies one or more expansion criteria, resizing a first dimension of the first window to a first set of two parallel edges of the display area and resizing a second dimension of the first window to a second set of parallel edges of the display area, where the first and second sets of parallel edges of the display area are distinct; and, in accordance with a determination (e.g., with the expansion determining unit 1216) that the first user input does not satisfy the one or more expansion criteria, resizing the first dimension of the first window to a first edge of the display area and the second dimension of the first window to a second edge of the display area.

In some embodiments, a magnitude of the movement vector associated with the first user input is less than a distance between the one or more edges of the first window and one or more corresponding edges of the display area, and the one or more edges of the first window are not co-located with the one or more corresponding edges of the display area after resizing the one or more dimensions of the first window that correspond to the one or more edges of the first window based on the movement vector associated with the first user input.

In some embodiments, in response to detecting the first user input, and in accordance with a determination (e.g., with the input type determining unit 1214) that the first user input corresponds to a third input type, the processing unit 1208 is further configured to move (e.g., with the display control unit 1210) one or more edges of the first window to one or more corresponding edges of the display area.

Figure 13:
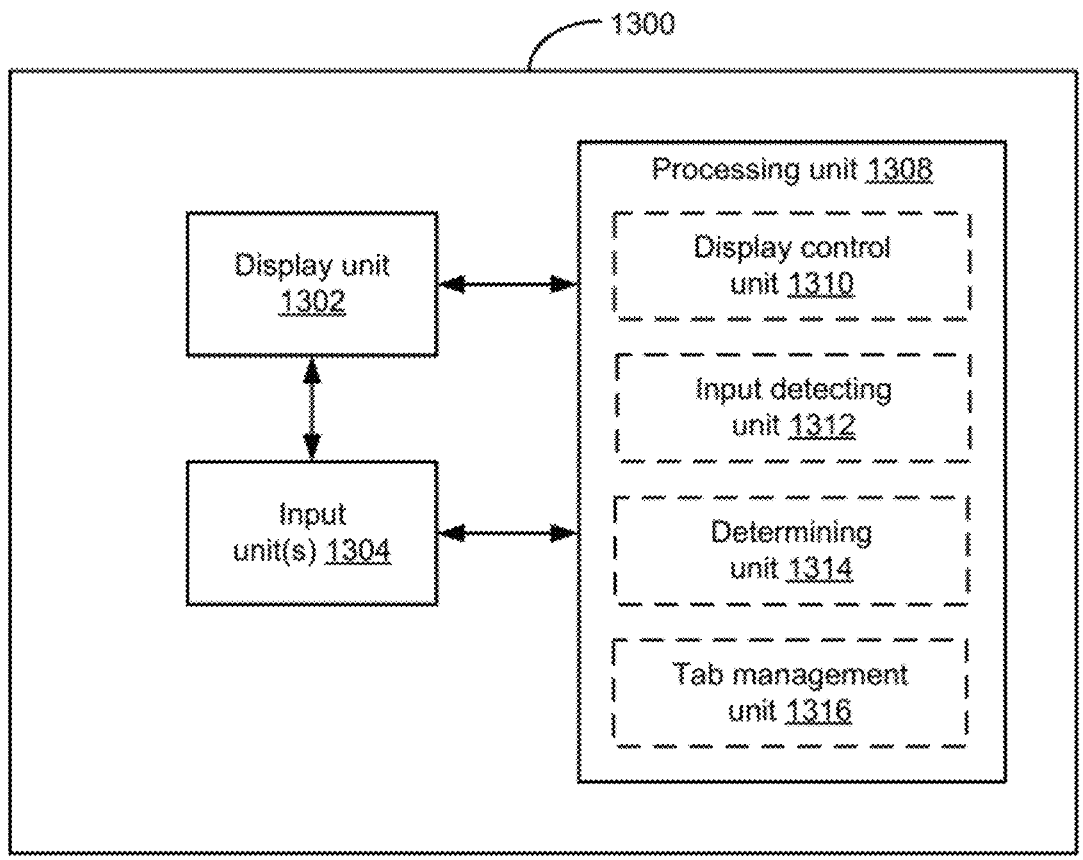

In accordance with some embodiments, FIG. 13 shows a functional block diagram of an electronic device 1300 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 includes a display unit 1302 configured to display a user interface, one or more input units 1304 configured to receive user inputs, and a processing unit 1308 coupled to the display unit 1302 and the one or more input units 1304. In some embodiments, the processing unit 1308 includes: a display control unit 1310, an input detecting unit 1312, a determining unit 1314, and a tab management unit 1316.

The processing unit 1308 is configured to: enable display of (e.g., with the display control unit 1310), on the display unit 1302, a first window associated with a first application within a display area; and detect (e.g., with the input detecting unit 1312) a first user input, via the one or more input unit 1304, that corresponds to a request to add a second window associated with the first application. In response to detecting the first user input, and in accordance with a determination (e.g., with the determining unit 1314) that the first window is displayed within the display area in full screen mode, the processing unit 1308 is further configured to add (e.g., with the tab management unit 1316) the second window as a new tab within a tab bar associated with the first window. In response to detecting the first user input, and in accordance with a determination (e.g., with the determining unit 1314) that the first window is displayed within the display area in windowed mode, the processing unit 1308 is further configured to enable display of (e.g., with the display control unit 1310) the second window separate from the first window within the display area.

In some embodiments, the first user input corresponds to selection of an affordance within the first window that causes an instruction to be sent to the first application to generate a new window associated with the first application.

In some embodiments, the first user input corresponds to a combination of one or more keystrokes that causes an instruction to be sent to the first application to generate a new window associated with the first application.

In some embodiments, adding the second window as the new tab within the tab bar associated with the first window includes displaying the second window as a tab within the second window as the new tab within the tab bar associated with the first window after the second application generates the second window.

In some embodiments, adding the second window as a new tab within a tab bar associated with the first window includes: determining whether a global tabbed window functionality is enabled; and, in accordance with the determination that the first window is displayed within the display area in full screen mode and in accordance with a determination that the global tabbed window setting is enabled, adding the second window as a new tab within a tab bar associated with the first window.

In some embodiments, the first application is not included on an opt-out list for the global tabbed window functionality.

In some embodiments, after displaying the second window separate from the first window within the display area, the processing unit 1308 is further configured to detect (e.g., with the input detecting unit 1312) a second user input, via the one or more input units 1304, to merge the first and second windows into a single tabbed window. In response to detecting the second user input, the processing unit 1308 is further configured to replace display of (e.g., with the display control unit 1310) the separate first and second windows with a merged window that includes a tab bar with a first tab associated with the first window and a second tab associated with the second window.

In some embodiments, the tab bar is displayed in a chrome region of the merged window, and the tab bar is generated and controlled independent of the first application.

In some embodiments, after displaying the merged window, the processing unit 1308 is further configured to detect (e.g., with the input detecting unit 1312) a third user input, via the one or more input units 1304, to close the merged window, and, in response to detecting the third user input, the processing unit 1308 is further configured to send (e.g., with the tab management unit 1316) window close instructions to the first application to close the first and second windows.

In some embodiments, after displaying the merged window, the processing unit 1308 is further configured to detect (e.g., with the input detecting unit 1312) a third user input, via the one or more input units 1304, dragging a third window separate from the merged window into the tab bar of the merged window, where the third window is associated with a second application, and, in response to the third user input, the processing unit 1308 is further configured to add (e.g., with the tab management unit 1316) a new tab associated with the third window to the tab bar of the merged window.

In some embodiments, after displaying the merged window, the processing unit 1308 is further configured to detect (e.g., with the input detecting unit 1312) a third user input, via the one or more input units 1304, dragging the merged window into a third window separate from the merged window, where the third window is associated with a second application, and, in response to the third user input, the processing unit 1308 is further configured to add (e.g., with the tab management unit 1316) a new tab associated with the third window to the tab bar of the merged window.

In some embodiments, after adding the new tab associated with the third window to the tab bar of the merged window, the processing unit 1308 is further configured to detect (e.g., with the input detecting unit 1312) a fourth user input, via the one or more input units 1304, close the merged window, and, in response to detecting the fourth user input, the processing unit 1308 is further configured to send (e.g., with the tab management unit 1316) a first window close instruction to the first application to close the first and second windows and a second window close instruction to the second application to close the third window.

In some embodiments, after detecting the first user input, the processing unit 1308 is further configured to detect (e.g., with the input detecting unit 1312) a subsequent user input, via the one or more input units 1304, to add a third window associated with a second application. In response to detecting the subsequent user input, and in accordance with a determination (e.g., with the determining unit 1314) that the first window is displayed within the display area in full screen mode, the processing unit 1308 is further configured to add (e.g., with the tab management unit 1316) the third window as a new tab in a tab bar associated with the first window. In response to detecting the subsequent user input, and in accordance with a determination (e.g., with the determining unit 1314) that the first window is displayed within the display area in windowed mode, the processing unit 1308 is further configured to enable display of (e.g., with the display control unit 1310) the third window as a separate window within the display area.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8E, 9A-9D, and 10A-10C are, optionally, implemented by components depicted in FIGS. 1A-1B or FIGS. 11-13. For example, detection operation 804, detection operation 904, and detection operation 1004 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:

at a device with one or more processors, non-transitory memory, a display, and an input device:

displaying, on the display, a first window in a display area, wherein the first window includes a first edge at a first position and a second edge at a second position;

detecting a first user input, via the input device, associated with the first edge of the first window;

in response to detecting the first user input:

in accordance with a determination that the first user input corresponds to a first input type, resizing a dimension of the first window that corresponds to the first edge of the first window based on a determined amount of movement associated with the first user input, wherein a magnitude of the determined amount of movement associated with the first user input is less than a distance between the first edge of the first window and the corresponding edge of the display area, and wherein the first edge of the first window is not co-located with a corresponding edge of the display area after resizing the dimension of the first window that corresponds to the first edge of the first window; and in accordance with a determination that the first user input corresponds to a second input type that is different from the first input type, moving the first edge of the first window to a corresponding edge of the display area while maintaining display of the second edge at the second position.

2. The method of claim 1, wherein the first input type corresponds to an input that includes a selection followed by the determined amount of movement.

3. The method of claim 1, wherein the second input type corresponds to a stationary input.

4. The method of claim 1, wherein moving the first edge of the first window to the corresponding edge of the display area is in accordance with a determination that the first user input corresponds to the first edge of the first window.

5. The method of claim 4, further comprising:

after moving the first edge of the first window to the corresponding edge of the display area, detecting a second user input, via the input device, associated with the first edge of the first window; and in response to detecting the second user input, and in accordance with a determination that the second user input corresponds to the second input type, moving the first edge of the first window to the first position.

6. The method of claim 4, wherein, prior to detecting the first user input, a second window is displayed within the display area between the first window and the corresponding edge of the display area, and wherein, in accordance with a determination that first user input corresponds to the first edge of the first window and corresponds to the second input type, the movement of the first edge of the first window to the corresponding edge of the display area is bound by an edge of the second window that is parallel to the first edge of the first window.

7. The method of any of claim 1, further comprising, in accordance with a determination that the first user input corresponds to a corner of the first window and is of the second input type, moving the first edge of the first window to the corresponding edge of the display area and moving a third edge of the first window to a corresponding edge of the display area, wherein the first edge and the third edge are adjacent to the corner of the first window.

8. The method of claim 7, further comprising:

after moving the first and third edges of the first window that are adjacent to the corner of the first window to the two corresponding edges of the display area, detecting a second user input, via the input device, associated with at least one edge of the first window; and in response to detecting the second user input:

in accordance with a determination that the second user input corresponds to a single edge of the first window and in accordance with a determination that the second user input corresponds to the second input type, moving the single edge of the first window to a position at which the single edge was located on the display prior detecting to the first user input; and in accordance with a determination that the second user input corresponds to a corner of the first window and in accordance with a determination that the second user input corresponds to the second input type, moving the two edges of the first window that correspond to the corner of the first window to position at which the two edges were located on the display prior detecting to the first user input.

9. The method of claim 7, wherein, prior to detecting the first user input, a second window is displayed within the display area between the first window and at least one of the two corresponding edges of the display area, and wherein, in accordance with a determination that first user input corresponds to the corner of the first window and in accordance with a determination that second user input corresponds to the second input type, the movement of at least one of the two edges of the first window that are adjacent to the corner of the first window to two corresponding edges of the display area is bound by at least one edge of the second window that is parallel to the two edges of the first window.

10. The method of claim 1, wherein resizing the dimension of the first window that corresponds to the first edge of the first window includes:

in accordance with a determination that the first user input satisfies one or more expansion criteria, resizing the dimension of the first window to two parallel edges of the display area; and in accordance with a determination that the first user input does not satisfy the one or more expansion criteria, resizing the dimension of the first window to one edge of the display area.

11. The method of claim 1, further comprising:

in accordance with a determination that the first user input satisfies one or more expansion criteria, resizing a first dimension of the first window to a first set of two parallel edges of the display area and resizing a second dimension of the first window to a second set of parallel edges of the display area, wherein the first and second sets of parallel edges of the display area are distinct; and in accordance with a determination that the first user input does not satisfy the one or more expansion criteria, resizing the first dimension of the first window to a first edge of the display area and the second dimension of the first window to a second edge of the display area.

12. The method of claim 1, further comprising:

in response to detecting the first user input:

in accordance with a determination that the first user input corresponds to a third input type, moving one or more edges of the first window to one or more corresponding edges of the display area.

13. An electronic device comprising:

a display unit configured to display a user interface;

one or more input units configured to receive inputs; and a processing unit coupled with the display unit and the one or more input units, the processing unit configured to:

enable display of, on the display unit, a first window in a display area, wherein the first window includes a first edge at a first position and a second edge at a second position;

detect a first user input, via the one or more input units, associated with the first edge of the first window;

in response to detecting the first user input:

in accordance with a determination that the first user input corresponds to a first input type, resize a dimension of the first window that corresponds to the first edge of the first window based on a determined amount of movement associated with the first user input, wherein a magnitude of the determined amount of movement associated with the first user input is less than a distance between the first edge of the first window and the corresponding edge of the display area, and wherein the first edge of the first window is not co-located with a corresponding edge of the display area after resizing the dimension of the first window that corresponds to the first edge of the first window; and in accordance with a determination that the first user input corresponds to a second input type that is different from the first input type, move the first edge of the first window to a corresponding edge of the display area while maintaining display of the second edge at the second position.

14. The electronic device of claim 13, wherein the first input type corresponds to an input that includes a selection followed by the determined amount of movement and the second input type corresponds to a stationary input.

15. The electronic device of claim 13, wherein moving the first edge of the first window to the corresponding edge of the display area is in accordance with a determination that the first user input corresponds to the first edge of the first window.

16. The electronic device of claim 15, further comprising:

after moving the first edge of the first window to the corresponding edge of the display area, detecting a second user input, via the one or more input units, associated with the first edge of the first window; and in response to detecting the second user input, and in accordance with a determination that the second user input corresponds to the second input type, moving the first edge of the first window to the first position.

17. A non-transitory computer readable storage medium storing one or more programs, the one or more programs comprising instructions, which, when executed by an electronic device with a display, and an input device, cause the electronic device to:

display, on the display, a first window in a display area, wherein the first window includes a first edge at a first position and a second edge at a second position;

detect a first user input, via the input device, associated with the first edge of the first window;

in response to detecting the first user input:

in accordance with a determination that the first user input corresponds to a first input type, resize a dimension of the first window that corresponds to the first edge of the first window based on a determined amount of movement associated with the first user input, wherein a magnitude of the determined amount of movement associated with the first user input is less than a distance between the first edge of the first window and the corresponding edge of the display area, and wherein the first edge of the first window is not co-located with a corresponding edge of the display area after resizing the dimension of the first window that corresponds to the first edge of the first window; and in accordance with a determination that the first user input corresponds to a second input type that is different from the first input type, move the first edge of the first window to a corresponding edge of the display area while maintaining display of the second edge at the second position.

18. The non-transitory computer-readable medium of claim 17, wherein the first input type corresponds to an input that includes a selection followed by the determined amount of movement and the second input type corresponds to a stationary input.

19. The non-transitory computer-readable medium of claim 17, wherein moving the first edge of the first window to the corresponding edge of the display area is in accordance with a determination that the first user input corresponds to the first edge of the first window, further comprising:

after moving the first edge of the first window to the corresponding edge of the display area, detecting a second user input, via the input device, associated with the first edge of the first window; and in response to detecting the second user input, and in accordance with a determination that the second user input corresponds to the second input type, moving the first edge of the first window to the first position.

* * * * *